(12) United States Patent  (10) Patent No.: US 11,947,791 B2
Soli et al.  (45) Date of Patent: Apr. 2, 2024

(54) DEVICES, METHODS, AND SYSTEMS FOR MANIPULATING USER INTERFACES

(71) Applicant: Apple Inc., Cupertino, CA (US)

(72) Inventors: Christopher D. Soli, Santa Cruz, CA (US); Bradley W. Griffin, Redwood City, CA (US); Daniel T. Preston, San Jose, CA (US); Tiffany S. Jon, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 431 days.

(21) Appl. No.: 16/843,019

(22) Filed: Apr. 8, 2020

(65) Prior Publication Data
US 2020/0356250 A1 Nov. 12, 2020

Related U.S. Application Data

(60) Provisional application No. 62/855,801, filed on May 31, 2019, provisional application No. 62/843,827, filed on May 6, 2019.

(51) Int. Cl.
G06F 3/04883 (2022.01)
G06F 3/0354 (2013.01)
G06F 3/04817 (2022.01)

(52) U.S. Cl.
CPC ...... *G06F 3/04883* (2013.01); *G06F 3/03545* (2013.01); *G06F 3/04817* (2013.01)

(58) Field of Classification Search
CPC .. G06F 11/80; G06F 3/03545; G06F 3/04817; G06F 3/04845; G06F 3/04883; G06T 11/80
See application file for complete search history.

(56) References Cited

U.S. PATENT DOCUMENTS

| 5,956,020 A | 9/1999 | D'Amico et al. |
| 9,477,403 B2 * | 10/2016 | Dowd ................. G06F 3/0488 |
| 9,916,017 B2 * | 3/2018 | Liang ................. G06F 3/04842 |

(Continued)

OTHER PUBLICATIONS

Ulrich, Katherine, "Macromedia Flash MX for Windows and Macintosh: Visual QuickStart Guide, Published May 30, 2002, Peachpit Press, Chapter having the section Using the Eraser Tool with Multiple Shapes" (Year: 2002).*

(Continued)

*Primary Examiner* — Alvin H Tan
(74) *Attorney, Agent, or Firm* — Fernando & Partners, LLP

(57) ABSTRACT

A method includes while displaying a drawing user interface, detecting an object insertion input and, in response, inserting a respective object in the drawing user interface. The method includes, while displaying the respective object, detecting a pixel erase input, and, in response, ceasing to display a first portion of the respective object without ceasing to display second and third portions of the respective object. The method includes detecting an object erase input directed to a portion of the respective object, and, in response, when the object erase input is directed to the second portion and the second portion is not connected to the third portion, ceasing to display the second portion, but not the third portion; and when the object erase input is directed to the third portion and the third portion is not connected to the second portion, ceasing to display the third portion, but not the second portion.

25 Claims, 210 Drawing Sheets

(56) References Cited

U.S. PATENT DOCUMENTS

| | | | |
|---|---|---|---|
| 10,832,454 B1* | 11/2020 | Liu | G06F 3/04845 |
| 11,209,975 B2* | 12/2021 | Andrews | G06F 3/04883 |
| 2011/0126129 A1* | 5/2011 | Nagahara | G06F 3/0488 |
| | | | 715/753 |
| 2012/0216150 A1 | 8/2012 | Wernecke | |
| 2013/0167086 A1 | 6/2013 | Kim et al. | |
| 2014/0187318 A1 | 7/2014 | Gallizzi et al. | |
| 2015/0169069 A1 | 6/2015 | Lo et al. | |
| 2016/0098186 A1* | 4/2016 | Sugiura | G06F 40/171 |
| | | | 345/173 |
| 2017/0364248 A1* | 12/2017 | Tran | G06T 3/60 |
| 2018/0349020 A1* | 12/2018 | Jon | G06F 3/04883 |

OTHER PUBLICATIONS

Johnson, Steve, "Adobe Photoshop CS5 on Demand," May 2010, Que, ISBN-13: 978-0-7897-4447-0, ISBN-10: 0-7897-4447-3 (Year: 2010).*

International Preliminary Report on Patentability for PCT/US2018/023484 dated Dec. 3, 2019, pp. 1-12.

* cited by examiner

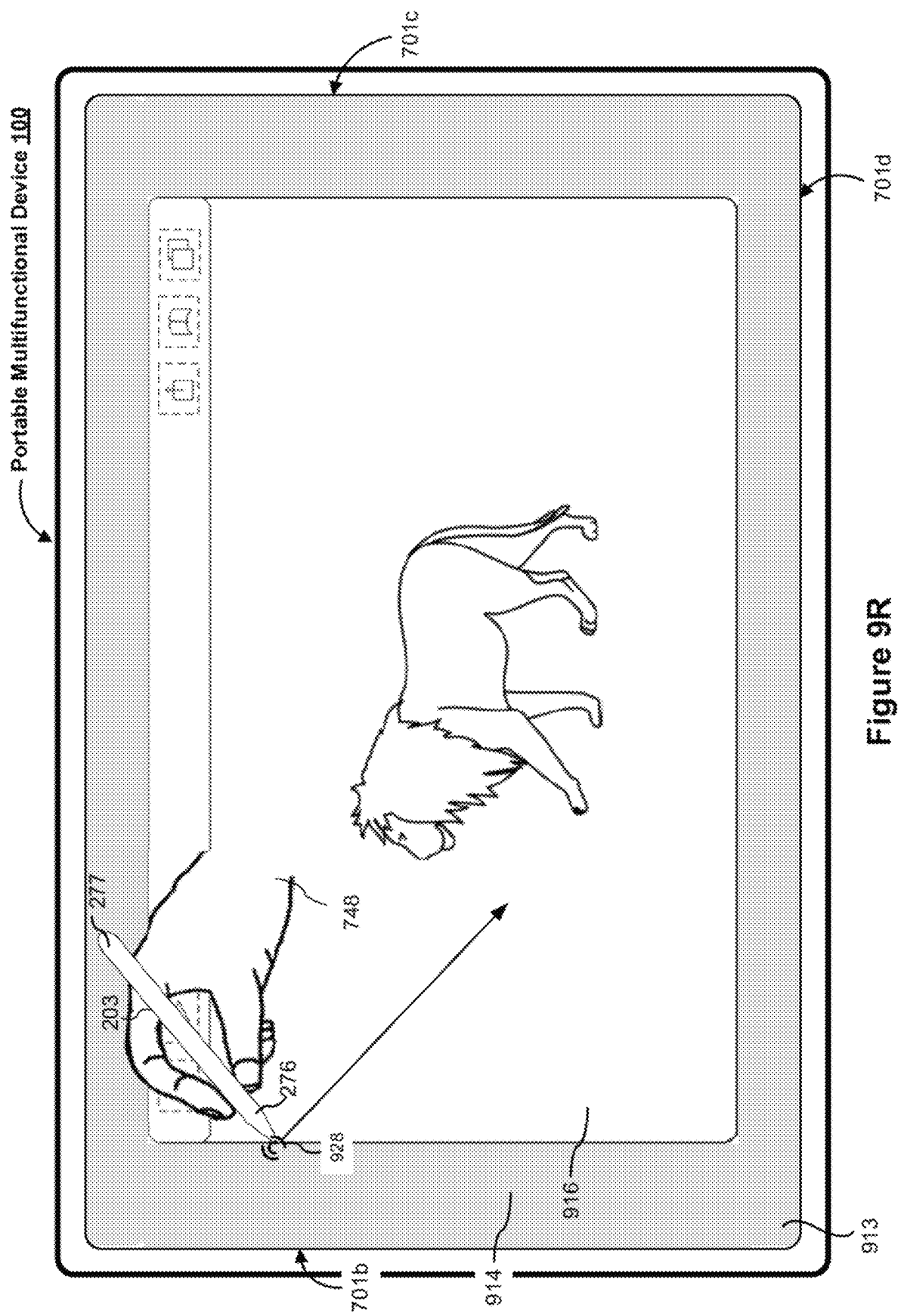

1000

---
While displaying the first drawing palette at the second location with the first appearance and having a first orientation, wherein the second location corresponds to a first location type:
    detect, via the input device, a second input that corresponds to a request to move the first drawing palette to a fourth location within the first application interface, wherein the fourth location corresponds to the first location type; and
    in response to detecting the second input:
        in accordance with a determination that the fourth location is on an opposite side of the display as compared with the second location, display the first drawing palette at the fourth location with the first appearance and having the first orientation; and
        in accordance with a determination that the fourth location is not on the opposite side of the display as compared with the second location, display the first drawing palette at the fourth location with the first appearance and having a second orientation different from the first orientation — 1028
---

---
While displaying the first drawing palette at the second location:
    detect, via the input device, a tap input directed to the first drawing palette; and
    in response to detecting the tap input, move the first drawing palette to the first location — 1030
---

---
The second appearance corresponds to the first drawing palette being in a condensed state — 1032

In accordance with a determination that the first input corresponds to a second input type that is different from the first input type, display the first drawing palette at the third location with the second appearance based on the first location type and the second input type — 1034

Determine that the third location corresponds to a second location type that is different from the first location type — 1036

In accordance with a determination that the first input satisfies a second distance threshold different from the first distance threshold — 1038
---

1040 — While displaying the first drawing palette in the condensed state at the third location:
  detect, via the input device, a touch input directed to the first drawing palette; and
  in response detecting the touch input, display the first drawing palette in a second expanded state that is different from the first expanded state, wherein the first drawing palette in the second expanded state includes more drawing tools than the first drawing palette in the condensed state 1042 — Detect, via the input device, a second input directed to a particular editing affordance within the first drawing palette in the second expanded state; and
  in response to detecting the second input, set a current editing setting associated with the first drawing palette according to the particular editing affordance

1044 — While displaying the first drawing palette at the second location or the third location:
  detect, via the input device, a tap input directed to the first drawing palette; and
  in response to detecting the tap input, move the first drawing palette to the first location

The first input type corresponds to a release of a movement of a stylus across a touch-sensitive surface of the electronic device, and the movement of the stylus is away from an edge of the touch-sensitive surface ——1118

The release point within the touch-sensitive surface is a threshold distance away from a target location of the touch-sensitive surface ——1120

The screenshot editing interface further includes a drawing palette at a first location within the screenshot editing interface, and the first drawing palette is movable to a second location within the screenshot editing interface in response to a first input directed to the first drawing palette ——1122

(B)

While displaying the screenshot editing interface that includes an opacity level affordance: ——1124
　　detect, via the input device, a first input directed to the opacity level affordance, wherein the first input sets the opacity level affordance to a respective opacity value; and
　　in response to detecting the first input, change an opacity of a filtering layer that is overlaid on the screenshot image to the respective opacity value In response to detecting the first input, display, via the display device, the filtering layer overlaid on annotations to the screenshot image ——1126

In response to detecting the first input, display, via the display device, annotations to the screenshot image overlaid on the filtering layer ——1128

(D)

In response to detecting, via the input device, a second input directed to a done affordance included within the screenshot editing interface, display, via the display device, a save interface; ——1130
　　detect, via the input device, a third input directed to the save interface; and
　　in response to detecting the third input, store the screenshot image and the filtering layer as a flattened image

```
┌─────────────────────────────────────────────────────────────────────────┐ ─ 1132
│ The screenshot editing interface further includes a respective affordance, the method │
│ further comprising:                                                     │
│        detect, via the input device, a first input directed to the respective affordance; │
│ and                                                                     │
│        in response to detecting the first input, add additional content to the │
│ screenshot editing interface that was not displayed on the display when the │
│ screenshot capture input was detected                                   │
└─────────────────────────────────────────────────────────────────────────┘
```

```
┌─────────────────────────────────────────────────────────────────────────┐ ─ 1134
│        In response to detecting, via the input device, a second input directed to a │
│ share affordance included within the screenshot editing interface, display, via the │
│ display device, a share interface;                                      │
│        detect, via the input device, a third input directed to the share interface; and │
│        in response to detecting the third input, store the screenshot image and the │
│ filtering layer as an image file, wherein the screenshot image and the filtering layer │
│ are separately editable                                                 │
└─────────────────────────────────────────────────────────────────────────┘
```

While displaying the respective object in the drawing user interface and before detecting the pixel erase input: — 1318
    display, within the drawing user interface, a drawing palette including a plurality of content manipulation affordances;
    detect, via the input device, a first input directed to an eraser affordance of the plurality of content manipulation affordances, wherein the eraser affordance is associated with an eraser tool;
    in response to detecting the first input, display an eraser mode interface including a plurality of eraser mode affordances;
    detect, via the input device, a second input directed to a first one of the plurality of eraser mode affordances; and
    in response to detecting the second input, set the eraser tool to a pixel erase mode of operation, wherein the pixel erase input is detected while the eraser tool is in the pixel erase mode of operation While the eraser tool is in the pixel erase mode of operation: — 1320
    detect, via the input device, a third input directed to a second one of the plurality of eraser mode affordances; and
    in response to detecting the third input, set the eraser tool to an object erase mode of operation, wherein the object erase input is detected while the eraser tool is in the object erase mode of operation While the eraser tool is in the object erase mode of operation, the eraser affordance has a first appearance, and while the eraser tool is in the pixel erase mode of operation, the eraser affordance has a second appearance that is different from the first appearance — 1322

(B)

The first portion of the respective object is within a first path defined by the pixel erase input — 1324

The first path defined by the pixel erase input passes through the respective object, resulting in the second portion of the respective object that is not connected to the third portion of the respective object — 1326

In response to detecting the object erase input:
    in accordance with a determination that the object erase input is directed to the second portion of the respective object and that the second portion of the respective object is connected to the third portion of the respective object, cease to display the second portion of the respective object and cease to display the third portion of the respective object — 1328

In response to detecting the object erase input:
    in accordance with a determination that the object erase input is directed to the third portion of the respective object and that the third portion of the respective object is connected to the second portion of the respective object, cease to display the third portion of the respective object and cease to display the second portion of the respective object — 1330

In accordance with a determination that the object erase input defines a third path intersecting the second portion of the respective object and intersecting the third portion of the respective object, cease to display the second portion of the respective object and cease to display the third portion of the respective object — 1332

In response to detecting the object erase input:
    in accordance with a determination that the object erase input is directed to the second portion of the respective object and that the second portion of the respective object is connected to the third portion of the respective object, cease to display the second portion of the respective object and cease to display the third portion of the respective object; and
    in accordance with a determination that the object erase input is directed to the third portion of the respective object and that the second portion of the respective object is connected to the third portion of the respective object, cease to display the second portion of the respective object and cease to display the third portion of the respective object — 1334

(G) ——1336 in accordance with a determination that the object erase input defines a first path intersecting the second portion of the respective object and not intersecting the third portion of the respective object, cease to display the second portion of the respective object without ceasing to display the third portion of the respective object

---

(H) ——1338

In accordance with a determination that the object erase input defines a second path intersecting the third portion of the respective object and not intersecting the second portion of the respective object, cease to display the third portion of the respective object without ceasing to display the second portion of the respective object

---

(I)

---

While displaying, within the drawing user interface, a drawing palette including a plurality of content manipulation affordances, detect, via the input device, a first input directed to a drawing affordance of the plurality of content manipulation affordances; ——1340 in response to detecting the first input, change a currently selected tool from an eraser tool to a drawing tool that is associated with the drawing affordance;

detect, via the input device, a drawing input directed to a canvas of the drawing user interface; and in response to detecting the drawing input, perform a drawing operation on the canvas

---

After changing the currently selected tool from the eraser tool to the drawing tool, detect, via the input device, a second input directed to an eraser affordance of the plurality of content manipulation affordances, wherein the eraser affordance is associated with the eraser tool; and ——1342 in response to detecting the second input, change the currently selected tool from the drawing tool to the eraser tool

Figure 13D

DEVICES, METHODS, AND SYSTEMS FOR MANIPULATING USER INTERFACES

CROSS-REFERENCE TO RELATED APPLICATIONS

This application claims priority to U.S. Provisional Patent App. No. 62/855,801, filed on May 31, 2019 and U.S. Provisional Patent App. No. 62/843,827, filed on May 6, 2019, both of which are hereby incorporated by reference in their entirety.

TECHNICAL FIELD

This relates generally to electronic devices with user interfaces, and, in particular, to electronic devices with one or more input devices that detect inputs in order to manipulate the user interfaces.

BACKGROUND

Using inputs for manipulating user interfaces of an electronic device has become ubiquitous. For example, in various embodiments, an electronic device uses peripheral-type input devices (e.g., a touch-screen input, mouse, keyboard) in order to affect the display of one or more displayed user interfaces.

However, many of these input devices provide limited and inefficient control for manipulating the user interface. Accordingly, repetitive, complex, and/or cumbersome inputs or input types may be needed to manipulate the user interface in order for the electronic device to perform a particular operation.

SUMMARY

Accordingly, there is a need for a robust and efficient mechanism for manipulating the user interface of a display at an electronic device. In particular, there is a need for the electronic device to have faster, more efficient methods and interfaces for user interface manipulation. Such methods and interfaces optionally complement or replace conventional methods for manipulating user interfaces. Such methods and interfaces reduce the number, extent, and/or nature of the inputs from a user and produce a more efficient human-machine interface. Accordingly, for battery-operated devices, such methods and interfaces conserve power and increase the time between battery charges.

The above deficiencies and other problems associated with user interfaces for electronic devices with touch-sensitive surfaces are reduced or eliminated by the disclosed devices, systems, and methods. In some embodiments, the electronic device is a desktop computer. In some embodiments, the electronic device is portable (e.g., a notebook computer, tablet computer, or handheld device). In some embodiments, the electronic device is a personal electronic device, such as a mobile phone or a wearable device (e.g., a smartwatch). In some embodiments, the electronic device has a touchpad. In some embodiments, the electronic device has a touch-sensitive display (also known as a "touch screen" or "touch-screen display"). In some embodiments, the electronic device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the user interacts with the GUI primarily through user interactions with the stylus while the stylus is not in physical contact with the touch-sensitive surface. In some embodiments, the user interacts with the GUI primarily through finger and/or hand contacts and gestures on the stylus while the user is holding the stylus. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with one or more processors, a non-transitory memory, an input device, and a display device. The method includes displaying, via the display device, a first drawing palette at a first location within a first application interface. The first drawing palette has a first appearance at the first location in which a representation of a currently selected drawing tool is concurrently displayed with one or more representations of other available drawing tools. The method further includes detecting, via the input device, a first input that corresponds to a request to move the first drawing palette within the first application interface. The method further includes, in response to detecting the first input: in accordance with a determination that the first input corresponds to a request to move the first drawing palette to a second location within the first application interface, displaying the first drawing palette at the second location with the first appearance; and in accordance with a determination that the first input corresponds to a request to move the first drawing palette to a third location within the first application interface that is different from the second location, displaying the first drawing palette at the third location with a second appearance that is different from the first appearance, wherein when the first drawing palette has the second appearance a representation of the currently selected drawing tool is displayed in the first drawing palette without displaying representations of other drawing tools in the first drawing palette.

In accordance with some embodiments, a method is performed at an electronic device with one or more processors, a non-transitory memory, an input device, and a display device. The method includes, while displaying content via the display device, detecting a screenshot capture input. The method further includes, in response to detecting the screenshot capture input: capturing a screenshot image of the content displayed via the display device; in accordance with a determination that the screenshot capture input is a first input type, displaying, via the display device, a screenshot editing interface for editing the screenshot image, wherein the screenshot editing interface includes the screenshot image; and in accordance with a determination that the screenshot capture input corresponds to a second input type that is different from the first input type, displaying, via the display device, a thumbnail representation of the screenshot image overlaid on the content and captured within the screenshot image.

In accordance with some embodiments, a method is performed at an electronic device with one or more processors, a non-transitory memory, an input device, and a display device. The method includes displaying, via the display device, a drawing user interface. The method further includes while displaying the drawing user interface, detecting an object insertion input that corresponds to a request to insert an object in the drawing user interface. The method further includes in response to detecting the object insertion input, inserting a respective object in the drawing user interface. The method further includes while the respective object is displayed in the drawing user interface, detecting a pixel erase input. The method further includes, in response to detecting the pixel erase input, ceasing to display a first portion of the respective object without ceasing to display a second portion of the respective object and without ceasing to display a third portion of the respective object. The method further includes detecting an object erase input directed to a portion of the respective object. The method further includes in response to detecting the object erase input: in accordance with a determination that the object erase input is directed to the second portion of the respective object and that the second portion of the respective object is not connected to the third portion of the respective object, ceasing to display the second portion of the respective object without ceasing to display the third portion of the respective object; and in accordance with a determination that the object erase input is directed to the third portion of the respective object and that the third portion of the respective object is not connected to the second portion of the respective object, ceasing to display the third portion of the respective object without ceasing to display the second portion of the respective object.

In accordance with some embodiments, an electronic device includes one or more processors, a non-transitory memory, an input device, a display device, and one or more programs. The one or more programs are stored in the non-transitory memory and configured to be executed by the one or more processors. The one or more programs include instructions for performing or causing performance of the operations of any of the methods described herein. In accordance with some embodiments, a non-transitory computer readable storage medium has stored therein instructions, which, when executed by an electronic device with one or more processors, an input device, and a display device, cause the electronic device to perform or cause performance of the operations of any of the methods described herein. In accordance with some embodiments, a graphical user interface on an electronic device with a non-transitory memory, an input device, and a display device, and one or more processors to execute one or more programs stored in the non-transitory memory includes one or more of the elements displayed in any of the methods described herein, which are updated in response to inputs, as described in any of the methods described herein. In accordance with some embodiments, an electronic device includes: one or more processors, a non-transitory memory, an input device, a display device, and means for performing or causing performance of the operations of any of the methods described herein. In accordance with some embodiments, an information processing apparatus, for use in an electronic device with one or more processors, a non-transitory memory, an input device, and a display device, includes means for performing or causing performance of the operations of any of the methods described herein.

Thus, an electronic device with an input device and a display device exploits various inputs detected via the input device, such as touch inputs, mouse inputs, keyboard inputs, etc. Based on the inputs, the electronic device effects a variety of operations, such as drawing palette manipulation operations (e.g., movement and resize/reorientation of the drawing palette), screenshot capture operations, and editing operations. In some embodiments, as compared with previously available systems, fewer inputs cause the electronic device to perform a particular operation, resulting in improved functionality of the electronic device. Examples of the improved functionality are longer battery life and less wear-and-tear, as well as more efficient and accurate user interactions with the electronic device.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 10A-10D are a flow diagram of a method for repositioning a drawing palette in accordance with some embodiments.

FIGS. 11A-11C are a flow diagram of a method for invoking and utilizing a screenshot editing interface in accordance with some embodiments.

FIGS. 13A-13D are a flow diagram of a method for selectively erasing portions of an object in accordance with some embodiments.

DESCRIPTION OF EMBODIMENTS

Figure 1A:
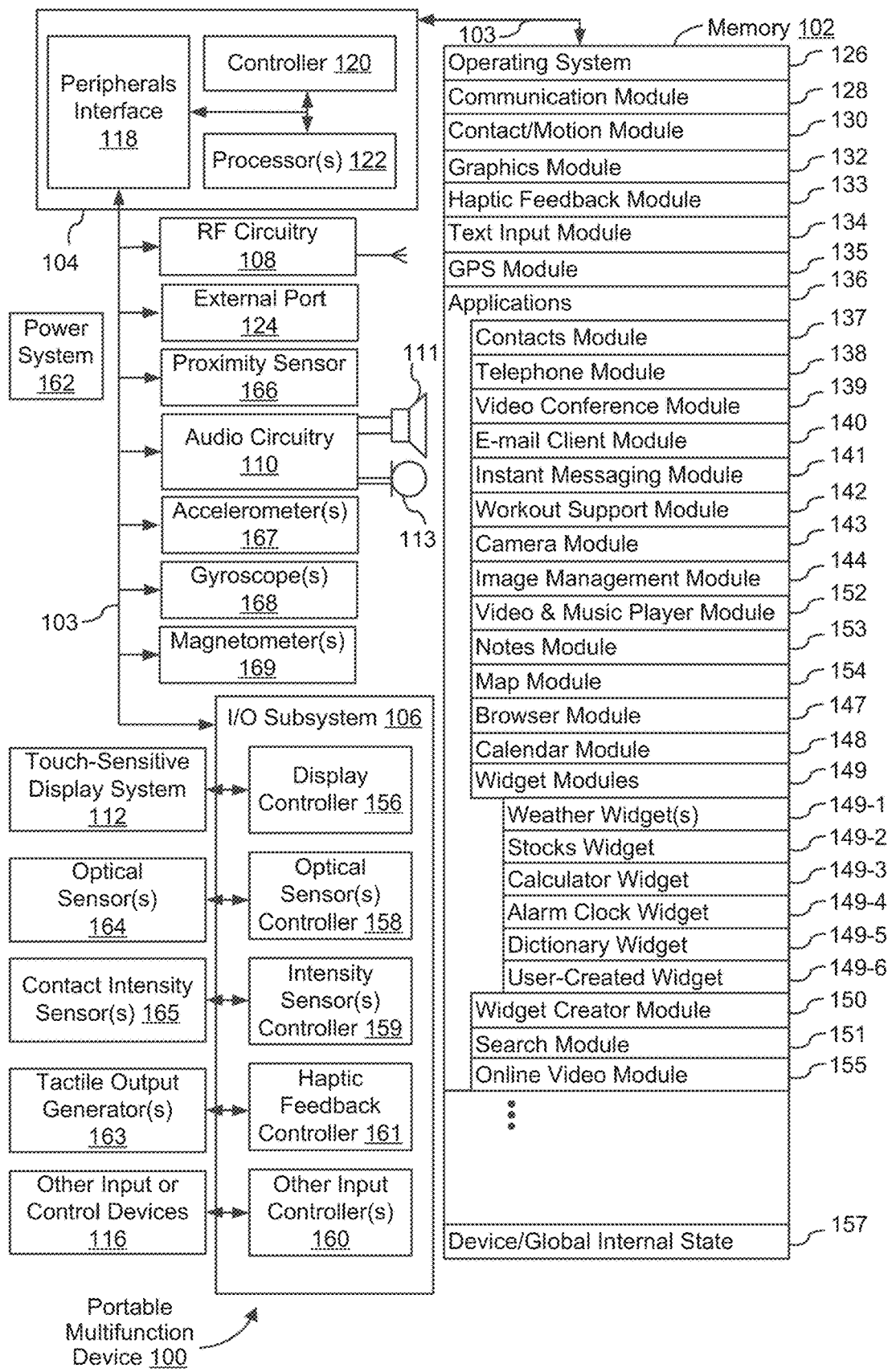
FIG. 1A is a block diagram illustrating a portable multifunction device with a touch-sensitive display in accordance with some embodiments.

Many electronic devices manipulate user interfaces based on detected inputs. However, existing methods for manipulating user interfaces may be slow, cumbersome, and inefficient.

For example, in various embodiments, an electronic device may display a drawing palette that enables changing which drawing tool is currently selected and/or properties of the currently selected drawing tool (e.g., color). However, the drawing palette may be fixed to a particular location (e.g., fixed to a particular side of the display). Consequently, drawing operations (e.g., drawing a line, entering text, pasting a shape) cannot be applied to a portion of the user interface where the drawing palette is located, which, in turn, limits usable display area of the user interface. Moreover, the electronic device does not change an appearance of the drawing palette (e.g., size, orientation, or number of types of drawing tools displayed therein) in response to detecting inputs requesting movement of the drawing palette. However, various embodiments disclosed herein provide that, in response to detecting a request to move a drawing palette to a particular location within the user interface, an electronic device displays the drawing palette at the particular location and, in various circumstances, with a different appearance. By changing the position and orientation of the drawing palette, the electronic device provides a larger useable portion of the display for drawing operations and other content modification operations.

As another example, in various embodiments, an electronic device may provide a screenshot capture function that provides an unintuitive, non-user-friendly experience. For example, the screenshot capture function provides limited mechanisms for manipulating a captured screenshot image. Furthermore, screenshot images are typically saved to a background clipboard unbeknownst to an unsophisticated user. However, various embodiments disclosed herein provide that, based on an input type of a detected input, an electronic device displays a screenshot editing interface or a thumbnail representation of a screenshot image. Moreover, in some embodiments, the screenshot editing interface includes a rich set of manipulation options (e.g., annotating, changing opacity level, or showing additional related content) to apply to the screenshot image. Accordingly, after performing a screenshot capture, the electronic device displays the screenshot editing interface, thereby providing a seamless and intuitive user experience that requires less time and fewer user inputs for manipulating screenshot images. This also reduces power usage and improves battery life of the electronic device by enabling the user to use the electronic device more quickly and efficiently.

As yet another example, in various embodiments, an electronic device provides an erasing tool for erasing portions of content. However, the erasing tool is limited in its functionality. For example, the erasing tool cannot perform different erasing operations on a portion of an object based on whether the portion was previously disconnected (e.g., split or divided) from other portions of the object. On the other hand, various embodiments disclosed herein provide that, after splitting an object into multiple disconnected portions based on a pixel erase input, an electronic device ceases to display a particular disconnected portion and maintains the other remaining portions in response to an object erase input. Accordingly, the electronic device provides greater functionality and control with respect to erasing operations. Moreover, the electronic device need not receive a drag erase input that is spatially coextensive with a disconnected portion of an object in order to erase the disconnected portion. By utilizing the object erase input instead of the drag erase input in order to erase the disconnected portion, the electronic device reduces processing and battery utilization and experiences less wear-and-tear.

Figure 7A:
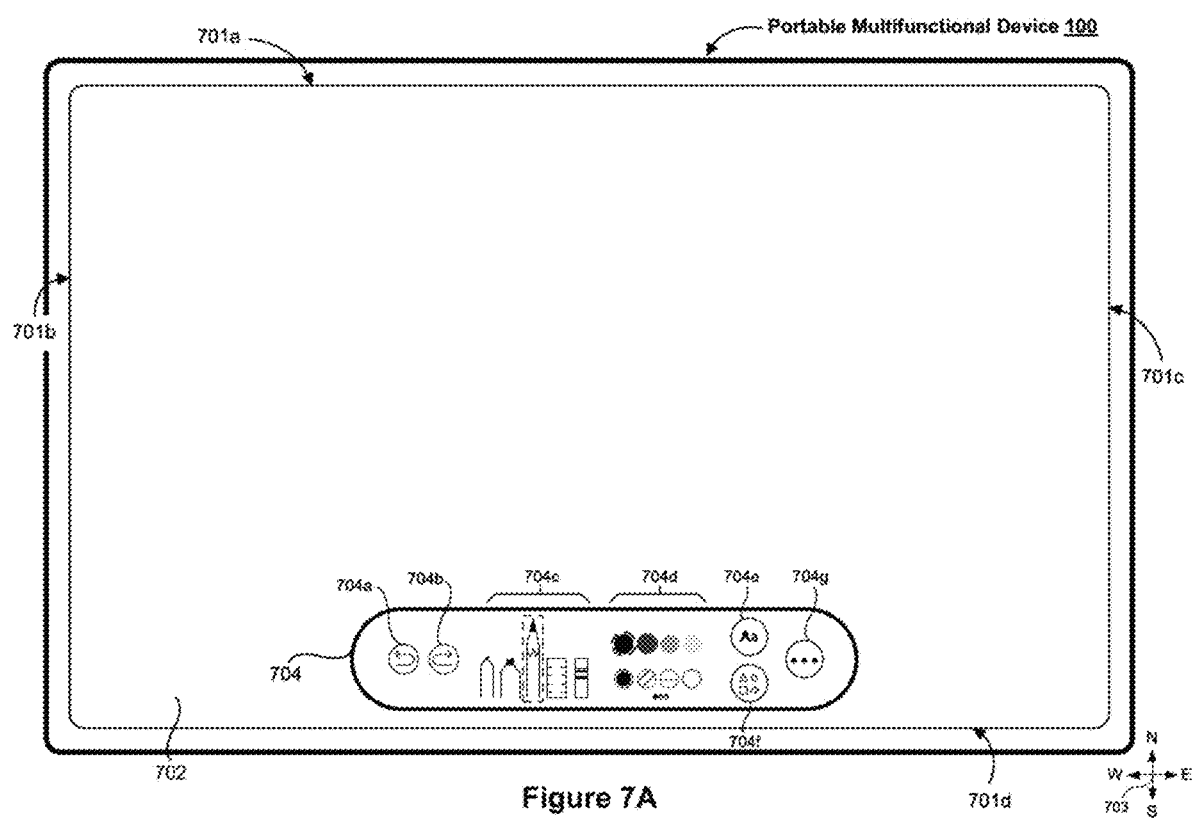
FIGS. 7A-7CF are examples of user interfaces for repositioning a drawing palette in accordance with some embodiments.
Figure 7B:
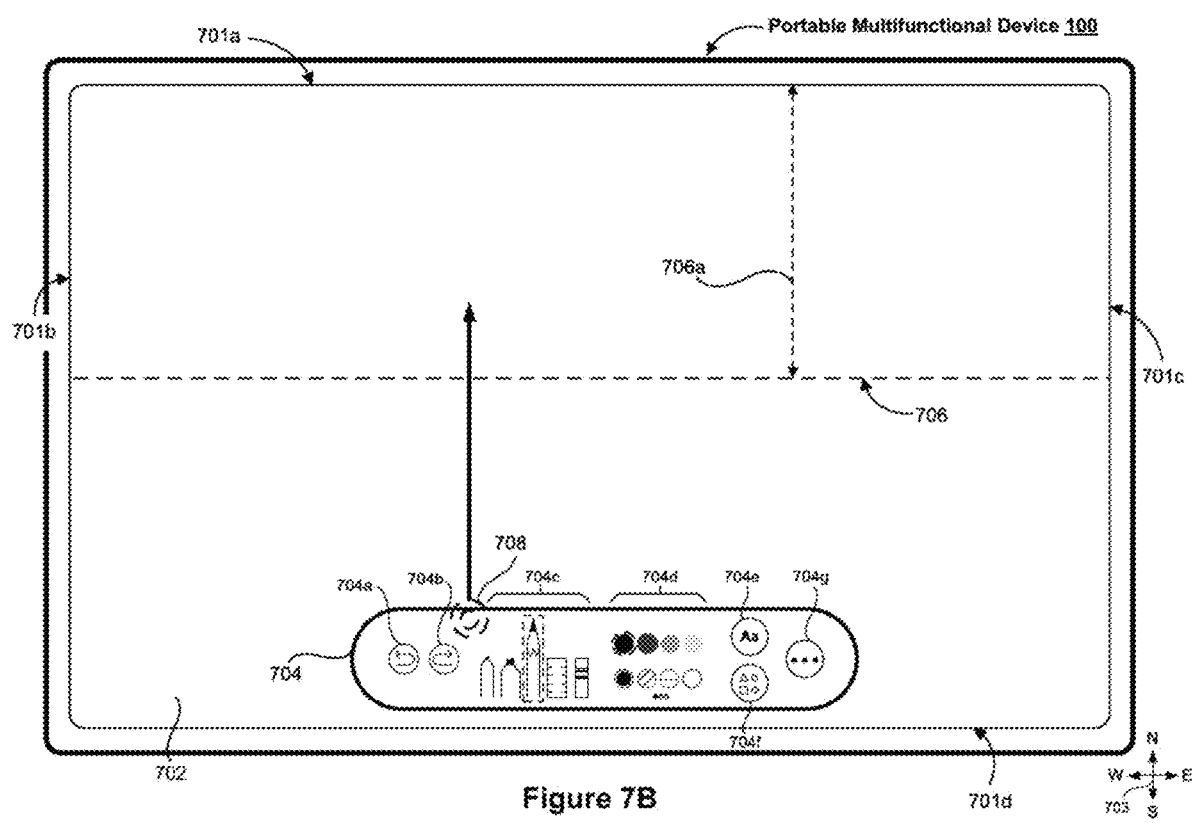
Figure 7C:
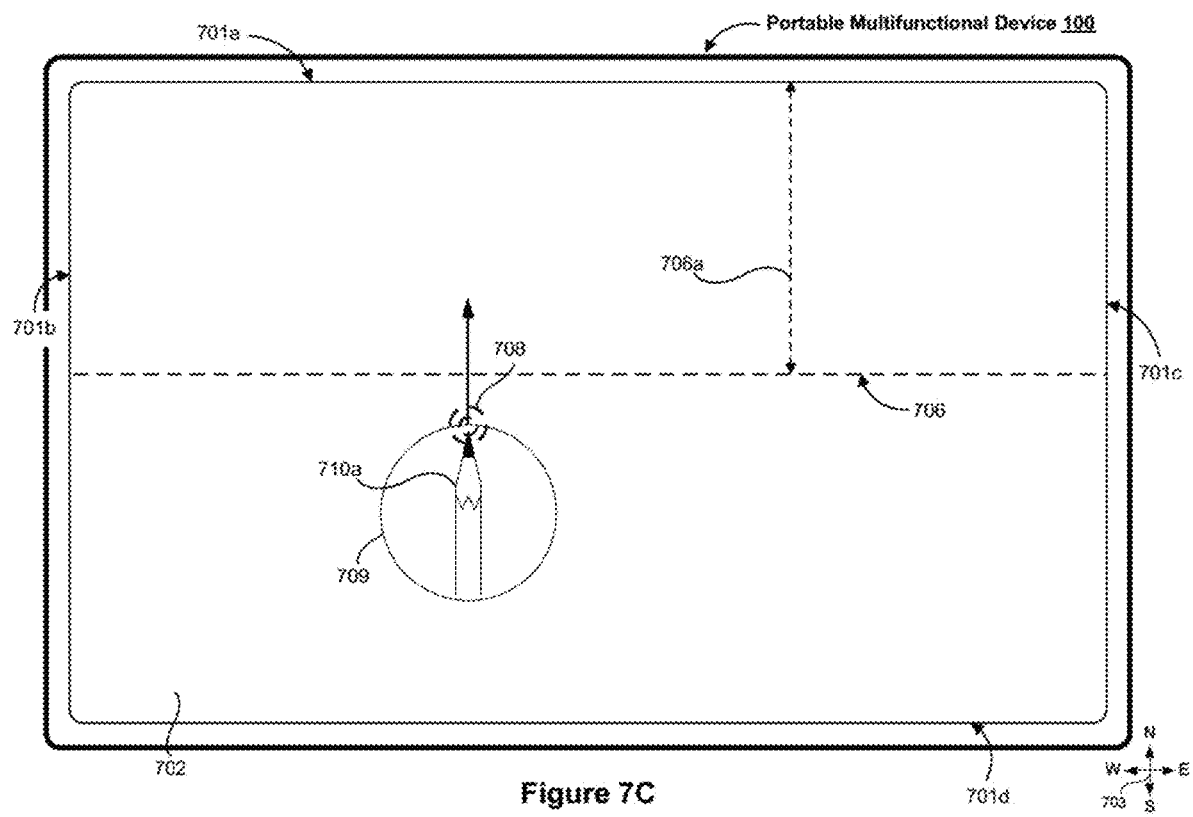
Figure 8A:
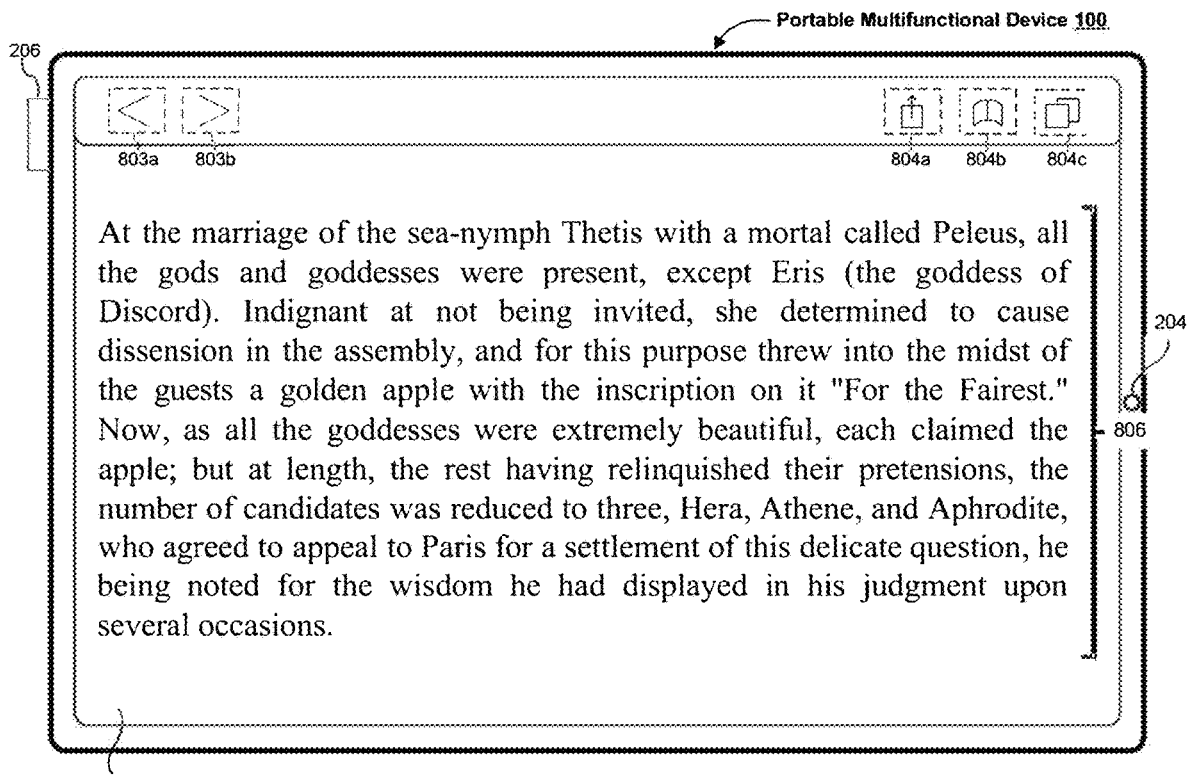
FIGS. 8A-8AL are examples of user interfaces for invoking and utilizing a screenshot editing interface in accordance with some embodiments.
Figure 9A:
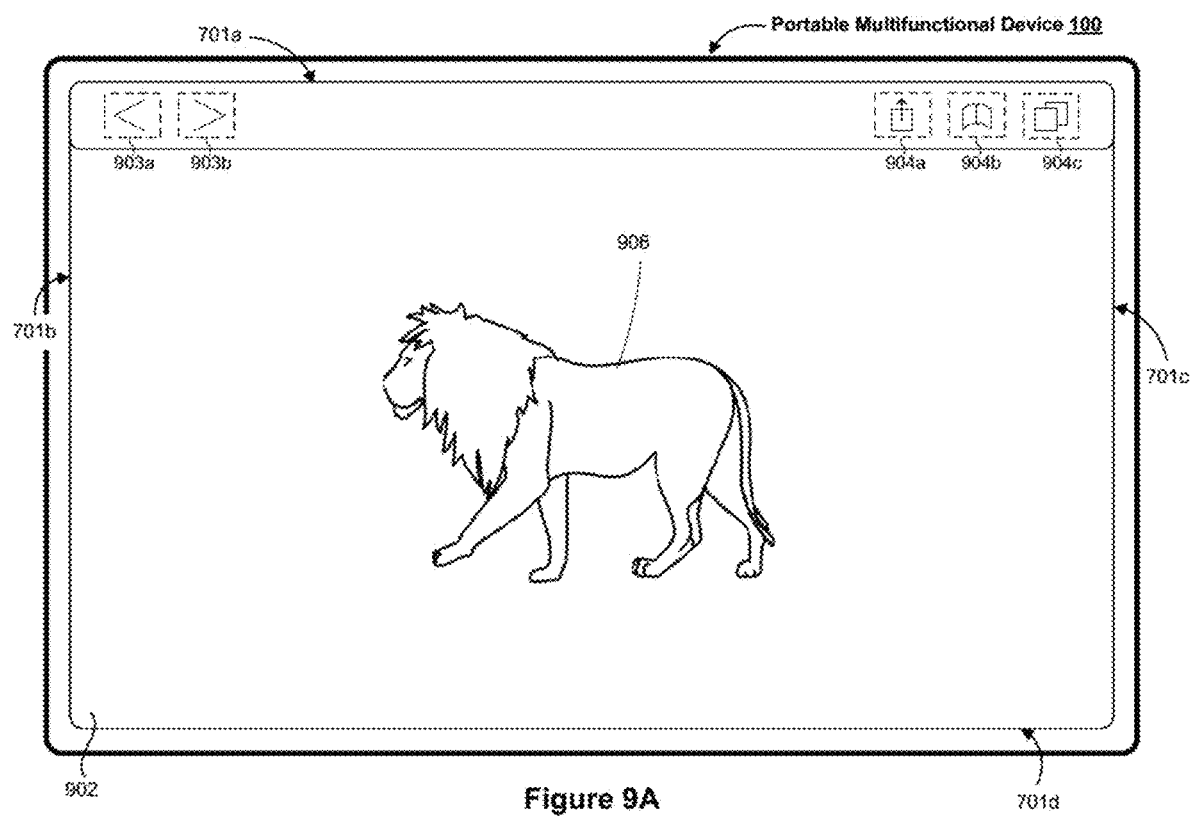
FIGS. 9A-9Z are examples of capturing a screenshot image based on detected stylus inputs in accordance with some embodiments.

Below, FIGS. 1A-1B, 2-4, 5A-5B, and 6A-6B provide a description of example devices. FIGS. 7A-7CF are examples of user interfaces for repositioning a drawing palette in accordance with some embodiments. The user interfaces in FIGS. 7A-7CF are used to illustrate the processes in FIGS. 10A-10D. FIGS. 8A-8AL are examples of user interfaces for invoking and utilizing a screenshot editing interface in accordance with some embodiments. FIGS. 9A-9Z are examples of capturing a screenshot image based on detected stylus inputs in accordance with some embodiments. The user interfaces in FIGS. 8A-8AL and FIGS. 9A-9Z are used to illustrate the processes in FIGS. 11A-11C. FIGS. 12A-12AP are examples of user interfaces for selectively erasing portions of an object in accordance with some embodiments. The user interfaces in FIGS. 12A-12AP are used to illustrate the processes in FIGS. 13A-13D.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the electronic device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch-screen displays and/or touchpads), are, optionally, used. It should also be understood that, in some embodiments, the electronic device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The electronic device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the electronic device optionally use at least one common physical user-interface device, such as the touch-sensitive surface. One or more functions of the touch-sensitive surface as well as corresponding information displayed on the electronic device are, optionally, adjusted and/or varied from one application to the next and/or within a respective application. In this way, a common physical architecture (such as the touch-sensitive surface) of the electronic device optionally supports the variety of applications with user interfaces that are intuitive and transparent to the user.

Attention is now directed toward embodiments of portable devices with touch-sensitive displays. FIG. 1A is a block diagram illustrating a portable multifunction device 100 with touch-sensitive display system 112 in accordance with some embodiments. The touch-sensitive display system 112 is sometimes called a "touch screen" for convenience and is sometimes simply called a touch-sensitive display. The electronic device 100 includes memory 102 (which optionally includes one or more computer readable storage mediums), a memory controller 122, one or more processing units (CPUs) 120, a peripherals interface 118, RF circuitry 108, audio circuitry 110, a speaker 111, a microphone 113, an input/output (I/O) subsystem 106, other input or control devices 116, and an external port 124. The electronic device 100 optionally includes one or more optical sensors 164. The electronic device 100 optionally includes one or more intensity sensors 165 for detecting intensity of contacts on the electronic device 100 (e.g., a touch-sensitive surface such as the touch-sensitive display system 112 of the electronic device 100). The electronic device 100 optionally includes one or more tactile output generators 163 for generating tactile outputs on the electronic device 100 (e.g., generating tactile outputs on a touch-sensitive surface such as the touch-sensitive display system 112 of the electronic device 100 or touchpad 355 of device 300). These components optionally communicate over one or more communication buses or signal lines 103.

As used in the specification and claims, the term "tactile output" refers to physical displacement of an electronic device relative to a previous position of the electronic device, physical displacement of a component (e.g., a touch-sensitive surface) of an electronic device relative to another component (e.g., housing) of the electronic device, or displacement of the component relative to a center of mass of the electronic device that will be detected by a user with the user's sense of touch. For example, in situations where the electronic device or the component of the electronic device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the electronic device or the component of the electronic device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," or "roughness"), unless otherwise stated, the generated tactile output corresponds to physical displacement of the electronic device or a component thereof that will generate the described sensory perception for a typical (or average) user.

It should be appreciated that the electronic device 100 is only one example of a portable multifunction device, and that the electronic device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

The memory 102 optionally includes high-speed random-access memory and optionally also includes non-volatile memory, such as one or more magnetic disk storage devices, flash memory devices, or other non-volatile solid-state memory devices. Access to memory 102 by other components of the electronic device 100, such as the one or more CPUs 120 and the peripherals interface 118, is, optionally, controlled by the memory controller 122.

The peripherals interface 118 can be used to couple input and output peripherals of the electronic device to the one or more CPUs 120 and the memory 102. The one or more processors CPUs run or execute various software programs and/or sets of instructions stored in the memory 102 to perform various functions for the electronic device 100 and to process data.

In some embodiments, the peripherals interface 118, the one or more CPUs 120, and the memory controller 122 are, optionally, implemented on a single chip, such as chip 104. In some other embodiments, they are, optionally, implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the electronic device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data is, optionally, retrieved from and/or transmitted to the memory 102 and/or the RF circuitry 108 by the peripherals interface 118. In some embodiments, the audio circuitry 110 also includes a headset jack (e.g., a headset jack 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an optical sensor controller 158, an intensity sensor controller 159, a haptic feedback controller 161, and one or more input controllers 160 for other input or control devices. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate embodiments, the one or more input controllers 160 are, optionally, coupled with any (or none) of the following: a keyboard, infrared port, USB port, stylus, and/or a pointer device such as a mouse. The one or more buttons (e.g., buttons 208, FIG. 2) optionally include an up/down button for volume control of the speaker 111 and/or the microphone 113. The one or more buttons optionally include a push button (e.g., a push button 206, FIG. 2).

The touch-sensitive display system 112 provides an input interface and an output interface between the electronic device and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example embodiment, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other embodiments. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112. In an example embodiment, projected mutual capacitance sensing technology is used, such as that found in the iPhone®, iPod Touch®, and iPad® from Apple Inc. of Cupertino, California.

The touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with the touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the electronic device translates the rough finger-based input into a precise pointer/cursor position or command for performing the actions desired by the user.

In some embodiments, in addition to the touch screen, the electronic device 100 optionally includes a touchpad (not shown) for activating or deactivating particular functions. In some embodiments, the touchpad is a touch-sensitive area of the electronic device that, unlike the touch screen, does not display visual output. The touchpad is, optionally, a touch-sensitive surface that is separate from the touch-sensitive display system 112 or an extension of the touch-sensitive surface formed by the touch screen.

The electronic device 100 also includes a power system 162 for powering the various components. The power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The electronic device 100 optionally also includes one or more optical sensors 164. FIG. 1A shows an optical sensor coupled with an optical sensor controller 158 in the I/O subsystem 106. The one or more optical sensors 164 optionally include charge-coupled device (CCD) or complementary metal-oxide semiconductor (CMOS) phototransistors. The one or more optical sensors 164 receive light from the environment, projected through one or more lens, and converts the light to data representing an image. In conjunction with imaging module 143 (also called a camera module), the one or more optical sensors 164 optionally capture still images and/or video. In some embodiments, an optical sensor is located on the back of the electronic device 100, opposite the touch-sensitive display system 112 on the front of the electronic device 100, so that the touch screen is enabled for use as a viewfinder for still and/or video image acquisition. In some embodiments, another optical sensor is located on the front of the electronic device 100 so that the user's image is obtained (e.g., for selfies, for videoconferencing while the user views the other video conference participants on the touch screen, etc.).

The electronic device 100 optionally also includes one or more contact intensity sensors 165. FIG. 1A shows a contact intensity sensor coupled with the intensity sensor controller 159 in I/O subsystem 106. The one or more contact intensity sensors 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The one or more contact intensity sensors 165 receive contact intensity information (e.g., pressure information or a proxy for pressure information) from the environment. In some embodiments, at least one contact intensity sensor is collocated with, or proximate to, a touch-sensitive surface (e.g., the touch-sensitive display system 112). In some embodiments, at least one contact intensity sensor is located on the back of the electronic device 100, opposite the touch-screen display system 112 which is located on the front of the electronic device 100.

The electronic device 100 optionally also includes one or more proximity sensors 166. FIG. 1A shows the proximity sensor 166 coupled with the peripherals interface 118. Alternately, the proximity sensor 166 is coupled with an input controller 160 in the I/O subsystem 106. In some embodiments, the proximity sensor 166 turns off and disables the touch-sensitive display system 112 when the electronic device 100 is placed near the user's ear (e.g., when the user is making a phone call).

The electronic device 100 optionally also includes one or more tactile output generators 163. FIG. 1A shows a tactile output generator coupled with the haptic feedback controller 161 in the I/O subsystem 106. The one or more tactile output generators 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The one or more tactile output generators 163 receive tactile feedback generation instructions from a haptic feedback module 133 and generates tactile outputs on the electronic device 100 that are capable of being sensed by a user of the electronic device 100. In some embodiments, at least one tactile output generator is collocated with, or proximate to, a touch-sensitive surface (e.g., the touch-sensitive display system 112) and, optionally, generates a tactile output by moving the touch-sensitive surface vertically (e.g., in/out of a surface of the electronic device 100) or laterally (e.g., back and forth in the same plane as a surface of the electronic device 100). In some embodiments, at least one tactile output generator sensor is located on the back of the electronic device 100, opposite the touch-sensitive display system 112, which is located on the front of the electronic device 100.

The electronic device 100 optionally also includes one or more accelerometers 167, gyroscopes 168, and/or magnetometers 169 (e.g., as part of an inertial measurement unit (IMU)) for obtaining information concerning the position (e.g., attitude) of the electronic device. FIG. 1A shows sensors 167, 168, and 169 coupled with the peripherals interface 118. Alternately, sensors 167, 168, and 169 are, optionally, coupled with an input controller 160 in the I/O subsystem 106. In some embodiments, information is displayed on the touch-screen display in a portrait view or a landscape view based on an analysis of data received from the one or more accelerometers. The electronic device 100 optionally includes a GPS (or GLONASS or other global navigation system) receiver (not shown) for obtaining information concerning the location and orientation (e.g., portrait or landscape) of the electronic device 100.

Figure 3:
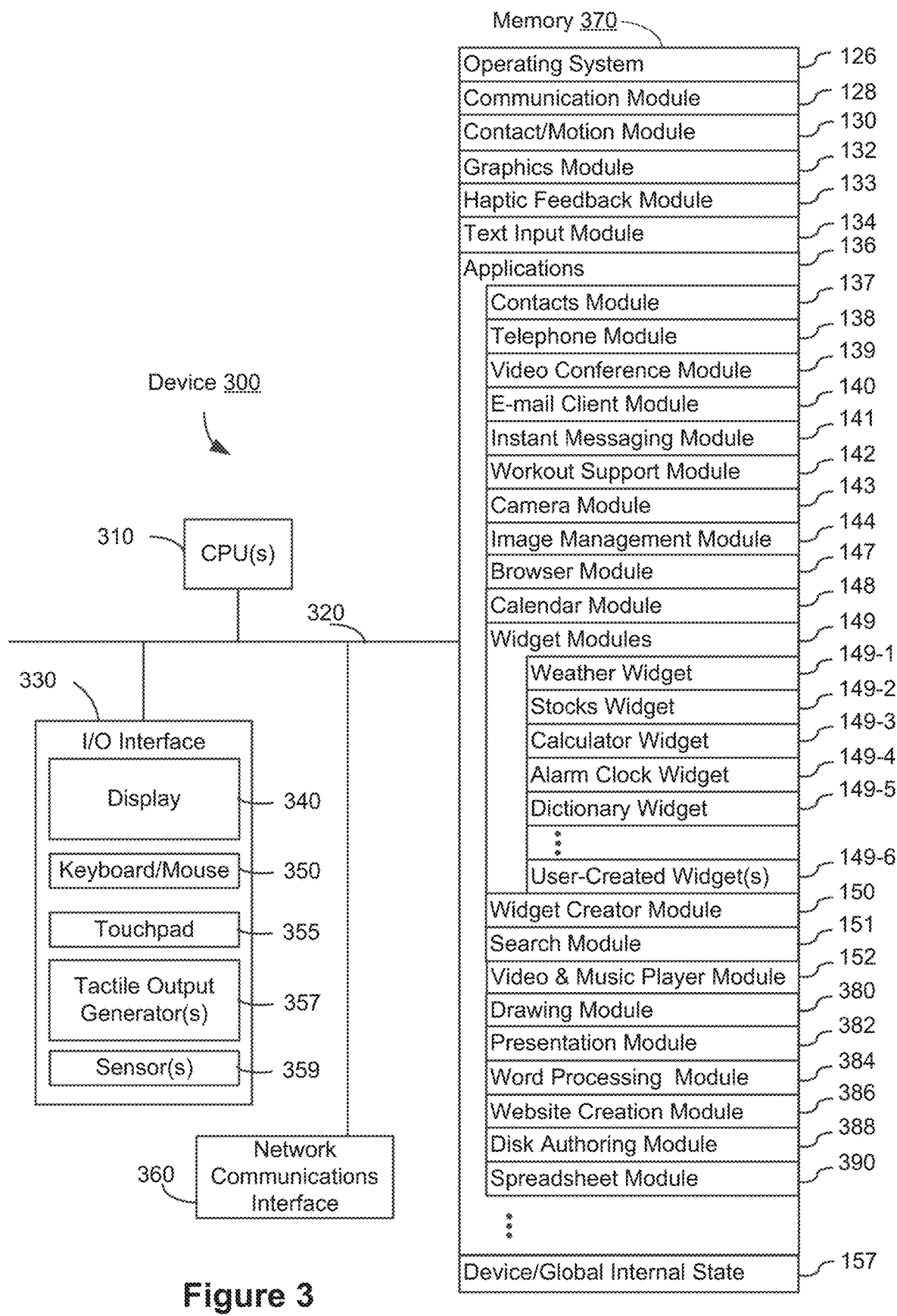
FIG. 3 is a block diagram of an example multifunction device with a display and a touch-sensitive surface in accordance with some embodiments.

In some embodiments, the software components stored in the memory 102 include an operating system 126, a communication module (or set of instructions) 128, a contact/motion module (or set of instructions) 130, a graphics module (or set of instructions) 132, a haptic feedback module (or set of instructions) 133, a text input module (or set of instructions) 134, a Global Positioning System (GPS)

module (or set of instructions) 135, and applications (or sets of instructions) 136. Furthermore, in some embodiments, the memory 102 stores a device/global internal state 157, as shown in FIGS. 1A and 3. The device/global internal state 157 includes one or more of: an active application state, indicating which applications, if any, are currently active; a display state, indicating what applications, views or other information occupy various regions of the touch-sensitive display system 112; a sensor state, including information obtained from the electronic device's various sensors and other input or control devices 116; and location and/or positional information concerning the electronic device's location and/or attitude.

The operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California.

The contact/motion module 130 optionally detects contact with the touch-sensitive display system 112 (in conjunction with the display controller 156) and other touch-sensitive devices (e.g., a touchpad or physical click wheel). The contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, the contact/motion module 130 and the display controller 156 detect contact on a touchpad.

The contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

The position module 131, in conjunction with the accelerometers 167, the gyroscopes 168, and/or the magnetometers 169, optionally detects positional information concerning the electronic device, such as the electronic device's attitude (e.g., roll, pitch, and/or yaw) in a particular frame of reference. The position module 131 includes software components for performing various operations related to detecting the position of the electronic device and detecting changes to the position of the electronic device. In some embodiments, the position module 131 uses information received from a stylus being used with the electronic device 100 to detect positional information concerning the stylus, such as detecting the positional state of the stylus relative to the electronic device 100 and detecting changes to the positional state of the stylus.

The graphics module 132 includes various known software components for rendering and displaying graphics on the touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic is, optionally, assigned a corresponding code. The graphics module 132 receives, from applications etc., one or more codes specifying graphics to be displayed along with, if necessary, coordinate data and other graphic property data, and then generates screen image data to output to the display controller 156.

The haptic feedback module 133 includes various software components for generating instructions used by the one or more tactile output generators 163 to produce tactile outputs at one or more locations on the electronic device 100 in response to user interactions with the electronic device 100.

The text input module 134, which is, optionally, a component of the graphics module 132, provides soft keyboards for entering text in various applications (e.g., contacts 137, e-mail 140, IM 141, browser 147, and any other application that needs text input).

The GPS module 135 determines the location of the electronic device 100 and provides this information for use in various applications (e.g., to the telephone 138 for use in location-based dialing, to the camera 143 as picture/video metadata, and to applications that provide location-based services such as weather widgets, local yellow page widgets, and map/navigation widgets).

The applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154;
- online video module 155; and/or
- annotation application 195, which is used for providing annotations to user interfaces and optionally storing and/or accessing saved annotations 196 in the memory 102.

Examples of other applications 136 that are, optionally, stored in the memory 102 include other word processing applications, other image editing applications, drawing applications, presentation applications, JAVA-enabled applications, encryption, digital rights management, voice recognition, and voice replication.

In conjunction with the touch-sensitive display system 112, the display controller 156, the contact module 130, the graphics module 132, and the text input module 134, the contacts module 137 includes executable instructions to manage an address book or contact list (e.g., stored in application internal state 192 of the contacts module 137 in the memory 102 or the memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by the telephone module 138, video conferencing module 139, e-mail client module 140, or IM module 141; and so forth.

In conjunction with the RF circuitry 108, the audio circuitry 110, the speaker 111, the microphone 113, the touch-sensitive display system 112, the display controller 156, the contact module 130, the graphics module 132, and the text input module 134, the telephone module 138 includes executable instructions to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with the RF circuitry 108, the audio circuitry 110, the speaker 111, the microphone 113, the touch-sensitive display system 112, the display controller 156, the one or more optical sensors 164, the optical sensor controller 158, the contact module 130, the graphics module 132, the text input module 134, the contact list 137, and the telephone module 138, the video conferencing module 139 includes executable instructions to initiate, conduct, and terminate a video conference between a user and one or more other participants in accordance with user instructions.

In conjunction with the RF circuitry 108, the touch-sensitive display system 112, the display controller 156, the contact module 130, the graphics module 132, and the text input module 134, the e-mail client module 140 includes executable instructions to create, send, receive, and manage e-mail in response to user instructions. In conjunction with the image management module 144, the e-mail client module 140 makes it very easy to create and send e-mails with still or video images taken with the camera module 143.

In conjunction with the RF circuitry 108, the touch-sensitive display system 112, the display controller 156, the contact module 130, the graphics module 132, and the text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with the RF circuitry 108, the touch-sensitive display system 112, the display controller 156, the contact module 130, the graphics module 132, the text input module 134, the GPS module 135, the map module 154, and the music player module 146, the workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with the touch-sensitive display system 112, the display controller 156, the one or more optical sensors 164, the optical sensor controller 158, the contact module 130, the graphics module 132, and the image management module 144, the camera module 143 includes executable instructions to capture still images or video (including a video stream) and store them into the memory 102, modify characteristics of a still image or video, and/or delete a still image or video from the memory 102.

In conjunction with the touch-sensitive display system 112, the display controller 156, the contact module 130, the graphics module 132, the text input module 134, and the camera module 143, the image management module 144 includes executable instructions to arrange, modify (e.g., edit), or otherwise manipulate, label, delete, present (e.g., in a digital slide show or album), and store still and/or video images.

In conjunction with the RF circuitry 108, the touch-sensitive display system 112, the display controller 156, the contact module 130, the graphics module 132, and the text input module 134, the browser module 147 includes executable instructions to browse the Internet in accordance with user instructions, including searching, linking to, receiving, and displaying web pages or portions thereof, as well as attachments and other files linked to web pages.

In conjunction with the RF circuitry 108, the touch-sensitive display system 112, the display controller 156, the contact module 130, the graphics module 132, the text input module 134, the e-mail client module 140, and the browser module 147, the calendar module 148 includes executable instructions to create, display, modify, and store calendars and data associated with calendars (e.g., calendar entries, to do lists, etc.) in accordance with user instructions.

In conjunction with the RF circuitry 108, the touch-sensitive display system 112, the display controller 156, the contact module 130, the graphics module 132, the text input module 134, and the browser module 147, the widget modules 149 are mini-applications that are, optionally, downloaded and used by a user (e.g., the weather widget 149-1, the stocks widget 149-2, the calculator widget 149-3, the alarm clock widget 149-4, and the dictionary widget 149-5) or created by the user (e.g., the user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with the RF circuitry 108, the touch-sensitive display system 112, the display controller 156, the contact module 130, the graphics module 132, the text input module 134, and the browser module 147, the widget creator module 150 includes executable instructions to create widgets (e.g., turning a user-specified portion of a web page into a widget).

In conjunction with the touch-sensitive display system 112, the display controller 156, the contact module 130, the graphics module 132, and the text input module 134, the search module 151 includes executable instructions to search for text, music, sound, image, video, and/or other files in the memory 102 that match one or more search criteria (e.g., one or more user-specified search terms) in accordance with user instructions.

In conjunction with the touch-sensitive display system 112, the display controller 156, the contact module 130, the graphics module 132, the audio circuitry 110, the speaker 111, the RF circuitry 108, and the browser module 147, the video and music player module 152 includes executable instructions that allow the user to download and play back recorded music and other sound files stored in one or more file formats, such as MP3 or AAC files, and executable instructions to display, present or otherwise play back videos (e.g., on the touch-sensitive display system 112, or on an external display connected wirelessly or via the external port 124). In some embodiments, the electronic device 100 optionally includes the functionality of an MP3 player, such as an iPod (trademark of Apple Inc. of Cupertino, California).

In conjunction with the touch-sensitive display system 112, the display controller 156, the contact module 130, the graphics module 132, and the text input module 134, the notes module 153 includes executable instructions to create and manage notes, to do lists, and the like in accordance with user instructions.

In conjunction with the RF circuitry 108, the touch-sensitive display system 112, the display controller 156, the contact module 130, the graphics module 132, the text input module 134, the GPS module 135, and the browser module 147, the map module 154 includes executable instructions to receive, display, modify, and store maps and data associated with maps (e.g., driving directions; data on stores and other points of interest at or near a particular location; and other location-based data) in accordance with user instructions.

In conjunction with the touch-sensitive display system 112, the display controller 156, the contact module 130, the graphics module 132, the audio circuitry 110, the speaker 111, the RF circuitry 108, the text input module 134, the e-mail client module 140, and the browser module 147, the online video module 155 includes executable instructions that allow the user to access, browse, receive (e.g., by streaming and/or download), play back (e.g., on the touch screen 112, or on an external display connected wirelessly or via the external port 124), send an e-mail with a link to a particular online video, and otherwise manage online videos in one or more file formats, such as H.264. In some embodiments, the instant messaging module 141, rather than the e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, the memory 102 optionally stores a subset of the modules and data structures identified above. Furthermore, the memory 102 optionally stores additional modules and data structures not described above.

In some embodiments, the electronic device 100 is an electronic device where operation of a predefined set of functions on the electronic device is performed exclusively through a touch screen and/or a touchpad. By using a touch screen and/or a touchpad as the primary input control device for operation of the electronic device 100, the number of physical input control devices (such as push buttons, dials, and the like) on the electronic device 100 is, optionally, reduced.

The predefined set of functions that are performed exclusively through a touch screen and/or a touchpad optionally include navigation between user interfaces. In some embodiments, the touchpad, when touched by the user, navigates the electronic device 100 to a main, home, or root menu from any user interface that is displayed on the electronic device 100. In such embodiments, a "menu button" is implemented using a touchpad. In some other embodiments, the menu button is a physical push button or other physical input control device instead of a touchpad.

Figure 1B:
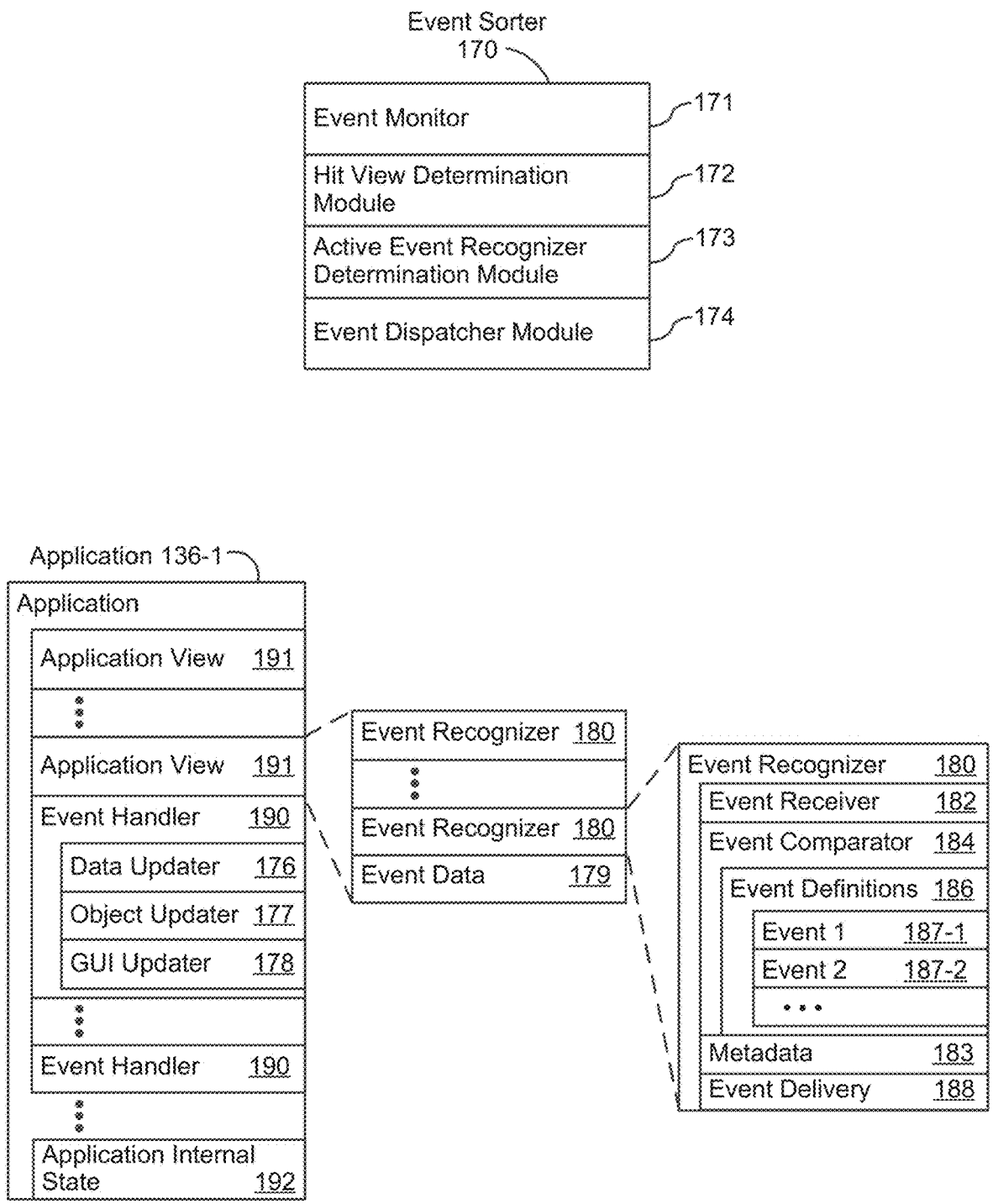
FIG. 1B is a block diagram illustrating example components for event handling in accordance with some embodiments.

FIG. 1B is a block diagram illustrating example components for event handling in accordance with some embodiments. In some embodiments, the memory 102 (in FIG. 1A) or 370 (in FIG. 3) includes an event sorter 170 (e.g., in the operating system 126) and a respective application 136-1 (e.g., any of the aforementioned applications 136, 137-155, 380-390).

The event sorter 170 receives event information and determines the application 136-1 and application view 191 of application 136-1 to which to deliver the event information. The sorter 170 includes an event monitor 171 and an event dispatcher module 174. In some embodiments, application 136-1 includes application internal state 192, which indicates the current application view(s) displayed on the touch-sensitive display system 112 when the application is active or executing. In some embodiments, the device/global internal state 157 is used by the event sorter 170 to determine which application(s) is (are) currently active, and the application internal state 192 is used by the event sorter 170 to determine application views 191 to which to deliver event information.

In some embodiments, the application internal state 192 includes additional information, such as one or more of: resume information to be used when the application 136-1 resumes execution, user interface state information that indicates information being displayed or that is ready for display by application 136-1, a state queue for enabling the user to go back to a prior state or view of application 136-1, and a redo/undo queue of previous actions taken by the user.

The event monitor 171 receives event information from the peripherals interface 118. Event information includes information about a sub-event (e.g., a user touch on the touch-sensitive display system 112, as part of a multi-touch gesture). The peripherals interface 118 transmits information it receives from the I/O subsystem 106 or a sensor, such as the proximity sensor 166, the accelerometer(s) 167, the gyroscope(s) 168, the magnetometer(s) 169, and/or the microphone 113 (through the audio circuitry 110). Information that the peripherals interface 118 receives from the I/O subsystem 106 includes information from the touch-sensitive display system 112 or a touch-sensitive surface.

In some embodiments, the event monitor 171 sends requests to the peripherals interface 118 at predetermined intervals. In response, the peripherals interface 118 transmits event information. In other embodiments, the peripherals interface 118 transmits event information only when there is a significant event (e.g., receiving an input above a predetermined noise threshold and/or for more than a predetermined duration).

In some embodiments, the event sorter 170 also includes a hit view determination module 172 and/or an active event recognizer determination module 173. The hit view determination module 172 provides software procedures for determining where a sub-event has taken place within one or more views, when the touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

The hit view determination module 172 receives information related to sub-events of a touch-based gesture. When an application has multiple views organized in a hierarchy, the hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

The active event recognizer determination module 173 determines which view or views within a view hierarchy should receive a particular sequence of sub-events. In some embodiments, the active event recognizer determination module 173 determines that only the hit view should receive a particular sequence of sub-events. In other embodiments, the active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

The event dispatcher module 174 dispatches the event information to an event recognizer (e.g., the event recognizer 180). In embodiments including the active event recognizer determination module 173, the event dispatcher module 174 delivers the event information to an event recognizer determined by the active event recognizer determination module 173. In some embodiments, the event dispatcher module 174 stores in an event queue the event information, which is retrieved by a respective event receiver module 182.

In some embodiments, the operating system 126 includes the event sorter 170. Alternatively, the application 136-1 includes the event sorter 170. In yet other embodiments, the event sorter 170 is a stand-alone module, or a part of another module stored in the memory 102, such as the contact/motion module 130.

In some embodiments, the application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher-level object from which application 136-1 inherits methods and other properties. In some embodiments, a respective event handler 190 includes one or more of: a data updater 176, an object updater 177, a GUI updater 178, and/or event data 179 received from the event sorter 170. The event handler 190 optionally utilizes or calls the data updater 176, the object updater 177, or the GUI updater 178 to update the application internal state 192. Alternatively, one or more of the application views 191 includes one or more respective event handlers 190. Also, in some embodiments, one or more of the data updater 176, the object updater 177, and the GUI updater 178 are included in a respective application view 191.

A respective event recognizer 180 receives event information (e.g., event data 179) from the event sorter 170, and identifies an event from the event information. The event recognizer 180 includes an event receiver module 182 and an event comparator 184. In some embodiments, the event recognizer 180 also includes at least a subset of: metadata 183, and event delivery instructions 188 (which optionally include sub-event delivery instructions).

The event receiver module 182 receives event information from the event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the electronic device from one orientation to another (e.g., from a portrait orientation to a landscape orientation, or vice versa), and the event information includes corresponding information about the current orientation (also called device attitude) of the electronic device.

The event comparator 184 compares the event information to predefined event or sub-event definitions and, based on the comparison, determines an event or sub-event, or determines or updates the state of an event or sub-event. In some embodiments, the event comparator 184 includes event definitions 186. The event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across the touch-sensitive display system 112, and lift-off of the touch (touch end). In some embodiments, the event also includes information for one or more associated event handlers 190.

In some embodiments, the event definition 187 includes a definition of an event for a respective user-interface object. In some embodiments, the event comparator 184 performs a hit test to determine which user-interface object is associated with a sub-event. For example, in an application view in which three user-interface objects are displayed on the touch-sensitive display system 112, when a touch is detected on the touch-sensitive display system 112, the event comparator 184 performs a hit test to determine which of the three user-interface objects is associated with the touch (sub-event). If each displayed object is associated with a respective event handler 190, the event comparator uses the result of the hit test to determine which the event handler 190 should be activated. For example, the event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in the event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates the event handler 190 associated with an event when one or more particular sub-events of an event are recognized. In some embodiments, a respective event recognizer 180 delivers event information associated with the event to the event handler 190. Activating an event handler 190 is distinct from sending (and deferred sending) sub-events to a respective hit view. In some embodiments, the event recognizer 180 throws a flag associated with the recognized event, and the event handler 190 associated with the flag catches the flag and performs a predefined process.

In some embodiments, the event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, the data updater 176 creates and updates data used in application 136-1. For example, the data updater 176 updates the telephone number used in the contacts module 137 or stores a video file used in video player module 145. In some embodiments, the object updater 177 creates and updates objects used in application 136-1. For example, the object updater 177 creates a new user-interface object or updates the position of a user-interface object. The GUI updater 178 updates the GUI. For example, the GUI updater 178 prepares display information and sends it to the graphics module 132 for display on a touch-sensitive display.

In some embodiments, the event handler(s) 190 includes or has access to the data updater 176, the object updater 177, and the GUI updater 178. In some embodiments, the data updater 176, the object updater 177, and the GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the electronic device; oral instructions; detected eye movements; biometric inputs; and/or any combination thereof are optionally utilized as inputs corresponding to sub-events which define an event to be recognized.

Figure 2:
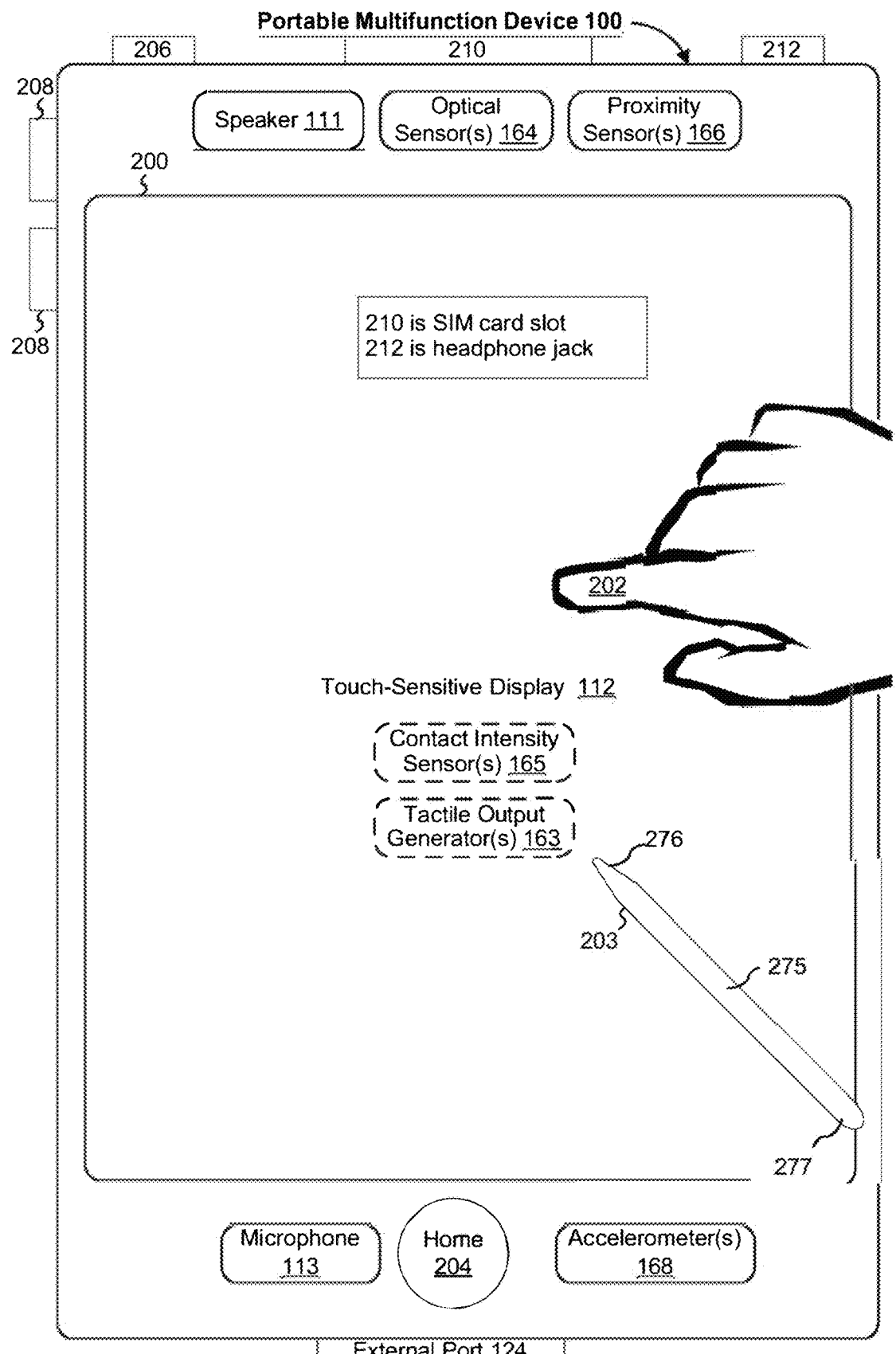
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within a user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with the electronic device 100. In some embodiments or circumstances, inadvertent contact with a graphic does not select the graphic. For example, a swipe gesture that sweeps over an application icon optionally does not select the corresponding application when the gesture corresponding to selection is a tap.

The stylus 203 includes a first end 276 and a second end 277. In various embodiments, the first end 276 corresponds to a tip of the stylus 203 (e.g., the tip of a pencil) and the second end 277 corresponds to the opposite or bottom end of the stylus 203 (e.g., the eraser of the pencil).

The stylus 203 includes a touch-sensitive surface 275 to receive touch inputs from a user. In some embodiments, the touch-sensitive surface 275 corresponds to a capacitive touch element. The stylus 203 includes a sensor or set of sensors that detect inputs from the user based on haptic and/or tactile contact with the touch-sensitive surface 275. In some embodiments, the stylus 203 includes any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive surface 275. Because the stylus 203 includes a variety of sensors and types of sensors, the stylus 203 can detect a variety of inputs from the user, including the gestures disclosed herein with respect to the touch screen of the portable multifunction device 100. In some embodiments, the one or more sensors can detect a single touch input or successive touch inputs in response to a user tapping once or multiple times on the touch-sensitive surface 275. In some embodiments, the one or more sensors can detect a swipe input on the stylus 203 in response to the user stroking along the touch-sensitive surface 275 with one or more fingers. In some embodiments, if the speed with which the user strokes along the touch-sensitive surface 275 breaches a threshold, the one or more sensors detect a flick input rather than a swipe input.

The stylus 203 also includes one or more sensors that detect orientation (e.g., angular position relative to the electronic device) and/or movement of the stylus 203, such as an accelerometer, magnetometer, gyroscope, and/or the like. The one or more sensors can detect a variety of rotational movements of the stylus 203 by the user, including the type and direction of the rotation. For example, the one or more sensors can detect the user rolling and/or twirling the stylus 203, and can detect the direction (e.g., clockwise or counterclockwise) of the rolling/twirling. In some embodiments, the detected input depends on the angular position of the first end 276 and the second end 277 of the stylus 203 relative to the electronic device. For example, in some embodiments, if the stylus 203 is substantially perpendicular to the electronic device 100 and the second end 277 (e.g., the eraser) is nearer to the electronic device, then contacting the surface of the electronic device with the second end 277 results in an erase operation. On the other hand, if the stylus 203 is substantially perpendicular to the electronic device and the first end 276 (e.g., the tip) is nearer to the electronic device, then contacting the surface of the electronic device with the first end 276 results in a marking operation.

The electronic device 100 optionally also includes one or more physical buttons, such as "home" or menu button 204. As described previously, menu button 204 is, optionally, used to navigate to any application 136 in a set of applications that are, optionally executed on the electronic device 100. Alternatively, in some embodiments, the menu button 204 is implemented as a soft key in a GUI displayed on the touch-screen display.

In some embodiments, the electronic device 100 includes the touch-screen display, the menu button 204, a push button 206 for powering the electronic device on/off and locking the electronic device 100, volume adjustment button(s) 208, Subscriber Identity Module (SIM) card slot 210, a headset jack 212, and docking/charging external port 124. The push button 206 is, optionally, used to turn the power on/off on the electronic device by depressing the push button 206 and holding the push button 206 in the depressed state for a predefined time interval; to lock the electronic device 100 by depressing the push button 206 and releasing the push button 206 before the predefined time interval has elapsed; and/or to unlock the electronic device 100 or initiate an unlock process. In some embodiments, the electronic device 100 also accepts verbal input for activation or deactivation of some functions through a microphone 113. The electronic device 100 also, optionally, includes one or more contact intensity sensors 165 for detecting intensity of contacts on the touch-sensitive display system 112 and/or one or more tactile output generators 163 for generating tactile outputs for a user of the electronic device 100.

FIG. 3 is a block diagram of an example multifunction device 300 with a display and a touch-sensitive surface in accordance with some embodiments. The electronic device 300 need not be portable. In some embodiments, the electronic device 300 is a laptop computer, a desktop computer, a tablet computer, a multimedia player device, a navigation device, an educational device (such as a child's learning toy), a gaming system, or a control device (e.g., a home or industrial controller). The electronic device 300 typically includes one or more processing units (CPUs) 310, one or more network or other communications interfaces 360, memory 370, and one or more communication buses 320 for interconnecting these components. The one or more communication buses 320 optionally include circuitry (sometimes called a chipset) that interconnects and controls communications between system components. The electronic device 300 includes an input/output (I/O) interface 330 comprising a display 340, which is typically a touch-screen display. The I/O interface 330 also optionally includes a keyboard and/or mouse (or other pointing device) 350 and touchpad 355, a tactile output generator 357 for generating tactile outputs on the electronic device 300 (e.g., similar to the tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). The memory 370 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. The memory 370 optionally includes one or more storage devices remotely located from the one or more CPUs 310. In some embodiments, the memory 370 stores programs, modules, and data structures analogous to the programs, modules, and data structures stored in the memory 102 of the portable multifunction device 100 (FIG. 1A), or a subset thereof. Furthermore, the memory 370 optionally stores additional programs, modules, and data structures not present in the memory 102 of the portable multifunction device 100. For example, the memory 370 of device 300 optionally stores a drawing module 380, a presentation module 382, a word processing module 384, a website creation module 386, a disk authoring module 388, and/or a spreadsheet module 390, while the memory 102 of the portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, the memory 370 optionally stores additional modules and data structures not described above.

Figure 4:
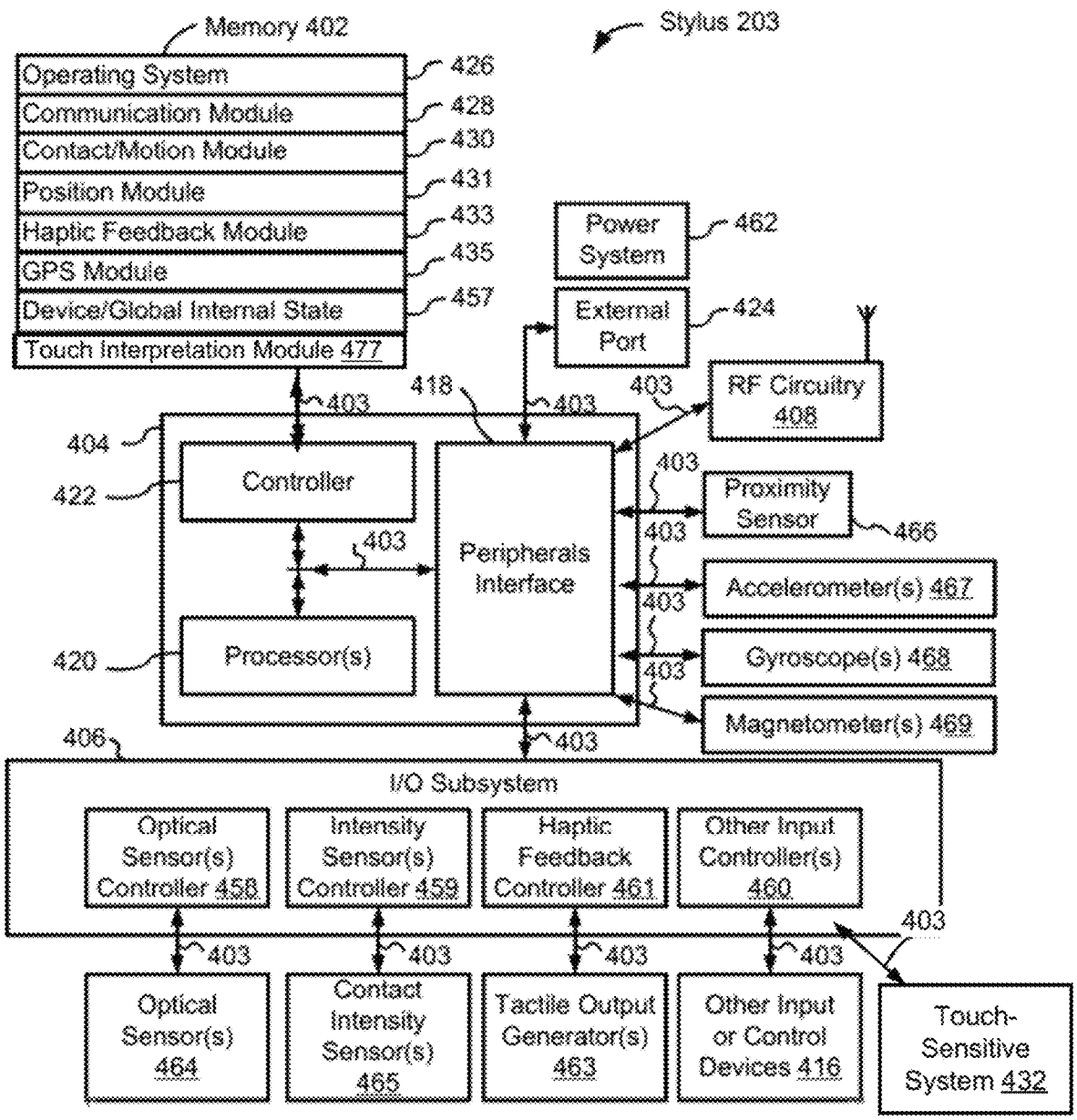
FIG. 4 is a block diagram of an example electronic stylus in accordance with some embodiments.

FIG. 4 is a block diagram of an exemplary electronic stylus 203 in accordance with some embodiments. The electronic stylus 203 is sometimes simply called a stylus. The stylus 203 includes memory 402 (which optionally includes one or more computer readable storage mediums), a memory controller 422, one or more processing units (CPUs) 420, a peripherals interface 418, RF circuitry 408, an input/output (I/O) subsystem 406, and other input or control devices 416. The stylus 203 optionally includes an external port 424 and one or more optical sensors 464. The stylus 203 optionally includes one or more intensity sensors 465 for detecting intensity of contacts of the stylus 203 on the electronic device 100 (e.g., when the stylus 203 is used with a touch-sensitive surface such as the touch-sensitive display system 112 of the electronic device 100) or on other surfaces (e.g., a desk surface). The stylus 203 optionally includes one or more tactile output generators 463 for generating tactile outputs on the stylus 203. These components optionally communicate over one or more communication buses or signal lines 403.

In some embodiments, the term "tactile output," discussed above, refers to physical displacement of an accessory (e.g., the stylus 203) of an electronic device (e.g., the electronic device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of the stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

It should be appreciated that the stylus 203 is only one example of an electronic stylus, and that stylus 203 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

The memory 402 optionally includes high-speed random-access memory and optionally also includes non-volatile memory, such as one or more flash memory devices, or other non-volatile solid-state memory devices. Access to the memory 402 by other components of the stylus 203, such as the one or more CPUs 420 and the peripherals interface 418, is, optionally, controlled by the memory controller 422.

The peripherals interface 418 can be used to couple input and output peripherals of the stylus to the one or more CPUs 420 and the memory 402. The one or more CPUs 420 run or execute various software programs and/or sets of instructions stored in the memory 402 to perform various functions for the stylus 203 and to process data.

In some embodiments, the peripherals interface 418, the one or more CPUs 420, and the memory controller 422 are, optionally, implemented on a single chip, such as a chip 404. In some other embodiments, they are, optionally, implemented on separate chips.

The RF (radio frequency) circuitry 408 receives and sends RF signals, also called electromagnetic signals. The RF circuitry 408 converts electrical signals to/from electromagnetic signals and communicates with the electronic device 100 or 300, communications networks, and/or other communications devices via the electromagnetic signals. The RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The I/O subsystem 406 couples input/output peripherals on the stylus 203, such as the other input or control devices 416, with the peripherals interface 418. The I/O subsystem 406 optionally includes an optical sensor controller 458, an intensity sensor controller 459, a haptic feedback controller 461, and one or more input controllers 460 for other input or control devices. The one or more input controllers 460 receive/send electrical signals from/to the other input or control devices 416. The other input or control devices 416 optionally include physical buttons (e.g., push buttons, rocker buttons, etc.), dials, slider switches, click wheels, and so forth. In some alternate embodiments, the one or more input controllers 460 are, optionally, coupled with any (or none) of the following: an infrared port and/or a USB port.

The stylus 203 also includes a power system 462 for powering the various components. The power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

The stylus 203 optionally also includes the one or more optical sensors 464. FIG. 4 shows an optical sensor coupled with the optical sensor controller 458 in the I/O subsystem 406. The one or more optical sensors 464 optionally include charge-coupled device (CCD) or complementary metal-oxide semiconductor (CMOS) phototransistors. The one or more optical sensors 464 receive light from the environment, projected through one or more lens, and converts the light to data representing an image.

The stylus 203 optionally also includes one or more contact intensity sensors 465. FIG. 4 shows a contact intensity sensor coupled with the intensity sensor controller 459 in the I/O subsystem 406. The one or more contact intensity sensors 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). The one or more contact intensity sensors 465 receive contact intensity information (e.g., pressure information or a proxy for pressure information) from the environment. In some embodiments, at least one contact intensity sensor is collocated with, or proximate to, a tip of the stylus 203.

The stylus 203 optionally also includes one or more proximity sensors 466. FIG. 4 shows the proximity sensor 466 coupled with the peripherals interface 418. Alternately, the proximity sensor 466 is coupled with the input controller 460 in the I/O subsystem 406. In some embodiments, the proximity sensor 466 determines proximity of the stylus 203 to an electronic device (e.g., the electronic device 100).

The stylus 203 optionally also includes one or more tactile output generators 463. FIG. 4 shows a tactile output generator 463 coupled with the haptic feedback controller 461 in the I/O subsystem 406. The one or more tactile output generators 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The one or more tactile output generators 463 receive tactile feedback generation instructions from the haptic feedback module 433 and generates tactile outputs on the stylus 203 that are capable of being sensed by a user of the stylus 203. In some embodiments, at least one tactile output generator 463 is collocated with, or proximate to, a length (e.g., a body or a housing) of the stylus 203 and, optionally, generates a tactile output by moving the stylus 203 vertically (e.g., in a direction parallel to the length of the stylus 203) or laterally (e.g., in a direction normal to the length of the stylus 203).

The stylus 203 optionally also includes one or more accelerometers 467, gyroscopes 468, and/or magnetometers 469 (e.g., as part of an inertial measurement unit (IMU)) for obtaining information concerning the location and positional state of the stylus 203. FIG. 4 shows sensors 467, 468, and 469 coupled with the peripherals interface 418. Alternately, sensors 467, 468, and 469 are, optionally, coupled with an input controller 460 in the I/O subsystem 406. The stylus 203 optionally includes a GPS (or GLONASS or other global navigation system) receiver (not shown) for obtaining information concerning the location of the stylus 203.

The stylus 203 includes a touch-sensitive system 432. The touch-sensitive system 432 detects inputs received at the touch-sensitive surface 275. These inputs include the inputs discussed herein with respect to the touch-sensitive surface 275 of the stylus 203. For example, the touch-sensitive system 432 can detect tap, twirl, roll, flick, and swipe inputs. The touch-sensitive system 432 coordinates with a touch interpretation module 477 in order to decipher the particular kind of touch input received at the touch-sensitive surface 275 (e.g., twirl/roll/flick/swipe/etc.).

Figure 5A:
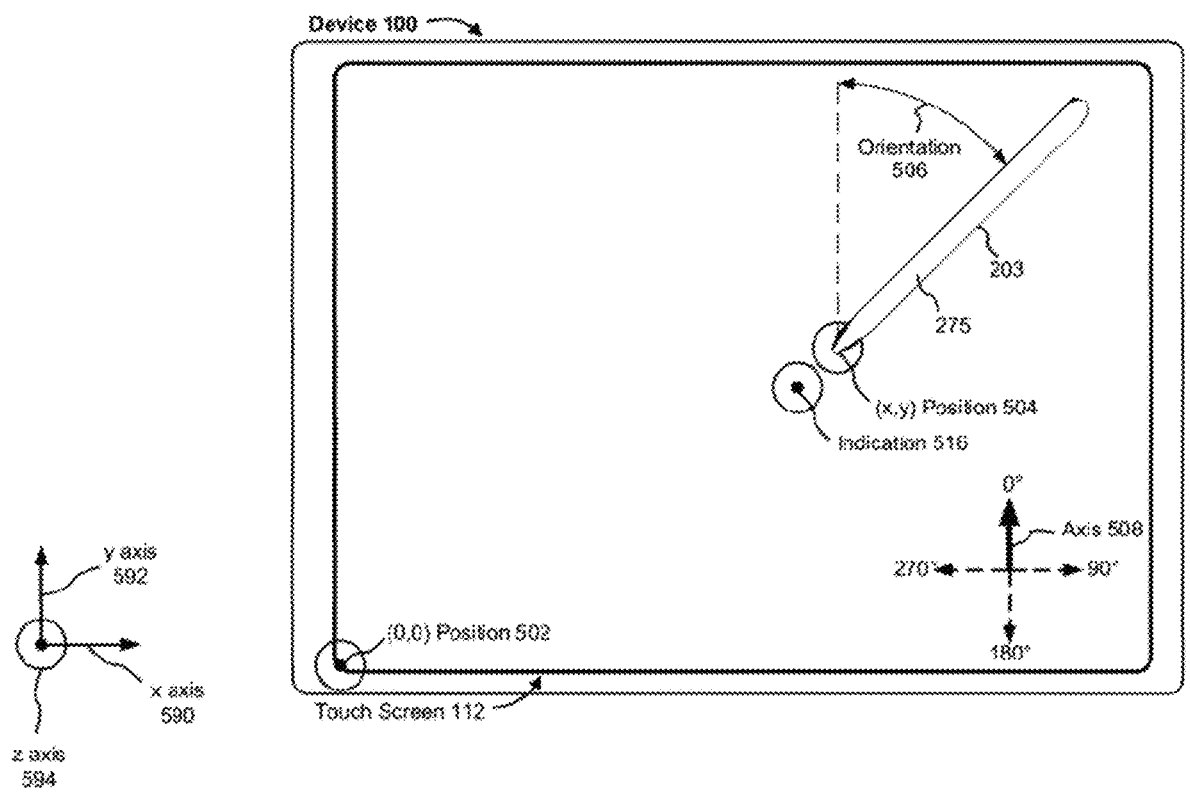
FIGS. 5A-5B illustrate a positional state of a stylus relative to a touch-sensitive surface in accordance with some embodiments.
Figure 5B:
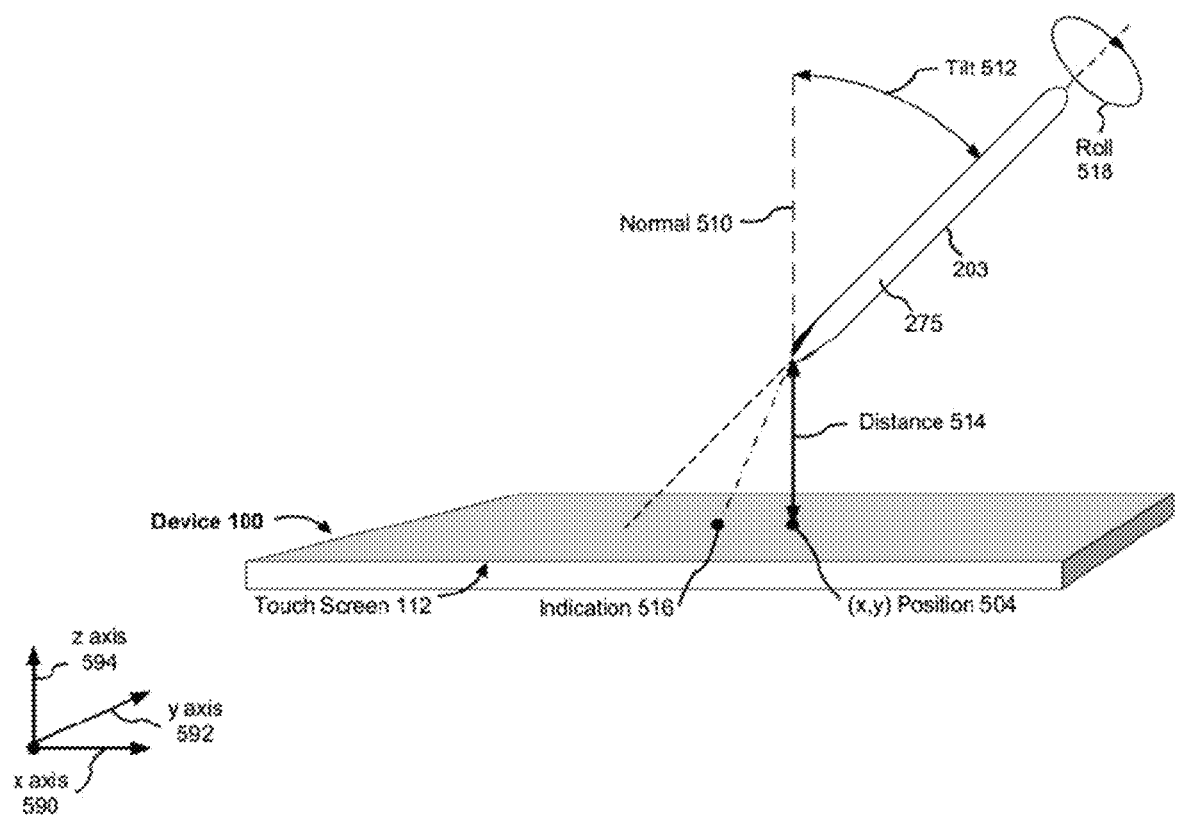

In some embodiments, the software components stored in memory 402 include an operating system 426, a communication module (or set of instructions) 428, a contact/motion module (or set of instructions) 430, a position module (or set of instructions) 431, and a Global Positioning System (GPS) module (or set of instructions) 435. Furthermore, in some embodiments, the memory 402 stores a device/global internal state 457, as shown in FIG. 4. Moreover, although not depicted, the memory 402 includes the touch interpretation module 477. The device/global internal state 457 includes one or more of: a sensor state, including information obtained from the stylus's various sensors and the other input or control devices 416; a positional state, including information regarding the stylus's position (e.g., position, orientation, tilt, roll and/or distance, as shown in FIGS. 5A and 5B) relative to an electronic device (e.g., the electronic device 100); and location information concerning the stylus's location (e.g., determined by the GPS module 435).

The operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

The communication module 428 optionally facilitates communication with other devices over the one or more external ports 424 and also includes various software components for handling data received by the RF circuitry 408 and/or the external port 424. The external port 424 (e.g., Universal Serial Bus (USB), FIREWIRE, etc.) is adapted for coupling directly to other devices or indirectly over a network (e.g., the Internet, wireless LAN, etc.). In some embodiments, the external port 424 is a Lightning connector that is the same as, or similar to and/or compatible with the Lightning connector used in some iPhone®, iPod Touch®, and iPad® devices from Apple Inc. of Cupertino, California.

The contact/motion module 430 optionally detects contact with the stylus 203 and other touch-sensitive devices of the stylus 203 (e.g., buttons or other touch-sensitive components of the stylus 203). The contact/motion module 430 includes software components for performing various operations related to detection of contact (e.g., detection of a tip of the stylus 203 with a touch-sensitive display, such as the touch screen 112 of the electronic device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across the touch screen 112 of the electronic device 100), and determining if the contact has ceased (e.g., detecting a lift-off event or a break in contact). In some embodiments, the contact/motion module 430 receives contact data from the I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the electronic device 100 using the contact/motion module 130 (in addition to or in place of the stylus 203 using the contact/motion module 430).

The contact/motion module 430 optionally detects a gesture input by the stylus 203. Different gestures with the stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the electronic device 100 using the contact/motion module 130 (in addition to or in place of the stylus 203 using the contact/motion module 430).

The position module 431, in conjunction with the accelerometers 467, the gyroscopes 468, and/or the magnetometers 469, optionally detects positional information concerning the stylus 203, such as the stylus's attitude (roll, pitch, and/or yaw) in a particular frame of reference. The position module 431, in conjunction with the accelerometers 467, the gyroscopes 468, and/or the magnetometers 469, optionally detects stylus movement gestures, such as flicks, taps, and rolls of the stylus 203. The position module 431 includes software components for performing various operations related to detecting the position of the stylus and detecting changes to the position of the stylus in a particular frame of reference. In some embodiments, the position module 431 detects the positional state of the stylus 203 relative to the electronic device 100 and detects changes to the positional state of the stylus 203 relative to the electronic device 100. As noted above, in some embodiments, the electronic device 100 or 300 determines the positional state of the stylus 203 relative to the electronic device 100 and changes to the positional state of the stylus 203 using the position module 131 (in addition to or in place of the stylus 203 using the position module 431).

The haptic feedback module 433 includes various software components for generating instructions used by the tactile output generator(s) 463 to produce tactile outputs at one or more locations on stylus 203 in response to user interactions with stylus 203.

The GPS module 435 determines the location of the stylus 203 and provides this information for use in various applications (e.g., to applications that provide location-based services such as an application to find missing devices and/or accessories).

The touch interpretation module 477 coordinates with the touch-sensitive system 432 in order to determine (e.g., decipher or identify) the type of touch input received at the touch-sensitive surface 275 of the stylus 203. For example, the touch interpretation module 477 determines that the touch input corresponds to a swipe input (as opposed to a tap input) if the user stroked a sufficient distance across the touch-sensitive surface 275 in a sufficiently short amount of time. As another example, the touch interpretation module 477 determines that the touch input corresponds to a flick input (as opposed to a swipe input) if the speed with which user stroked across the touch-sensitive surface 275 was sufficiently faster than the speech corresponding to a swipe input. The threshold speeds of strokes can be preset and can be changed. In various embodiments, the pressure and/or force with which the touch is received at the touch-sensitive surface determines the type of input. For example, a light touch can correspond to a first type of input while a harder touch can correspond to a second type of input.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, the memory 402 optionally stores a subset of the modules and data structures identified above. Furthermore, the memory 402 optionally stores additional modules and data structures not described above.

FIGS. 5A-5B illustrate a positional state of the stylus 203 relative to a touch-sensitive surface (e.g., the touch screen 112 of the electronic device 100) in accordance with some embodiments. In some embodiments, the positional state of the stylus 203 corresponds to (or indicates): a position of a projection of a tip (or other representative portion) of the stylus 203 on the touch-sensitive surface (e.g., an (x,y) position 504, FIG. 5A), an orientation of the stylus 203 relative to the touch-sensitive surface (e.g., an orientation 506, FIG. 5A), a tilt of the stylus 203 relative to the touch-sensitive surface (e.g., a tilt 512, FIG. 5B), and/or a distance of the stylus 203 relative to the touch-sensitive surface (e.g., a distance 514, FIG. 5B). In some embodiments, the positional state of stylus 203 corresponds to (or indicates) a pitch, yaw, and/or roll of the stylus (e.g., an attitude of the stylus 203 relative to a particular frame of reference, such as a touch-sensitive surface (e.g., the touch screen 112) or the ground). In some embodiments, the positional state includes a set of positional parameters (e.g., one or more positional parameters). In some embodiments, the positional state is detected in accordance with one or more measurements from the stylus 203 that are sent to an electronic device (e.g., the electronic device 100). For example, the stylus 203 measures the tilt (e.g., the tilt 512, FIG. 5B) and/or the orientation (e.g., the orientation 506, FIG. 5A) of the stylus and sends the measurement to the electronic device 100. In some embodiments, the positional state is detected in accordance with raw output, from one or more electrodes in the stylus, that is sensed by a touch-sensitive surface (e.g., the touch screen 112 of the electronic device 100) instead of, or in combination with a positional state detected in accordance with one or more measurements from the stylus 203. For example, the touch-sensitive surface receives raw output from one or more electrodes in the stylus 203 and calculates the tilt and/or the orientation of the stylus 203 based on the raw output (optionally, in conjunction with positional state information provided by the stylus 203 based on sensor measurements generated by the stylus 203).

FIG. 5A illustrates the stylus 203 relative to a touch-sensitive surface (e.g., the touch screen 112 of the electronic device 100) from a viewpoint directly above the touch-sensitive surface, in accordance with some embodiments. In FIG. 5A, a z axis 594 points out of the page (i.e., in a direction normal to a plane of touch screen 112), an x axis 590 is parallel to a first edge (e.g., a length) of the touch screen 112, a y axis 592 is parallel to a second edge (e.g., a width) of the touch screen 112, and the y axis 592 is perpendicular to the x axis 590.

FIG. 5A illustrates the tip of the stylus 203 at the (x,y) position 504. In some embodiments, the tip of the stylus 203 is a terminus of the stylus 203 configured for determining proximity of the stylus 203 to a touch-sensitive surface (e.g., the touch screen 112). In some embodiments, the projection of the tip of the stylus 203 on the touch-sensitive surface is an orthogonal projection. In other words, the projection of the tip of the stylus 203 on the touch-sensitive surface is a point at the end of a line from the stylus tip to the touch-sensitive surface that is normal to a surface of the touch-sensitive surface (e.g., the (x,y) position 504 at which the tip of the stylus 203 would touch the touch-sensitive surface if the stylus 203 were moved directly along a path normal to the touch-sensitive surface). In some embodiments, the (x,y) position 504 at the lower left corner of the touch screen 112 is position (0,0) (e.g., the (0,0) position 502) and other (x,y) positions on touch screen 112 are relative to the lower left corner of the touch screen 112. Alternatively, in some embodiments, the (0,0) position is located at another position of touch screen 112 (e.g., in the center of the touch screen 112) and other (x,y) positions are relative to the (0,0) position of the touch screen 112.

Further, FIG. 5A illustrates the stylus 203 with the orientation 506. In some embodiments, the orientation 506 is an orientation of a projection of the stylus 203 onto the touch screen 112 (e.g., an orthogonal projection of a length of the stylus 203 or a line corresponding to the line between the projection of two different points of the stylus 203 onto the touch screen 112). In some embodiments, the orientation 506 is relative to at least one axis in a plane parallel to the touch screen 112. In some embodiments, the orientation 506 is relative to a single axis in a plane parallel to the touch screen 112 (e.g., an axis 508, with a clockwise rotation angle from the axis 508 ranging from 0 degrees to 360 degrees, as shown in FIG. 5A). Alternatively, in some embodiments, the orientation 506 is relative to a pair of axes in a plane parallel to the touch screen 112 (e.g., the x axis 590 and they axis 592, as shown in FIG. 5A, or a pair of axes associated with an application displayed on the touch screen 112).

In some embodiments, an indication (e.g., an indication 516) is displayed on a touch-sensitive display (e.g., the touch screen 112 of the electronic device 100). In some embodiments, the indication 516 shows where the stylus 203 will touch (or mark) the touch-sensitive display before the stylus 203 touches the touch-sensitive display. In some embodiments, the indication 516 is a portion of a mark that is being drawn on the touch-sensitive display. In some embodiments, the indication 516 is separate from a mark that is being drawn on the touch-sensitive display and corresponds to a virtual "pen tip" or other element that indicates where a mark will be drawn on the touch-sensitive display.

In some embodiments, the indication 516 is displayed in accordance with the positional state of the stylus 203. For example, in some circumstances, the indication 516 is displaced from the (x,y) position 504 (as shown in FIGS. 5A and 5B), and in other circumstances, the indication 516 is not displaced from the (x,y) position 504 (e.g., the indication 516 is displayed at or near the (x,y) position 504 when the tilt 512 is zero degrees). In some embodiments, the indication 516 is displayed, in accordance with the positional state of the stylus 203, with varying color, size (or radius or area), opacity, and/or other characteristics. In some embodiments, the displayed indication accounts for thickness of a glass layer on the touch-sensitive display, so as to carry through the indication 516 "onto the pixels" of the touch-sensitive display, rather than displaying the indication 516 "on the glass" that covers the pixels.

FIG. 5B illustrates the stylus 203 relative to a touch-sensitive surface (e.g., the touch screen 112 of the electronic device 100) from a side viewpoint of the touch-sensitive surface, in accordance with some embodiments. In FIG. 5B, a z axis 594 points in a direction normal to the plane of the touch screen 112, an x axis 590 is parallel to a first edge (e.g., a length) of the touch screen 112, a y axis 592 is parallel to a second edge (e.g., a width) of the touch screen 112, and the y axis 592 is perpendicular to the x axis 590.

FIG. 5B illustrates the stylus 203 with the tilt 512. In some embodiments, the tilt 512 is an angle relative to a normal (e.g., a normal 510) to a surface of the touch-sensitive surface (also called simply the normal to the touch-sensitive surface). As shown in FIG. 5B, the tilt 512 is zero when the stylus is perpendicular/normal to the touch-sensitive surface (e.g., when the stylus 203 is parallel to the normal 510) and the tilt 512 increases as the stylus 203 is tilted closer to being parallel to the touch-sensitive surface.

Further, FIG. 5B illustrates the distance 514 of the stylus 203 relative to the touch-sensitive surface. In some embodiments, the distance 514 is the distance from the tip of stylus 203 to the touch-sensitive surface, in a direction normal to the touch-sensitive surface. For example, in FIG. 5B, the distance 514 is the distance from the tip of the stylus 203 to the (x,y) position 504.

Although the terms, "x axis," "y axis," and "z axis," are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to the y axis. Similarly, a "z axis" is distinct from the "x axis" and the "y axis," and is typically perpendicular to both the "x axis" and the "y axis."

Further, FIG. 5B illustrates a roll 518, a rotation about the length (long axis) of the stylus 203.

Attention is now directed towards embodiments of user interfaces ("UP") that are, optionally, implemented on a portable multifunction device 100.

Figure 6A:
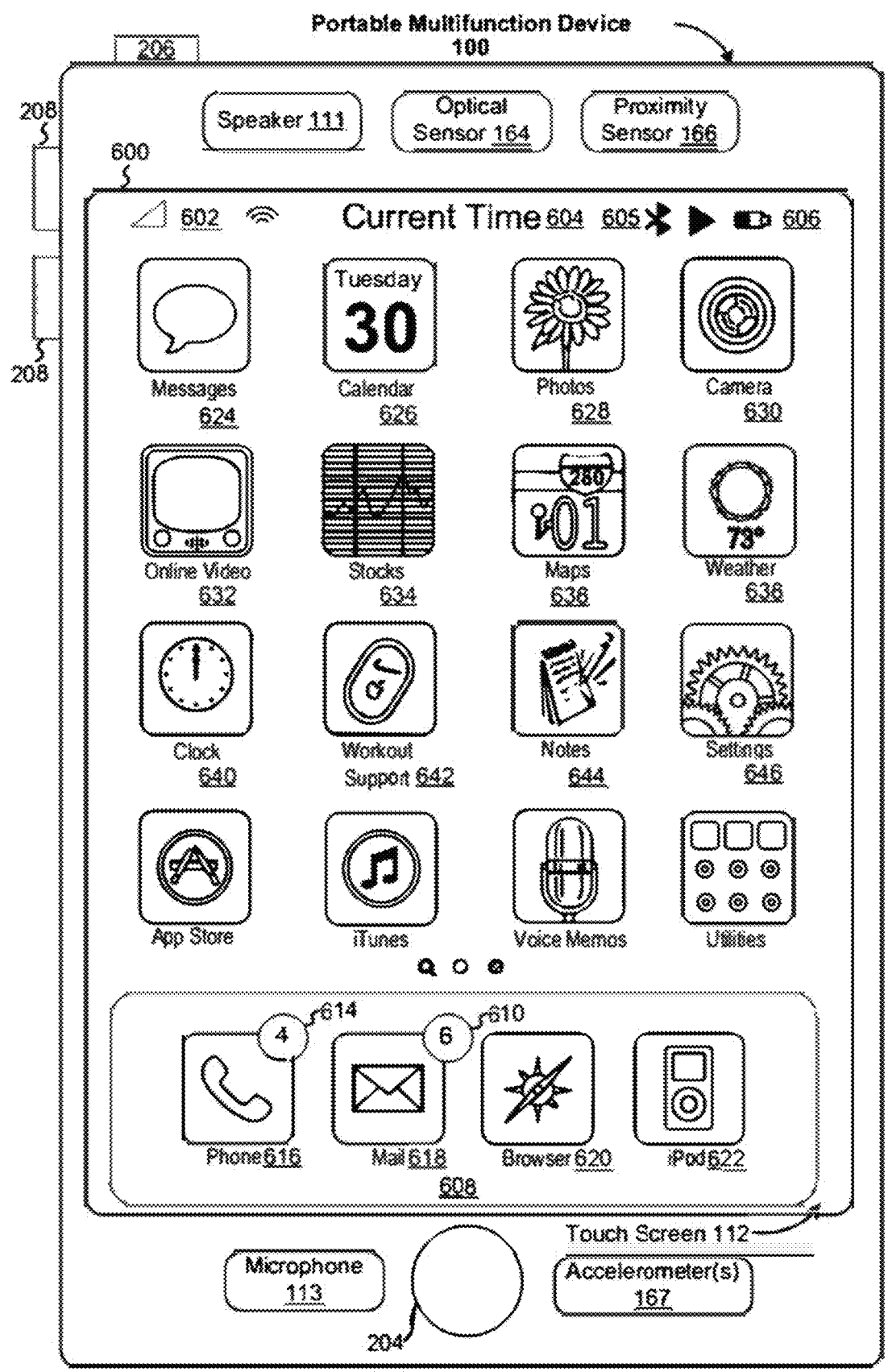
FIG. 6A illustrates an example user interface for a menu of applications on a portable multifunction device in accordance with some embodiments.

FIG. 6A illustrates an exemplary user interface for a menu of applications on the portable multifunction device 100 in accordance with some embodiments. Similar user interfaces are, optionally, implemented on the electronic device 300. In some embodiments, user interface 600 includes the following elements, or a subset or superset thereof:

- Signal strength indicator(s) 602 for wireless communication(s), such as cellular and Wi-Fi signals;
- Time 604;
- BLUETOOTH indicator 605;
- Battery status indicator 606;
- Tray 608 with icons for frequently used applications, such as:
  - Icon 616 for telephone module 138, labeled "Phone," which optionally includes an indicator 614 of the number of missed calls or voicemail messages;
  - Icon 618 for e-mail client module 140, labeled "Mail," which optionally includes an indicator 610 of the number of unread e-mails;
  - Icon 620 for browser module 147, labeled "Browser;" and
  - Icon 622 for video and music player module 152, also referred to as iPod® (trademark of Apple Inc.) module 152, labeled "iPod;" and
- Icons for other applications, such as:
  - Icon 624 for IM module 141, labeled "Messages;"
  - Icon 626 for calendar module 148, labeled "Calendar;"
  - Icon 628 for image management module 144, labeled "Photos;"
  - Icon 630 for camera module 143, labeled "Camera;"
  - Icon 632 for online video module 155, labeled "Video Editing;"
  - Icon 634 for stocks widget 149-2, labeled "Stocks;"
  - Icon 636 for map module 154, labeled "Map;"
  - Icon 638 for weather widget 149-1, labeled "Weather;"
  - Icon 640 for alarm clock widget 149-4, labeled "Clock;"
  - Icon 642 for workout support module 142, labeled "Workout Support;"
  - Icon 644 for notes module 153, labeled "Notes;" and
  - Icon 646 for a settings application or module, which provides access to settings for the electronic device 100 and its various applications 136.

It should be noted that the icon labels illustrated in FIG. 6A are merely examples. For example, in some embodiments, the icon 622 for the video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 6B:
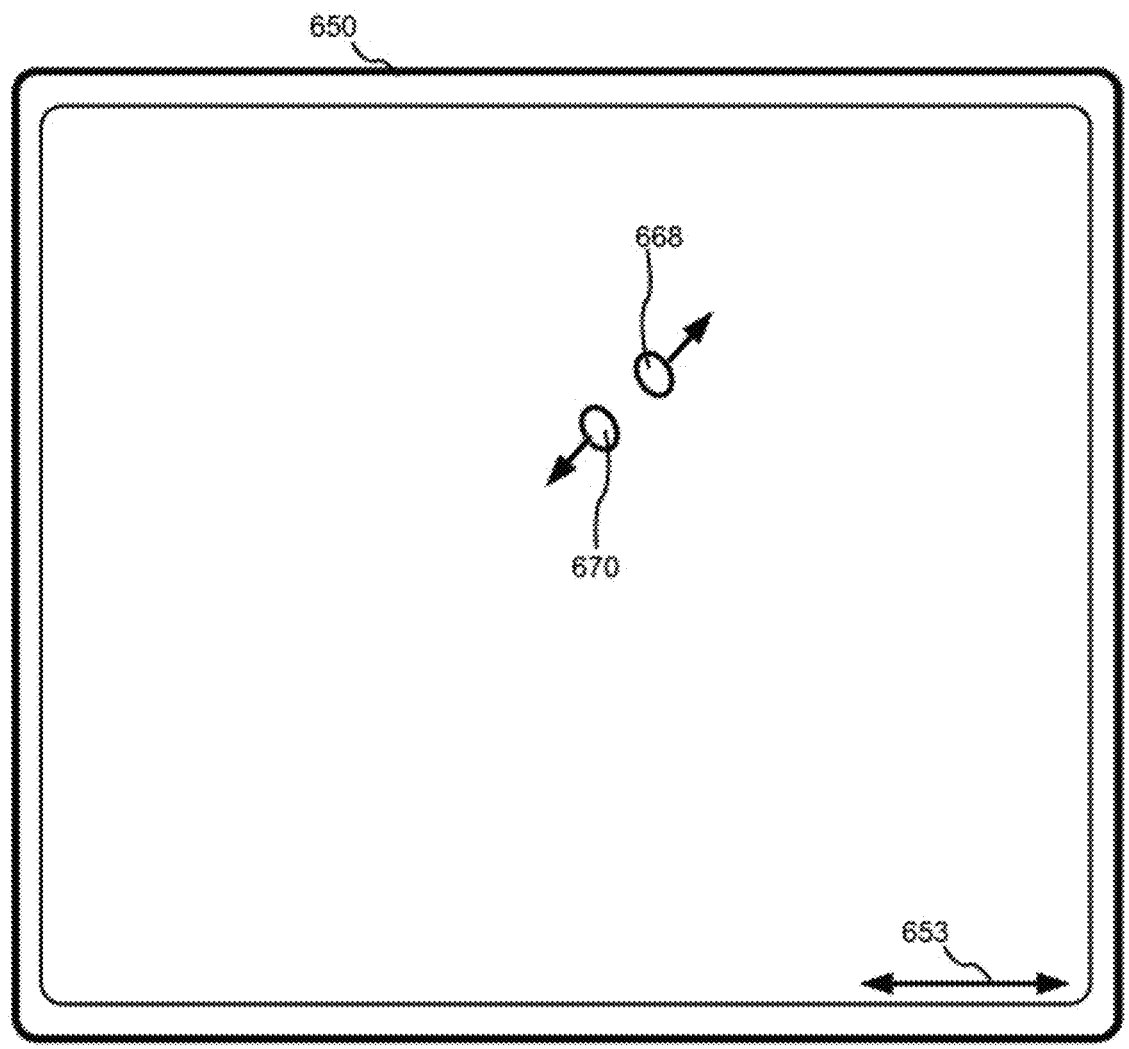
FIG. 6B illustrates an example user interface for a multifunction device with a touch-sensitive surface that is separate from the display in accordance with some embodiments.
Figure 6B:
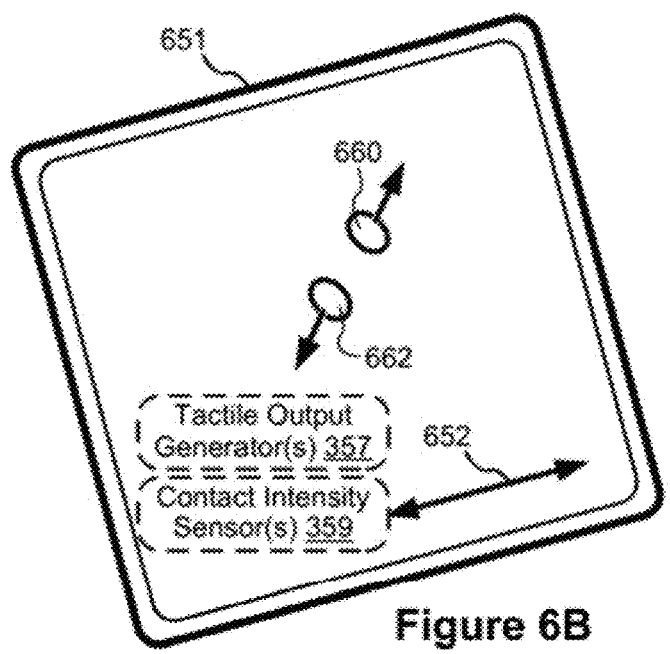

FIG. 6B illustrates an exemplary user interface on an electronic device (e.g., the device 300, FIG. 3) with a touch-sensitive surface 651 (e.g., a tablet or touchpad 355, FIG. 3) that is separate from the display 650. The device 300 also, optionally, includes one or more contact intensity sensors (e.g., the one or more sensors 359) for detecting intensity of contacts on the touch-sensitive surface 651 and/or one or more tactile output generators 357 for generating tactile outputs for a user of the device 300.

FIG. 6B illustrates an exemplary user interface on an electronic device (e.g., the device 300, FIG. 3) with a touch-sensitive surface 651 (e.g., a tablet or touchpad 355, FIG. 3) that is separate from the display 650. Although many of the examples that follow will be given with reference to inputs on the touch screen display 112 (where the touch-sensitive surface and the display are combined), in some embodiments, the electronic device 100 detects inputs on a touch-sensitive surface that is separate from the display, as shown in FIG. 6B. In some embodiments, the touch-sensitive surface (e.g., the touch-sensitive surface 651 in FIG. 6B) has a primary axis (e.g., a primary axis 652 in FIG. 6B) that corresponds to a primary axis (e.g., a primary axis 653 in FIG. 6B) on the display (e.g., the 650). In accordance with these embodiments, the electronic device 100 detects contacts (e.g., contacts 660 and 662 in FIG. 6B) with the touch-sensitive surface 651 at locations that correspond to respective locations on the display (e.g., in FIG. 6B, the contact 660 corresponds to a location 668 and the contact 662 corresponds to a location 670). In this way, user inputs (e.g., the contacts 660 and 662, and movements thereof) detected by the electronic device 100 on the touch-sensitive surface (e.g., the touch-sensitive surface 651 in FIG. 6B) are used by the electronic device 100 to manipulate the user interface on the display (e.g., the display 650 in FIG. 6B) of the electronic device 100 when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.) and/or stylus inputs, it should be understood that, in some embodiments, one or more of the finger inputs are replaced with input from another input device (e.g., a mouse-based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts (or stylus contacts) are, optionally, used simultaneously.

User Interfaces and Associated Processes

Attention is now directed towards embodiments of user interfaces ("UP") and associated processes that may be implemented on an electronic device, such as the portable multifunction device 100 in FIG. 1 or the electronic device 300 in FIG. 3, with one or more input devices to detect various inputs (e.g., touch inputs, stylus inputs, mouse inputs, keyboard inputs, etc.) and a display device for manipulating a user interface based on the various inputs.

FIGS. 7A-7CF are examples of user interfaces for repositioning a drawing palette in accordance with some embodiments. The user interfaces in these figures are used to illustrate the processes described below, including the processes in FIGS. 10A-10D. Although some of the examples which follow will be given with reference to inputs on a touch-screen display (where the touch-sensitive surface and the display are combined, for example on the touch screen 112), in some embodiments, the electronic device 100 detects inputs on the touch-sensitive surface 651 that is separate from the display 650, as shown in FIG. 6B.

As illustrated in FIG. 7A, the electronic device 100 displays a first application interface 702, such as a drawing application interface or a word processing application interface. The first application interface 702 is bounded by a first edge 701a, a second edge 701b, a third edge 701c, and a fourth edge 701d.

The electronic device 100 displays a first drawing palette 704 having a first appearance. The first drawing palette 704 is displayed along (e.g., next to, anchored to, and/or substantially parallel to) the fourth side 701d of the first application interface 702. The first drawing palette 704 may include a variety of affordances (e.g., drawing tool affordances, editing function affordances, and/or color pots) to facilitate content manipulation operations. For example, as illustrated in FIG. 7A, the first drawing palette 704 includes an undo affordance 704a, a redo affordance 704b, a set of drawing tool affordances 704c, a set of color pots 704d, a text tool affordance 704e, a shapes tool affordance 704f, and an additional functions affordance 704g. One of ordinary skill in the art will appreciate that the first drawing palette 704 may include any number and types of affordances, arranged in any number of ways.

An input directed to the undo affordance 704a requests the electronic device 100 to undo a previous operation, such as erasing a previously drawn mark. An input directed to the redo affordance 704b requests the electronic device 100 to redo a previous undo operation, such as redisplaying the previously erased mark.

The set of drawing tool affordances 704c includes (from left-to-right) a pen affordance, a marker affordance (e.g., a highlighter affordance), a pencil affordance, a ruler affordance, and an eraser affordance. As illustrated in FIG. 7A, the pencil affordance indicates that the pencil is selected as the currently selected drawing tool. An input directed to a respective drawing tool affordance sets the respective drawing tool as the currently selected drawing tool.

The set of color pots 704d includes a top row of color affordances for setting a currently selected color and a bottom row of pattern affordances for setting a currently selected pattern associated with the color. As illustrated in FIG. 7A, the color black and a solid pattern are currently selected. An input directed to a respective color affordance or a respective pattern affordance sets the respective color/pattern as currently selected.

The text tool affordance 704e enables creation of text content within the first application interface 702. For example, after selection of the text tool affordance 704e, inputs directed to the first application interface 702 cause the electronic device 100 to display a text box for receiving a text string and cause the electronic device 100 to replace the text box with the text string entered into the text box.

The shapes tool affordance 704f enables placement of a particular shape within the first application interface 702. In some embodiments, for example, an input directed to the shapes tool affordance 704f brings up a shapes interface including a variety of predetermined shapes (e.g., square, circle, triangle). Subsequently, the electronic device 100 detects an input corresponding to dragging a particular shape from within the shapes interface to a location within the first application interface 702. In response, the electronic device 100 displays the particular shape at the location within the first application interface 702.

As illustrated in FIG. 7B, the electronic device 100 detects a drag input 708 that corresponds to a request to move the first drawing palette 704 within the first application interface 702. The drag input 708 corresponds to a request to move the first drawing palette 704 away from the fourth edge 701d of the first application interface 702 towards the first edge 701a of the first application interface 702. In some embodiments, the electronic device 100 detects the drag input 708 on a touch-sensitive surface of the electronic device 100, such as detecting a finger drag input or a stylus drag input. In some embodiments, the drag input 708 corresponds to a mouse drag input (e.g., a click and drag).

FIG. 7B also includes, for purely explanatory purposes, a first threshold line 706 that is a first distance 706a away from the first edge 701a of the first application interface 702. Notably, as illustrated in FIG. 7B, the end point of the drag input 708 is beyond the first threshold line 706.

As illustrated in FIG. 7C, the drag input 708 proceeds from the initial position in FIG. 7B to a second position nearer to the first edge 701a. Accordingly, the electronic device 100 replaces the first drawing palette 704 with a drawing tool indicator 709. The drawing tool indicator 709 includes a black-tipped pencil 710a because, as illustrated in FIGS. 7A and 7B, the set of drawing tool affordances 704c indicate that the currently selected drawing tool is a pencil and the set of color pots 704d indicate that black is the currently selected color. Moreover, the drawing tool indicator 709 is oriented upwards (e.g., towards the north direction) because the set of drawing tool affordances 704c are likewise oriented upwards in FIGS. 7A and 7B.

Figure 7D:
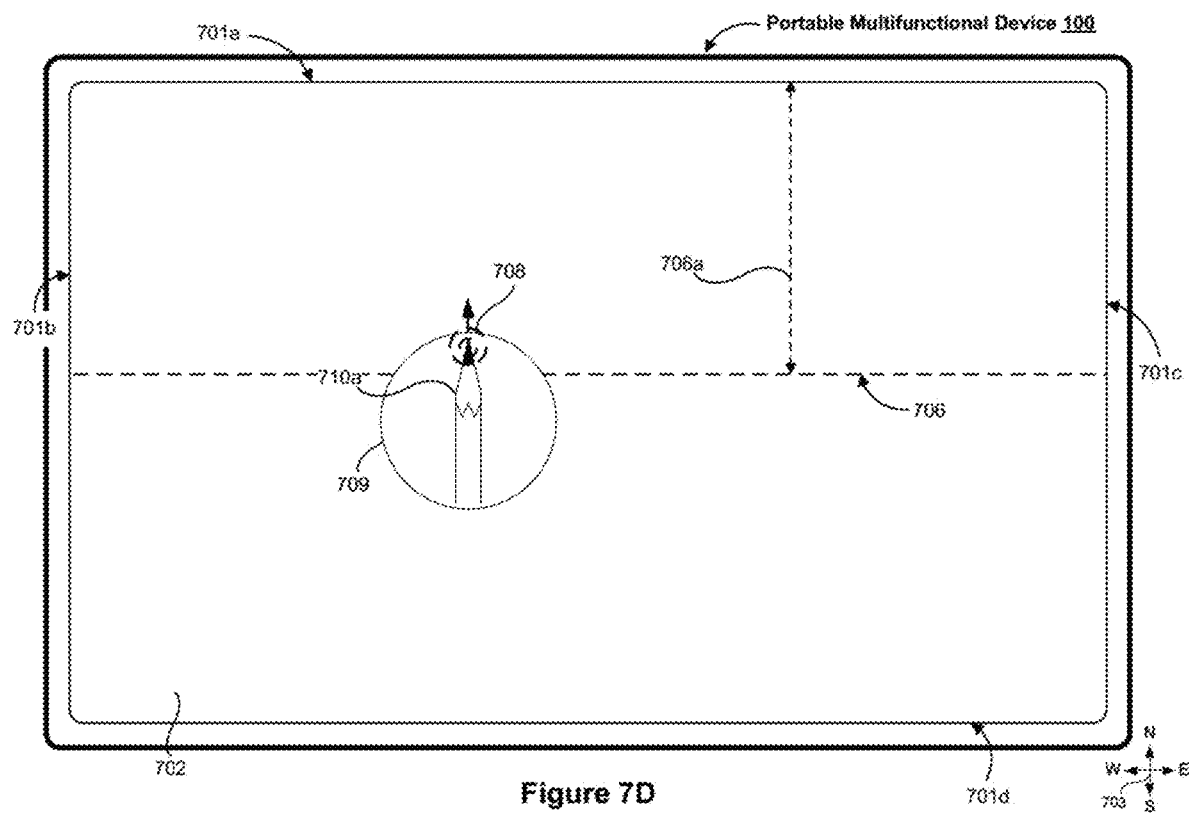
Figure 7E:
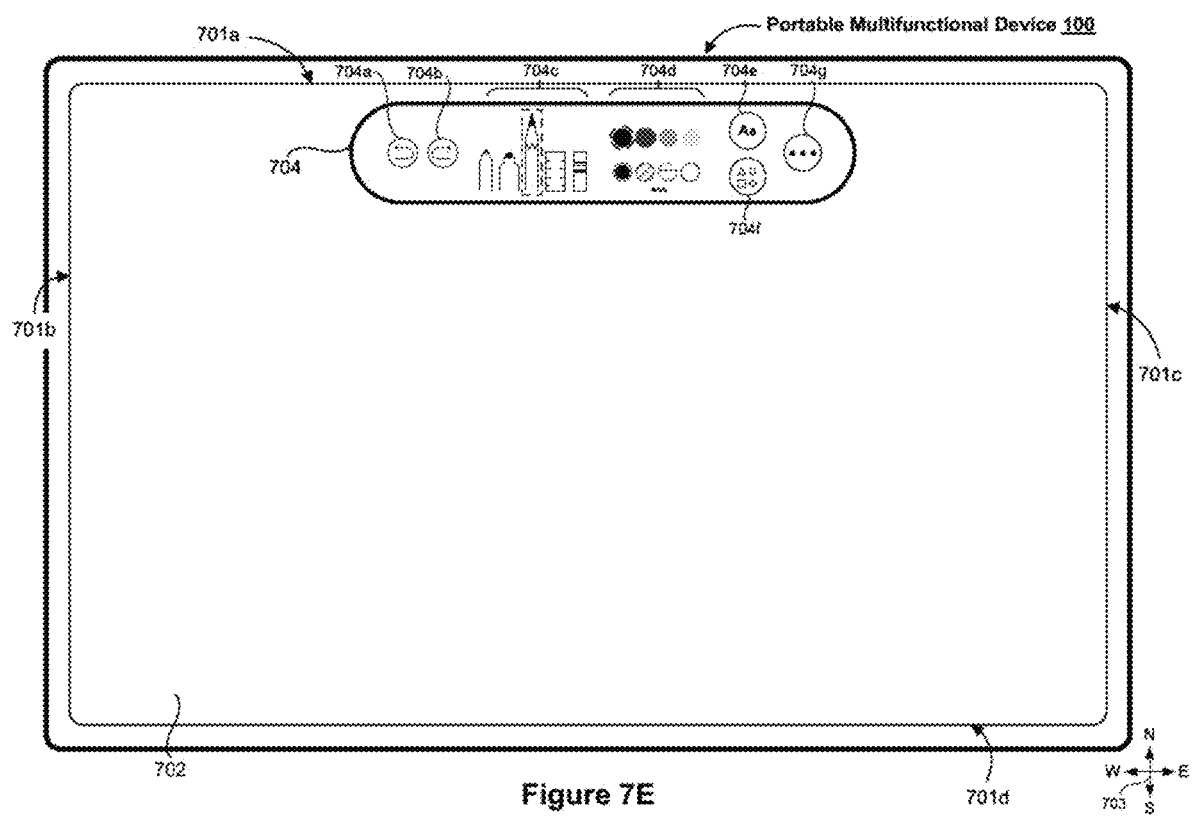

As illustrated in FIG. 7D, the drag input 708 proceeds nearer still to the first edge 701a, crossing the first threshold line 706. The electronic device 100 maintains the orientation of the drawing tool indicator 709 because, as is illustrated in FIG. 7E, the set of drawing tool affordances 704c within the repositioned first drawing palette 704 continues to face upwards. In response to determining completion of the drag input 708, the electronic device 100 replaces the drawing tool indicator 709 with the first drawing palette 704 having the first appearance along the first edge 701a in FIG. 7E.

Figure 7F:
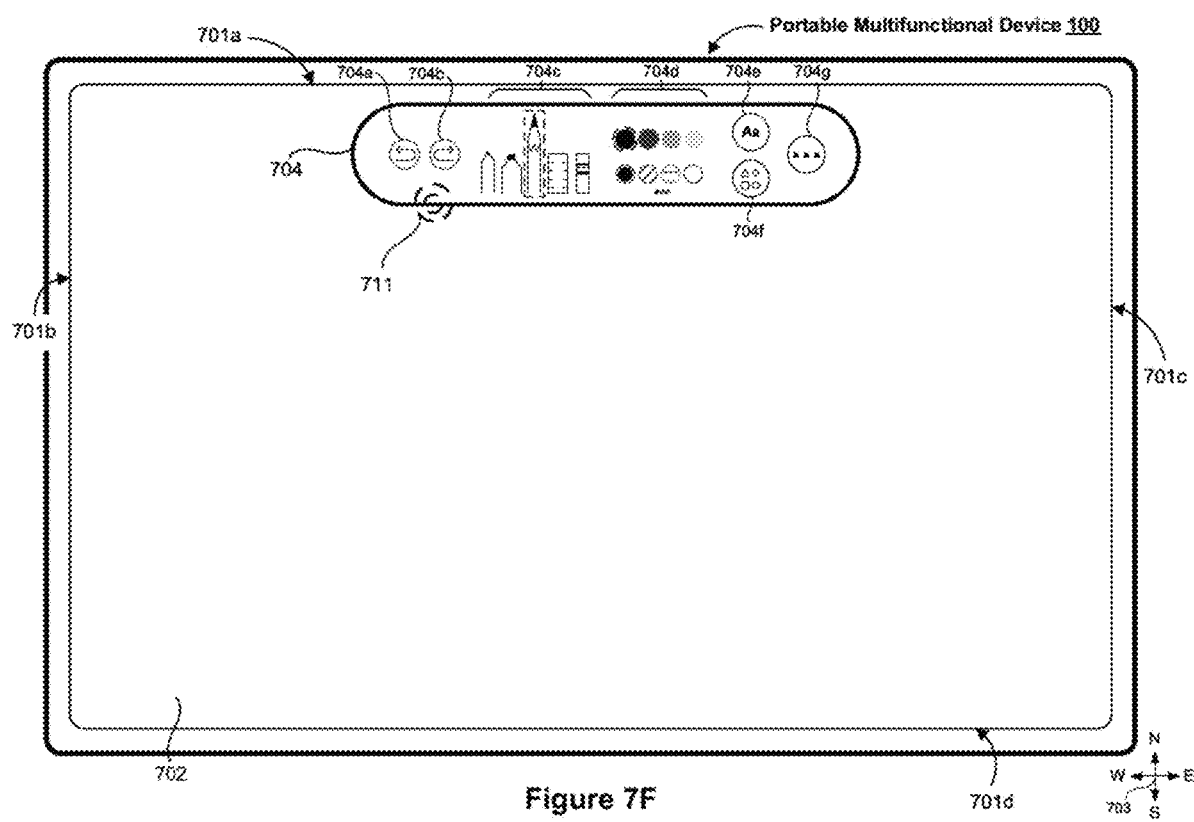

As illustrated in FIG. 7F, the electronic device 100 detects a tap input 711 directed to the first drawing palette 704. In some embodiments, the tap input 711 corresponds to a single tap or double tap input detected on the touch-sensitive surface of the electronic device 100. In some embodiments, the tap input 711 corresponds to a single mouse-click or double mouse-click input.

Figure 7G:
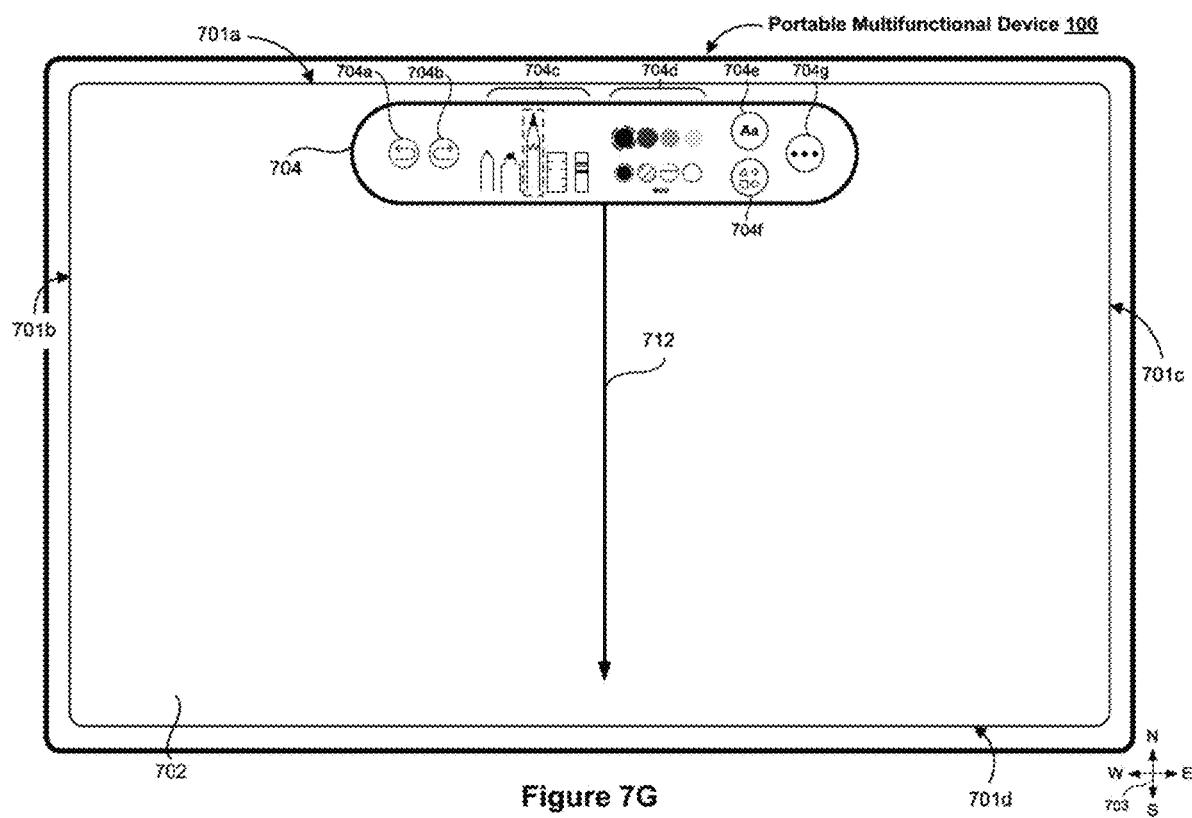
Figure 7H:
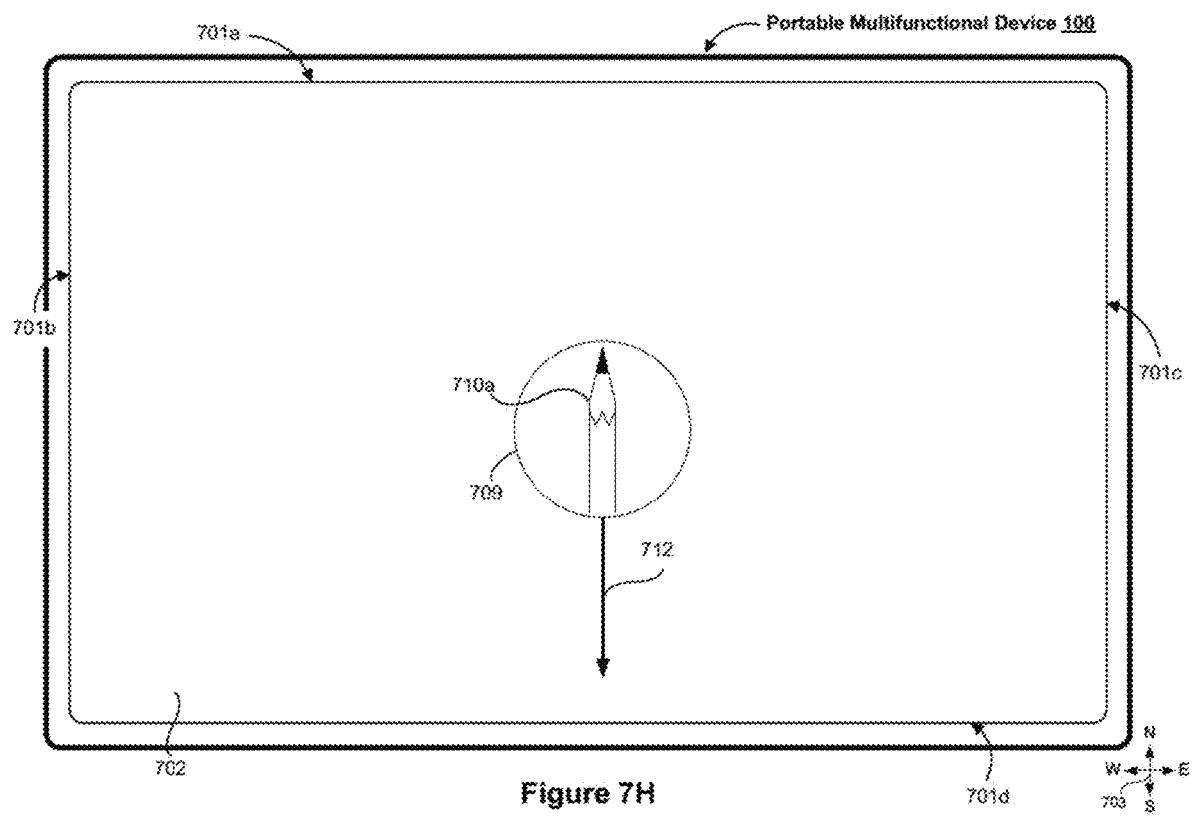
Figure 7I:
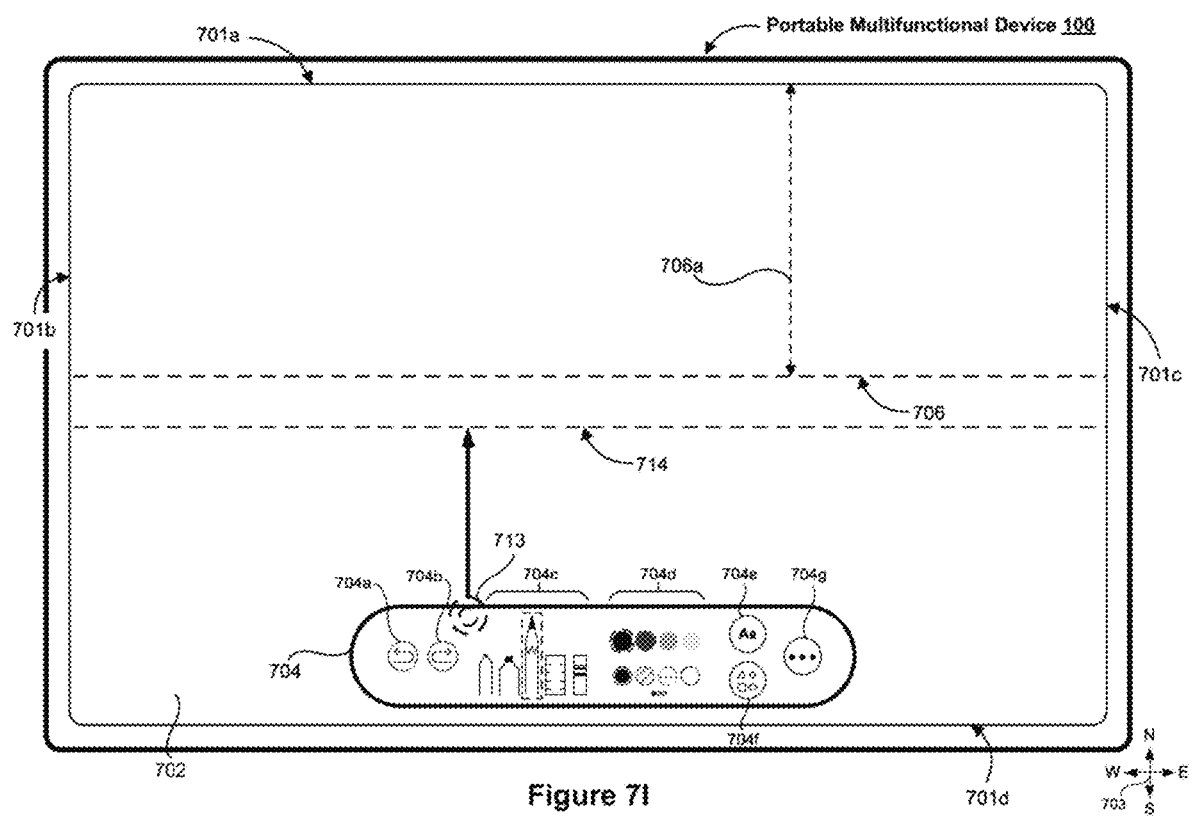

In response to detecting the tap input 711 in FIG. 7F, the electronic device 100 moves the first drawing palette 704 to the previous position along the fourth edge 701d, as illustrated in FIGS. 7G-7I. Namely, as illustrated in FIG. 7G, the electronic device 100 moves the first drawing palette 704 along a line path 712 towards the fourth edge 701d. In some embodiments, the electronic device 100 moves the first drawing palette 704 according to an animation. During the transition from the first edge 701a back to the fourth edge 701d, the electronic device 100 replaces the first drawing palette 704 with the drawing tool indicator 709, as illustrated in FIG. 7H. Again, the electronic device 100 maintains the drawing tool indicator 709 oriented upwards (e.g., towards the north direction) because, as illustrated in FIG. 7I, the set of drawing tool affordances 704c remains oriented upwards. FIG. 7I illustrates the end of the transition, with the electronic device 100 displaying the first drawing palette 704 having the first appearance along the fourth edge 701d.

Figure 7J:
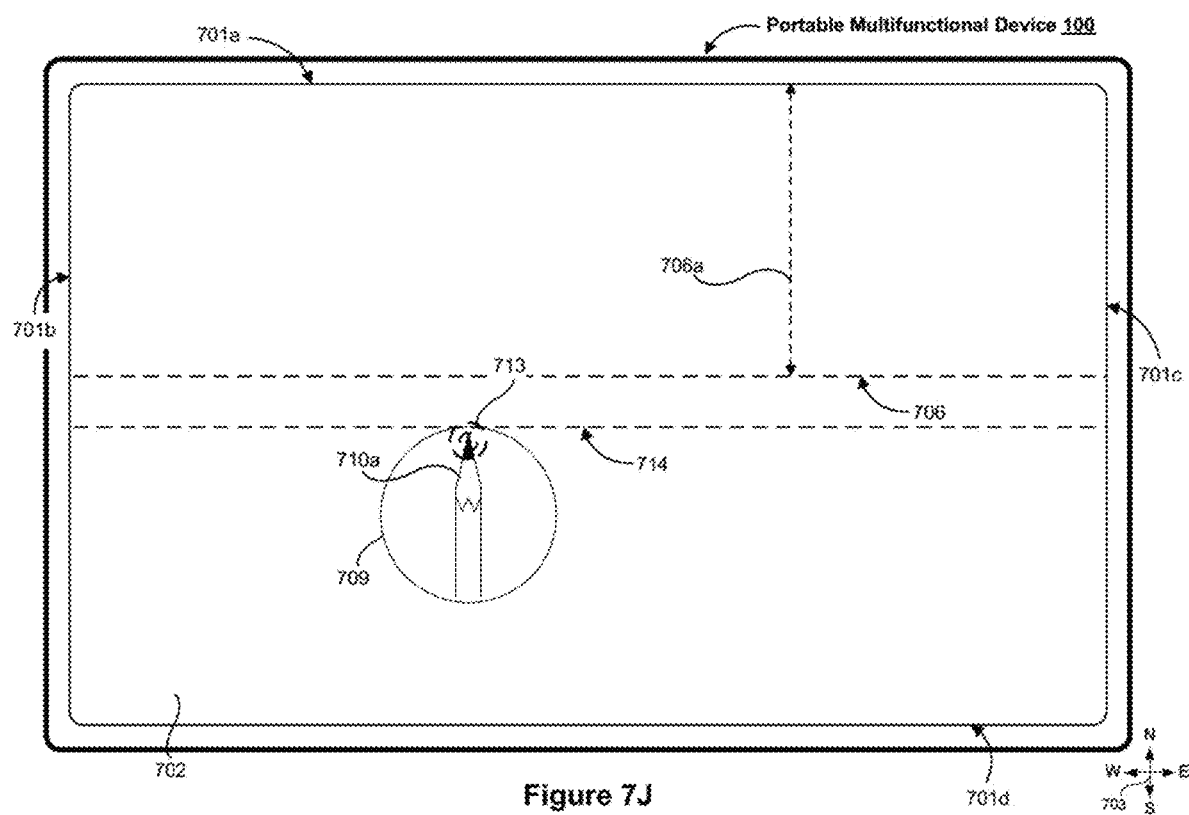
Figure 7K:
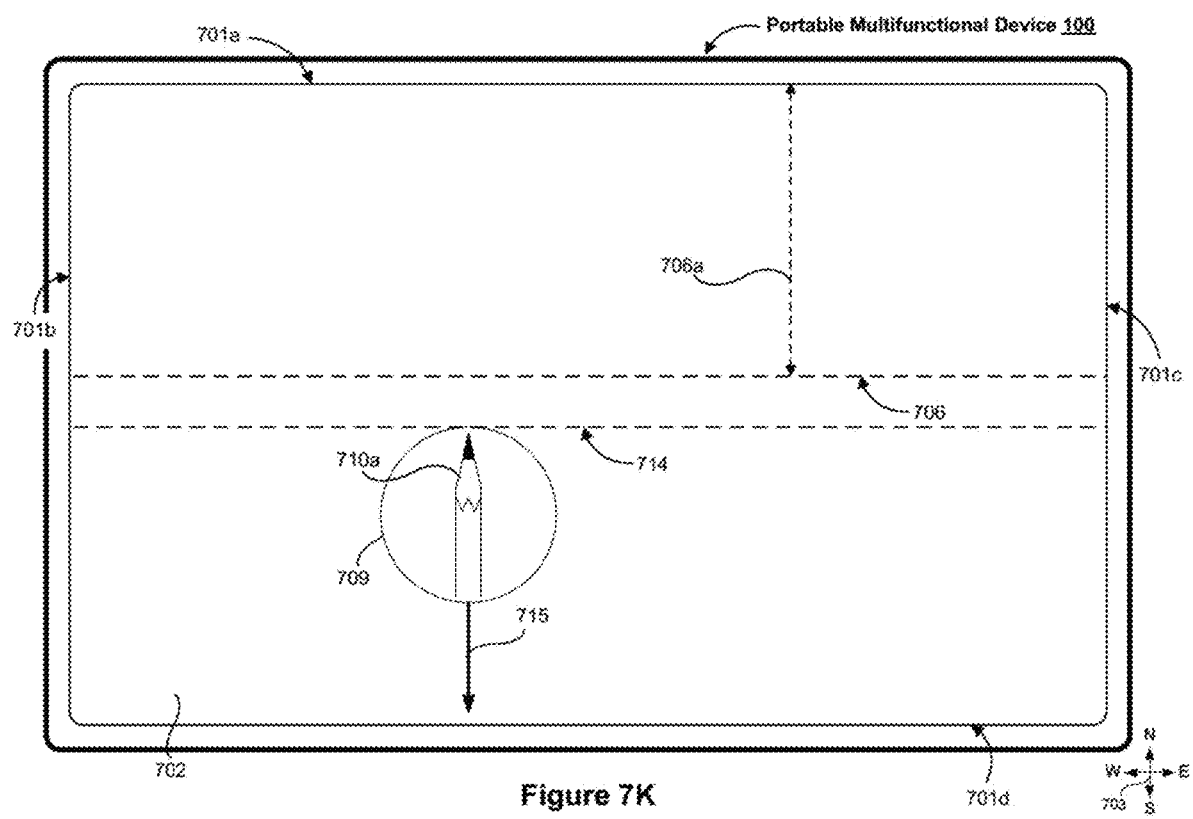
Figure 7L:
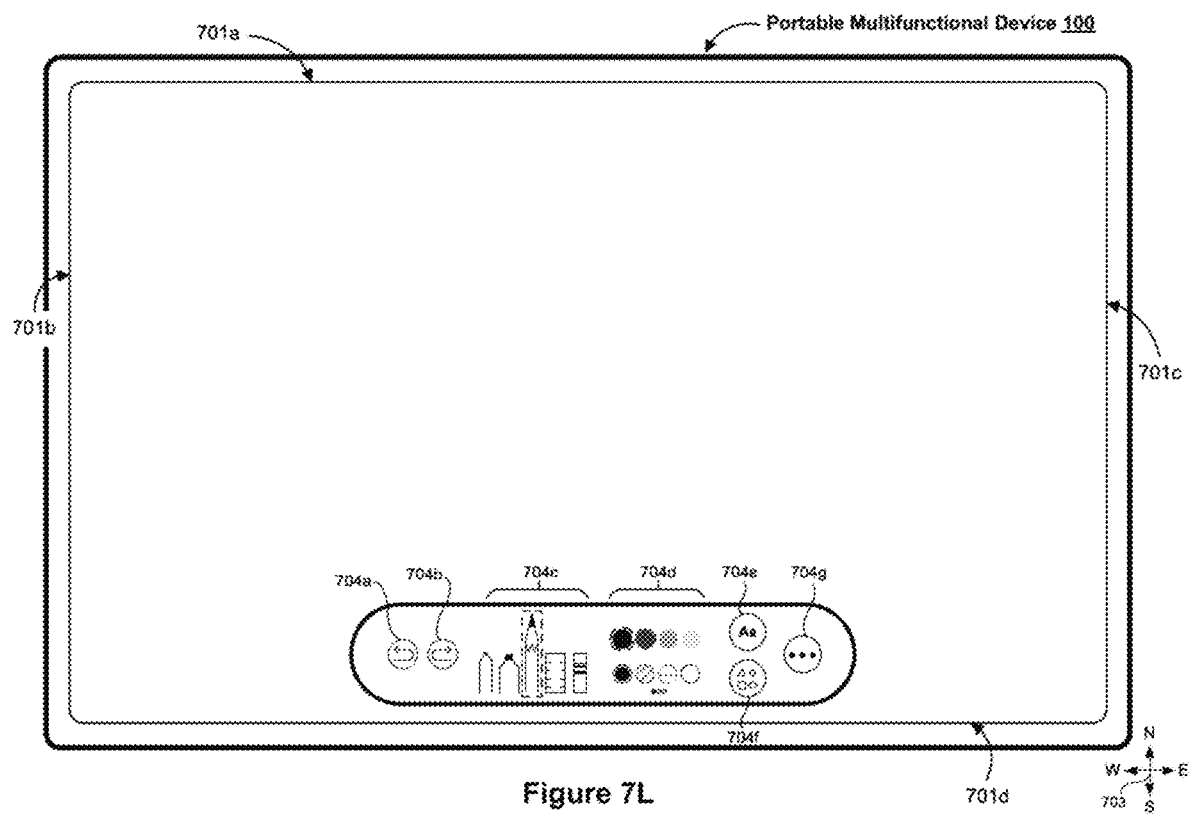

As further illustrated in FIG. 7I, the electronic device 100 detects a drag input 713. However, unlike the previous drag input 708 illustrated in FIGS. 7B-7D, the drag input 713 does not cross the first threshold line 706. Rather, the drag input 713 ends at a reference line 714, which is illustrated for purely explanatory purposes. As illustrated in FIG. 7J, as the drag input 713 progresses upwards away from the fourth edge 701d, the electronic device 100 replaces the first drawing palette 704 with the drawing tool indicator 709. The drawing tool indicator 709 includes the black-tipped pencil 710a. As illustrated in FIG. 7K, in response to detecting that the release of the drag input 713 is not beyond the first threshold line 706, the electronic device 100 moves the drawing tool indicator 709 back towards the fourth edge 701d, as is indicated by a line path 715. Ultimately, as illustrated in FIG. 7L, the electronic device 100 displays the first drawing palette 704 having the first appearance along the fourth edge 701d.

Figure 7M:
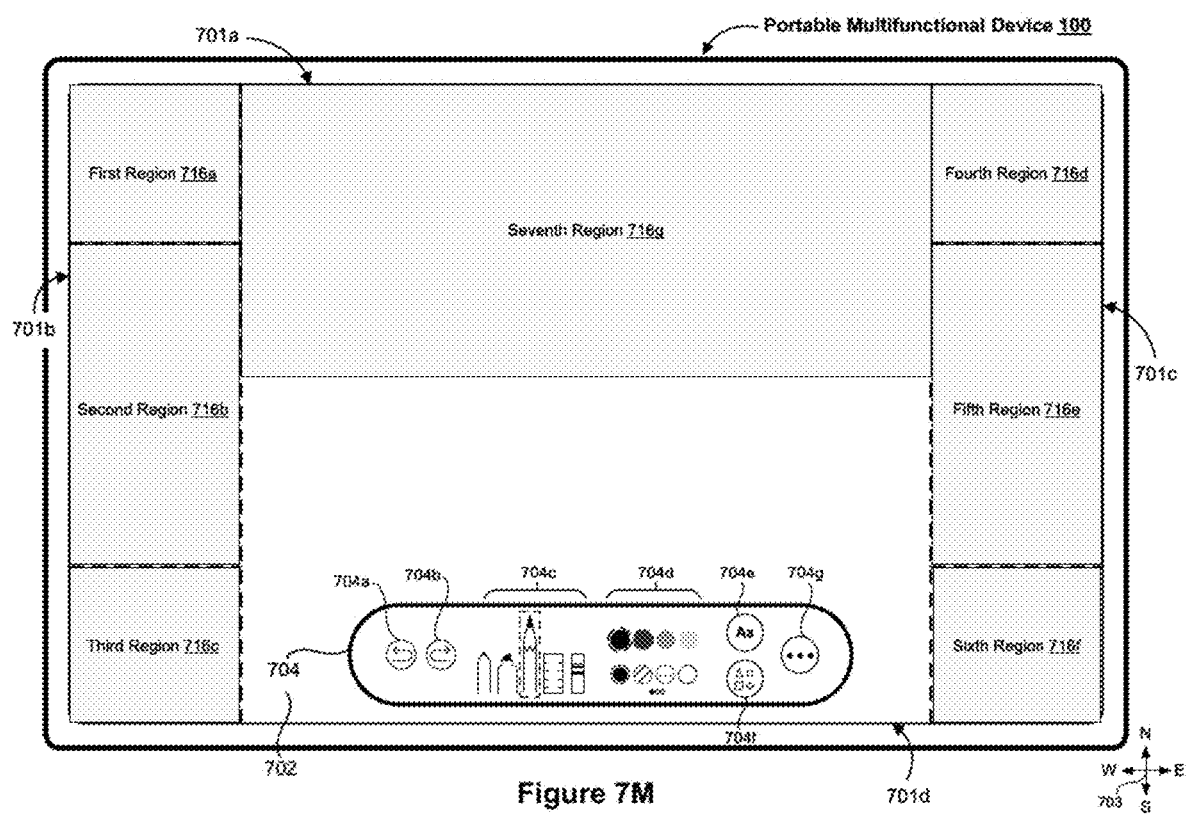

As illustrated in FIG. 7M, in some embodiments, the electronic device 100 partitions seven regions 716a-716g, which are illustrated for purely explanatory purposes. According to various embodiments, in response to detecting a particular input directed to the first drawing palette 704, the electronic device 100 moves the first drawing palette 704 from an initial location (e.g., along the fourth edge 701d) to a terminal location in a particular one of the seven regions 716a-716g. In some embodiments, the electronic device 100 changes an appearance of the first drawing palette 704 from the first appearance to a second appearance when located in the particular one of the seven regions 716a-716g. Hereinafter, in various embodiments, a drawing palette is moved to a particular region of the first application interface 702 when a substantial portion of the drawing palette is within the particular region or a center of the drawing palette is within the particular region. Accordingly, in various embodiments, the drawing palette may be moved to the particular region even if a portion of the drawing palette is outside of the particular region.

In particular, the first region 716a corresponds to a first corner of the first application interface 702 that intersects the first edge 701a and the second edge 701b. The second region 716b corresponds to a portion of the first application interface 702 that runs along the second edge 701b. The third region 716c corresponds to a second corner of the first application interface 702 that intersects the second edge 701b and the fourth edge 701d. The fourth region 716d corresponds to a third corner of the first application interface 702 that intersects the first edge 701a and the third edge 701c. The fifth region 716e corresponds to a portion of the first application interface 702 that runs along the third edge 701c. The sixth region 716f corresponds to a fourth corner of the first application interface 702 that intersects the third edge 701c and the fourth edge 701d. The seventh region 716g corresponds to a portion of the first application interface 702 that runs along the first edge 701a.

Figure 7N:
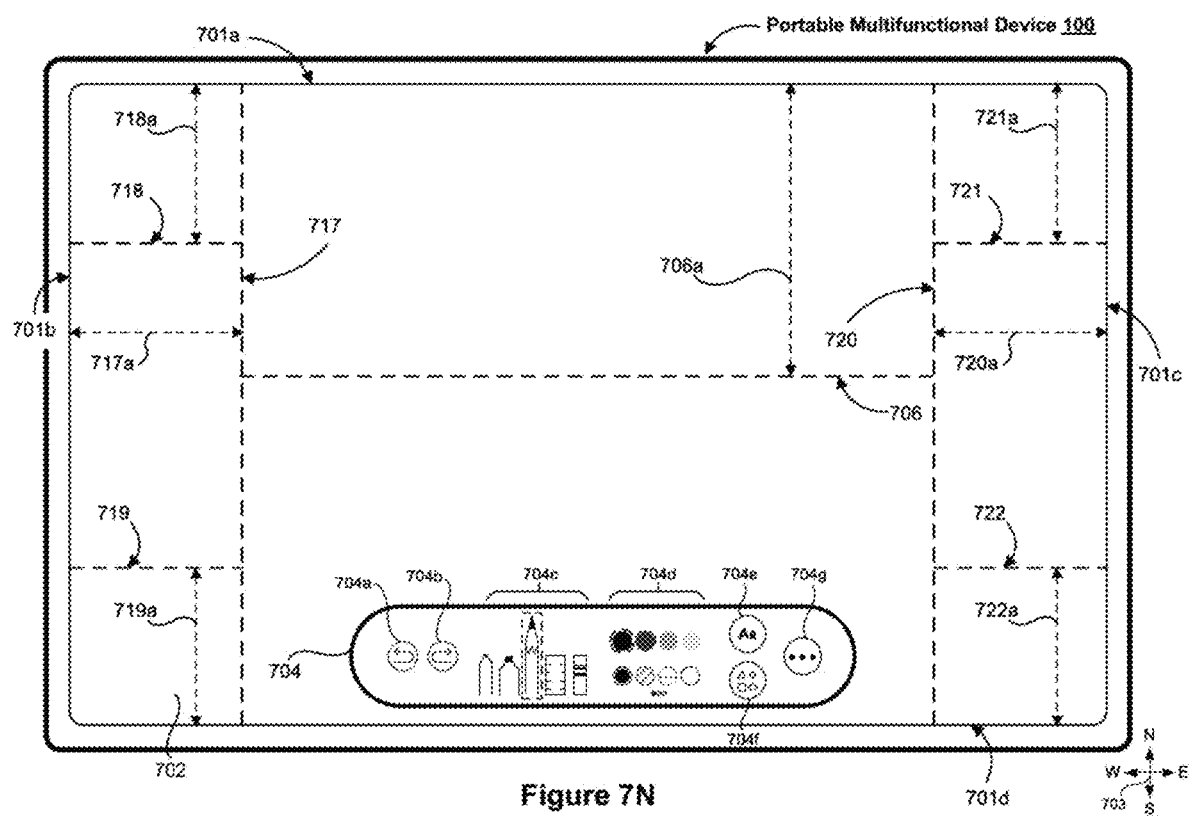

As illustrated in FIG. 7N, with continued reference to FIG. 7M, each of the seven regions 716a-716g is associated with one or more thresholds lines located away from corresponding edge(s). According to various embodiments, the electronic device 100 moves the first drawing palette 704 to a particular one of the seven regions 716a-716g when a drag input directed to the first drawing palette 704 crosses corresponding threshold line(s). The threshold lines are illustrated for purely explanatory purposes. One of ordinary skill in the art will appreciate that the location of the threshold lines may vary according to various embodiments.

Namely, the seventh region 716g is associated with the first threshold line 706 that is a first distance 706a away from the first edge 701a, as described above with reference to FIGS. 7B-7D and 7I-7K. The first region 716a is associated with a second threshold line 718 that is a second distance 718a away from the first edge 701a and a third threshold line 717 that is a third distance 717a away from the second edge 701b. The second region 716b is associated with the third threshold line 717. The third region 716c is associated with the third threshold line 717 and a fourth threshold line 719 that is a fourth distance 719a away from the fourth edge 710d. The fourth region 716d is associated with a fifth threshold line 721 that is a fifth distance 721a from the first edge 701a and a sixth threshold line 720 that is a sixth distance from the third edge 701c. The fifth region 716e is associated with the sixth threshold line 720. The sixth region 716f is associated with the sixth threshold line 720 and a seventh threshold line 722 that is a seventh distance 722a away from the fourth edge 701d.

According to various embodiments, the electronic device 100 moves the first drawing palette 704 to a particular one of the seven regions 716a-716g in response to detecting an input that satisfies one or more movement criteria. For example, in some embodiments, the electronic device 100 moves the first drawing palette 704 to a particular one of the seven regions 716a-716g in response to detecting a drag input directed to the first drawing palette 704 that crosses one or more threshold line(s). As another example, in some embodiments, the electronic device 100 moves the first drawing palette 704 to a particular one of the seven regions 716a-716g in response to detecting a flick input directed to first drawing palette 704 that satisfies a velocity threshold (e.g., direction threshold and magnitude threshold).

Figure 7O:
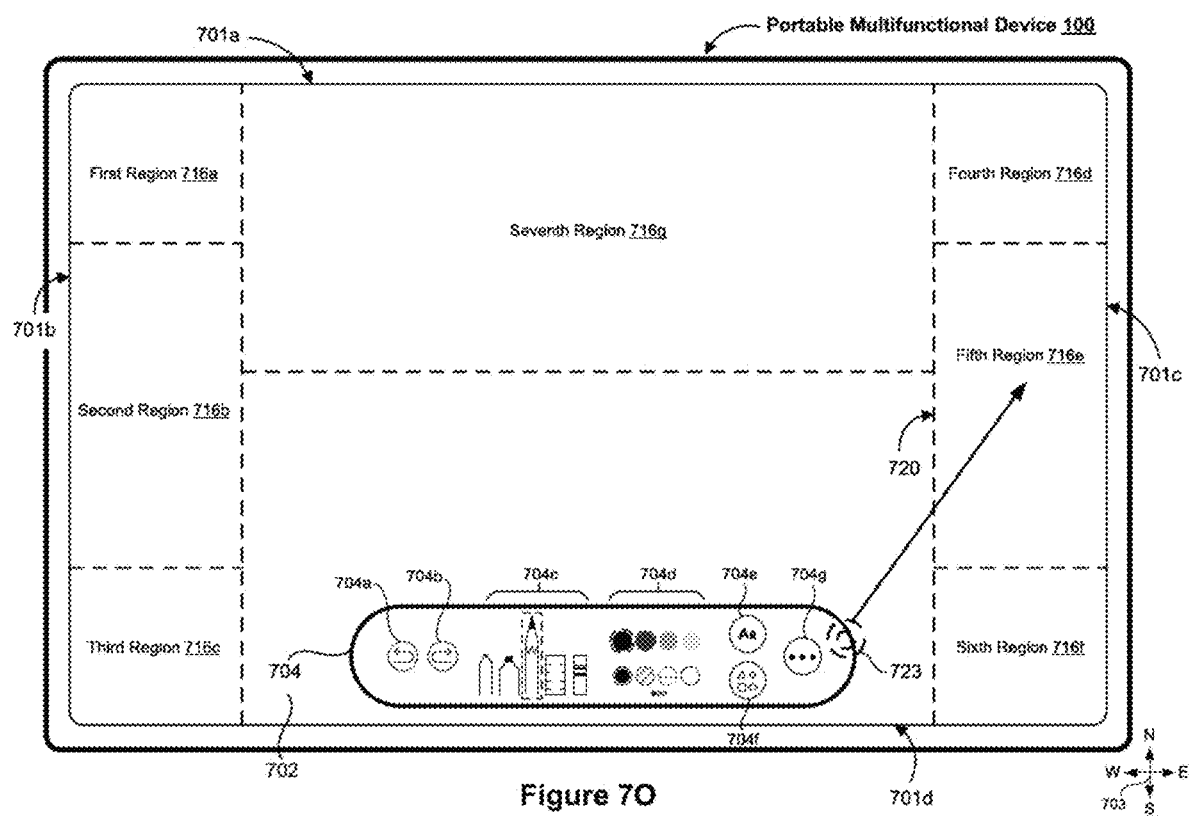
Figure 7P:
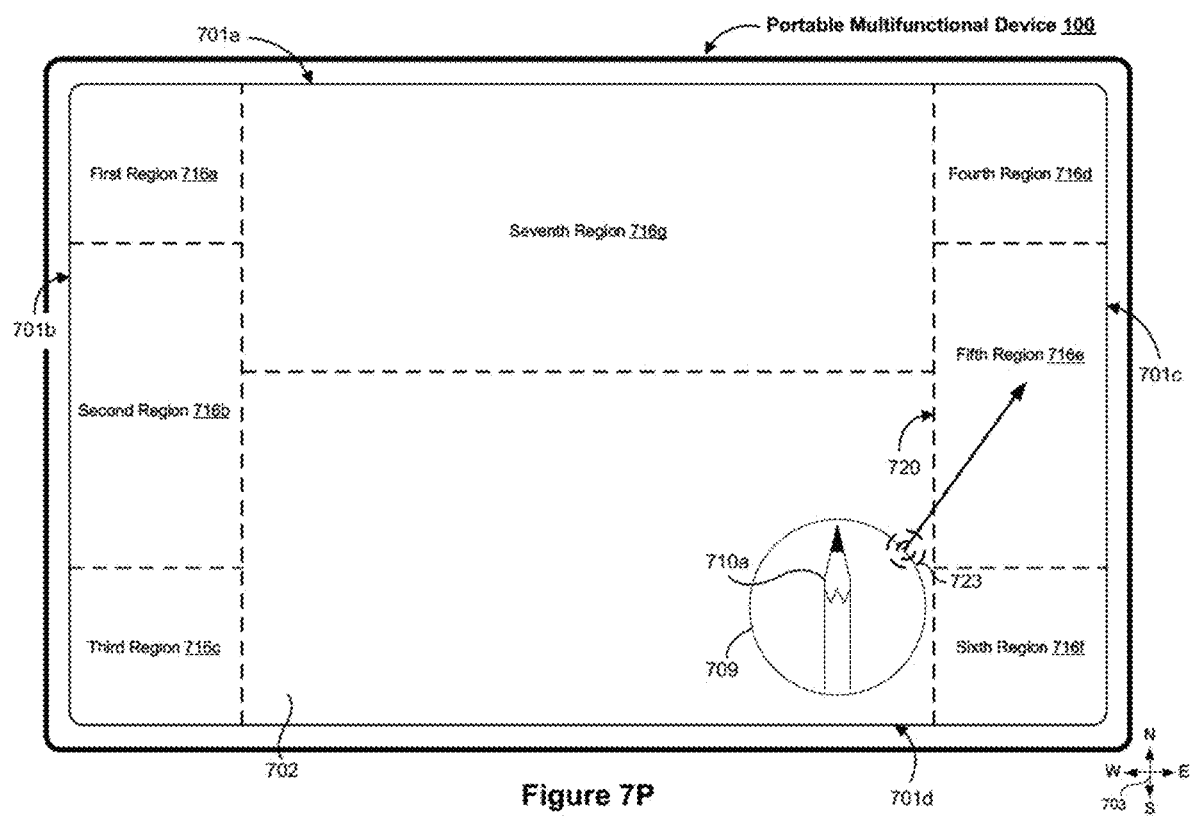

As illustrated in FIG. 7O, the electronic device 100 detects a drag input 723 that requests movement of the first drawing palette 704 to the fifth region 716e. As illustrated in FIG. 7P, prior to detecting the drag input 723 cross the sixth threshold line 720 associated with the fifth region 716e, the electronic device 100 replaces the first drawing palette 704 with the drawing tool indicator 709 including an upward-facing black-tipped pencil 710a. The black-tipped pencil 710a is upwards-facing because the currently selected drawing tool, as indicated by the set of drawing tool affordances 704c in FIG. 7O, corresponds to an upward-facing black-tipped pencil.

Figure 7Q:
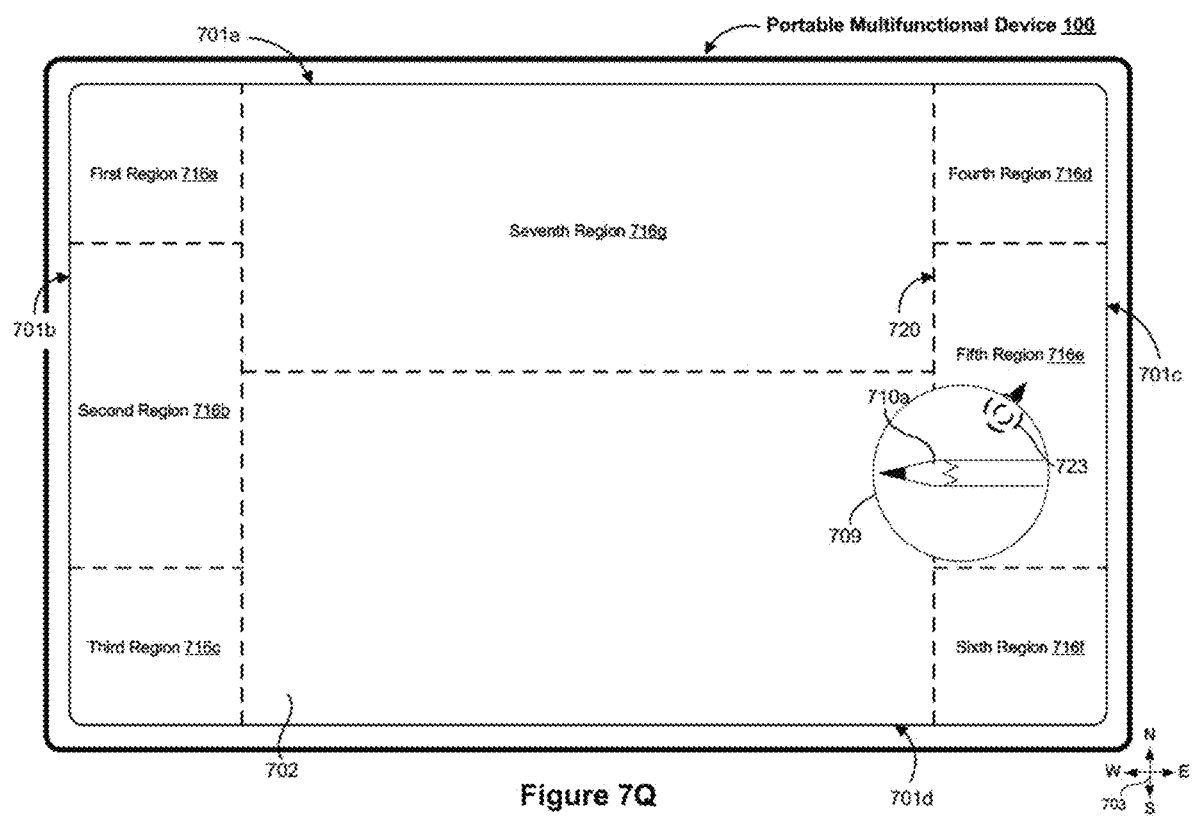

As illustrated in FIG. 7Q, in response to detecting the drag input 723 cross the sixth threshold line 720, the electronic device 100 rotates the black-tipped pencil 710a in order to be substantially perpendicular to and facing away from the third edge 701c. The electronic device 100 rotates the black-tipped pencil 710a in this way because, as is illustrated in FIG. 7R, the electronic device 100 reorients the first drawing palette 704 and the set of drawing tool affordances 704c in order to be substantially perpendicular to and facing away from the third edge 701c.

Figure 7R:
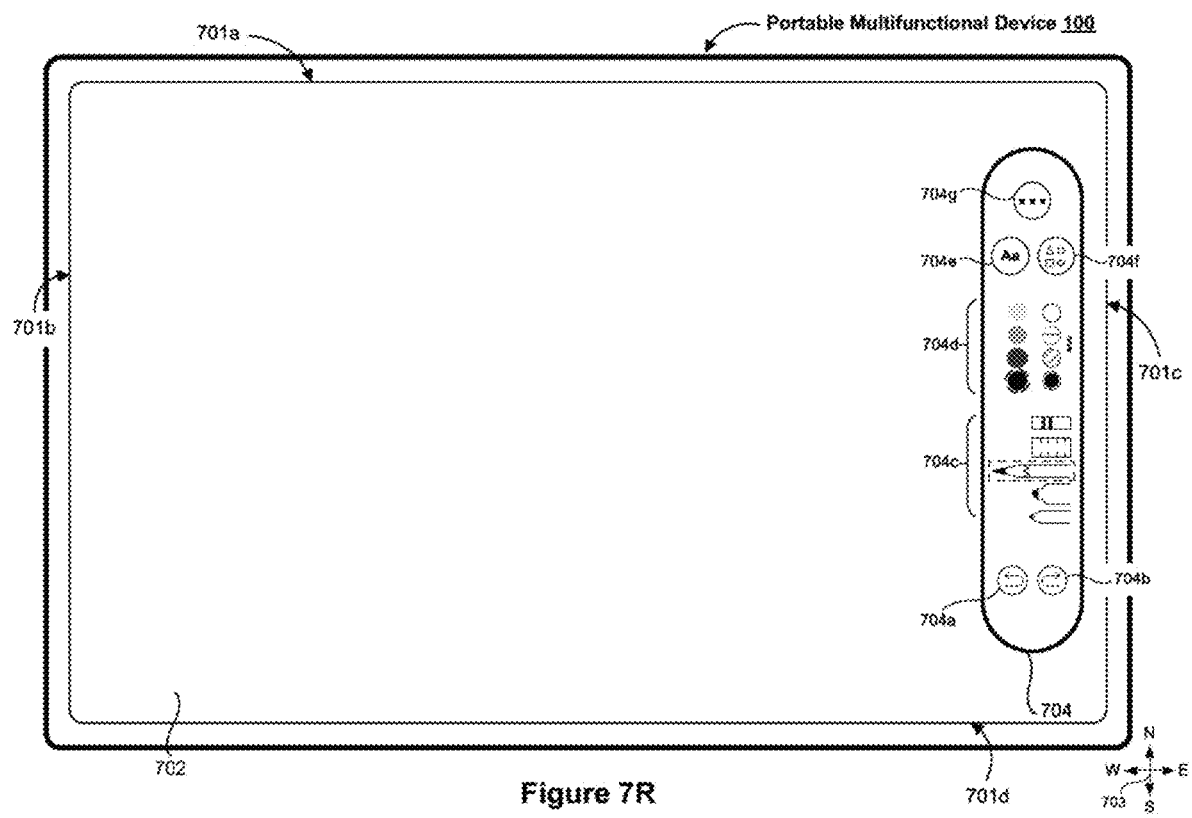

As illustrated in FIG. 7R, in response to detecting completion of the drag input 723, the electronic device 100 displays the first drawing palette 704 having the first appearance along the third edge 701c with a different orientation than in, e.g., FIG. 7O. Notably, the electronic device 100 displays the first drawing palette 704 along the third edge 701c and rotates the set of drawing tool affordances 704c in order to face away from the third edge 701c.

Figure 7S:
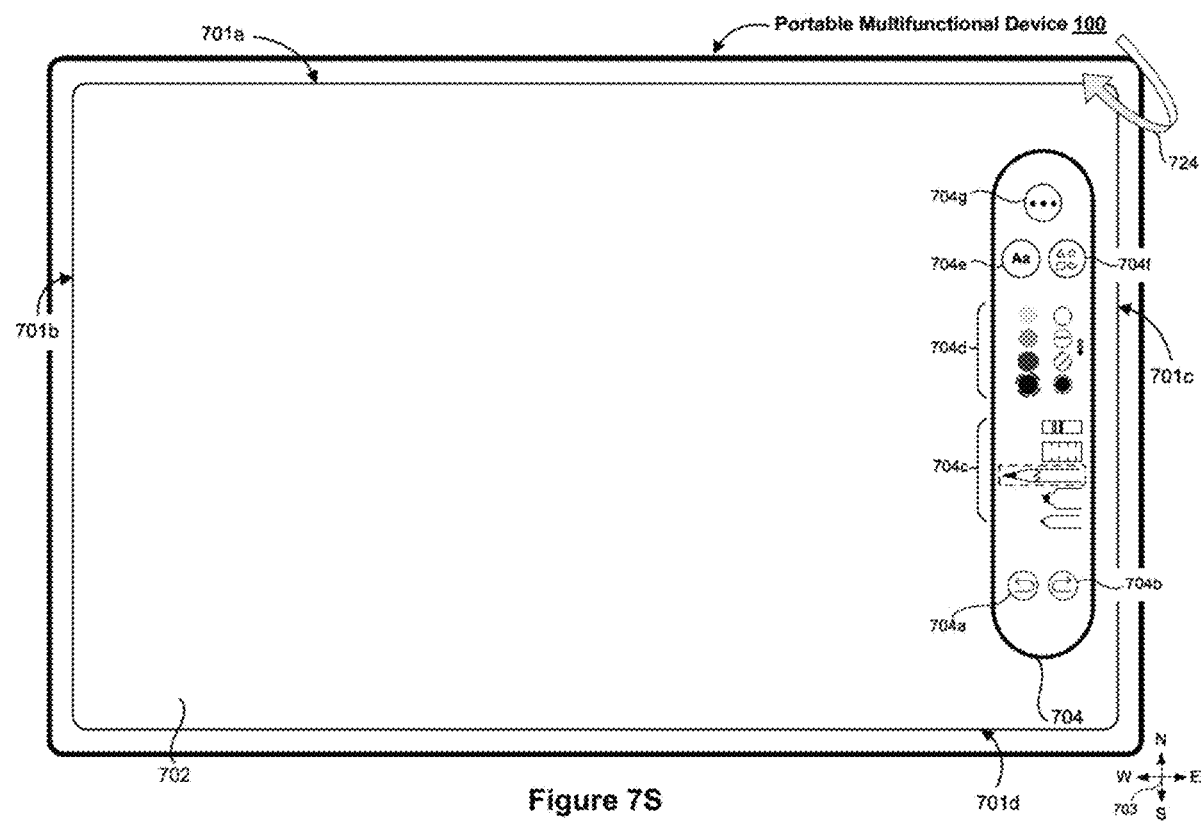
Figure 7T:
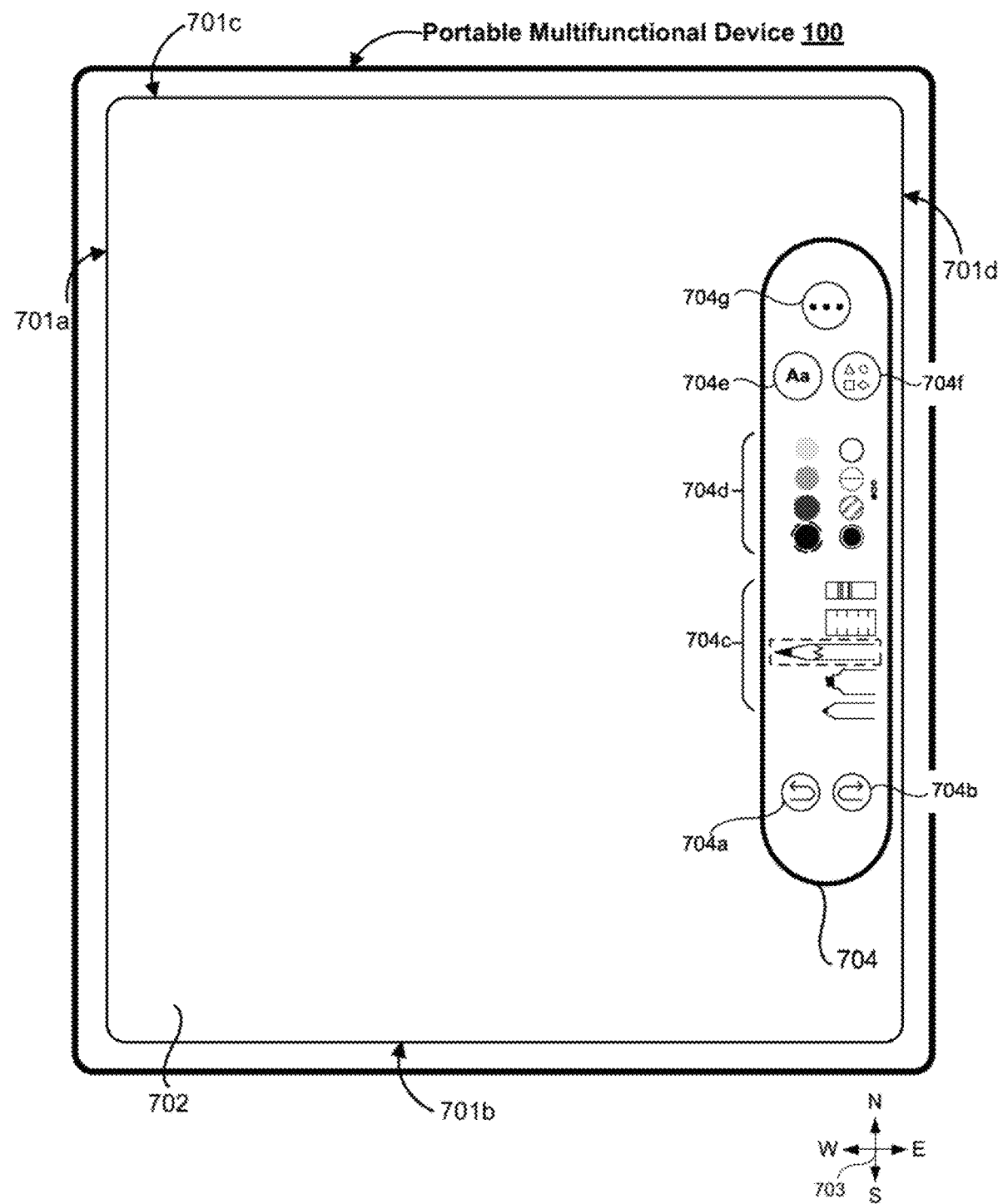

As illustrated in FIG. 7S, the electronic device 100 detects (e.g., via an inertial measurement unit (IMU)) a first device rotation input 724 that rotates the electronic device 100 counterclockwise 90 degrees. Accordingly, as illustrated in FIG. 7T, the position of the edges 701a-701d of the electronic device 100 change relative to FIG. 7S. In response to detecting the first device rotation input 724 in FIG. 7S, the electronic device 100 moves the first drawing palette 704 from along the third edge 701c (as illustrated in FIG. 7S) to along the fourth edge 701d. In this way, the electronic device 100 fixes (e.g., anchors) the first drawing palette 704 to a particular side of the first application interface 702 (e.g., the right side).

Figure 7U:
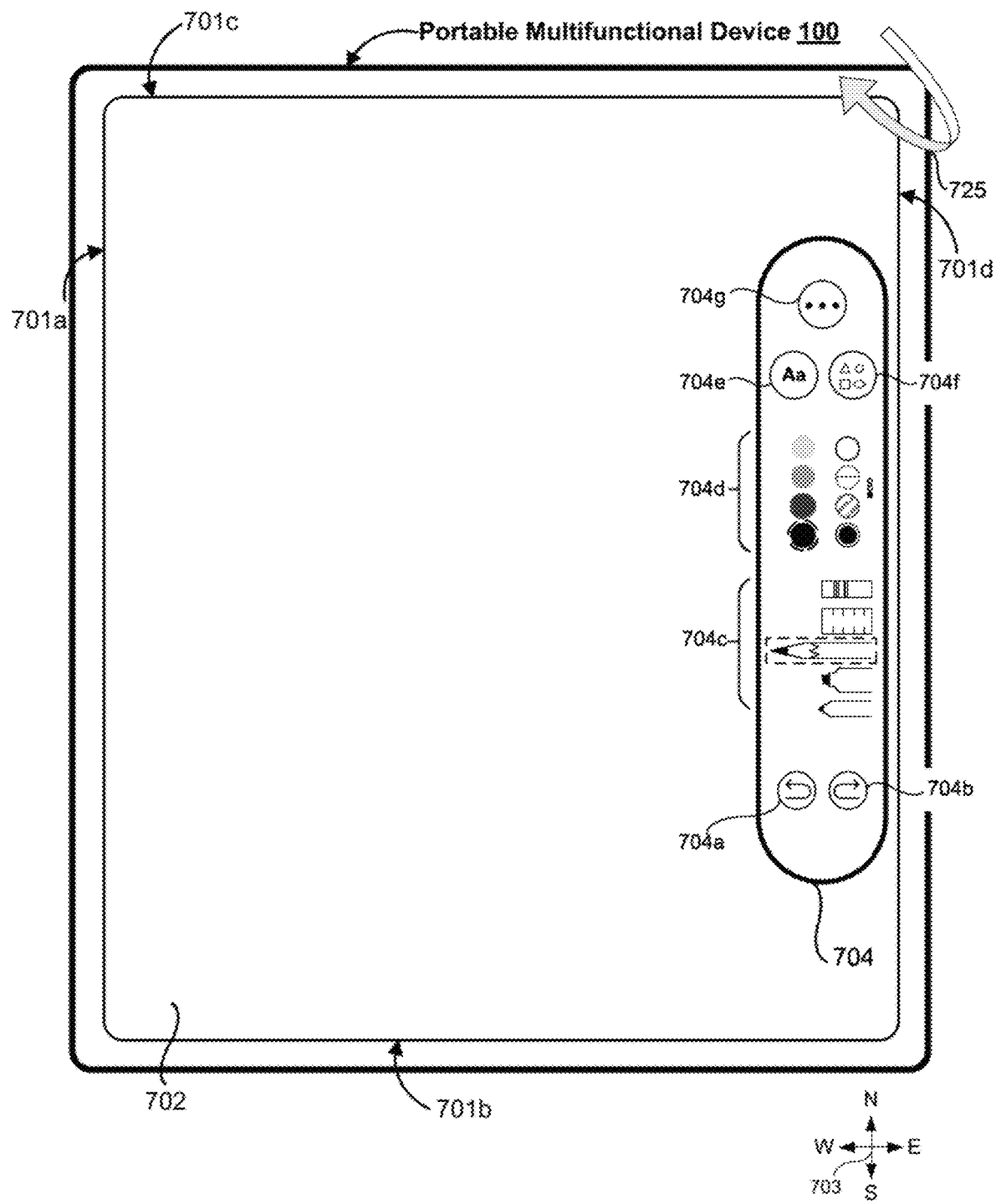
Figure 7V:
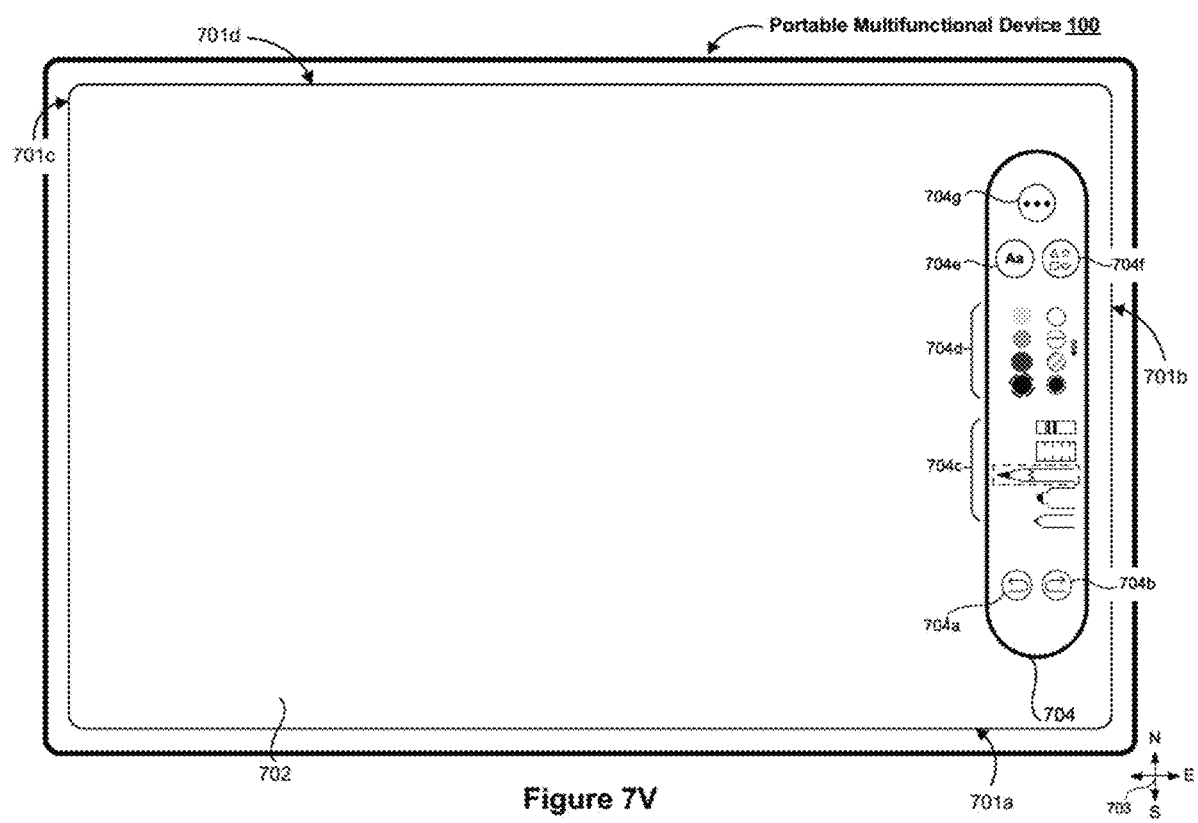

As illustrated in FIG. 7U, the electronic device 100 detects a second device rotation input 725 that rotates the electronic device 100 an additional 90 degrees counterclockwise. Accordingly, as illustrated in FIG. 7V, the position of the edges 701a-701d of the electronic device 100 change relative to FIG. 7U. In response to detecting the second device rotation input 725 in FIG. 7U, the electronic device 100 moves the first drawing palette 704 from along the fourth edge 701d in FIG. 7U to along the second edge 701b in order to fix the first drawing palette 704 to the right side of the first application interface 702.

Figure 7W:
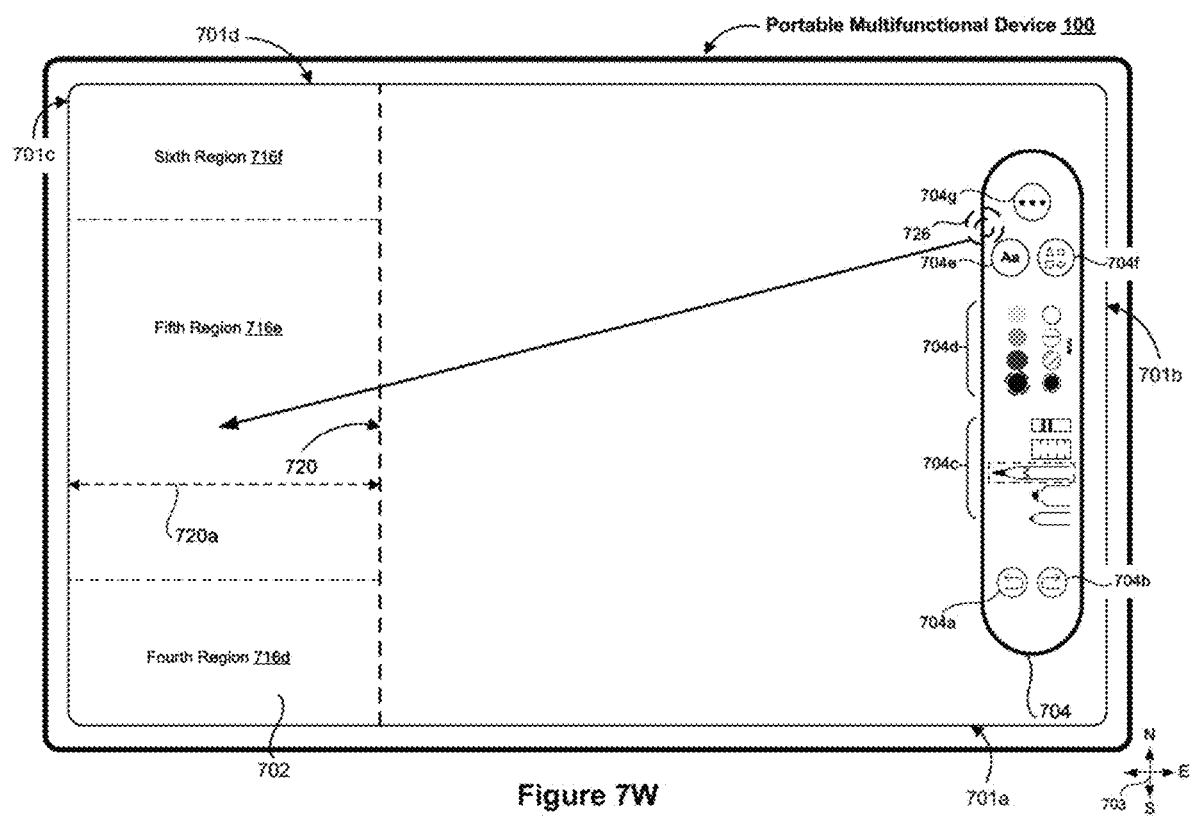
Figure 7X:
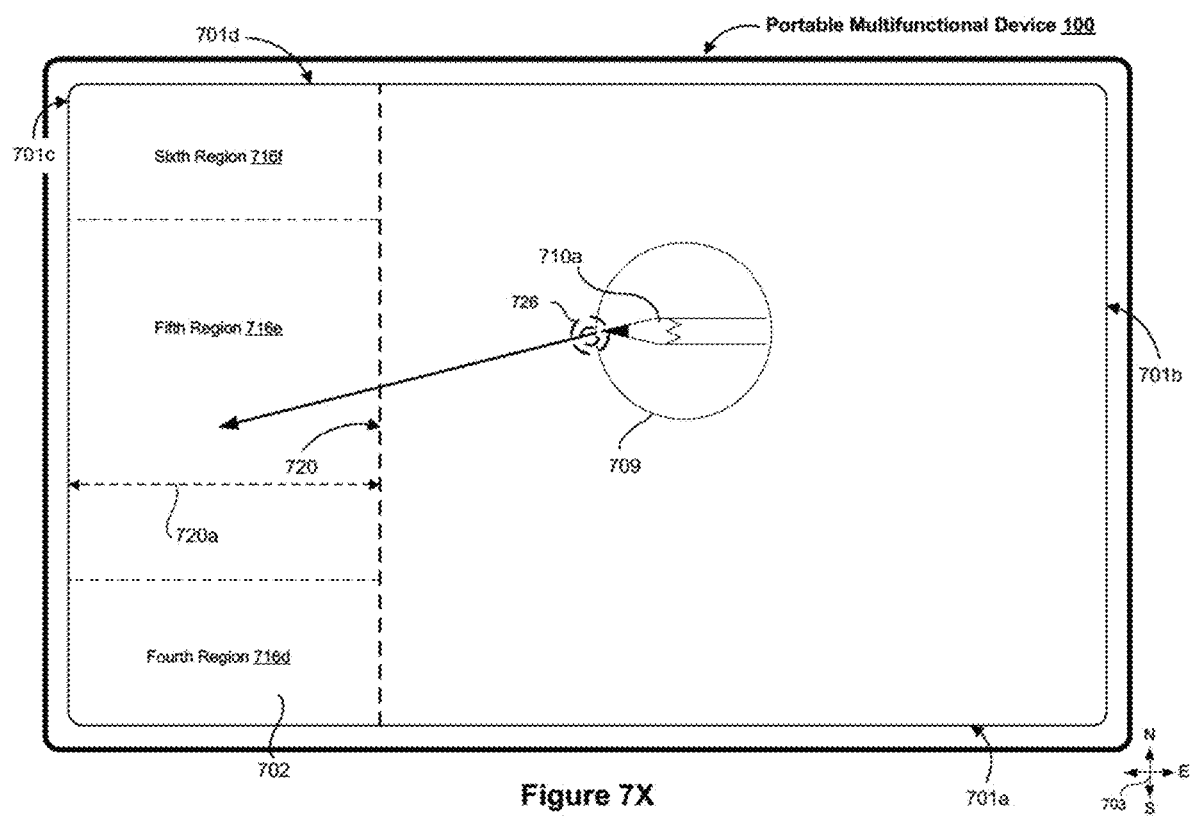

As illustrated in FIG. 7W, the electronic device 100 detects a drag input 726 that requests movement of the first drawing palette 704 to the fifth region 716e. As illustrated in FIG. 7X, prior to detecting the drag input 726 cross the sixth threshold line 720 associated with the fifth region 716e, the electronic device 100 replaces the first drawing palette 704 with the drawing tool indicator 709 including a black-tipped pencil 710a. The electronic device 100 maintains the black-tipped pencil 710a as substantially perpendicular to and facing away from the second edge 701b.

Figure 7Y:
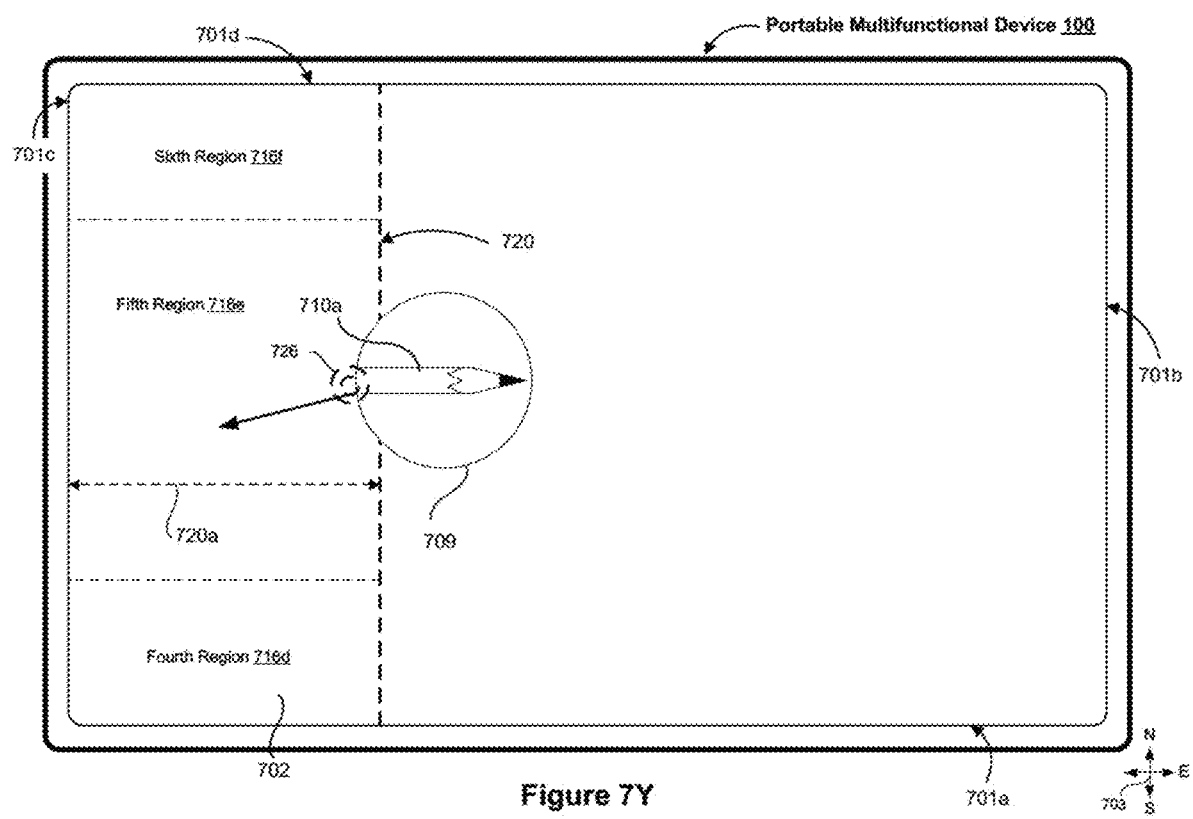

As illustrated in FIG. 7Y, in response to detecting the drag input 726 cross the sixth threshold line 720, the electronic device 100 rotates the black-tipped pencil 710a in order to be substantially perpendicular to and facing away from the third edge 701c. The electronic device 100 rotates the black-tipped pencil 710a in this way because, as is illustrated in FIG. 7Z, the electronic device 100 reorients the set of drawing tool affordances 704c in order to be substantially perpendicular to and facing away from the third edge 701c.

Figure 7Z:
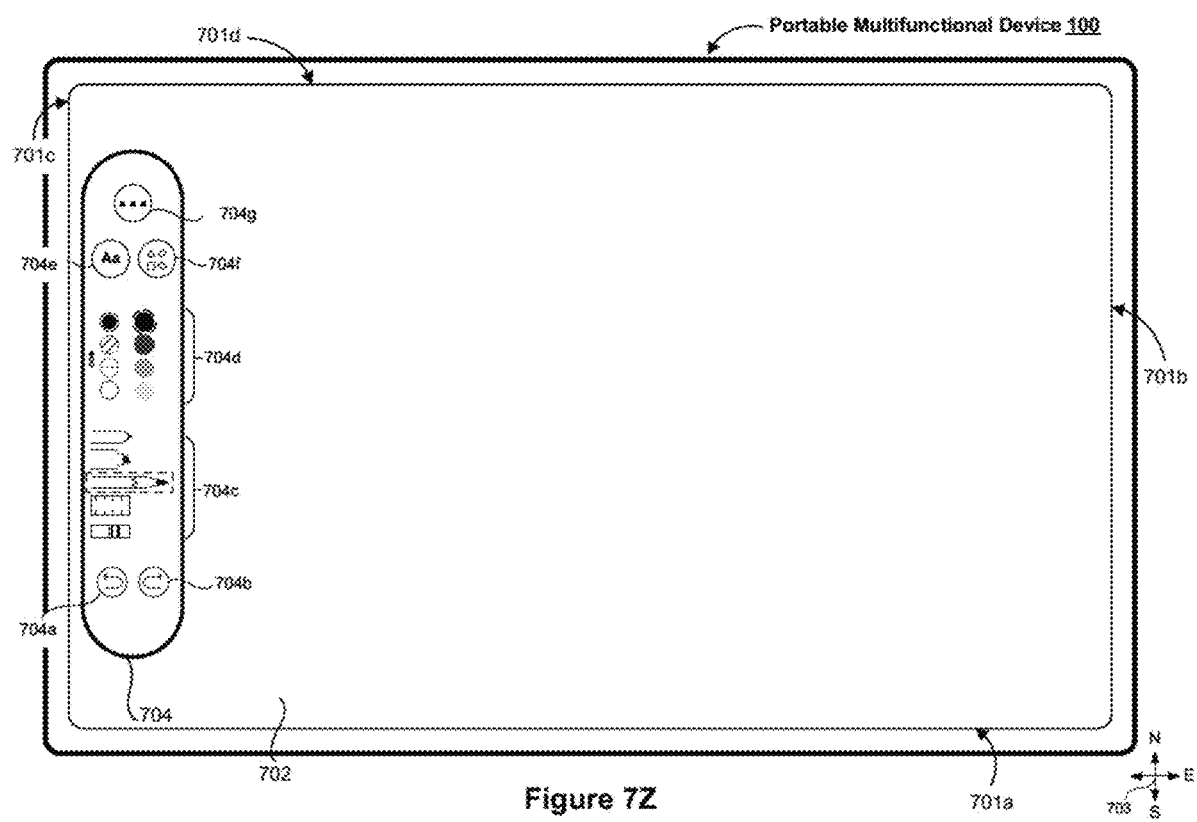
Figure 7A:
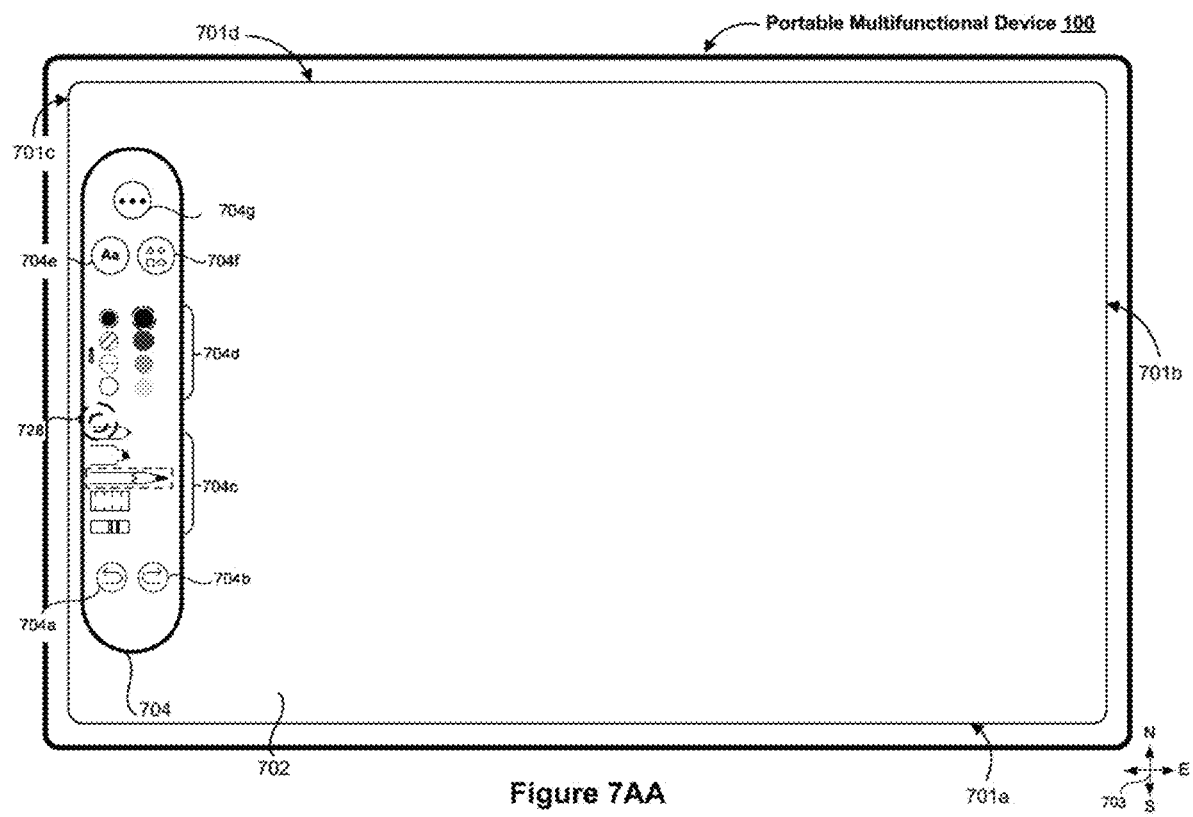
Figure 7A:
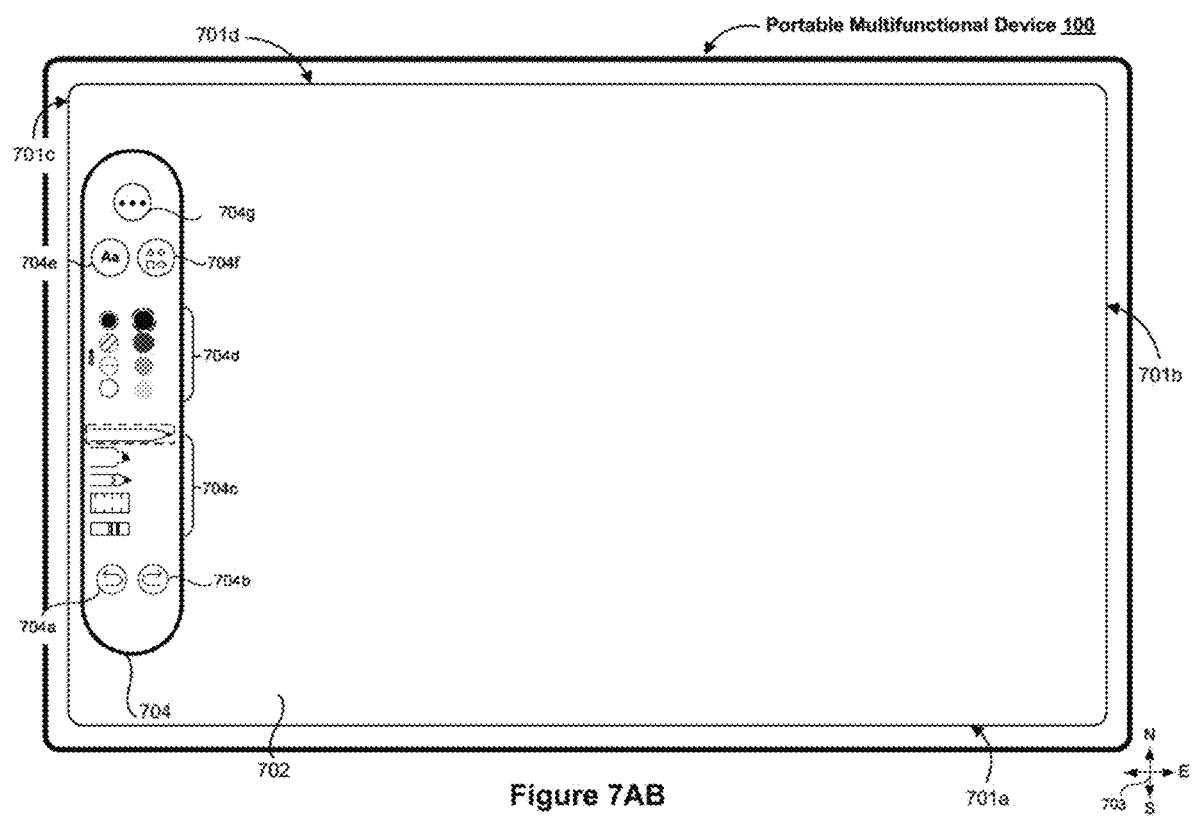
Figure 7A:
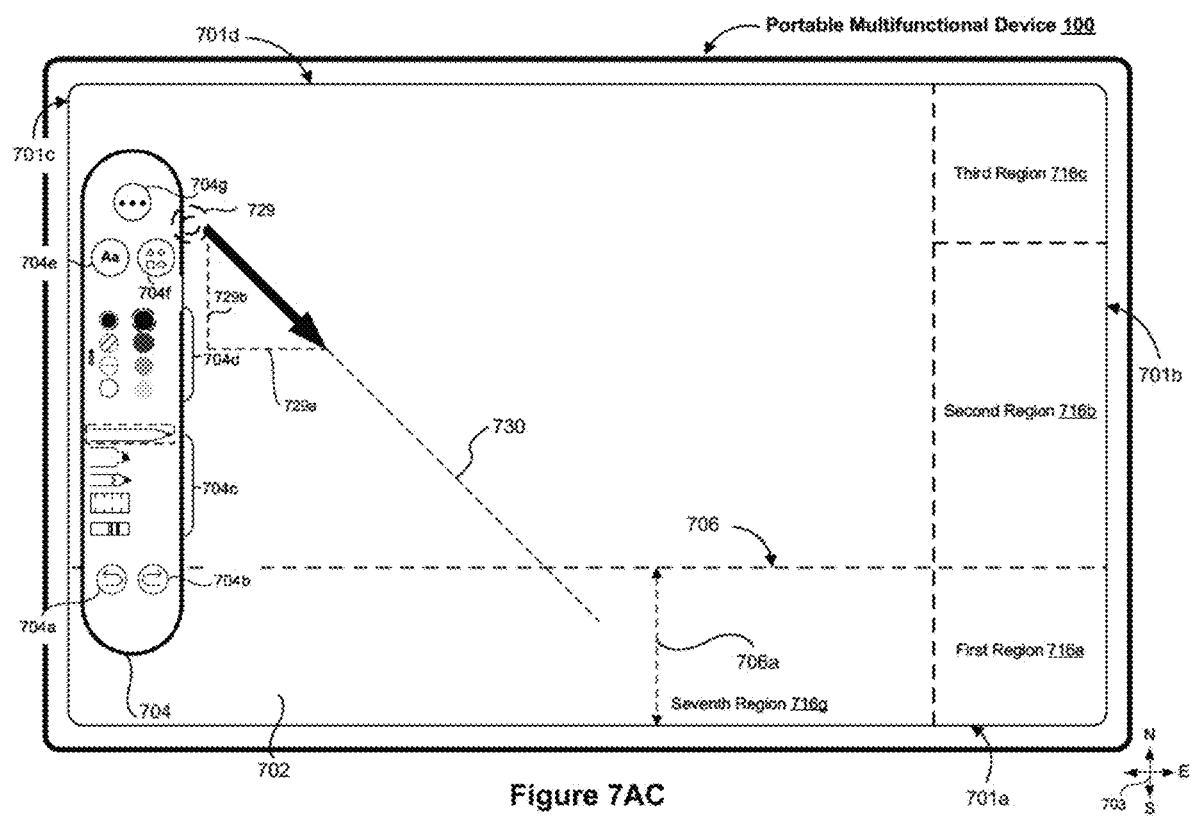
Figure 7A:
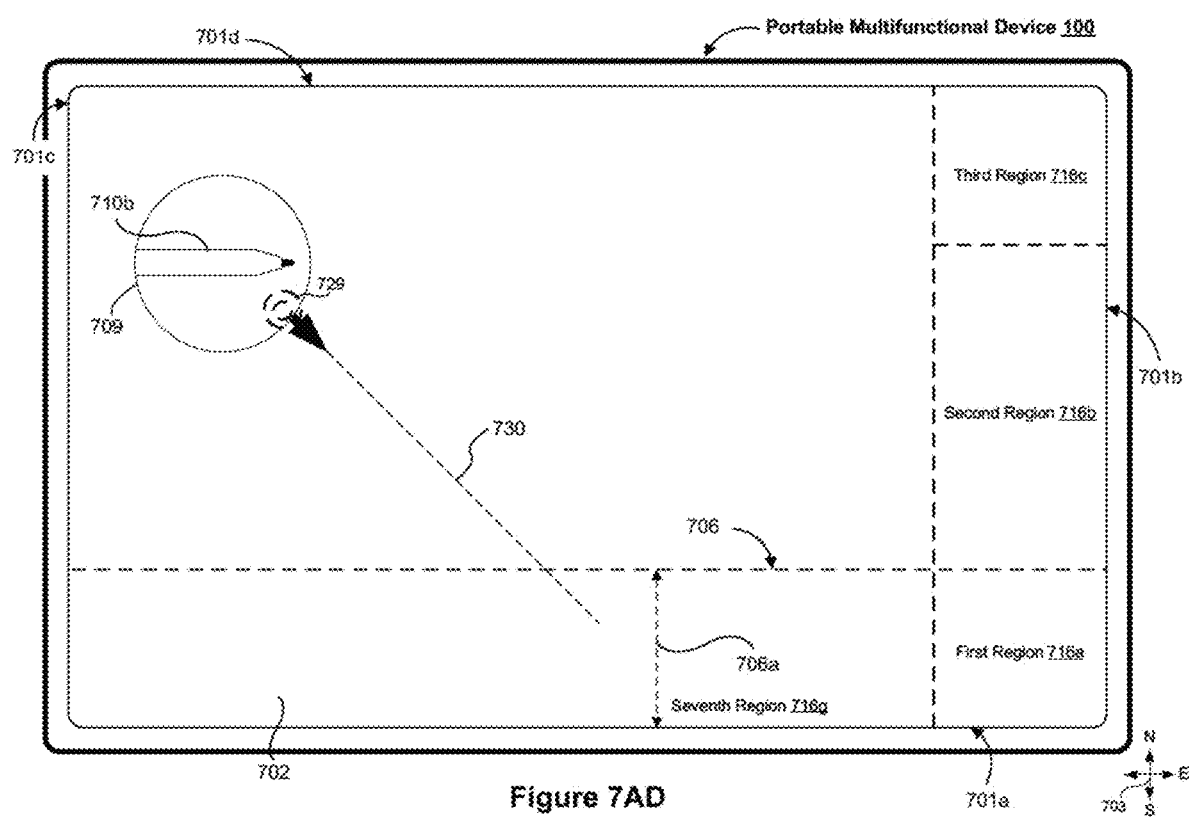
Figure 7A:
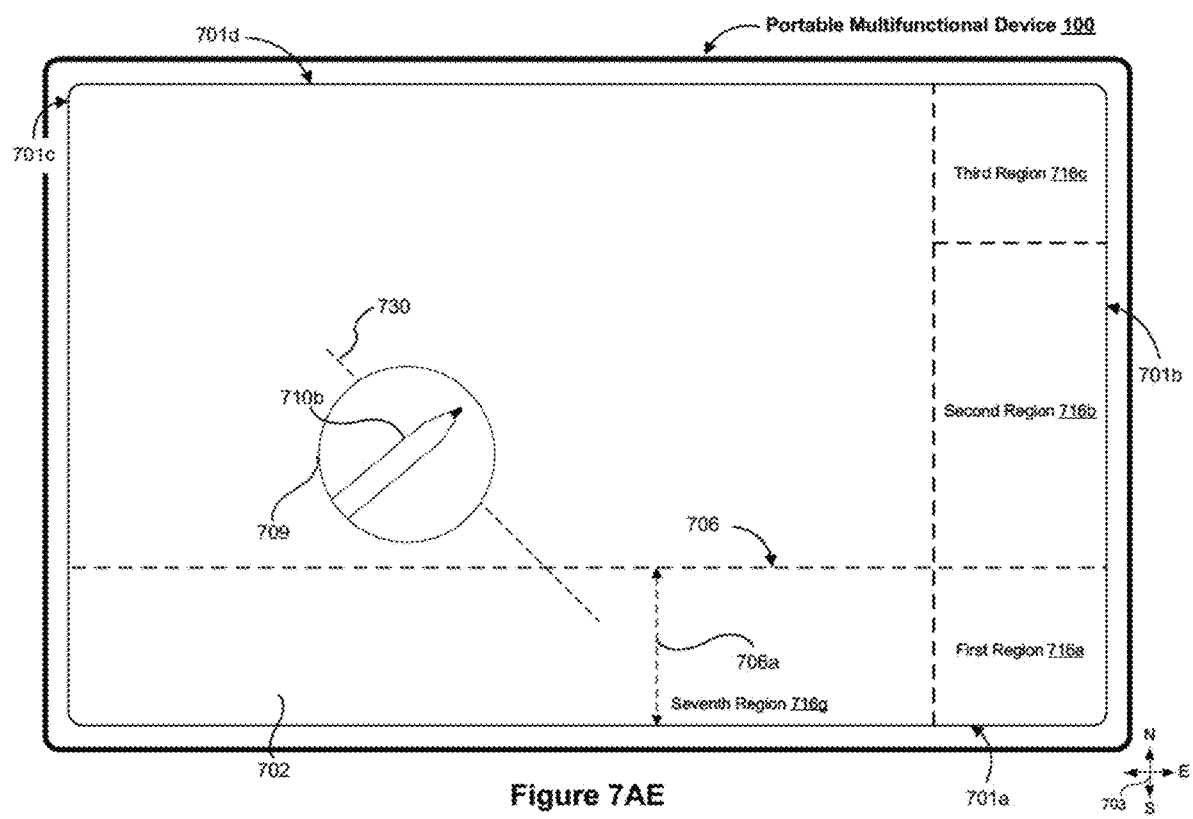
Figure 7A:
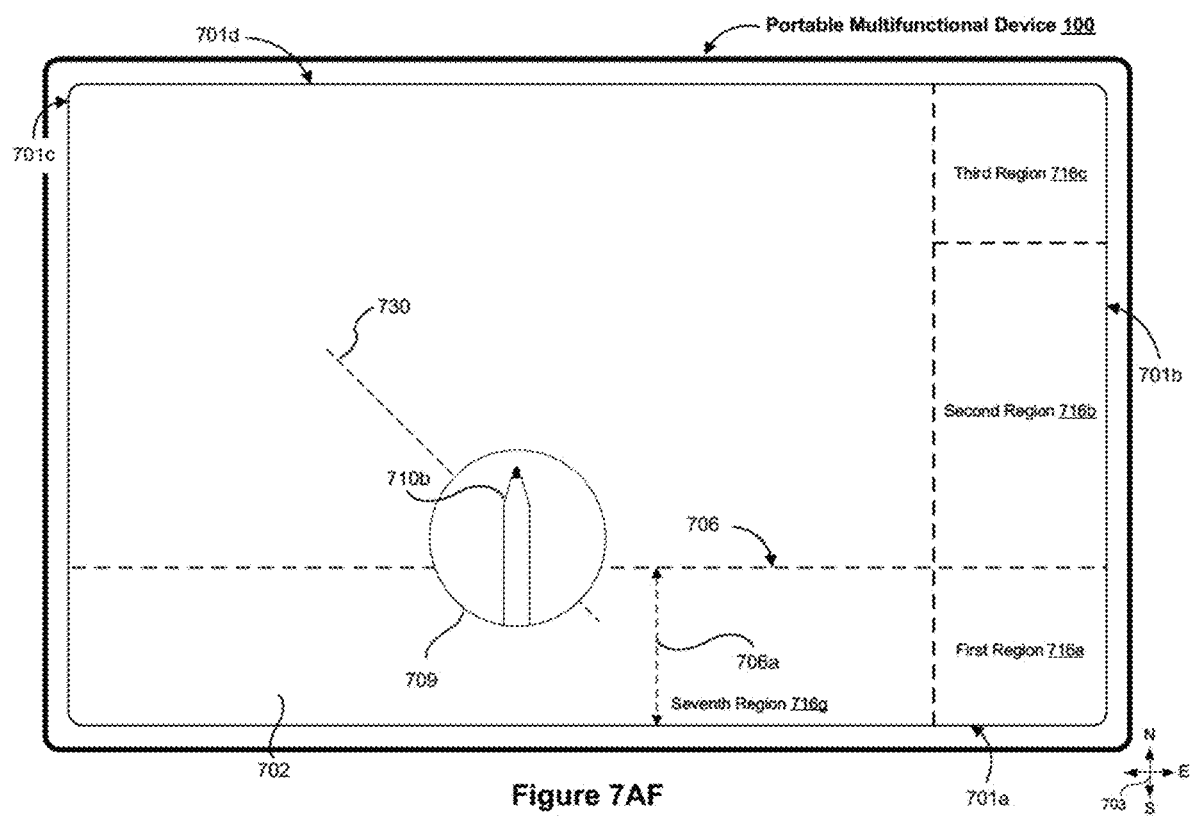
Figure 7A:
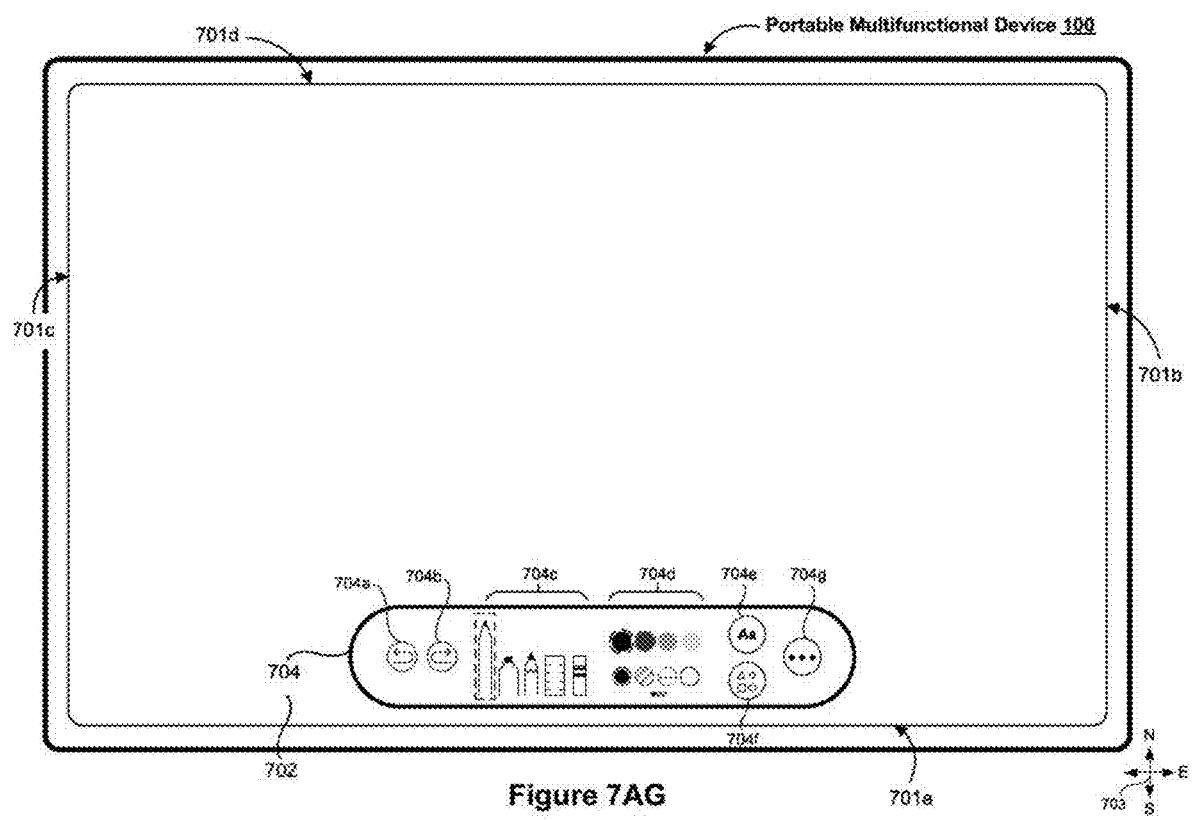
Figure 7A:
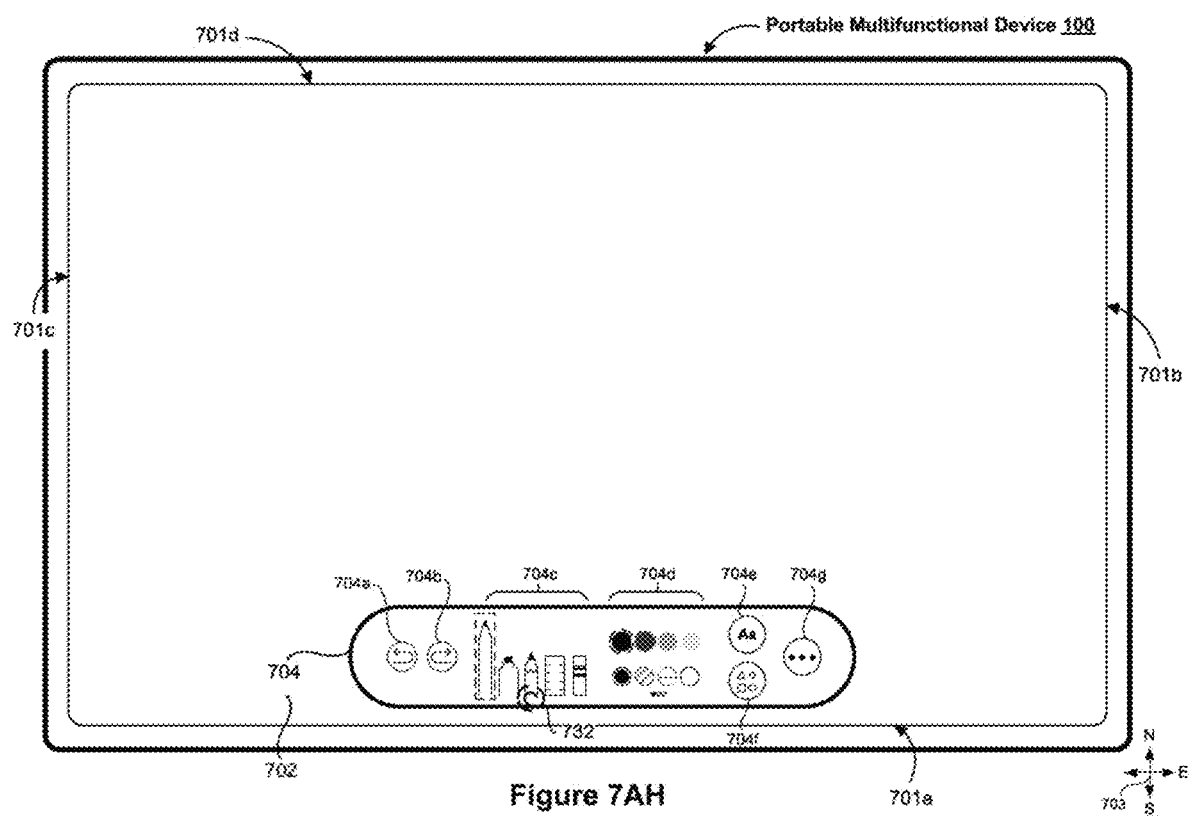
Figure 7A:
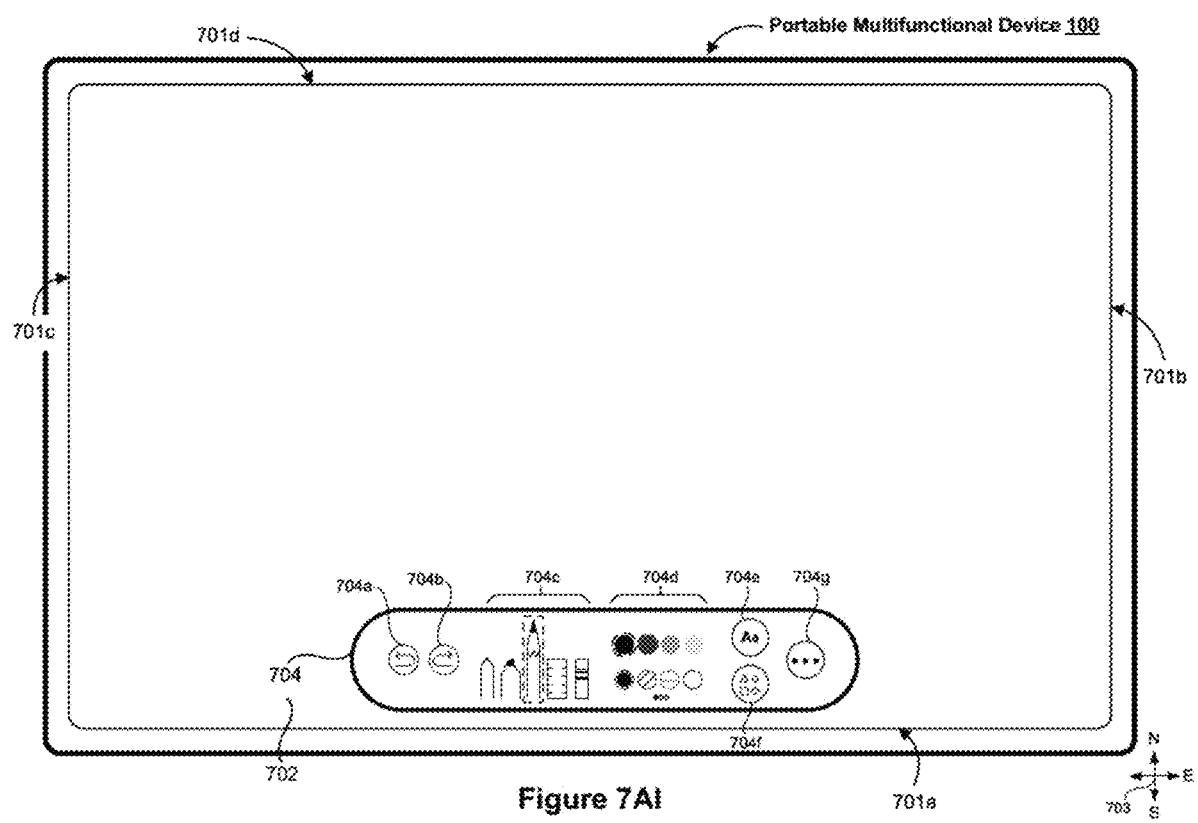
Figure 7A:
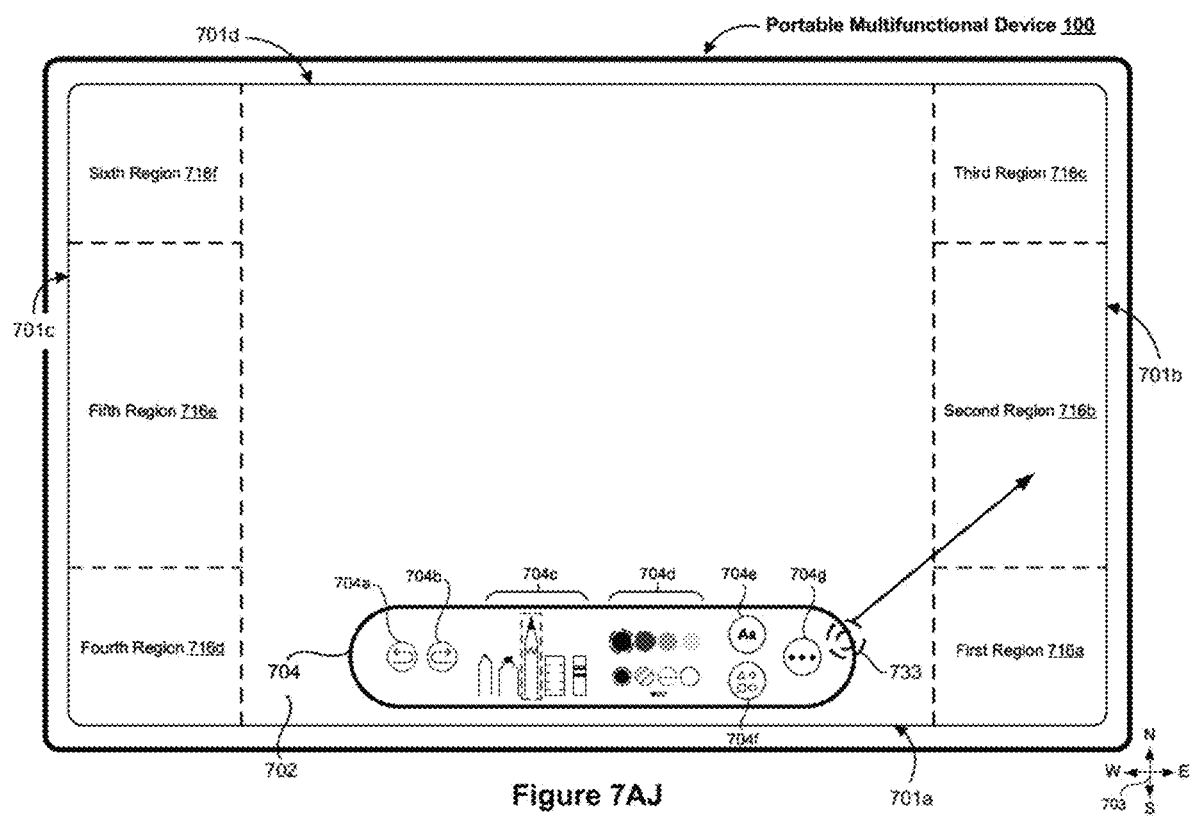
Figure 7A:
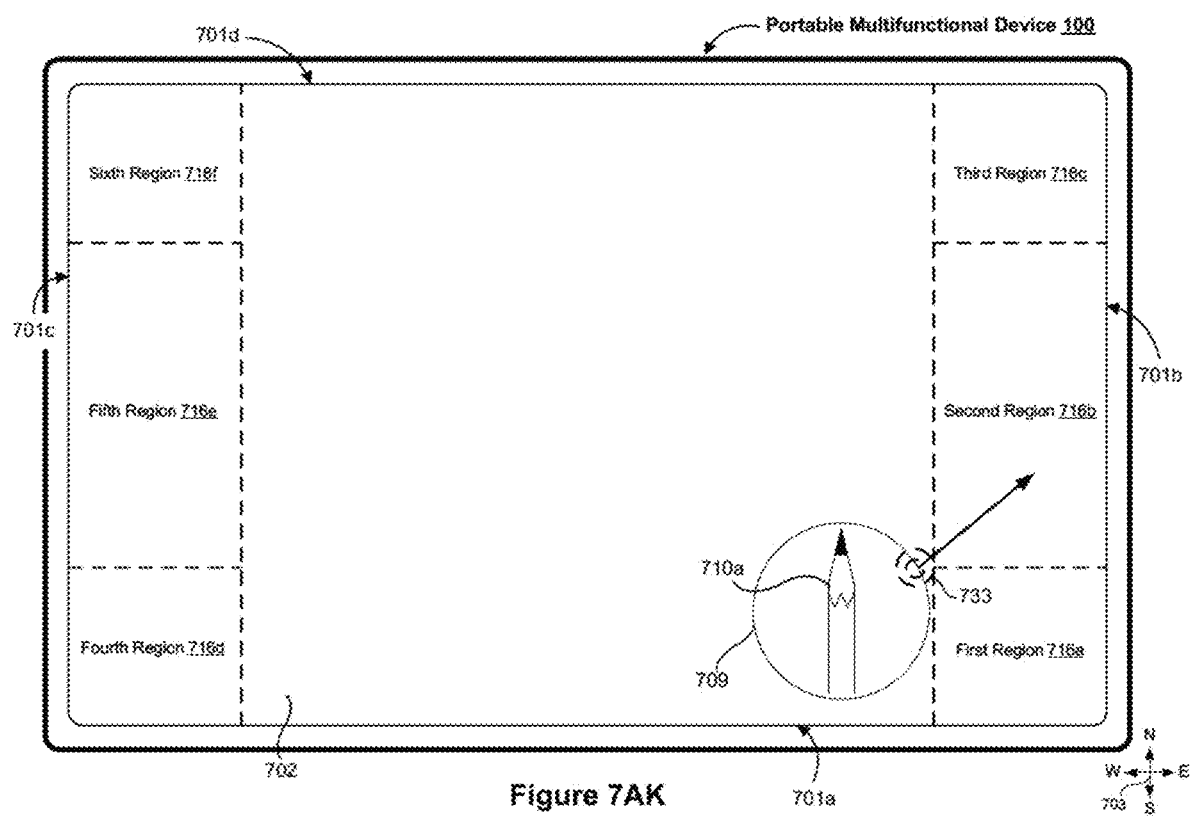
Figure 7A:
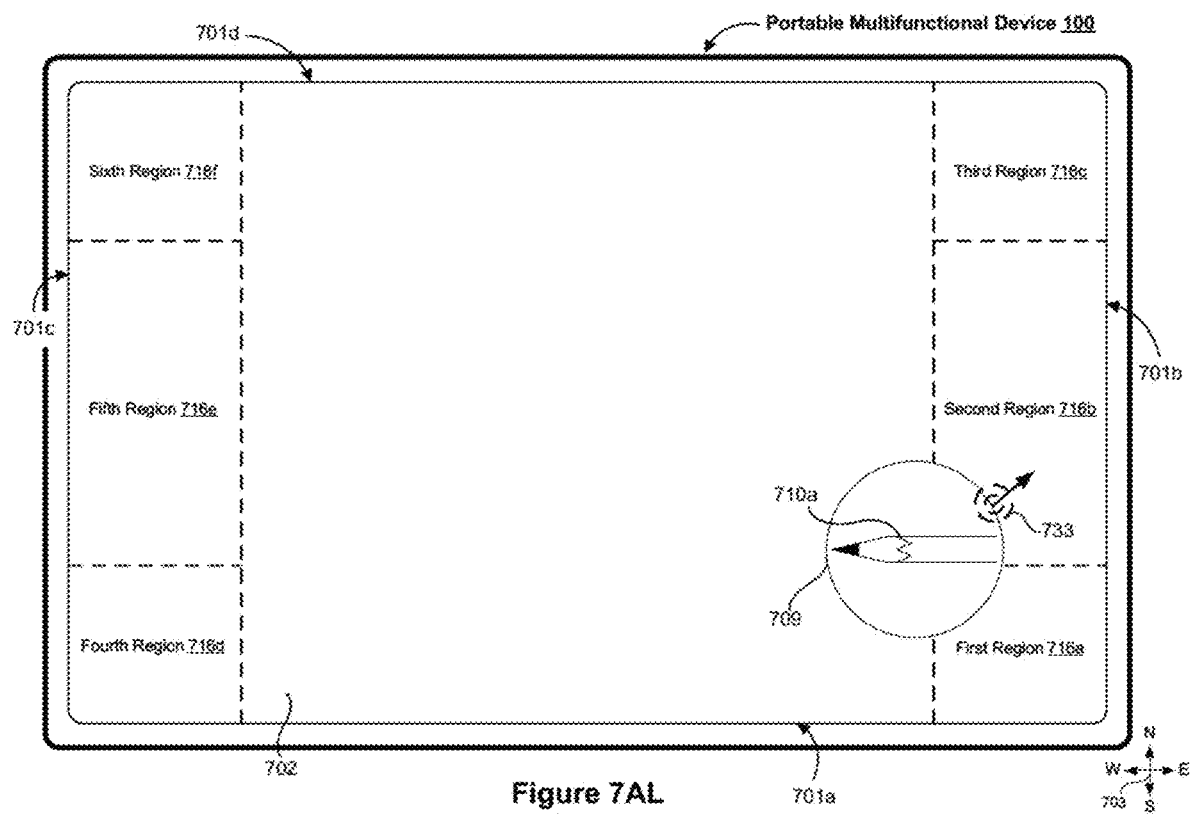
Figure 7A:
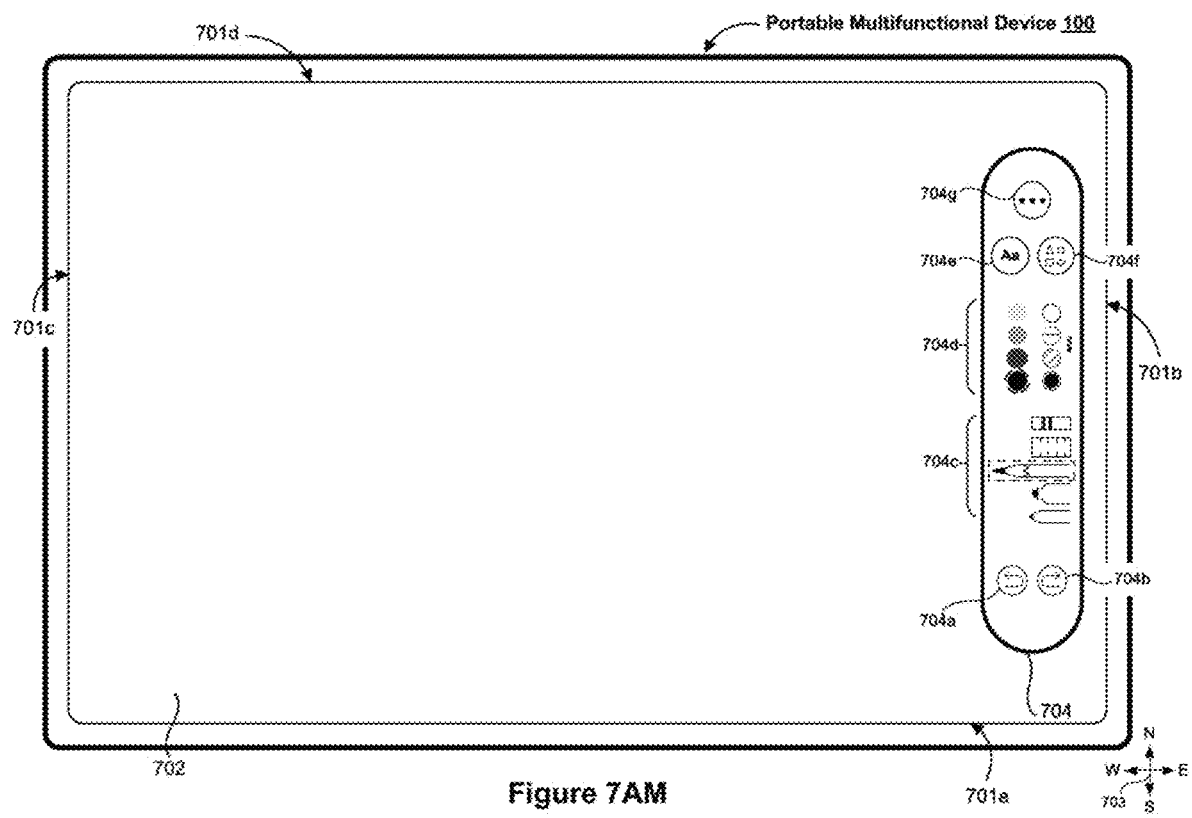
Figure 7A:
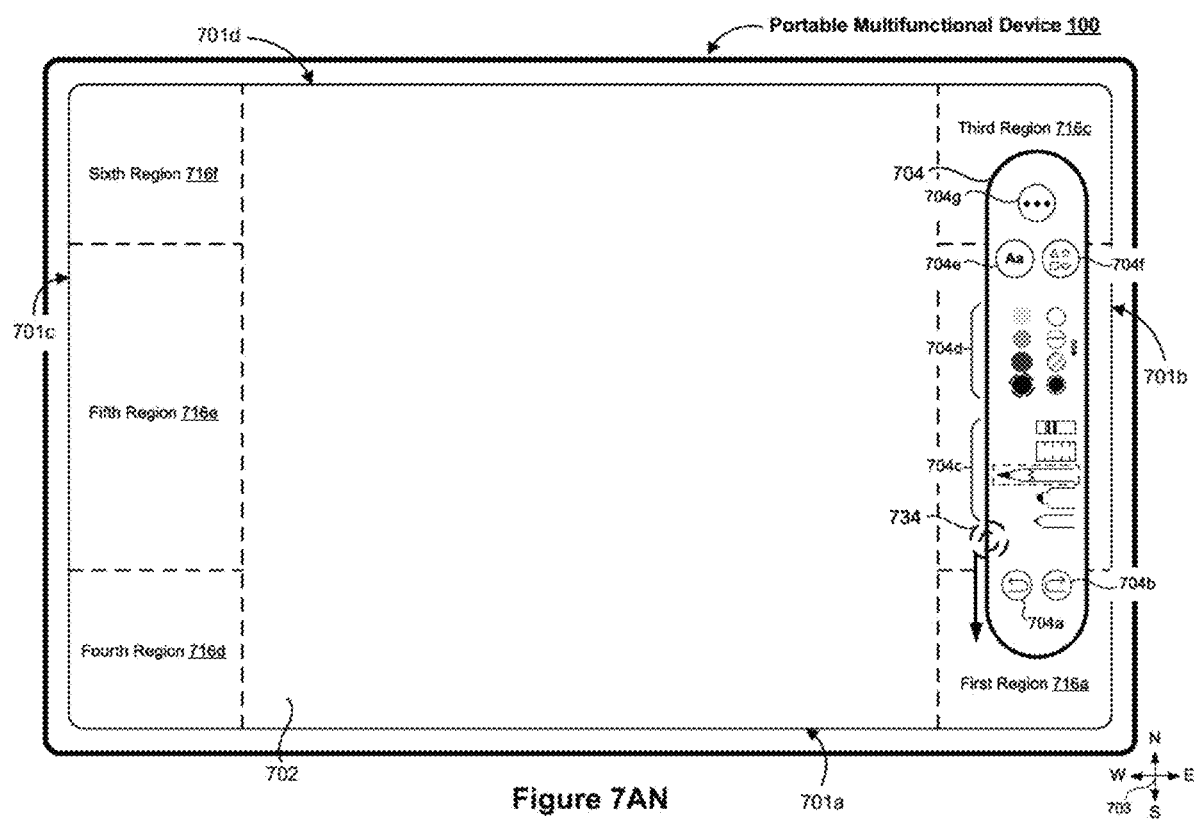
Figure 7A:
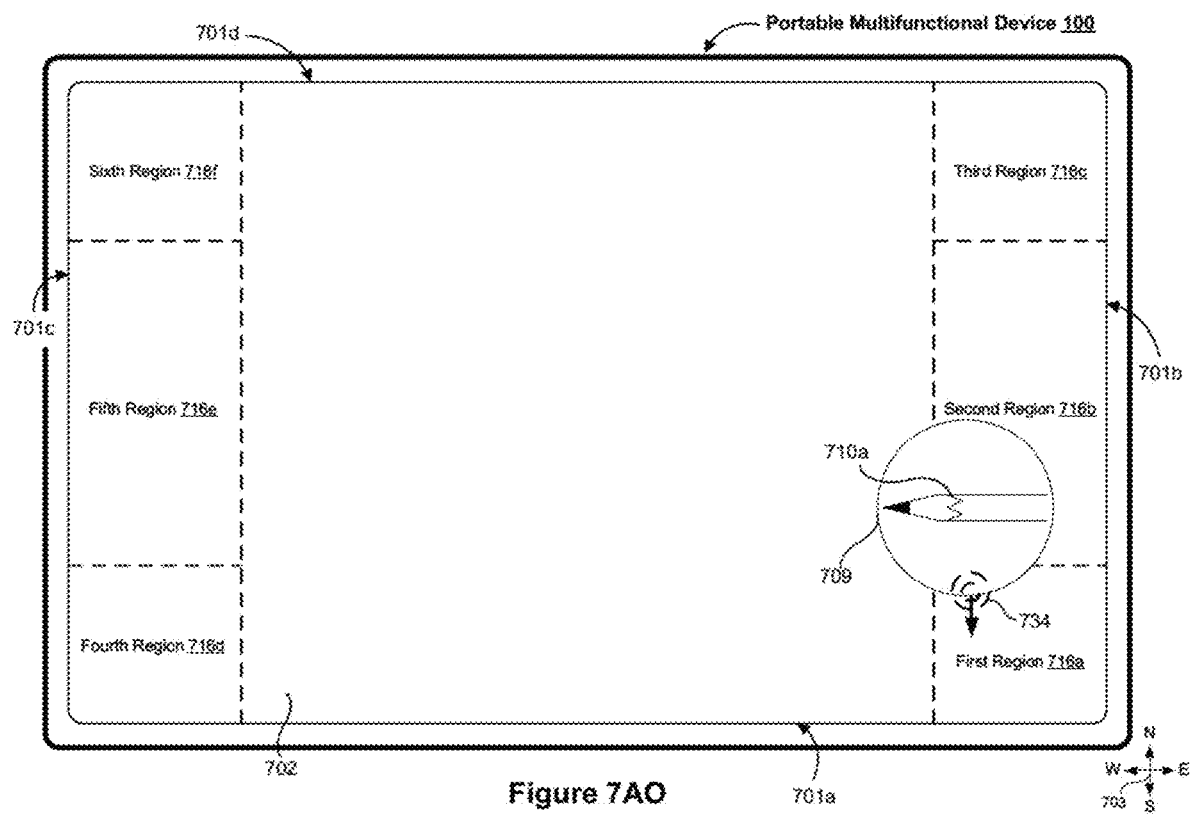
Figure 7A:
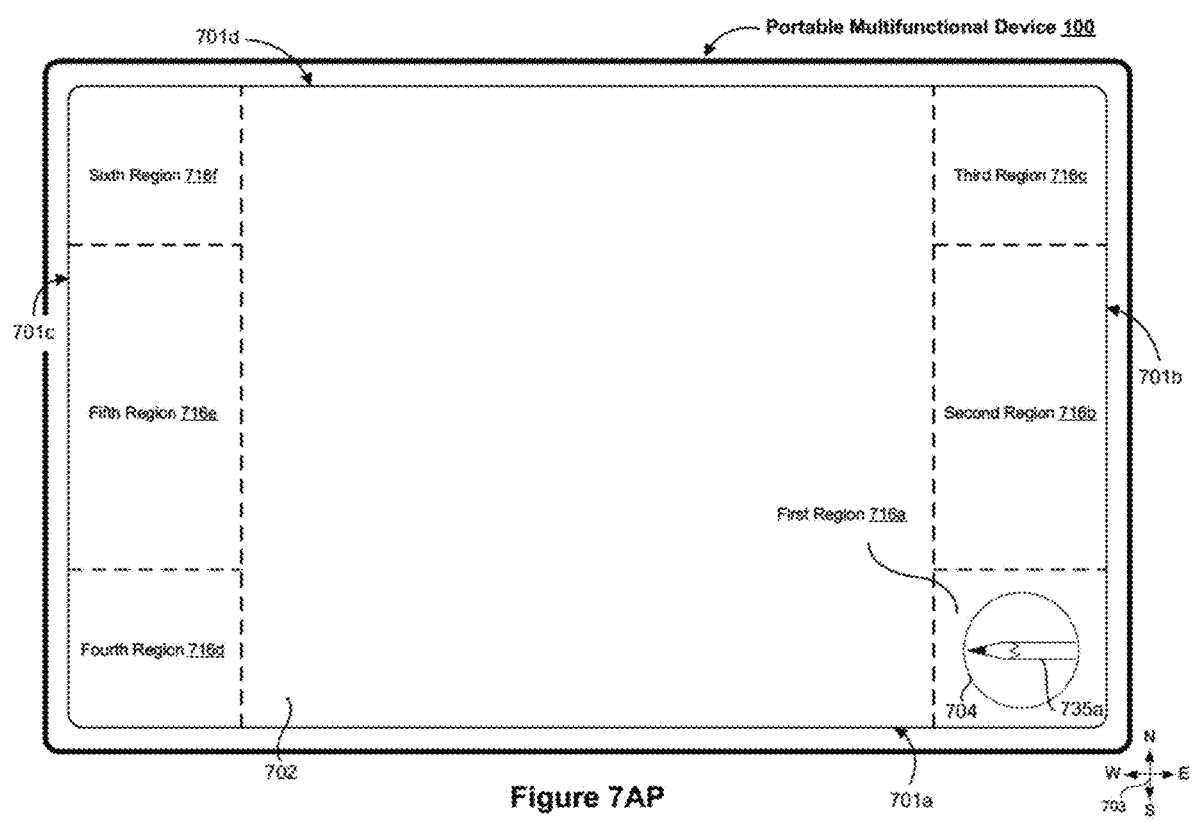
Figure 7A:
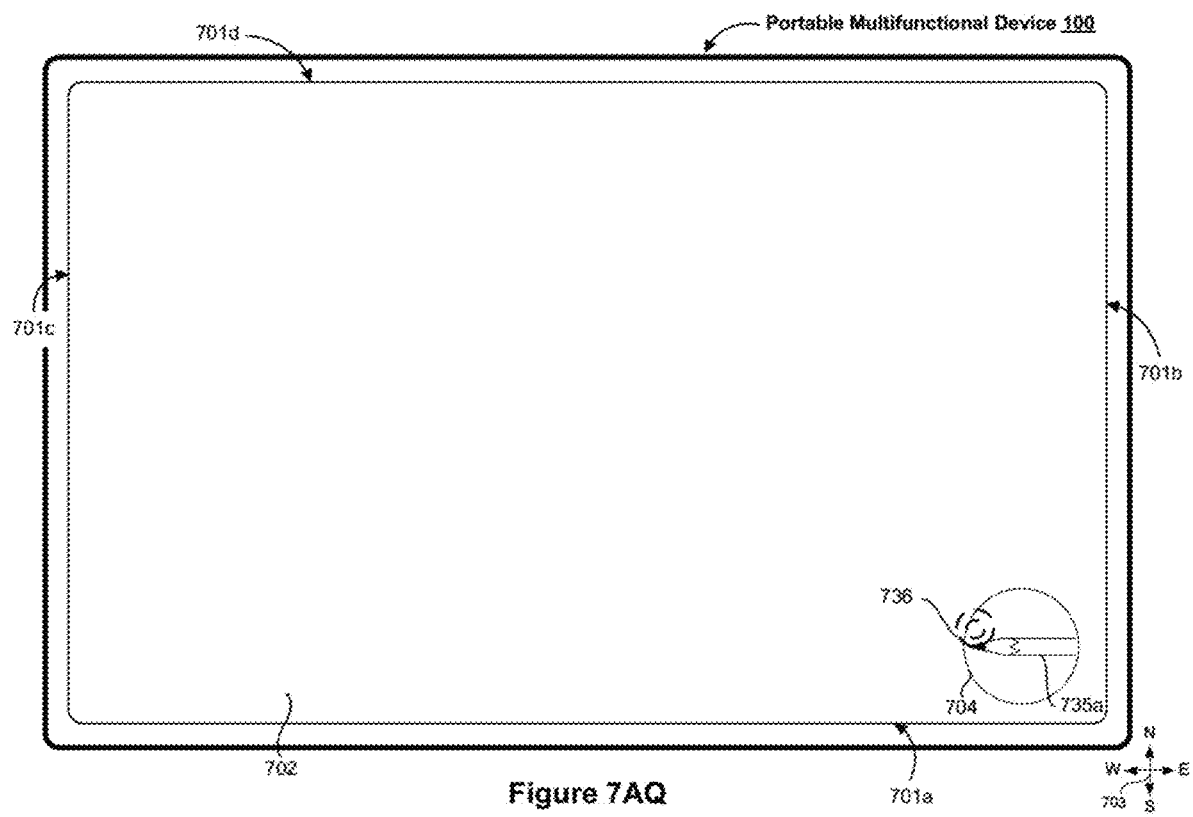
Figure 7A:
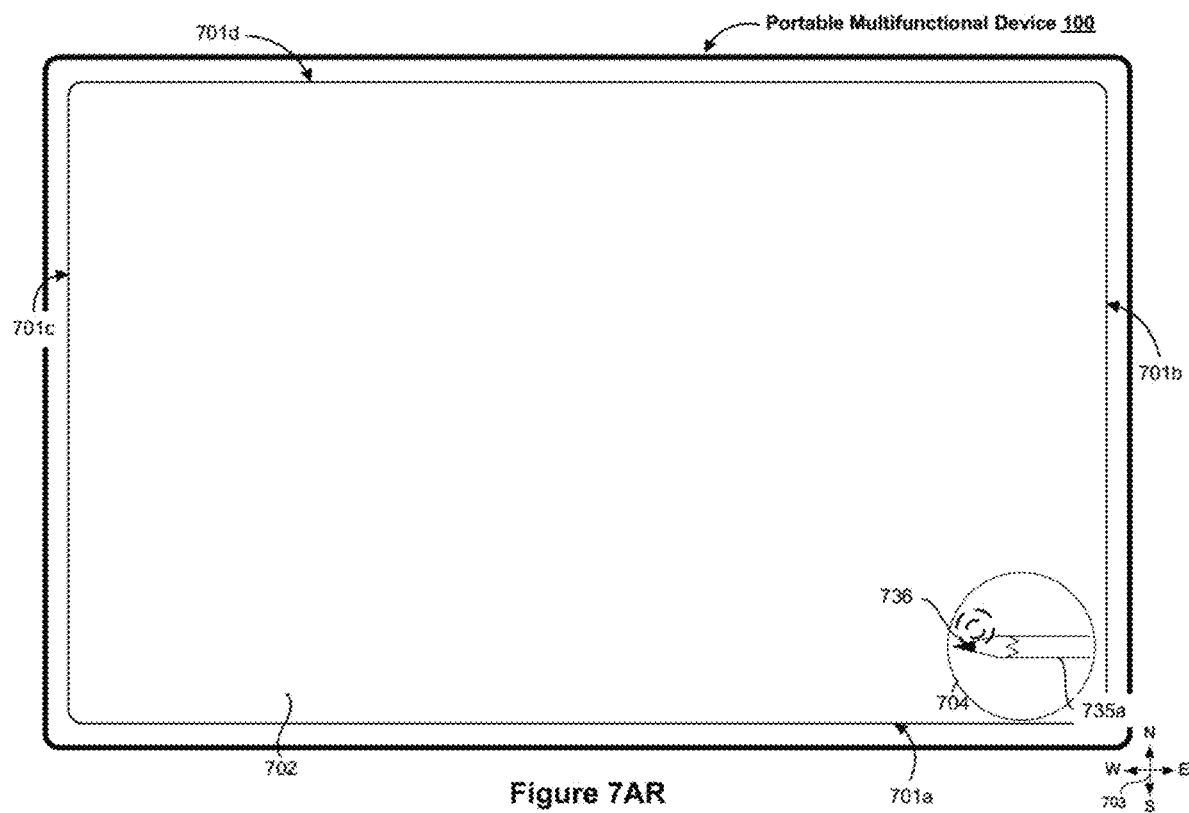
Figure 7A:
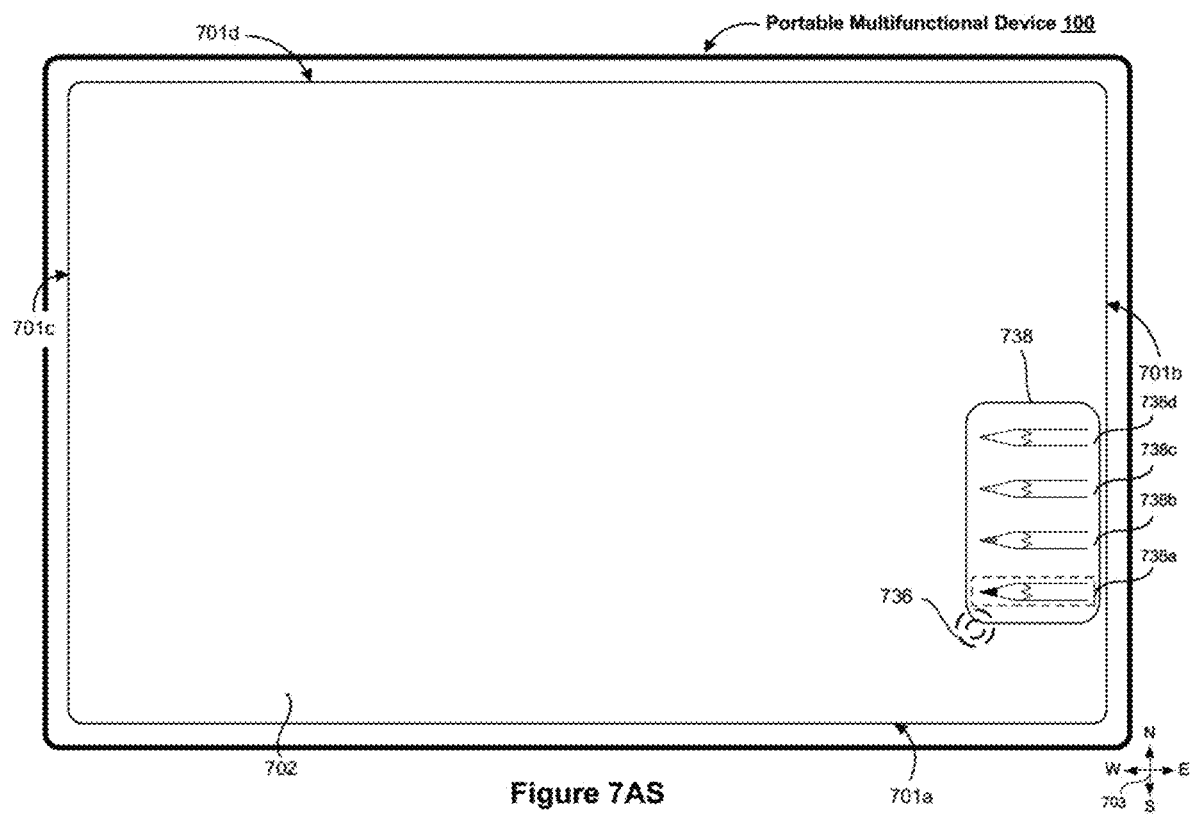
Figure 7A:
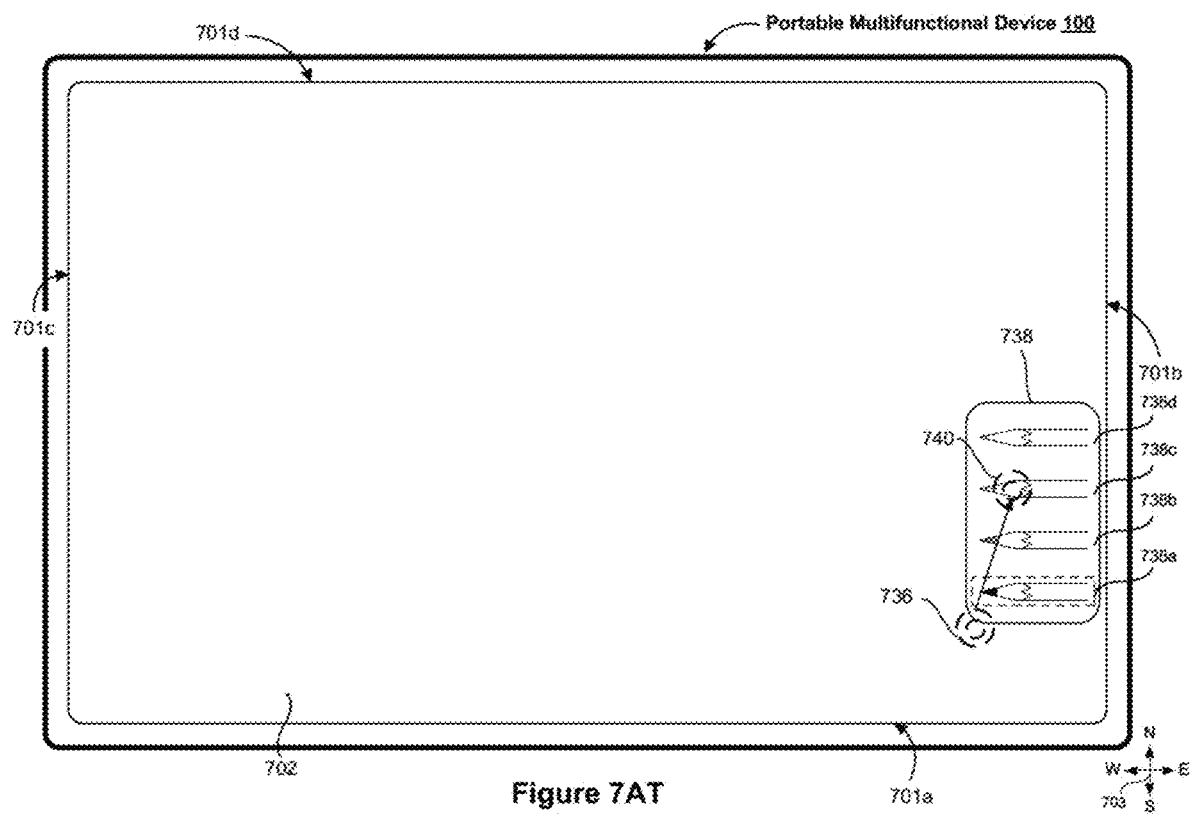
Figure 7A:
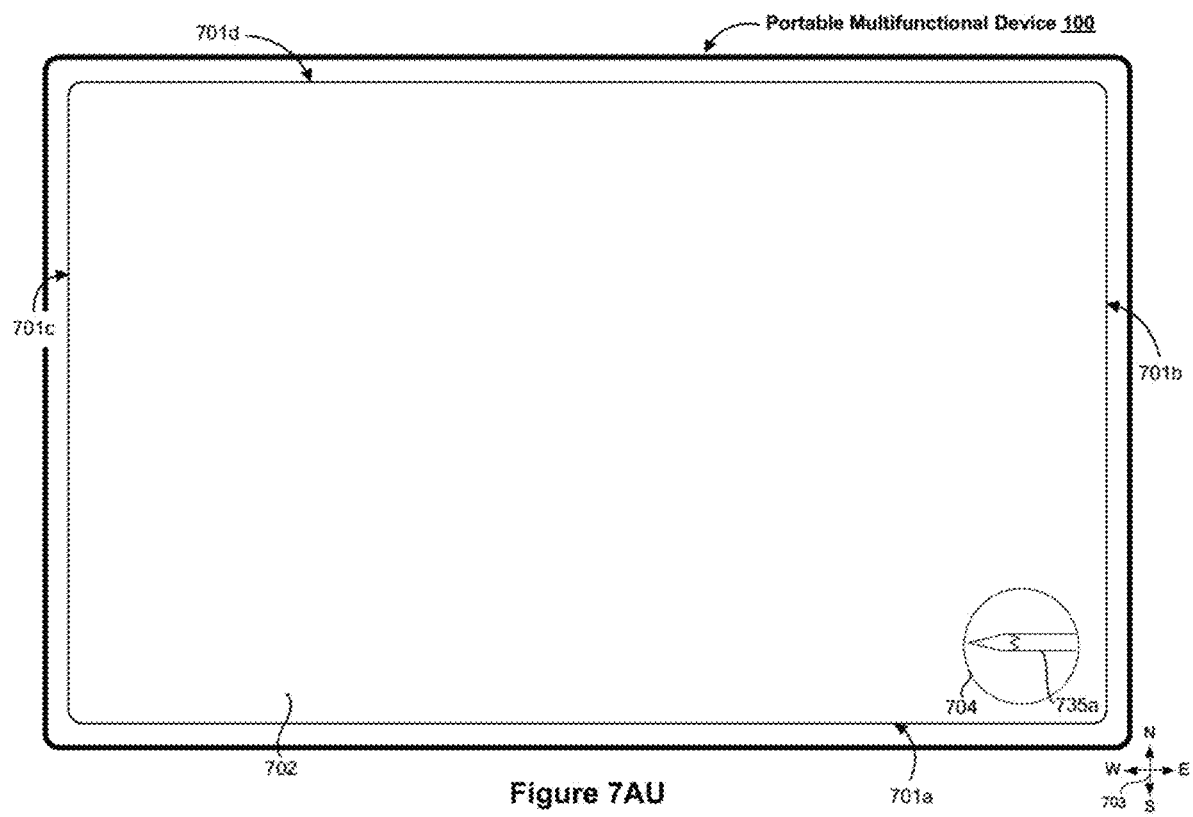
Figure 7A:
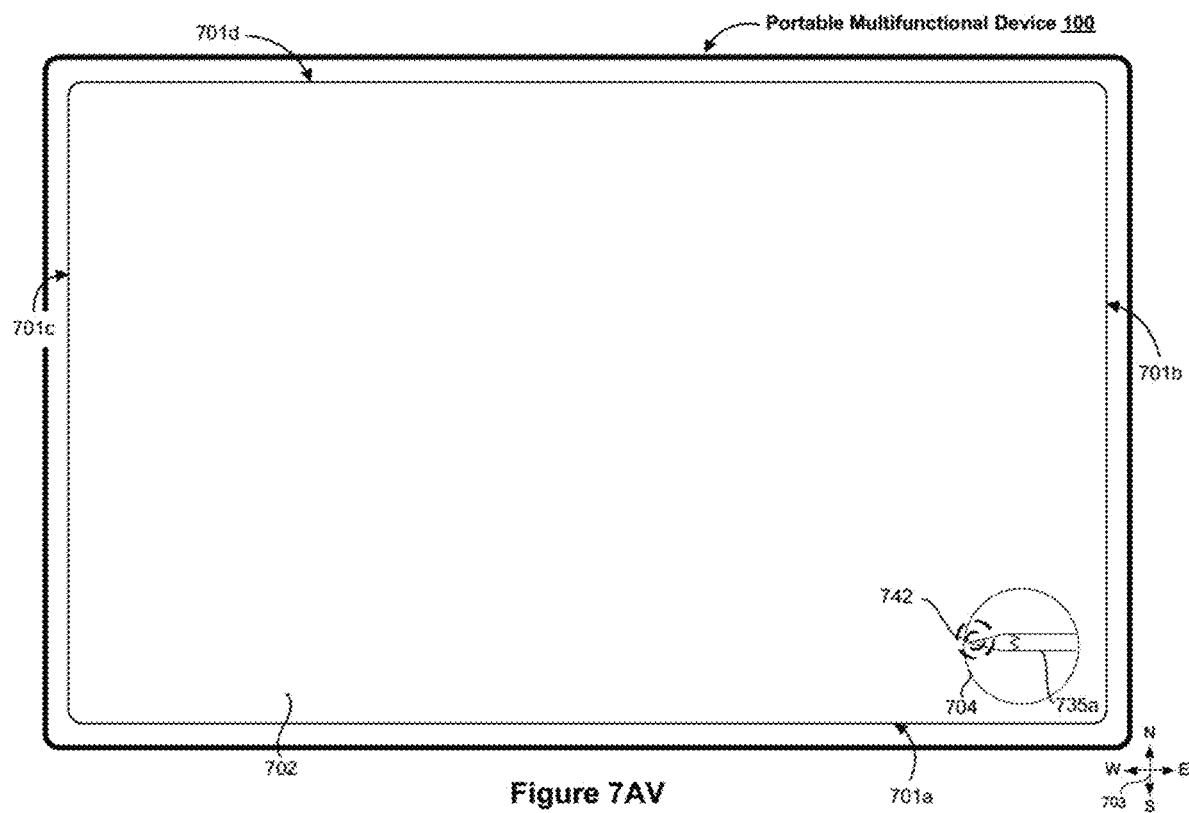
Figure 7A:
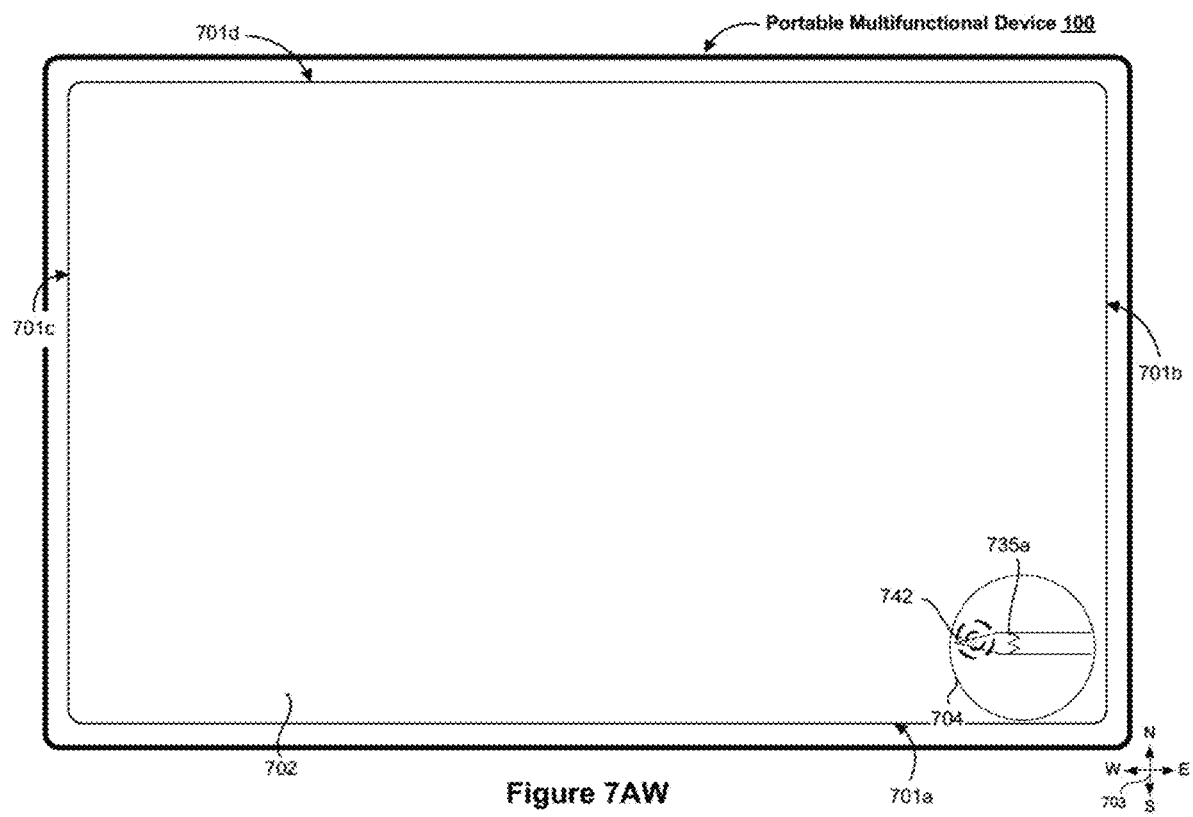
Figure 7A:
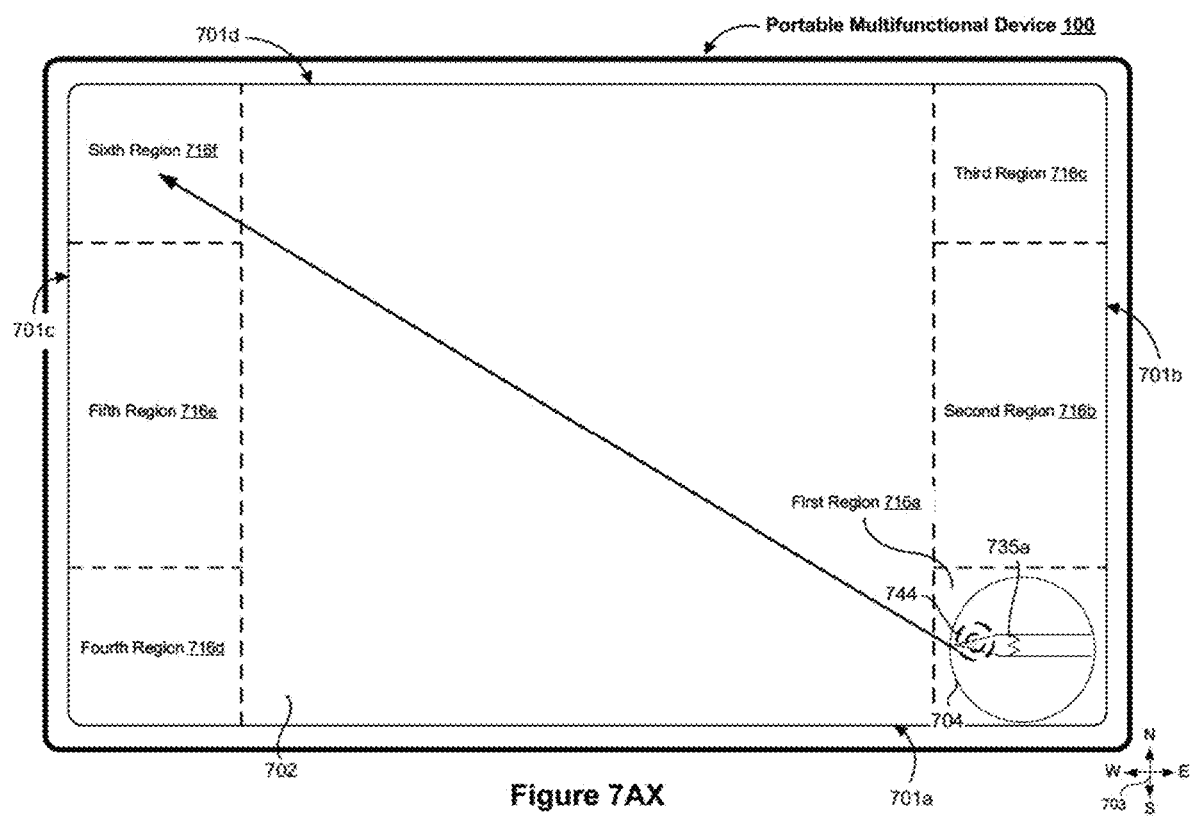
Figure 7A:
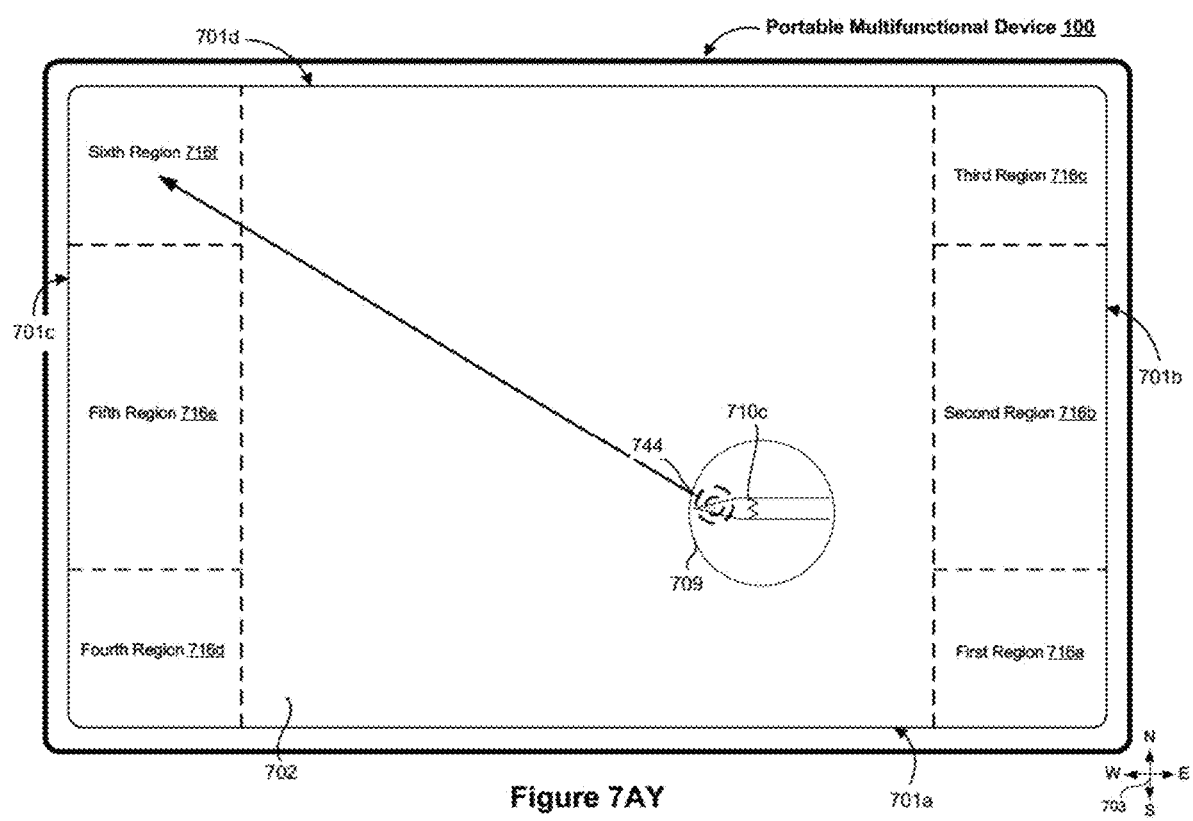
Figure 7A:
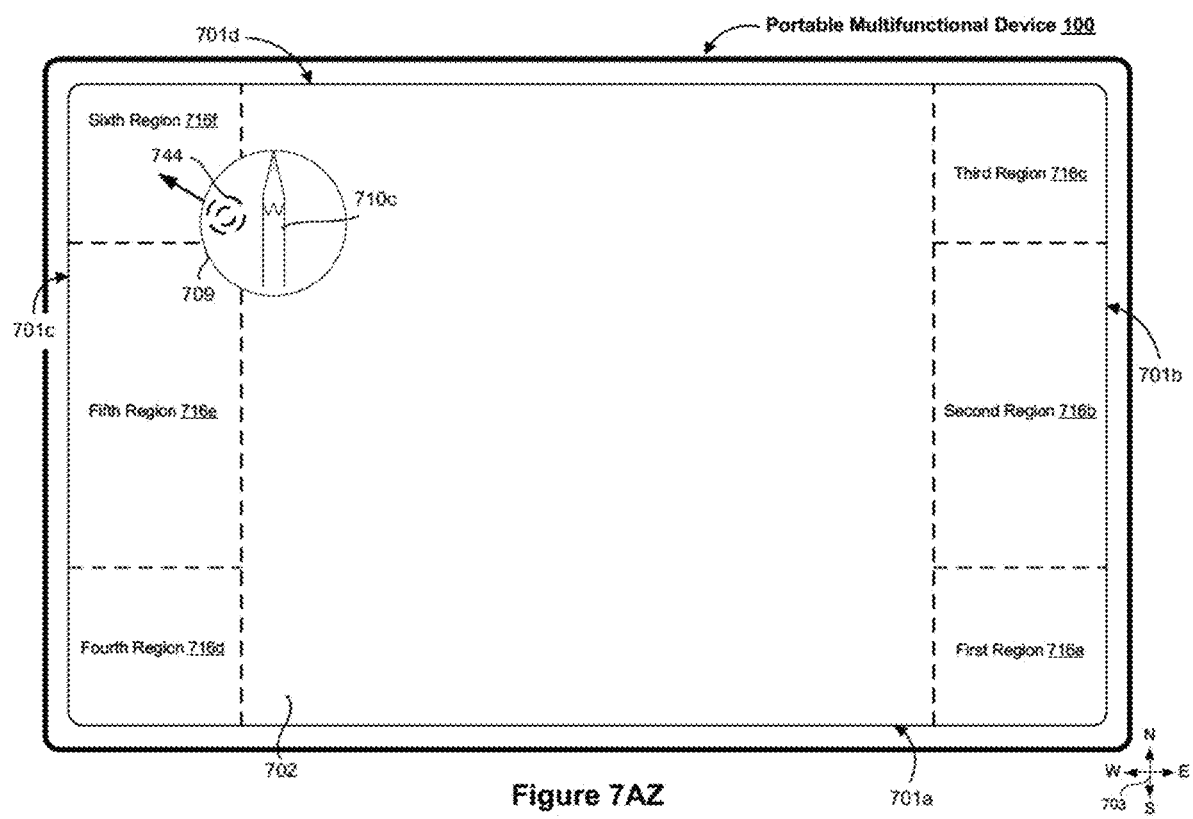
Figure 7B:
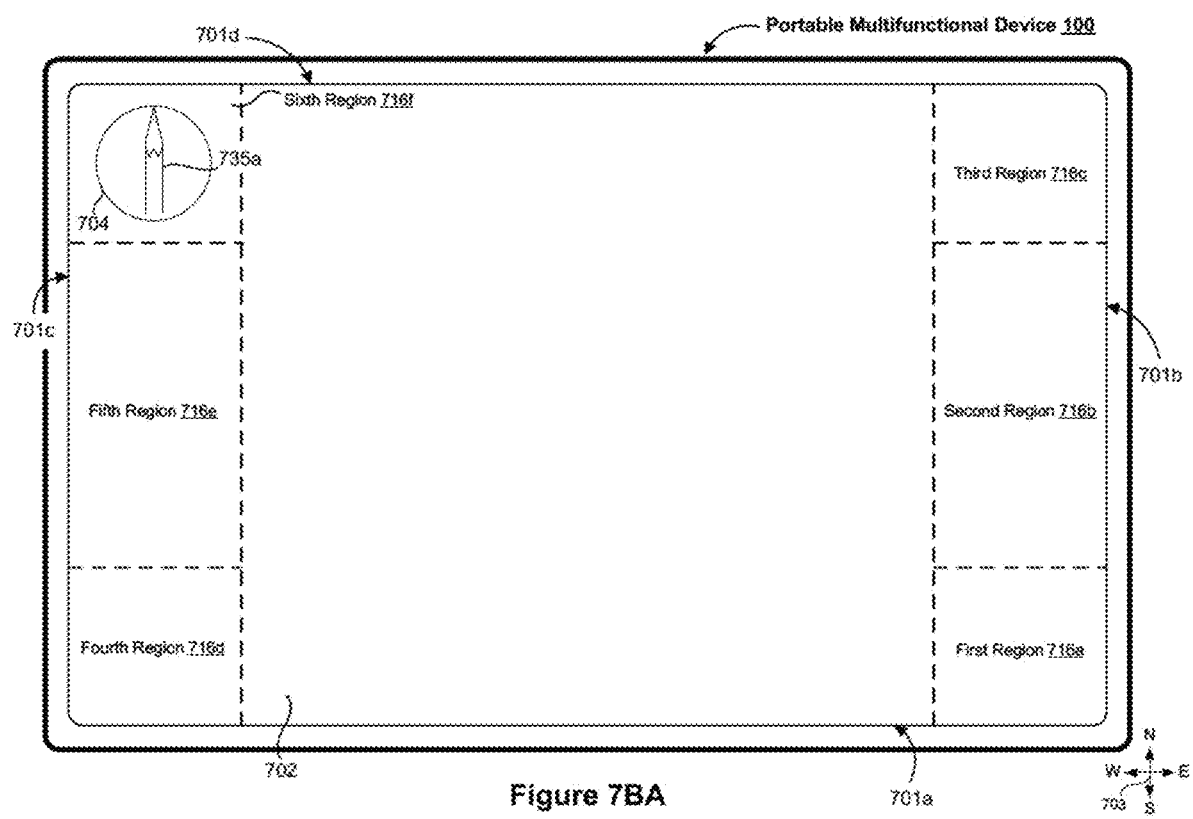
Figure 7B:
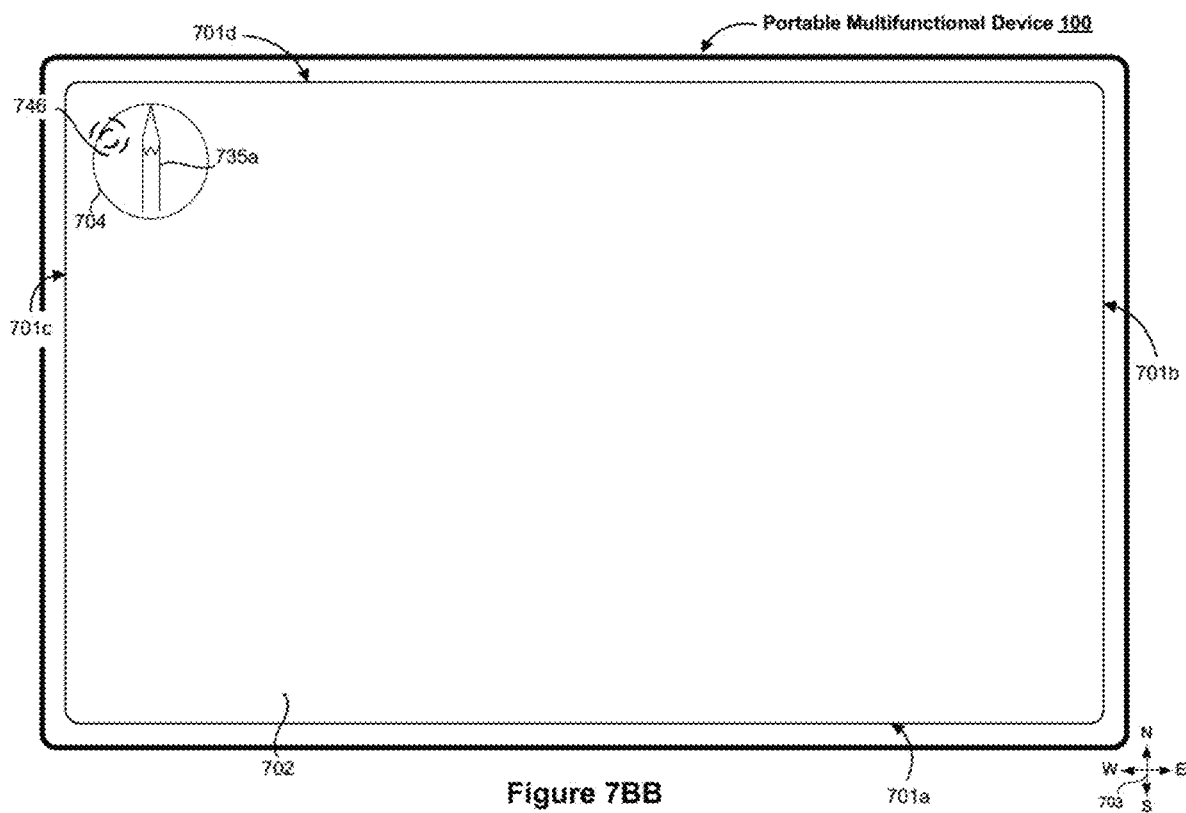
Figure 7B:
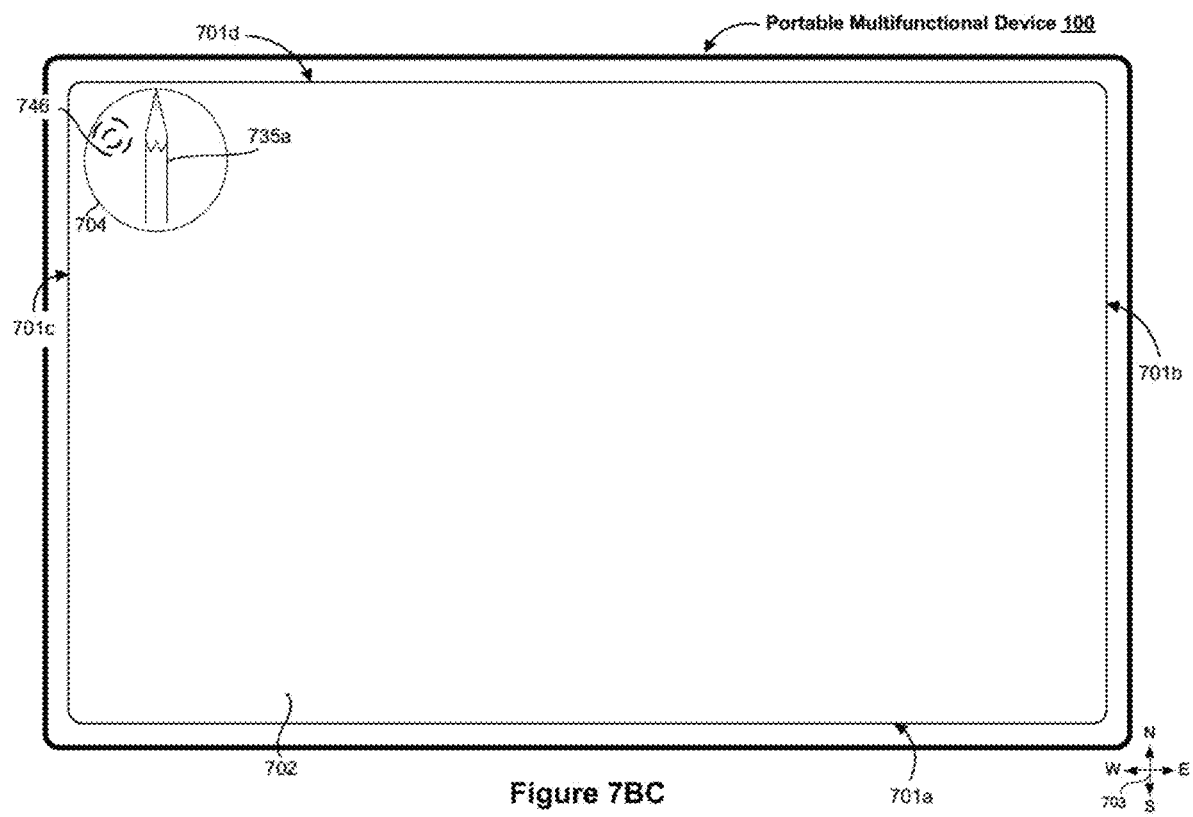
Figure 7B:
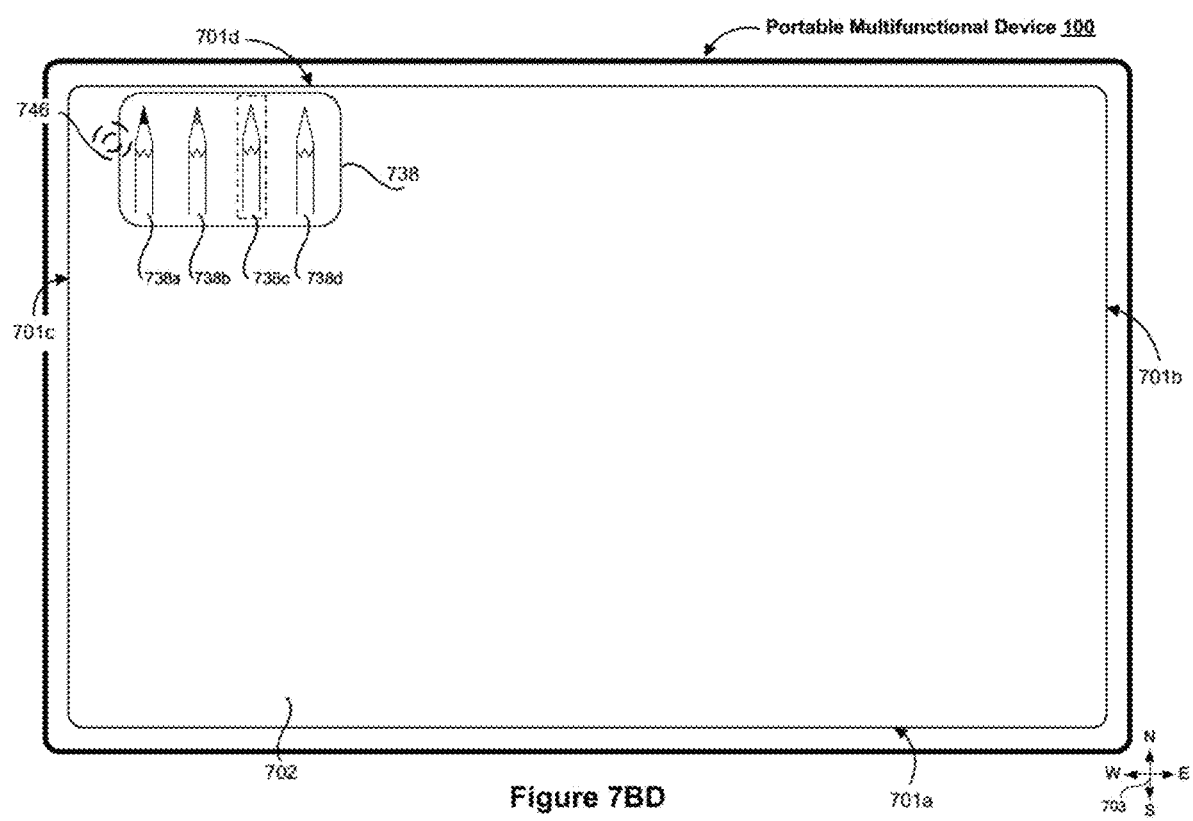
Figure 7B:
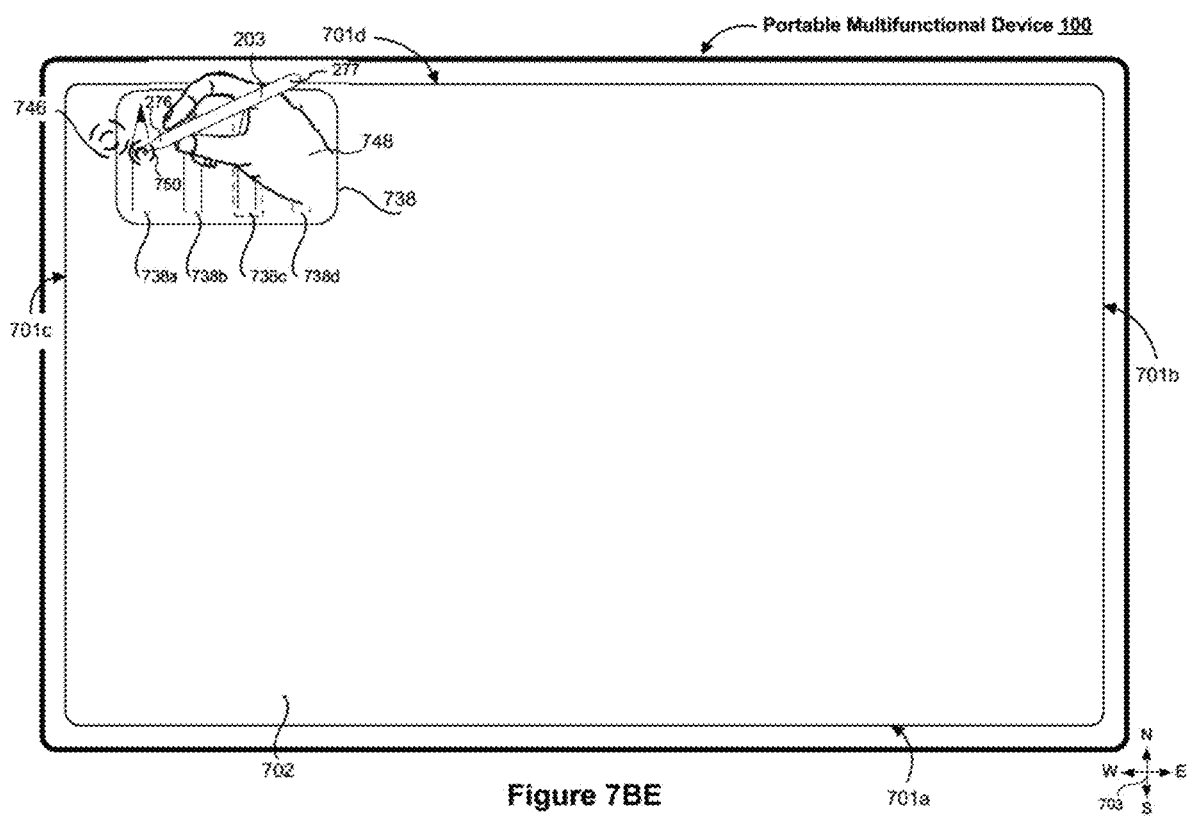
Figure 7B:
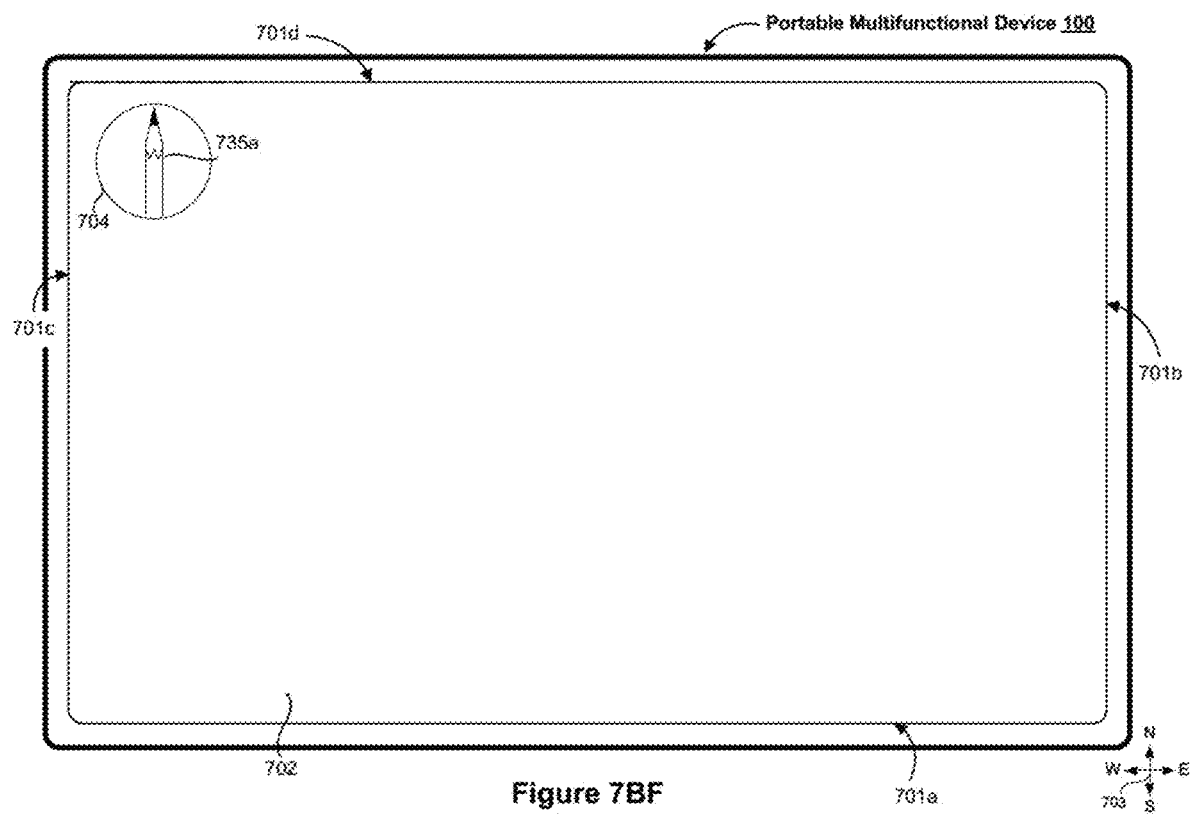
Figure 7B:
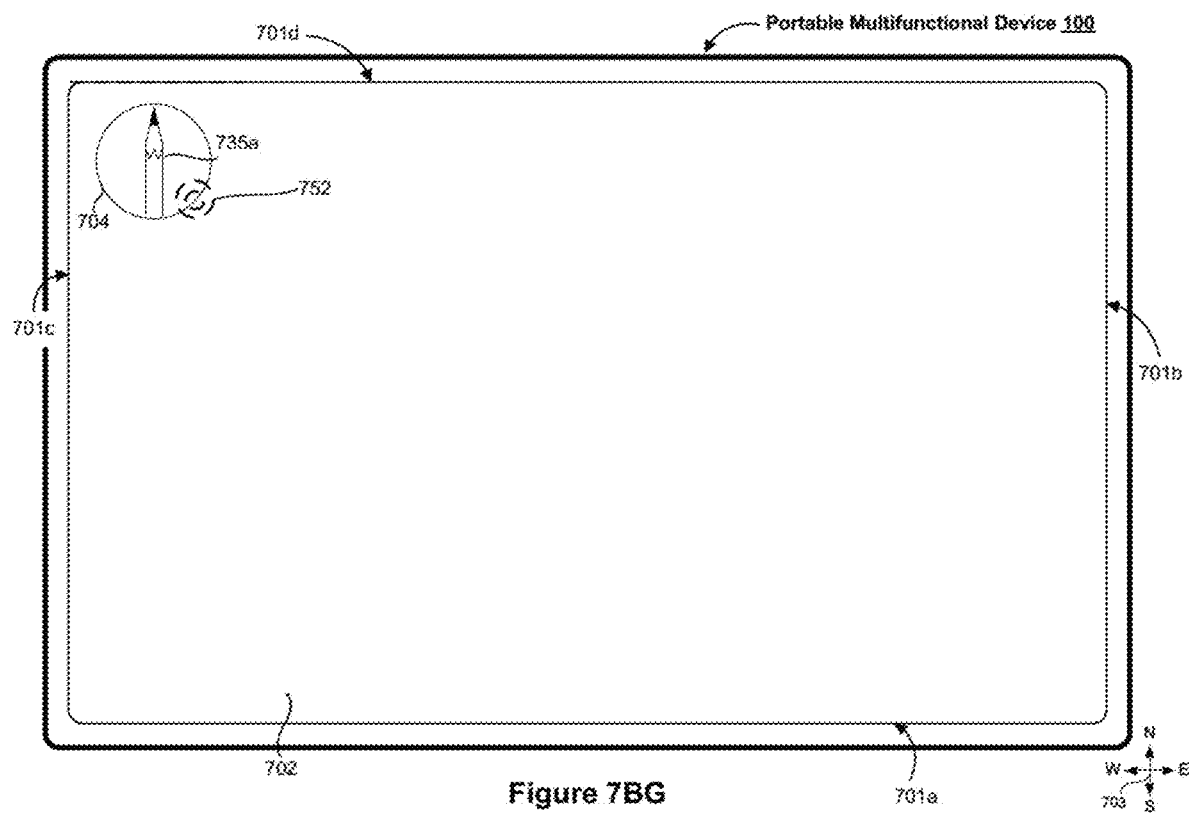
Figure 7B:
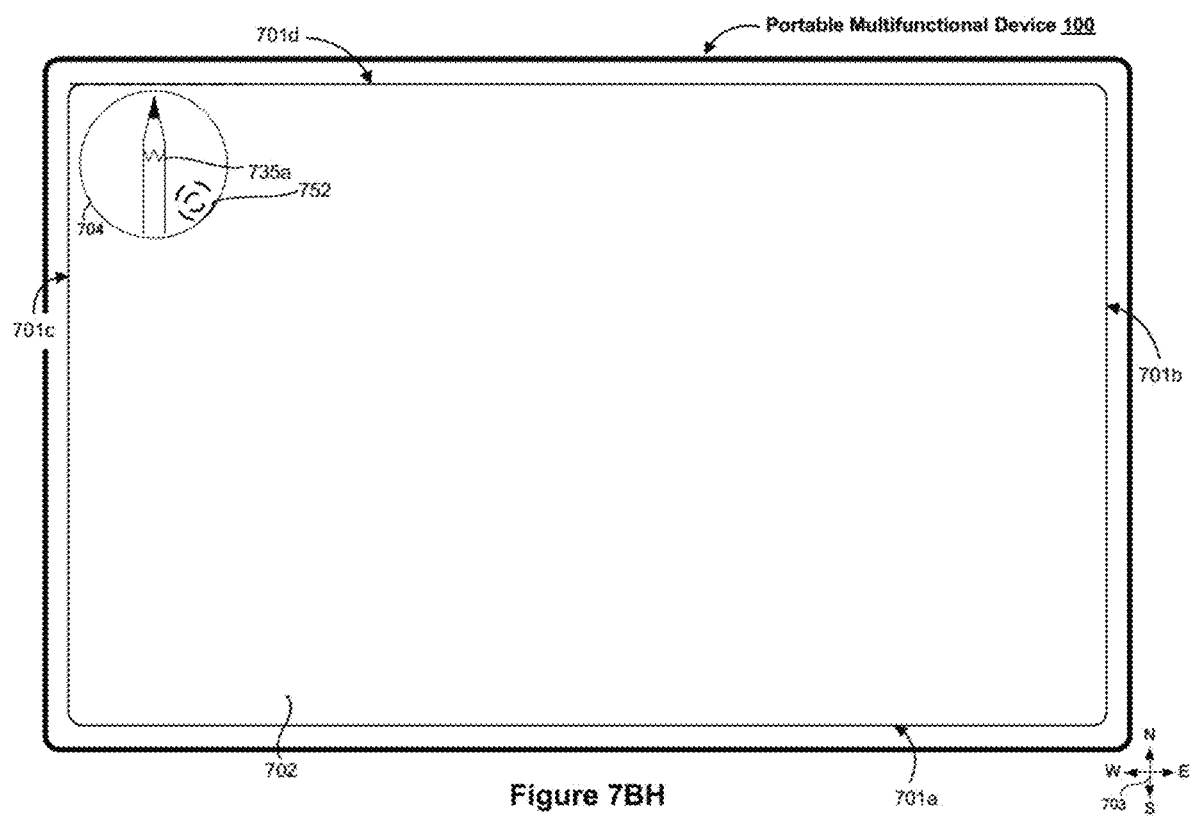
Figure 7B:
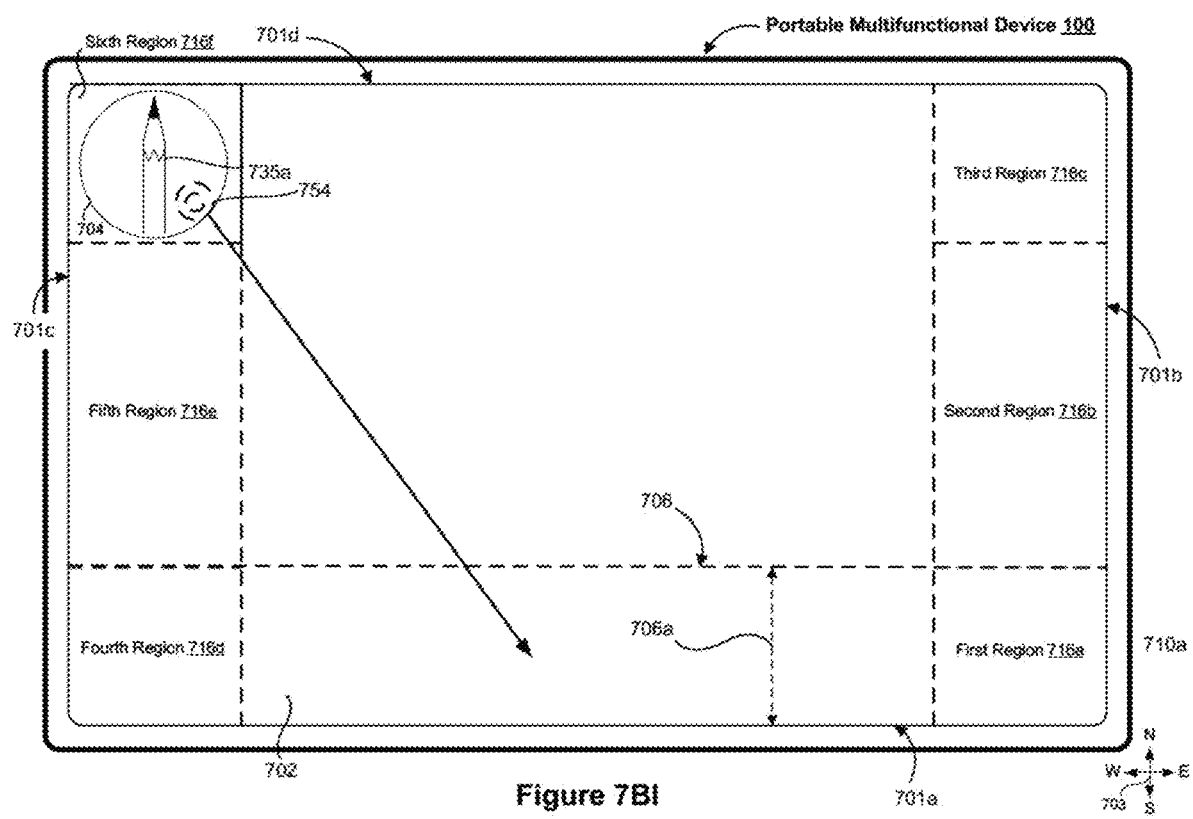
Figure 7B:
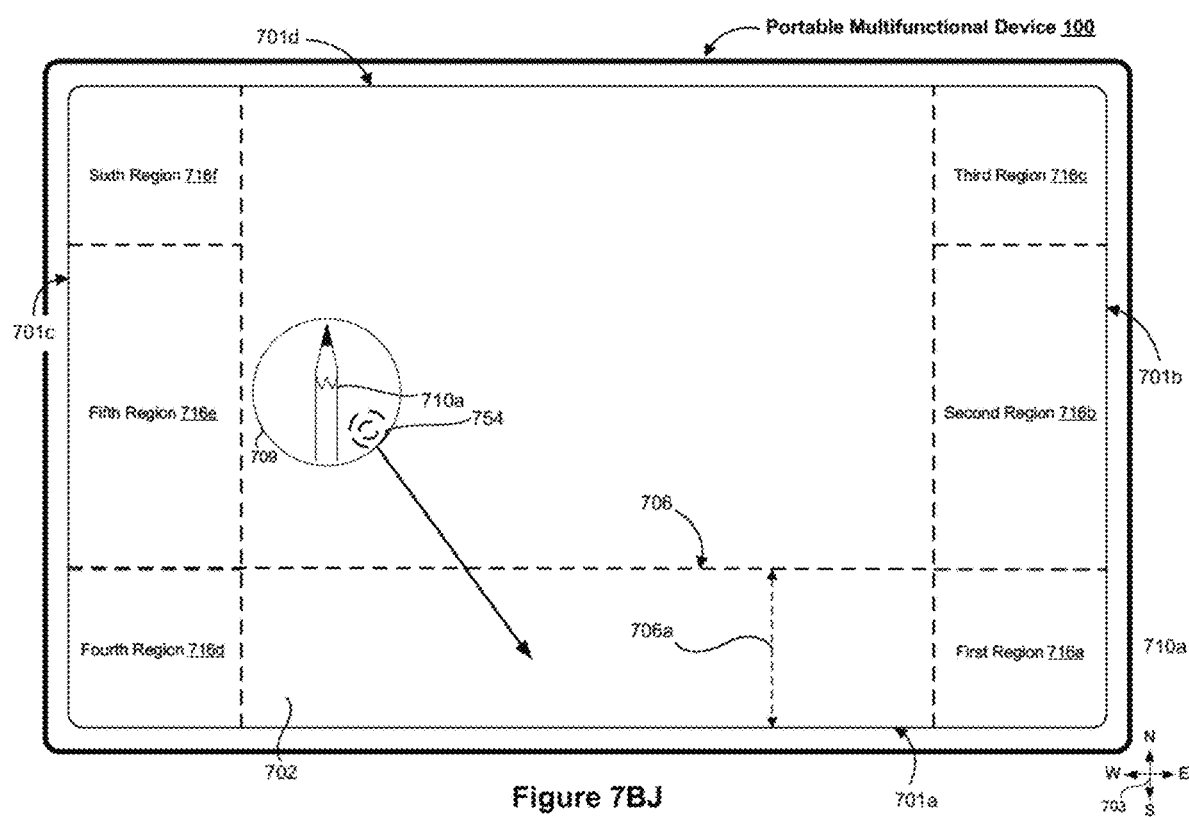
Figure 7B:
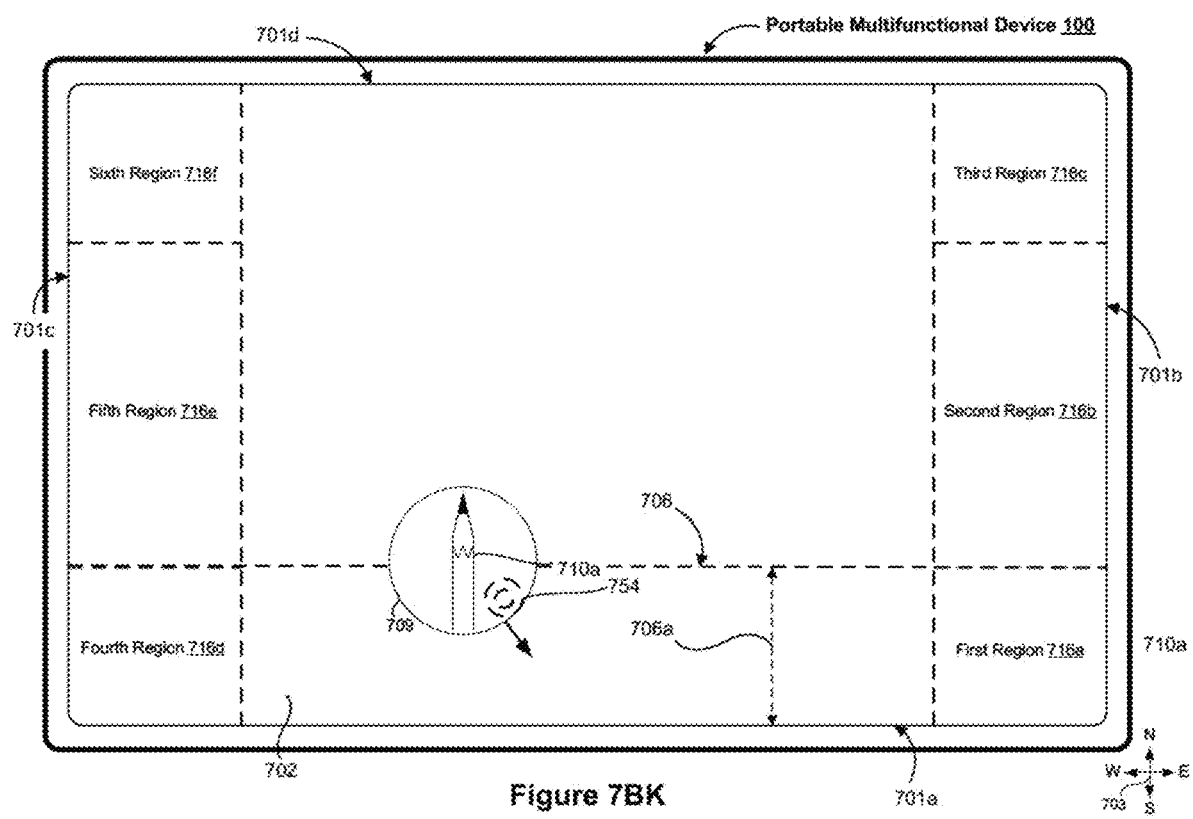
Figure 7B:
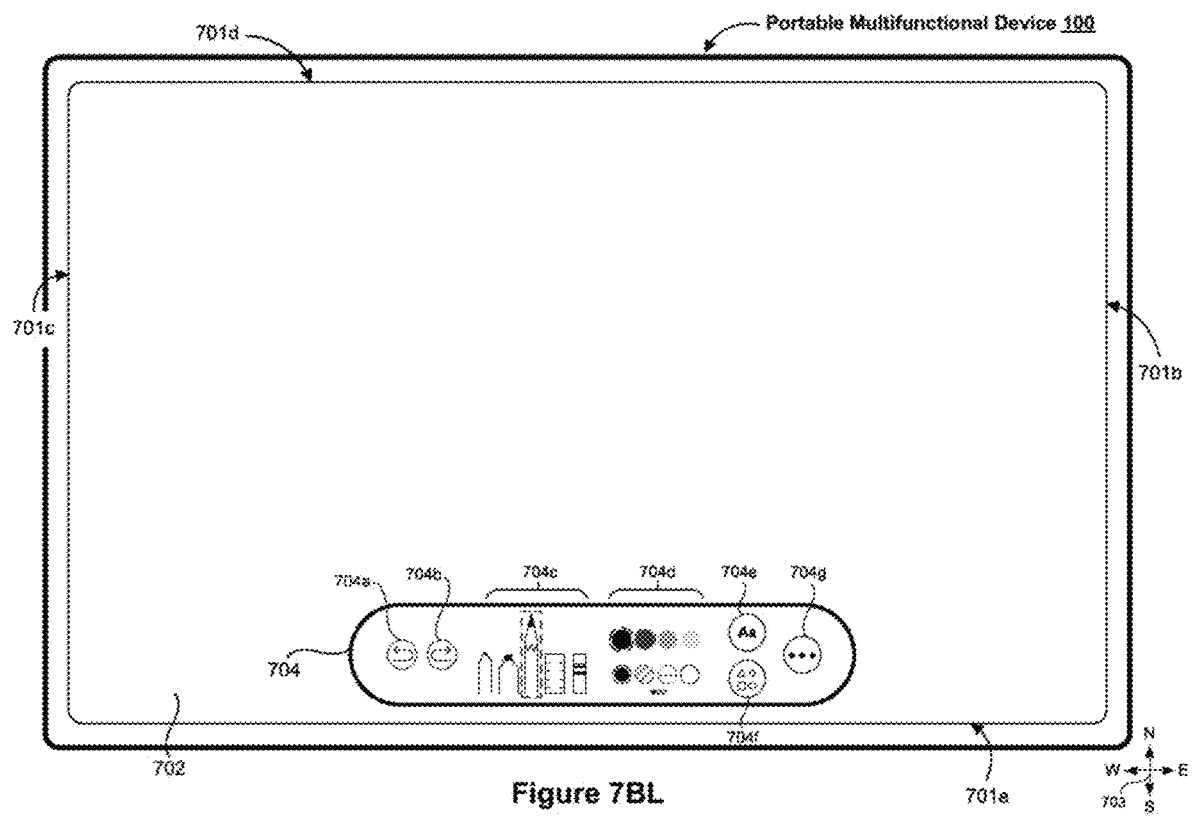
Figure 7B:
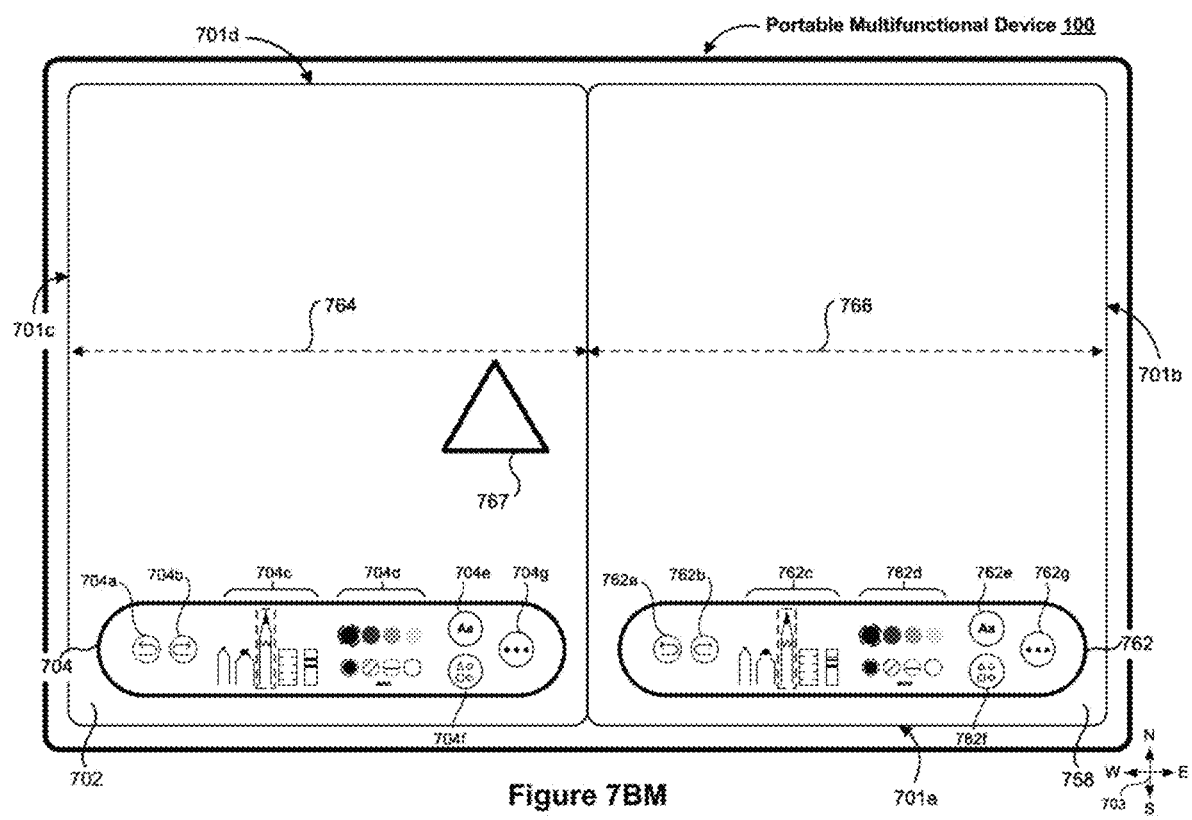
Figure 7B:
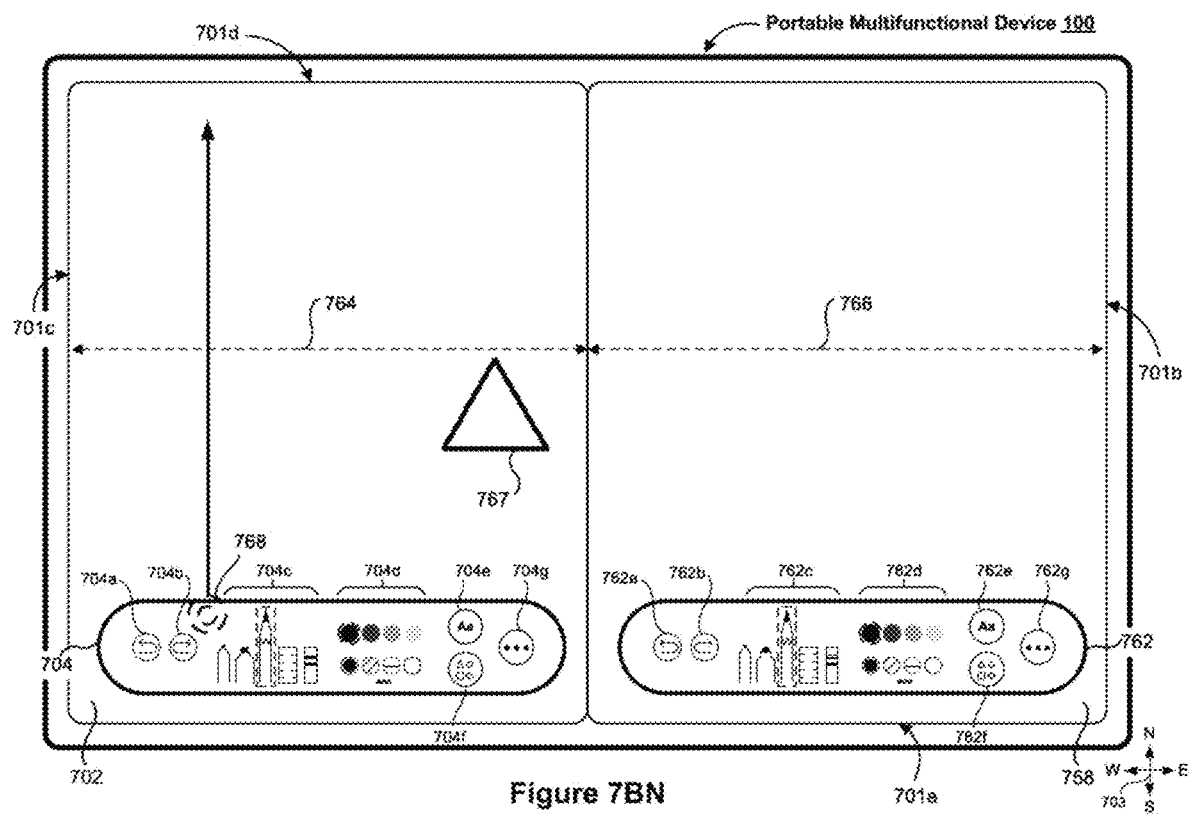
Figure 7B:
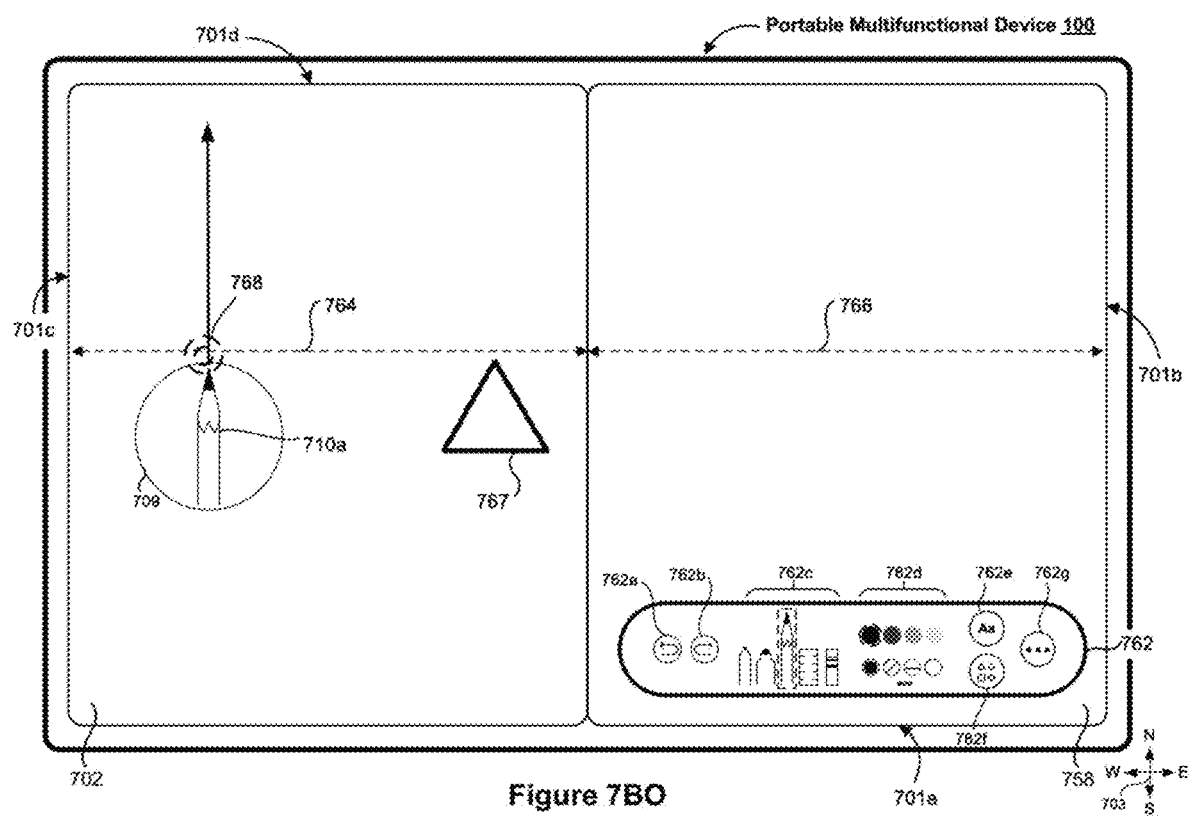
Figure 7B:
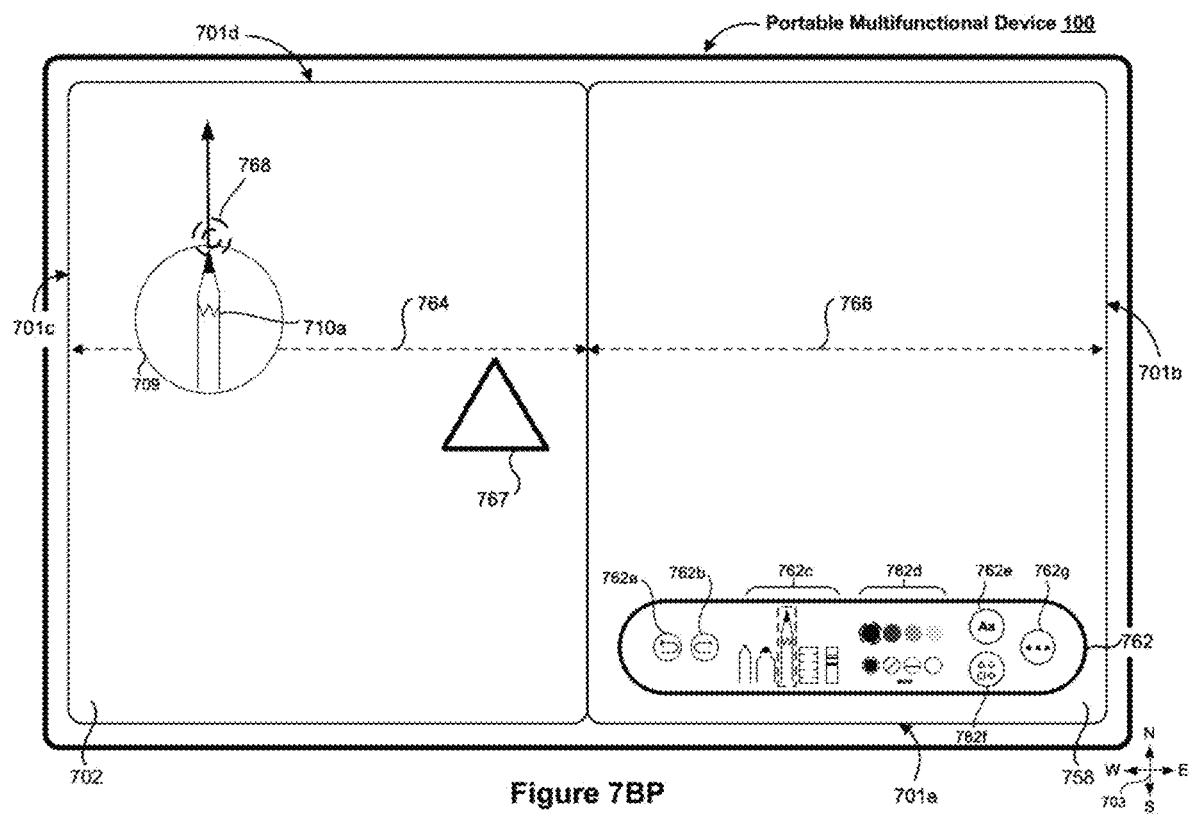
Figure 7B:
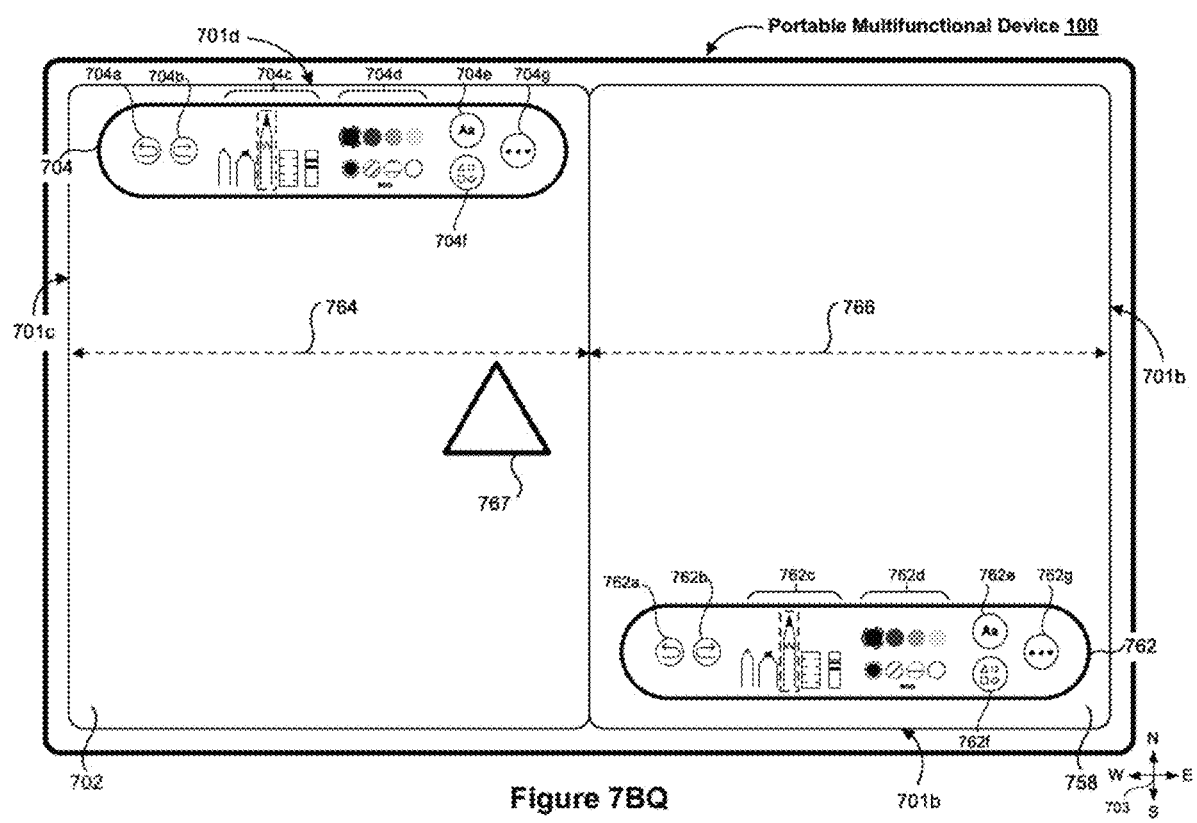
Figure 7B:
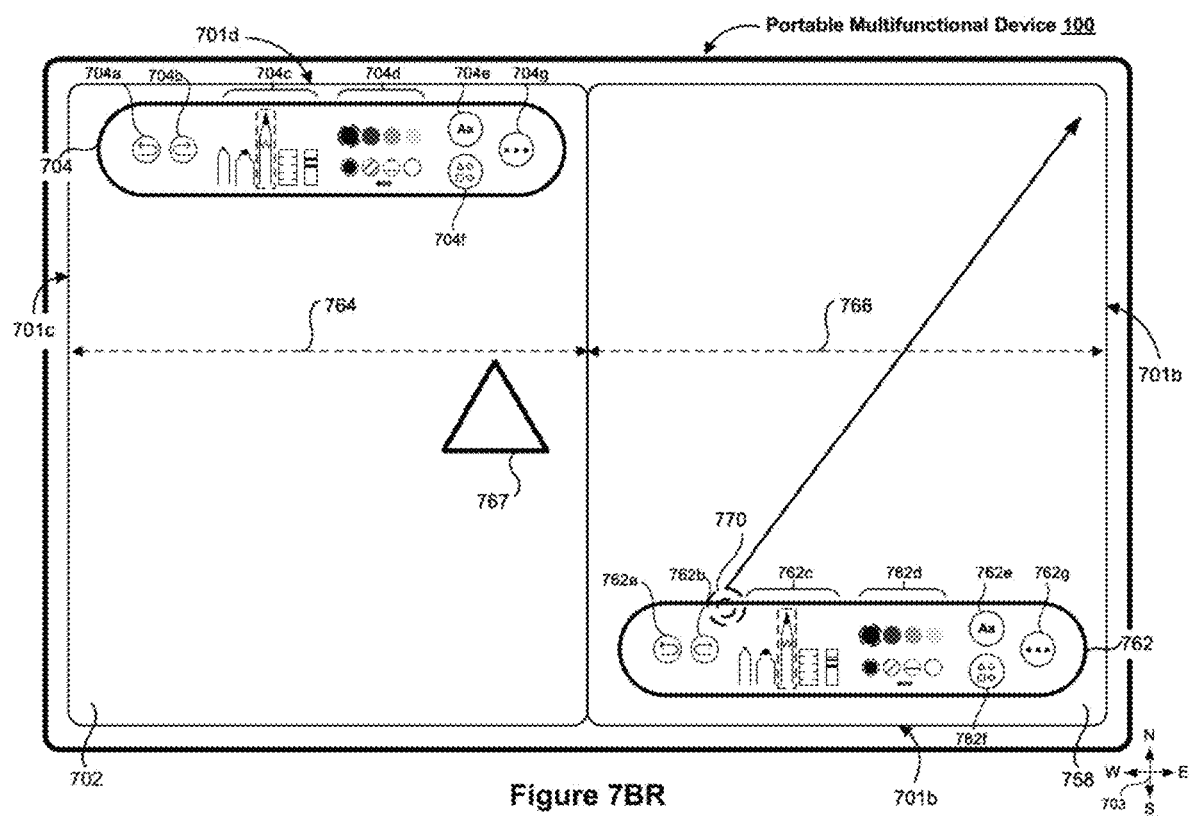
Figure 7B:
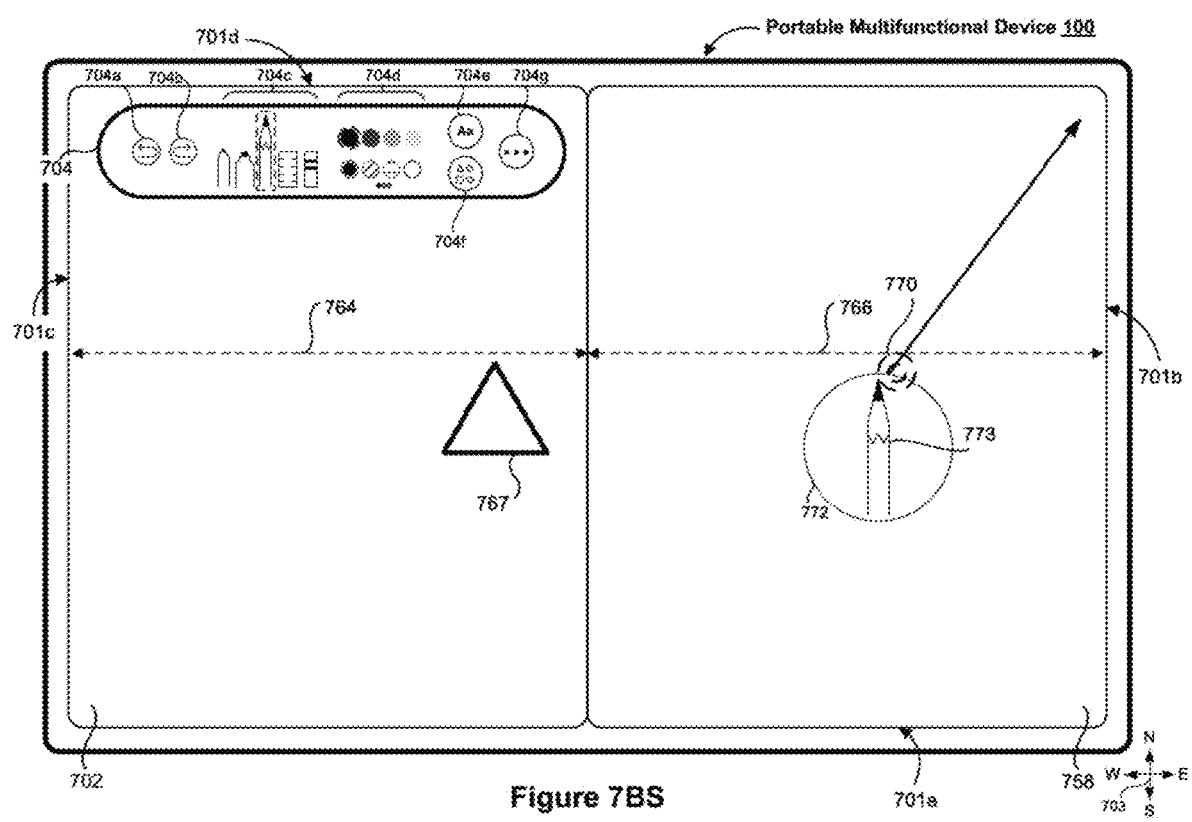
Figure 7B:
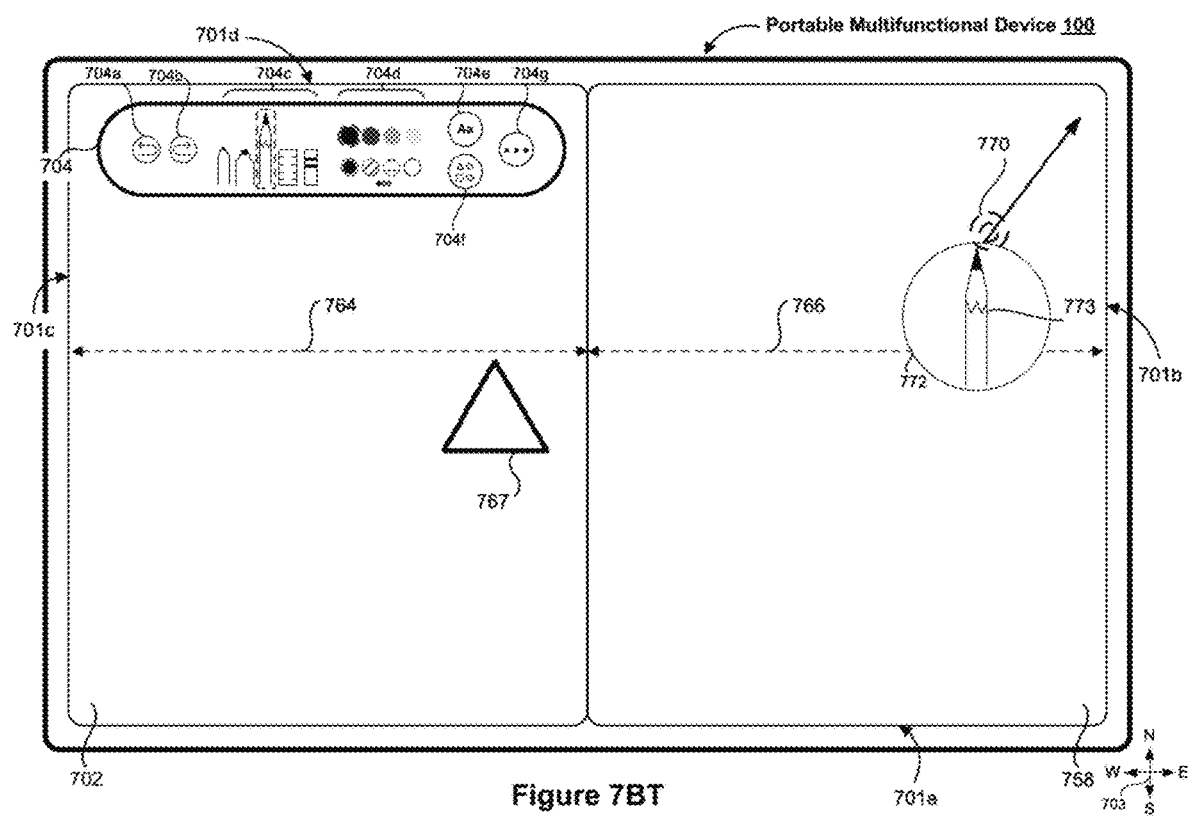
Figure 7B:
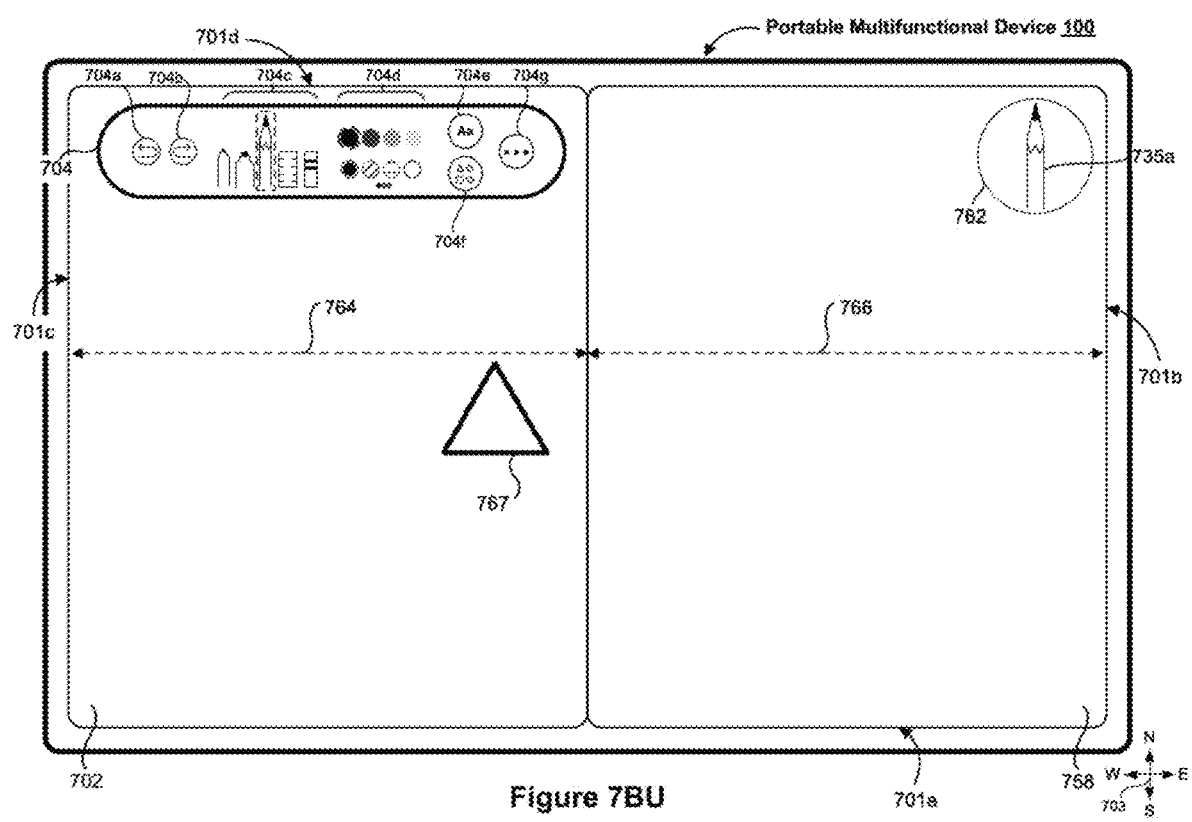
Figure 7B:
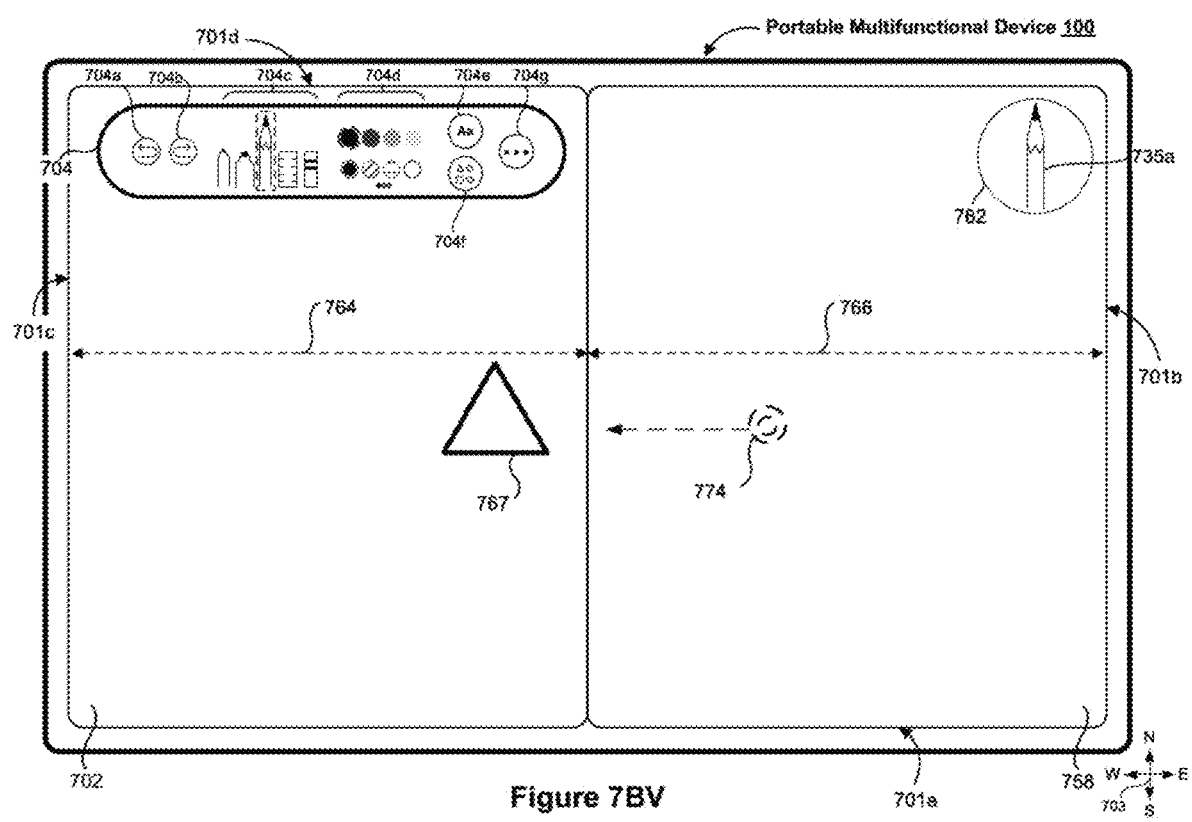
Figure 7B:
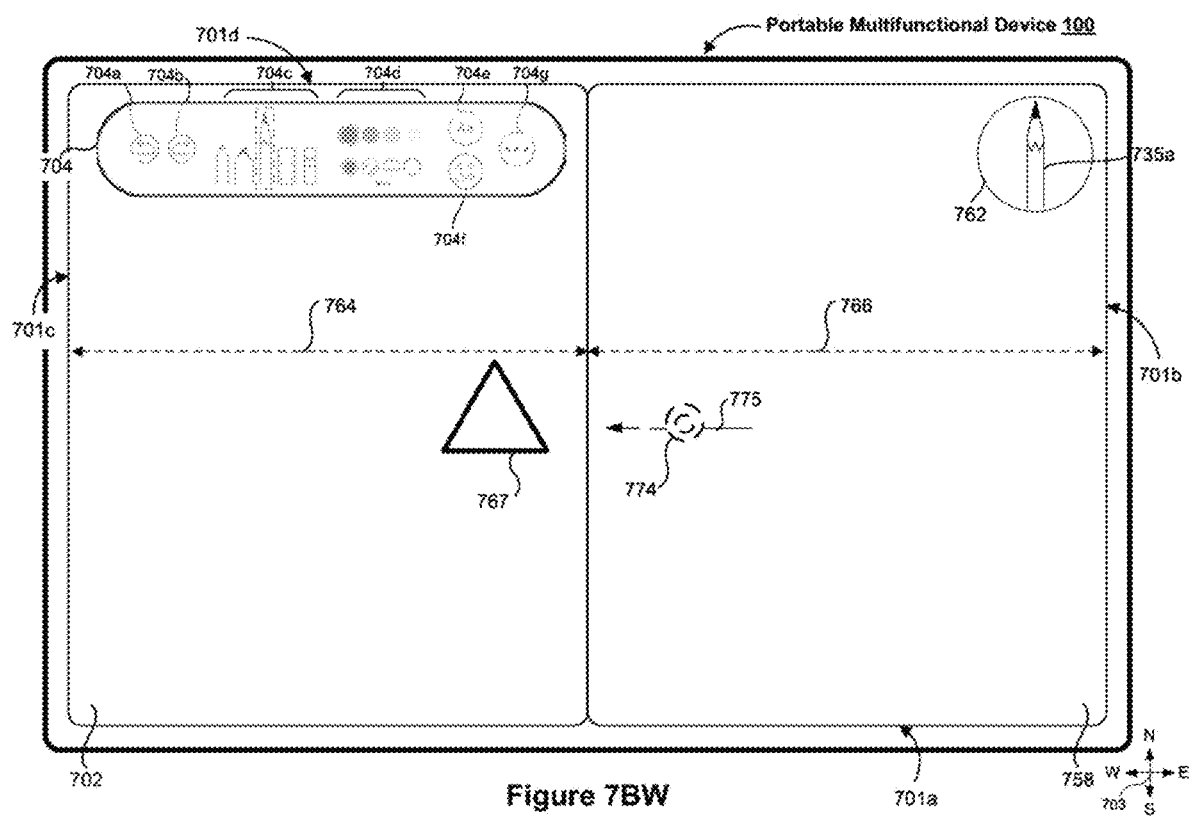
Figure 7B:
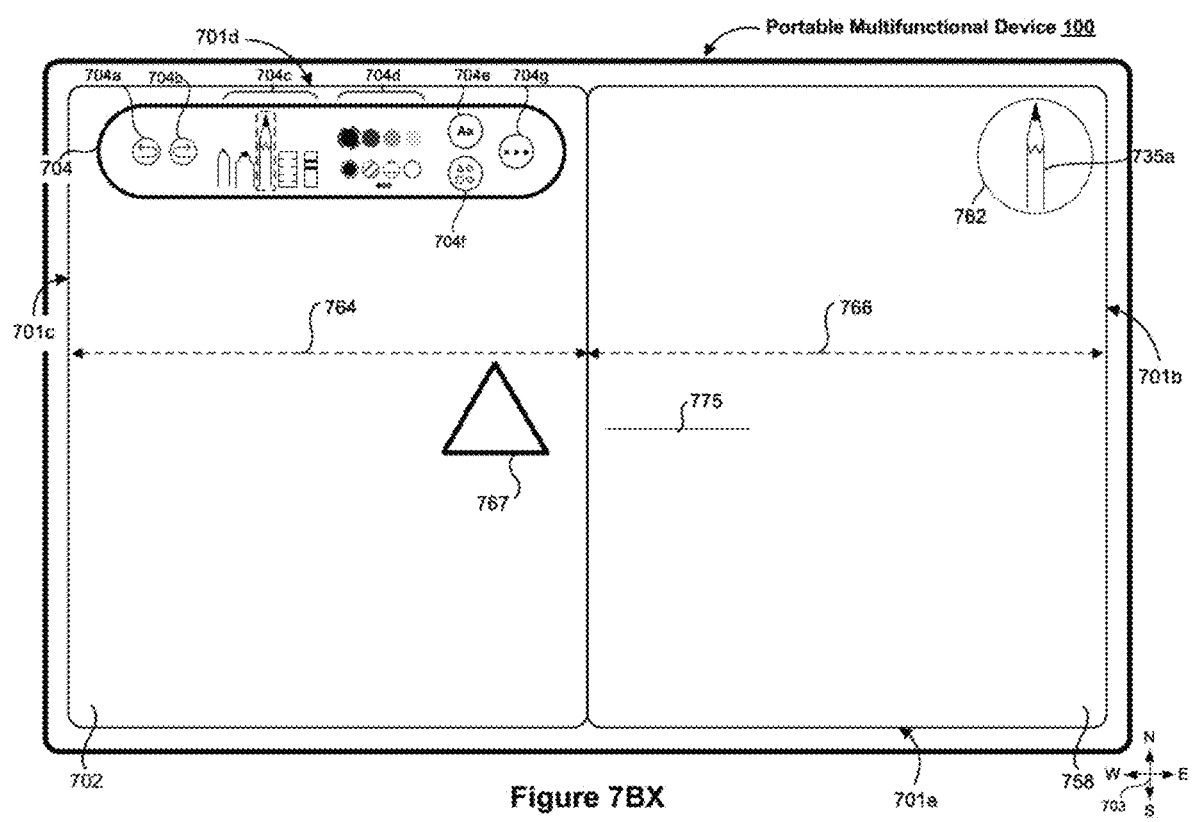
Figure 7B:
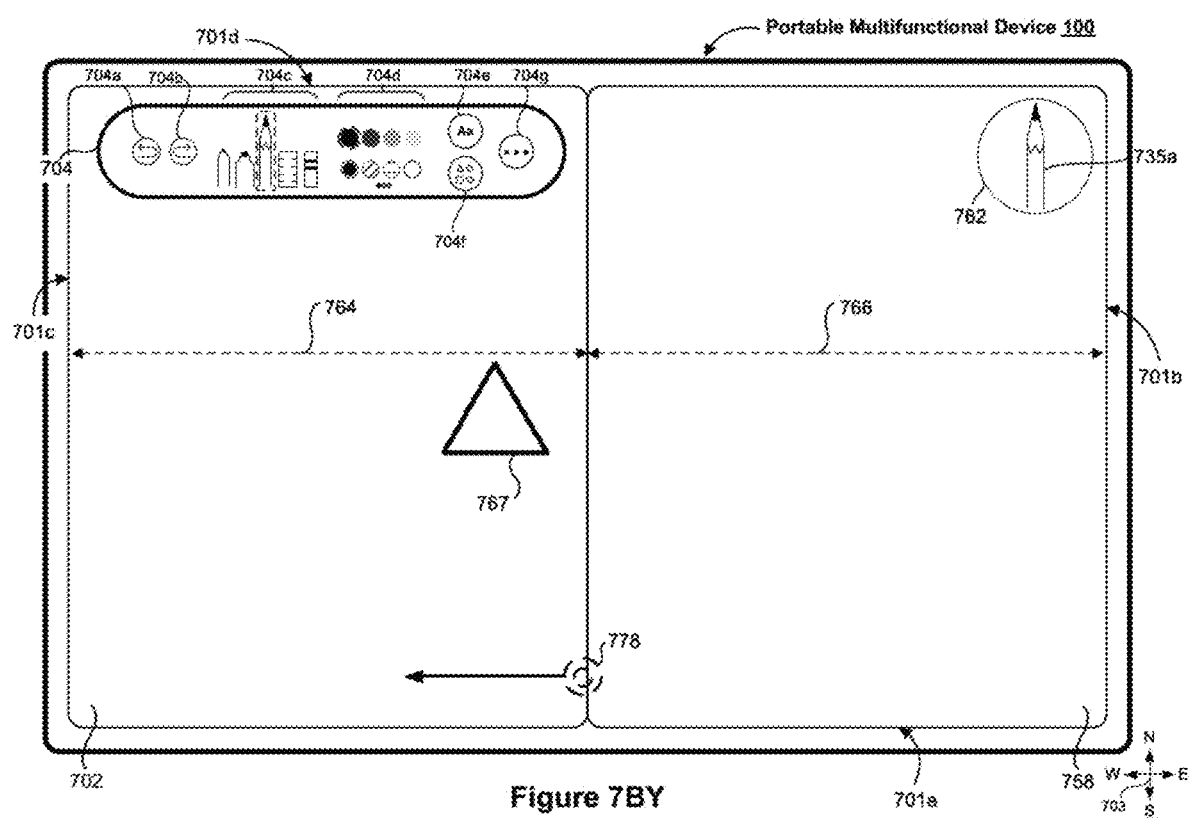
Figure 7B:
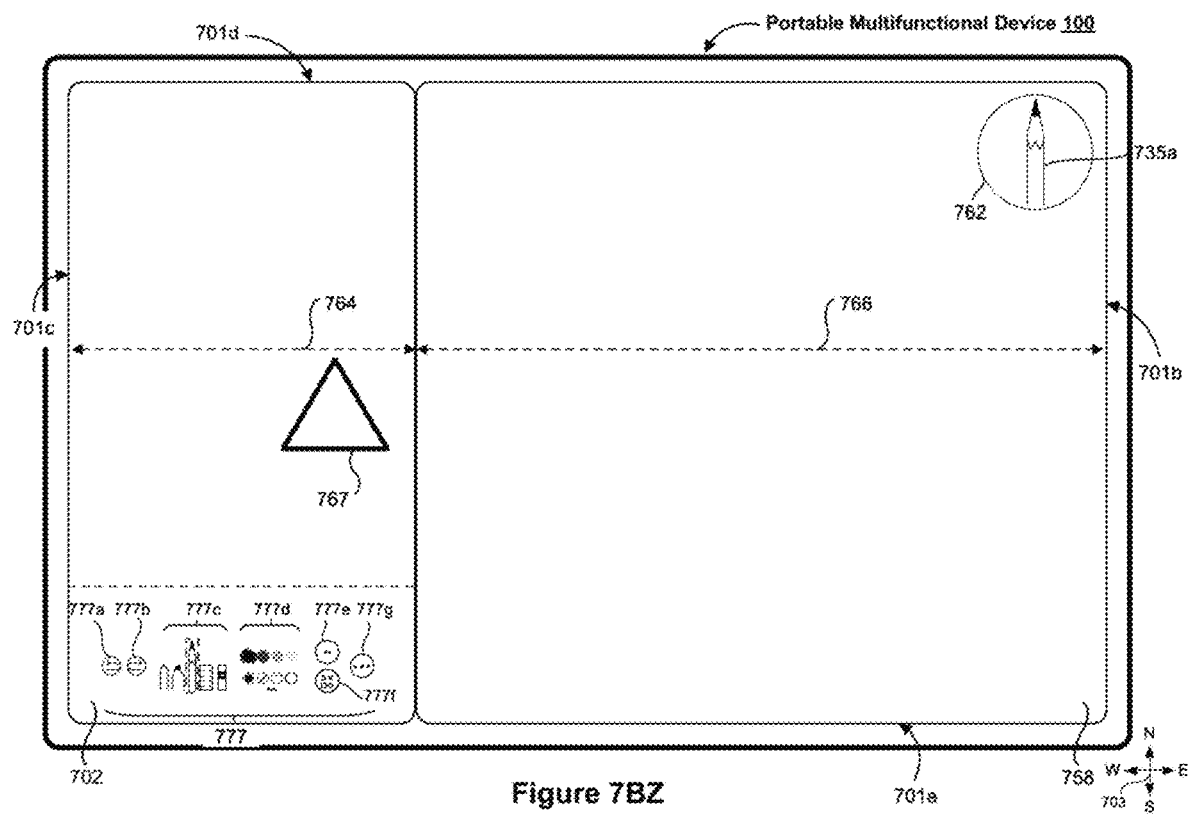
Figure 7C:
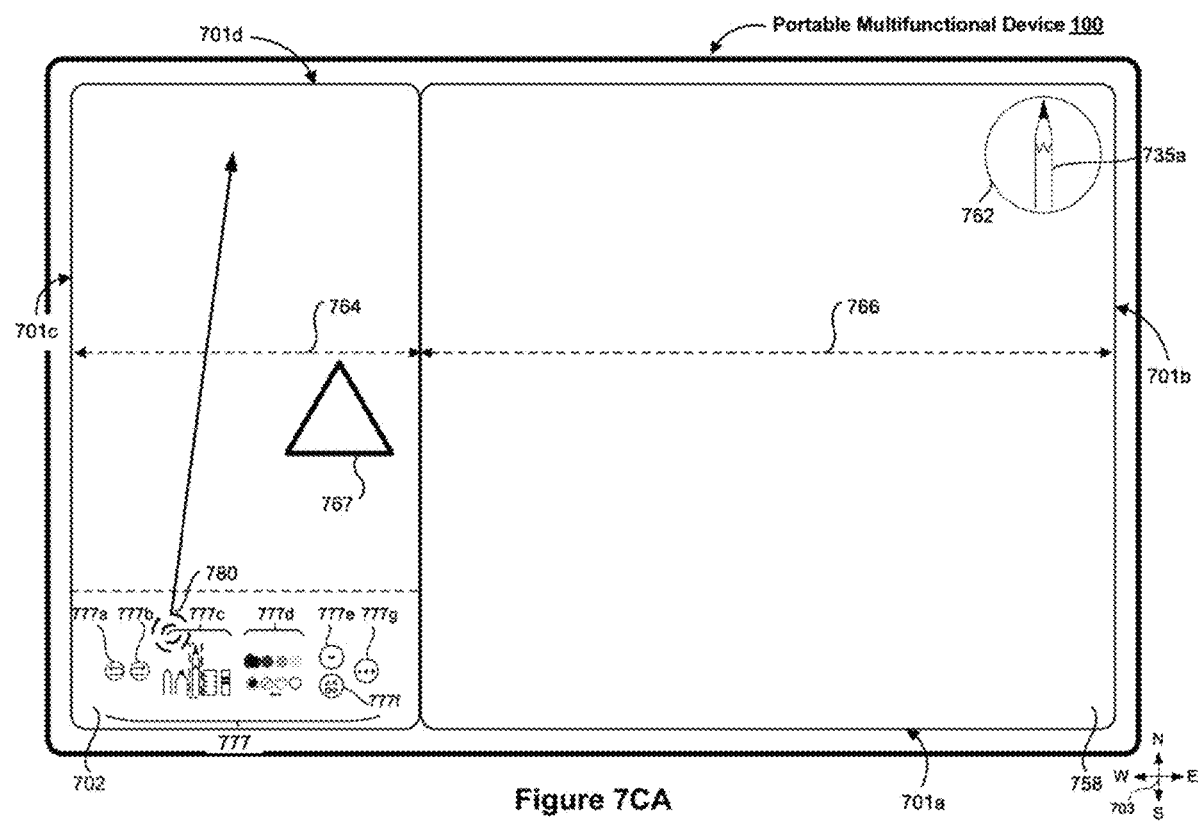
Figure 7C:
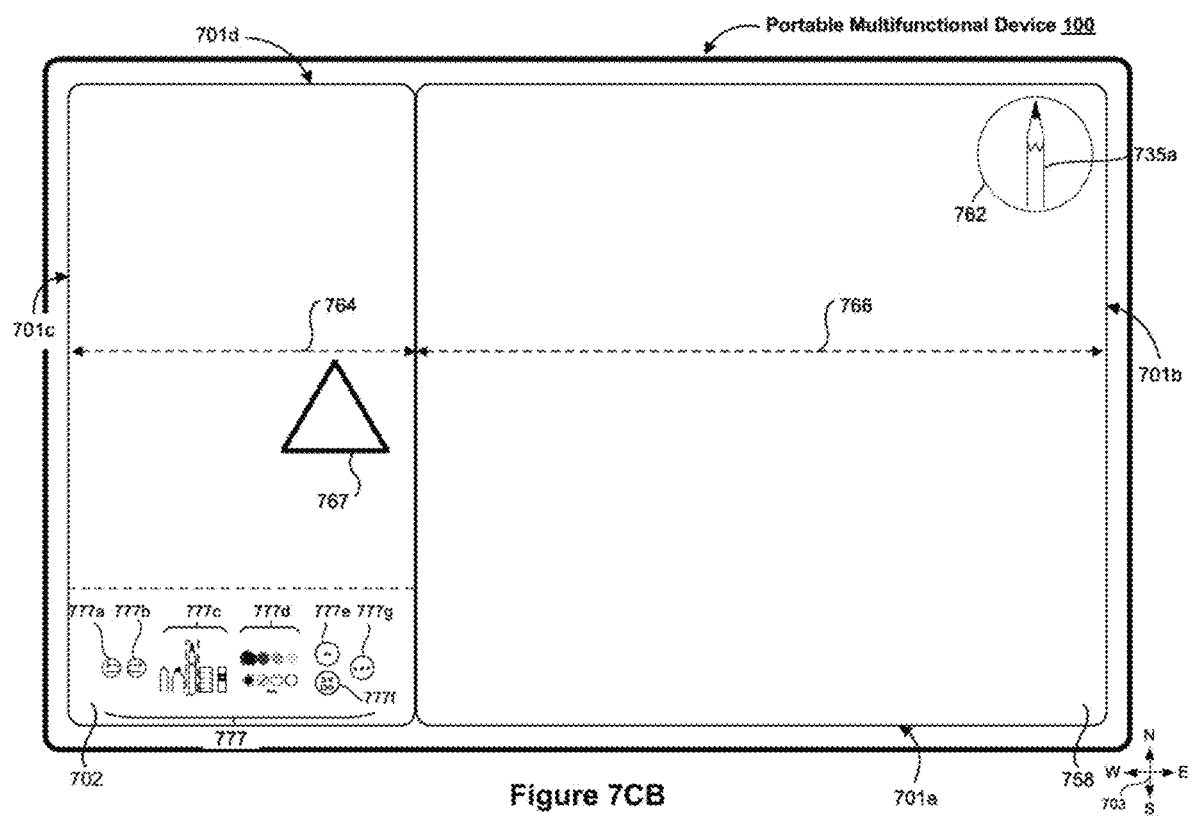
Figure 7C:
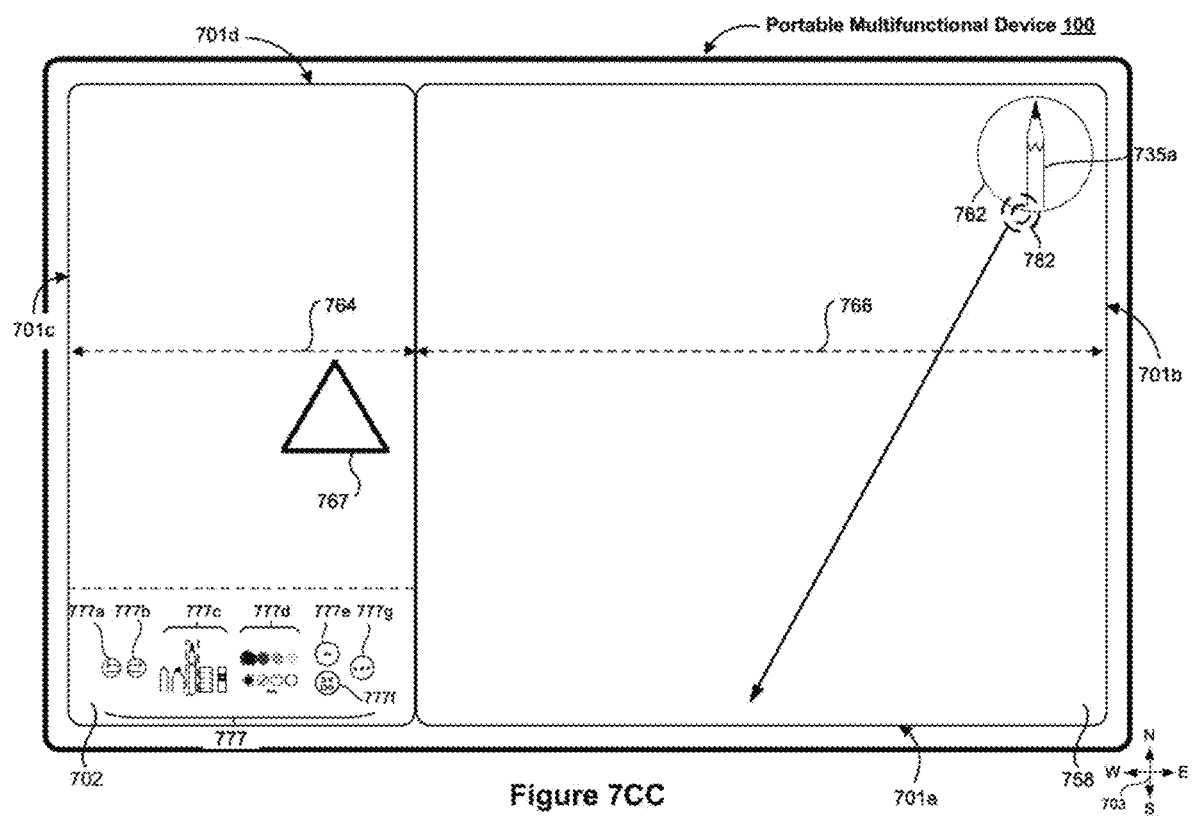
Figure 7C:
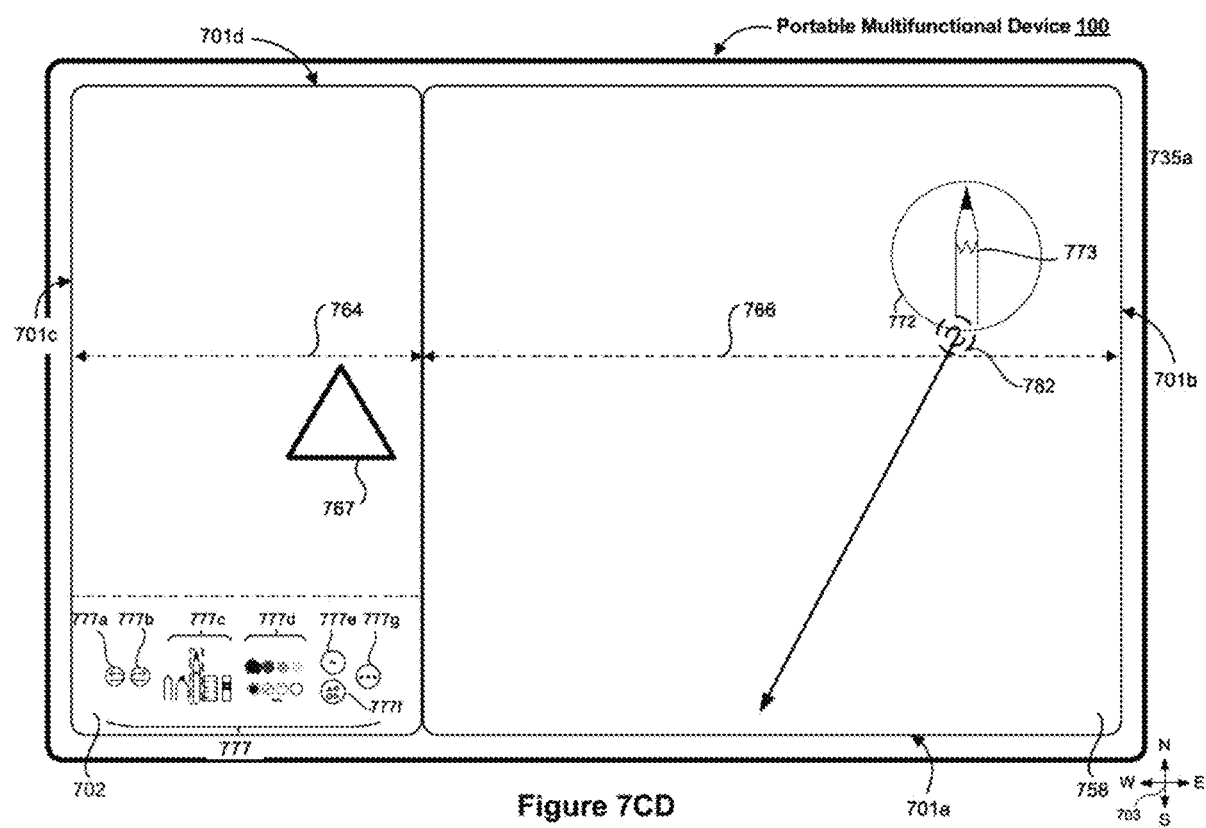
Figure 7C:
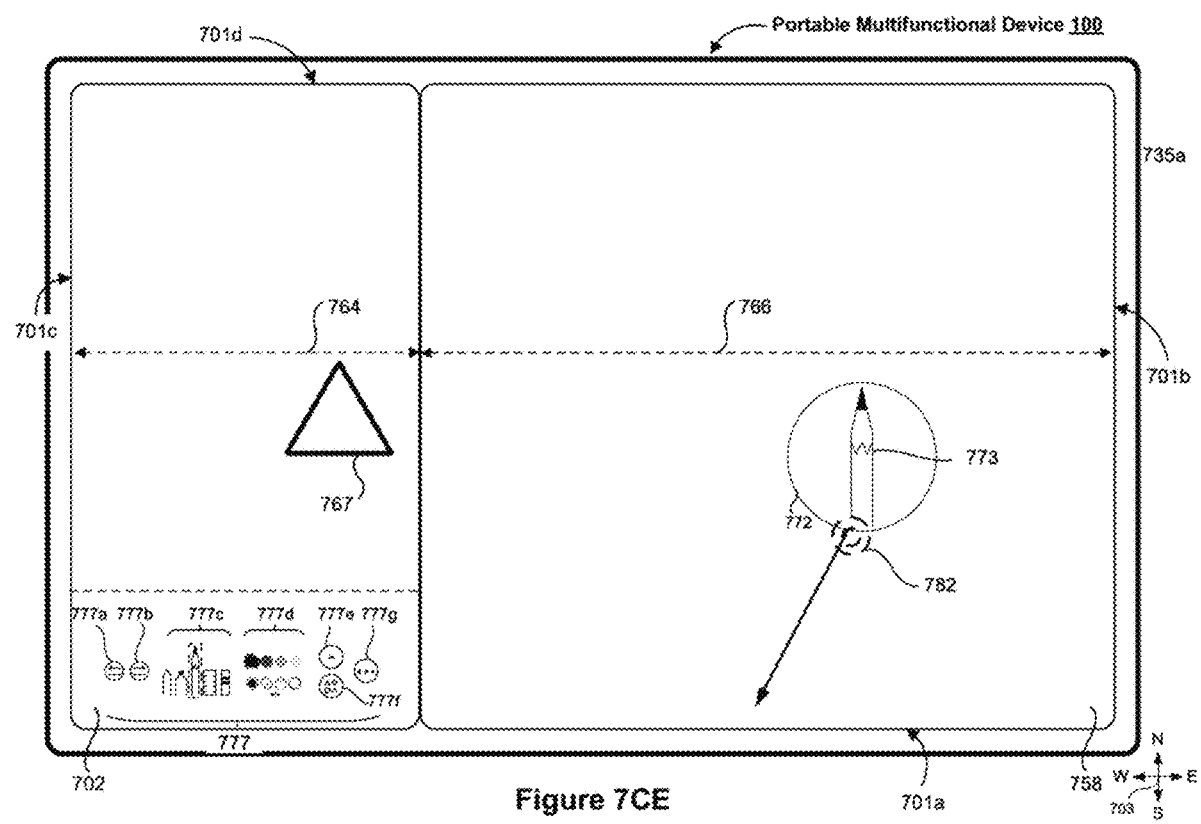
Figure 7C:
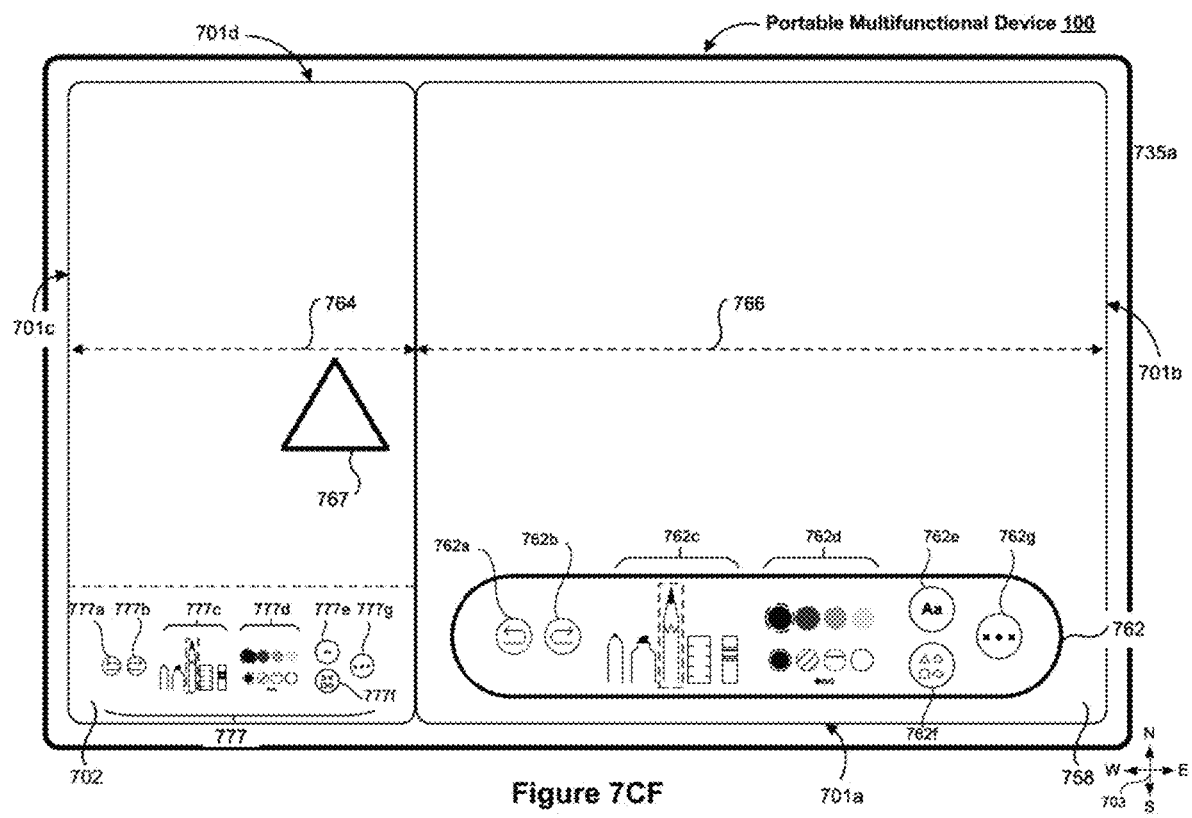

As illustrated in FIG. 7Z, in response to detecting completion of the drag input 726, the electronic device 100 displays the first drawing palette 704 having the first appearance along the third edge 701c. Notably, the electronic device 100 displays the first drawing palette 704 along the third edge 701c and rotates the set of drawing tool affordances 704c in order to be substantially perpendicular to and facing away from the third edge 701c. Moreover, in some embodiments, as illustrated in FIG. 7Z, the electronic device 100 displays the first drawing palette 704 with a respective appearance that corresponds to a mirror image of a respective appearance of the first drawing palette 704 in FIG. 7W.

As illustrated in FIG. 7AA, the electronic device 100 detects an input 728 that sets the pen as the currently selected drawing tool. As illustrated in FIG. 7AB, the electronic device 100 displays the first drawing palette 704, and in particular, the set of drawing tool affordances 704c, indicating that the pen is the currently selected drawing tool.

As illustrated in FIG. 7AC, the electronic device 100 detects a flick input 729 directed to the first drawing palette 704. Notably, the displayed regions in FIG. 7AC have different locations as compared with previous figures because of the first device rotation input 724 illustrated in FIG. 7S and the second device rotation input 725 illustrated in FIG. 7U. As illustrated in FIG. 7AC, the flick input 729 includes a horizontal component 729a and a vertical component 729b. Although the flick input 729 is in a direction 730 towards the seventh region 716g, the flick input 729 does not cross the corresponding first threshold line 706. Nevertheless, in response to determining that the flick input 729 satisfies a velocity threshold, the electronic device 100 moves the first drawing palette 704 to the seventh region 716g. For example, in some embodiments, the flick input 729 satisfies the velocity threshold when the flick input 729 is associated with a sufficient magnitude (e.g., speed and/or acceleration). As another example, in some embodiments, the flick input 729 satisfies the velocity threshold when the flick input 729 is associated with a sufficient level of speed and/or acceleration.

As illustrated in FIG. 7AD, as the flick input 729 proceeds, the electronic device 100 replaces the first drawing palette 704 with the drawing tool indicator 709 including a black-tipped pen 710b. The electronic device 100 displays the black-tipped pen 710b because the black-tipped pen drawing tool is currently selected. Moreover, the electronic device 100 displays the black-tipped pen 710b as substantially perpendicular to and facing away from the third edge 701c in order to match the orientation of the set of drawing tool affordances 704c in FIG. 7AC.

As illustrated in FIG. 7AE, the electronic device 100 partially rotates the black-tipped pen 710b in order to be facing a direction that is between the orientation of the black-tipped pen 710b in FIG. 7AD and the orientation of the black-tipped pen 710b in FIG. 7AF (e.g., a 45-degree angle). Unlike the previous examples involving drag inputs, in response to detecting the flick input 729, the electronic device 100 moves the first drawing palette 704 to the target region (seventh region 716g) independent of whether the flick input 729 crosses the first threshold line 706. Accordingly, the electronic device 100 begins rotating the black-tipped pen 710b before the drawing tool indicator 709 reaches the first threshold line 706.

As illustrated in FIG. 7AF, as the electronic device 100 moves the drawing tool indicator 709 into the seventh region 716g, the electronic device 100 completes rotating the black-tipped pen 710b in order to match the orientation of the set of drawing tool affordances 704c in FIG. 7AG. As illustrated in FIG. 7AG, the electronic device 100 displays the first drawing palette 704 having the first appearance including the set of drawing tool affordances 704c substantial perpendicular to and facing away from the first edge 701a.

As illustrated in FIG. 7AH, the electronic device 100 detects an input 732 that sets the pencil as the currently selected drawing tool. As illustrated in FIG. 7AL the electronic device 100 displays the first drawing palette 704, and in particular, the set of drawing tool affordances 704c, indicating that the pencil is the currently selected drawing tool.

As illustrated in FIG. 7AJ, the electronic device 100 detects a drag input 733 requesting movement of the first drawing palette 704 to the second region 716b. As illustrated in FIG. 7AK, prior to detecting the drag input 733 cross into the second region 716b, the electronic device 100 replaces the first drawing palette 704 with the drawing tool indicator 709 including a black-tipped pencil 710a because the black-tipped pencil is the currently selected drawing tool. The black-tipped pencil 710a is substantially perpendicular to and facing away from the first edge 701a in order to match the orientation of the set of drawing tool affordances 704c in FIG. 7AJ.

As illustrated in FIG. 7AL, in response to detecting the drag input 733 cross into the second region 716b, the electronic device 100 rotates the black-tipped pencil 710a in order to be substantially perpendicular to and facing away from the second edge 701b. The electronic device 100 rotates the black-tipped pencil 710a in this way because, as is illustrated in FIG. 7AM, the electronic device 100 reorients the set of drawing tool affordances 704c in order to be substantially perpendicular to and facing away from the second edge 701b.

As illustrated in FIG. 7AM, in response to detecting completion of the drag input 733, the electronic device 100 displays the first drawing palette 704 having the first appearance along the second edge 701b. Notably, the electronic device 100 displays the first drawing palette 704 along the second edge 701b and rotates the set of drawing tool affordances 704c in order to be substantially perpendicular to and facing away from the second edge 701b.

As illustrated in FIG. 7AN, the electronic device 100 detects a drag input 734 requesting movement of the first drawing palette 704 to the first region 716a, a corner region. As illustrated in FIG. 7AO, after detecting the drag input 734 but before completion of the drag input 734, the electronic device 100 replaces the first drawing palette 704 with the drawing tool indicator 709 including a black-tipped pencil 710a.

As illustrated in FIG. 7AP, in response to detecting completion of the drag input 734, the electronic device 100 displays the first drawing palette 704 having a second appearance that is different from the first appearance. The second appearance includes a currently selected drawing tool indicator 735a that is substantially perpendicular to and facing away from the second edge 701b because the set of drawing tool affordances 704c associated with the first appearance in FIG. 7AM are similarly oriented.

In some embodiments, the first appearance corresponds to the first drawing palette being in a first expanded state and the second appearance corresponds to the first drawing palette being in a condensed state. In some embodiments, as compared with the first appearance, the second appearance includes fewer content manipulation affordances. For example, as illustrated in FIG. 7AP, the first drawing palette 704 with the second appearance includes a single affordance, e.g., currently selected drawing tool indicator 735a that corresponds to the currently selected drawing tool, whereas the first drawing palette 704 with the first appearance includes multiple content manipulation affordances 704a-704g in FIG. 7AM.

As illustrated in FIGS. 7AQ-7AU, the electronic device 100 transitions the first drawing palette 704 in the condensed state to a second expanded state different from the first expanded state. As illustrated in FIG. 7AQ, the electronic device 100 detects a touch input 736 directed to the first drawing palette 704. In response to detecting the touch input 736 in FIG. 7AQ, the electronic device 100 enlarges (e.g., expands or swells) the first drawing palette 704 in FIG. 7AR. In some embodiments, the touch input 736 corresponds to a touch input detected on the touch-sensitive surface for a first threshold amount of time. In some embodiments, the enlarged first drawing palette 704 in FIG. 7AR is in a second expanded state relative to the first drawing palette 704 in FIGS. 7AP and 7AQ. The enlarged first drawing palette 704 includes the currently selected drawing tool indicator 735a.

In some embodiments, as illustrated in FIG. 7AS, in response to detecting the touch input 736 for a second threshold amount of time greater than the first threshold amount of time, the electronic device 100 replaces the first drawing palette 704 with a preview drawing palette 738. Notably, the preview drawing palette 738 has the same leftward-facing orientation as the enlarged first drawing palette 704 in FIG. 7AR. Accordingly, the electronic device 100 expands the preview drawing palette 738 vertically (e.g., upwards) relative to the enlarged first drawing palette 704 in FIG. 7AR.

In some embodiments, the preview drawing palette 738 is in a second expanded state relative to the first drawing palette 704 in FIGS. 7AP and 7AQ. The preview drawing palette 738 includes selectable drawing tool affordances 738a-738d, wherein the black-tipped pencil affordance 738a has focus because it is the currently selected drawing tool. One of ordinary skill in the art will appreciate that the preview drawing palette 738 may include any number and types of content manipulation affordances. For example, in some embodiments, the preview drawing palette 738 includes respective affordances for different tools, such as the pencil, pen, highlighter, and eraser.

As illustrated in FIG. 7AT, the electronic device 100 detects a drag input 740 that selects a gray-tipped pencil tool affordance 738c. In some embodiments, the drag input 740 originates at the point of the previous touch input 736. In response to detecting the drag input 740 in FIG. 7AT, the electronic device changes the currently selected drawing tool indicator 735a from the black-tipped pencil to the gray-tipped pencil within the first drawing palette 704 in FIG. 7AU.

As illustrated in FIG. 7AV, the electronic device 100 detects a touch input 742 directed to the first drawing palette 704. In response to detecting the touch input 742 in FIG. 7AV, the electronic device 100 enlarges the first drawing palette 704 in FIG. 7AW.

As illustrated in FIG. 7AX, the electronic device 100 detects a drag input 744 that requests to move the first drawing palette 704 to the sixth region 716f. In some embodiments, the drag input 740 originates at the point of the previous touch input 742. As illustrated in FIG. 7AY, prior to detecting the drag input 744 crossing into the sixth region 716f, the electronic device 100 replaces the first drawing palette 704 with the drawing tool indicator 709 including a gray-tipped pencil 710c that is substantially perpendicular to and facing away from the second edge 710b. The gray-tipped pencil 710c is oriented in this way because the currently selected drawing tool indicator 735a within the first drawing palette 704 in FIG. 7AX is similarly oriented.

As illustrated in FIG. 7AZ, in response to detecting the drag input 744 cross into the sixth region 716f, the electronic device 100 rotates the gray-tipped pencil 710c in order to be substantially perpendicular to and facing away from the first edge 701a. The electronic device 100 rotates the gray-tipped pencil 710c in this way because maintaining the orientation of the gray-tipped pencil 710c as facing leftwards, towards the destination third edge 701c, would result in an unintuitive and undesirable user experience. As illustrated in FIG. 7BA, in response to detecting completion of the drag input 744, the electronic device 100 replaces the drawing tool indicator 709 with the first drawing palette 704 having the second appearance including the currently selected drawing tool indicator 735a facing upwards.

As illustrated in FIG. 7BB, the electronic device 100 detects a touch input 746. In response to detecting the touch input 746 in FIG. 7BB for a first threshold amount of time, the electronic device 100 enlarges the first drawing palette 704 in FIG. 7BC.

As illustrated in FIG. 7BD, in response to continuing to detect the touch input 746 for a second threshold amount of time greater than the first threshold amount of time, the electronic device 100 replaces the first drawing palette 704 in FIG. 7BC with the preview drawing palette 738 in FIG. 7BD. Notably, the preview drawing palette 738 has the same upward-facing orientation as the enlarged first drawing palette 704 in FIG. 7BC. Accordingly, the electronic device 100 expands the preview drawing palette 738 horizontally (e.g., rightwards) relative to the enlarged first drawing palette 704 in FIG. 7BC. This is in contrast to the electronic device 100 expanding the enlarged first drawing palette 704 vertically in FIG. 7AS. The preview drawing palette 738 indicates that the gray-tipped pencil 710c is the currently selected drawing tool.

As illustrated in FIG. 7BE, while detecting the touch input 746, the electronic device 100 detects a stylus tap input 750 made by a stylus 203 being held by a hand 748 of a user. The stylus tap input 750 is directed to the black-tipped pencil 738a. In response to detecting the stylus tap input 750 in FIG. 7BE, the electronic device 100 replaces the preview drawing palette 738 with the first drawing palette 704 having the second appearance in FIG. 7BF. The first drawing palette 704, and in particular, the currently selected drawing tool indicator 735a indicates that the black-tipped pencil is the currently selected drawing tool.

As illustrated in FIG. 7BG, the electronic device 100 detects a touch input 752 directed to the first drawing palette 704. In response to detecting the touch input 752 in FIG. 7BG, the electronic device 100 enlarges the first drawing palette 704 in FIG. 7BH. The enlarged first drawing palette 704 includes currently selected drawing tool indicator 735a that corresponds to the currently selected black-tipped pencil.

As illustrated in FIG. 7BI, the electronic device 100 detects a drag input 754 requesting to move the first drawing palette 704 towards the bottom edge 701a. In response to detecting the drag input 754 and prior to detecting the drag input 754 cross the first threshold line 706, the electronic device 100 replaces the first drawing palette 704 with the drawing tool indicator 709 in FIG. 7BJ. The drawing tool indicator 709 includes an upward-facing black-tipped pencil 710a in order to match the orientation of the currently selected drawing tool indicator 735a displayed within the first drawing palette 704 in FIG. 7BI.

As illustrated in FIG. 7BK, in response to detecting the drag input 754 cross the first threshold line 706, the electronic device 100 maintains the orientation of the black-tipped pencil 710a in order to match the orientation of the corresponding set of drawing tool affordances 704c within the first drawing palette 704 in FIG. 7BL. As illustrated in FIG. 7BL, in response to detecting completion of the drag input 754, the electronic device 100 replaces the drawing tool indicator 709 in FIG. 7BK with the first drawing palette 704 having the first appearance. The first drawing palette 704 includes the set of drawing tools affordances 704c indicating that the black-tipped pencil is the currently selected drawing tool.

FIGS. 7BM-7CF illustrate the electronic device 100 displaying and manipulating multiple drawing palettes within respective drawing application interfaces. As illustrated in FIG. 7BM, the electronic device 100 concurrently displays the first application interface 702 including the first drawing palette 704 having the first appearance and a second application interface 758 including a second drawing palette 762 having the first appearance. The first application interface 702 includes content 767 (e.g., a triangle). The second drawing palette 762 includes a variety of content manipulation affordances 762a-762g, which, in some embodiments, respectively correspond to the content manipulation affordances 704a-704g within the first drawing palette 704. In some embodiments, the first application interface 702 and the second application interface 758 correspond to different application windows of the same application (e.g., a notes application). In some embodiments, the first application interface 702 is associated with a first application that is different from a second application associated with the second application interface 758. As further illustrated in FIG. 7BM, the first application interface 702 is associated with a first width 764 that is equal to or substantially equal to a second width 766 associated with the second application interface 758. According to this spatial relationship, as illustrated in FIGS. 7BM-7BU, both the first drawing palette 704 and the second drawing palette 762 are movable within the first application interface 702 and the second application interface 758, respectively.

As illustrated in FIG. 7BN, the electronic device 100 detects a drag input 768 that requests movement of the first drawing palette 704 to the top edge of the first application interface 702. As illustrated in FIGS. 7BO and 7BP, in response to detecting the drag input 768 but before completion of the drag input 768, the electronic device 100 replaces the first drawing palette 704 with the drawing tool indicator 709. Details regarding this type of transition are provided above. In response to detecting completion of the drag input 768, the electronic device 100 displays the first drawing palette 704 having the first appearance along the top edge of the first application interface 702 in FIG. 7BQ.

As illustrated in FIG. 7BR, the electronic device 100 detects a drag input 770 that requests movement of the second drawing palette 762 to the upper-right corner of the second application interface 758. As illustrated in FIGS. 7BS and 7BT, in response to detecting the drag input 770 but before completion of the drag input 770, the electronic device 100 replaces the second drawing palette 762 with a second drawing tool indicator 772. In response to detecting completion of the drag input 770, the electronic device 100 displays the second drawing palette 762 at the upper-right corner and facing upwards in FIG. 7BU. The second drawing palette 762 has a second appearance that is different from the first appearance of the second drawing palette 762 in FIG. 7BR. Namely, the second appearance is smaller than and includes fewer affordances than the first appearance.

As illustrated in FIG. 7BV, the electronic device 100 detects a drawing input 774 within the second application interface 758. In some embodiments, as illustrated in FIG. 7BW, while the electronic device 100 detects the drawing input 774 within the second application interface 758, the electronic device 100 deemphasizes (e.g., fades) the first drawing palette 704 relative to content 767 displayed within the first application interface 702. In response to detecting the drawing input 774 in FIG. 7BV, the electronic device 100 displays a corresponding mark 775. In some embodiments, as illustrated in FIG. 7BX, in response to detecting completion of the drawing input 774, the electronic device 100 reemphasizes the first drawing palette 704.

As illustrated in FIG. 7BY, the electronic device 100 detects a drag input 778 that requests decreasing the first width 764 associated with the first application interface 702 and increasing the second width 766 associated with the second application interface 758. In response to detecting the drag input 778 in FIG. 7BY, the electronic device 100 decreases the first width 764 and increases the second width 766, as is illustrated in FIG. 7BZ.

Moreover, because the electronic device 100 reduces the first width 764 beyond a particular threshold, the electronic device 100 replaces the first drawing palette 704 within the first application interface 702 with a toolbar 777 including various content manipulation affordances in FIG. 7BZ. Notably, unlike the first drawing palette 704, the toolbar 777 is fixed to a corresponding edge 701*a* of the first application interface 702. Thus, as illustrated in FIGS. 7CA and 7CB, in response to detecting a drag input 780 directed to the toolbar 777, the electronic device 100 does not move the toolbar 777 or the content manipulation affordances therein.

On the other hand, the second width 766 associated with the second application interface 758 has not fallen below the particular threshold. Accordingly, the electronic device 100 maintains the second drawing palette 762 as illustrated in FIG. 7BZ. As illustrated in FIGS. 7CC-7CF, the electronic device 100 detects a drag input 782 requesting movement of the second drawing palette 762 to the bottom edge of the second application interface 758. In response to detecting the drag input 782 in FIG. 7CC, the electronic device 100 displays the second drawing tool indicator 772 in FIGS. 7CD and 7CE, and ultimately displays the second drawing palette 762 with the first appearance along the bottom edge of the second application interface 758 in FIG. 7CF.

FIGS. 8A-8AL are examples of user interfaces for invoking and utilizing a screenshot editing interface in accordance with some embodiments. The user interfaces in these figures are used to illustrate the processes described below, including the processes in FIGS. 11A-11C. Although some of the examples which follow will be given with reference to inputs on a touch-screen display (where the touch-sensitive surface and the display are combined, for example on the touch screen 112), in some embodiments, the electronic device 100 detects inputs on the touch-sensitive surface 651 that is separate from the display 650, as shown in FIG. 6B.

As illustrated in FIG. 8A, the electronic device 100 displays a user interface with content 802 including text 806, a back affordance 803*a*, a forward affordance 803*b*, a share affordance 804*a*, a bookmarks affordance 804*b*, and a tabs affordance 804*c*. One of ordinary skill in the art will appreciate that the content 802 may include any type and/or variety of content, such as text, images, different affordances, etc.

Figure 8B:
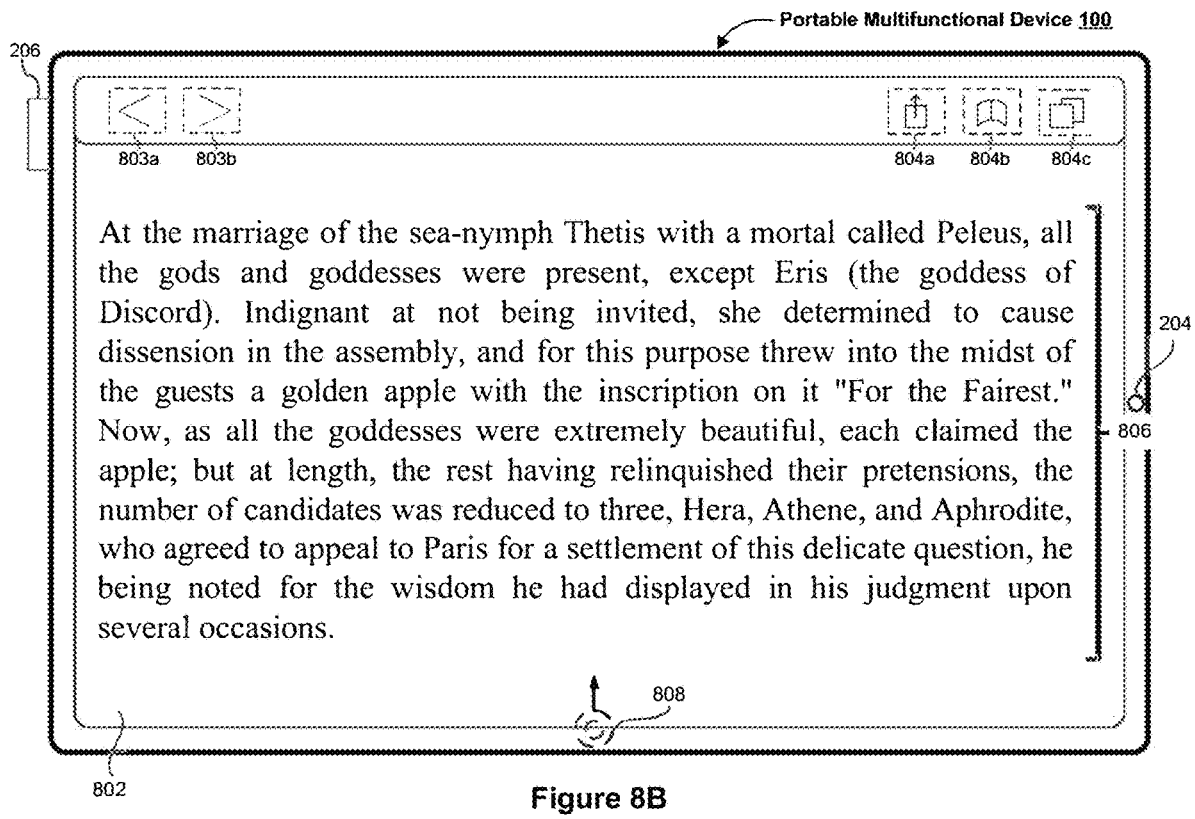
Figure 8C:
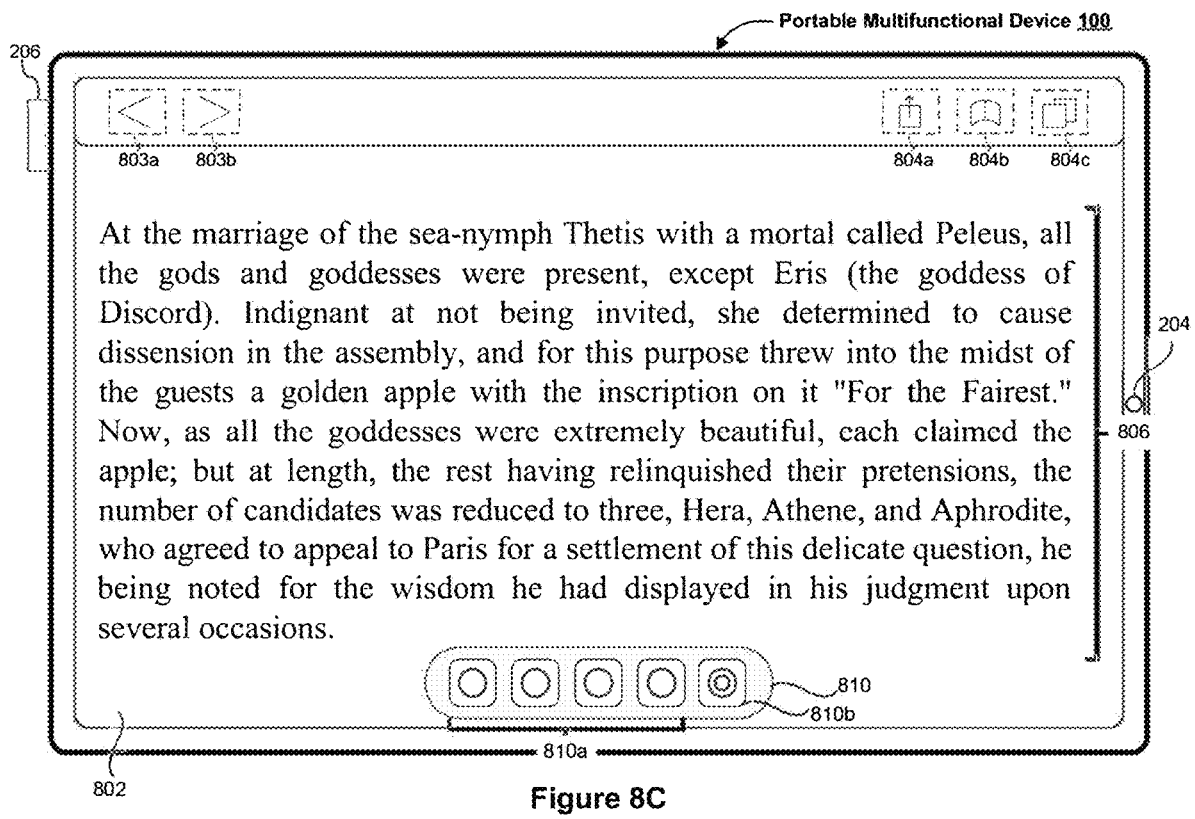

As illustrated in FIG. 8B, the electronic device 100 detects an input 808. In some embodiments, the input 808 corresponds to a drag input or a flick input detected on a touch-sensitive surface of the electronic device 100. In some embodiments, the input 808 corresponds to a mouse-drag input. In response to detecting the input 808 in FIG. 8B, the electronic device 100 displays an interface 810 in FIG. 8C. The interface 810 includes a plurality of application representations 810*a* corresponding to a plurality of applications. The interface 810 further includes a screenshot capture affordance 810*b*. For example, in some embodiments, the interface 810 corresponds to a dock that includes respective affordances that, when selected, cause the device to display a user interface for an application corresponding to the selected affordance. As another example, in some embodiments, the interface 810 corresponds to a control center that includes respective affordances for performing various functions, such as changing properties of an electronic device (e.g., change screen brightness level, turn on/off airplane mode) and invoking features of the electronic device (e.g., bring up a camera application, initiate screen mirroring).

Figure 8D:
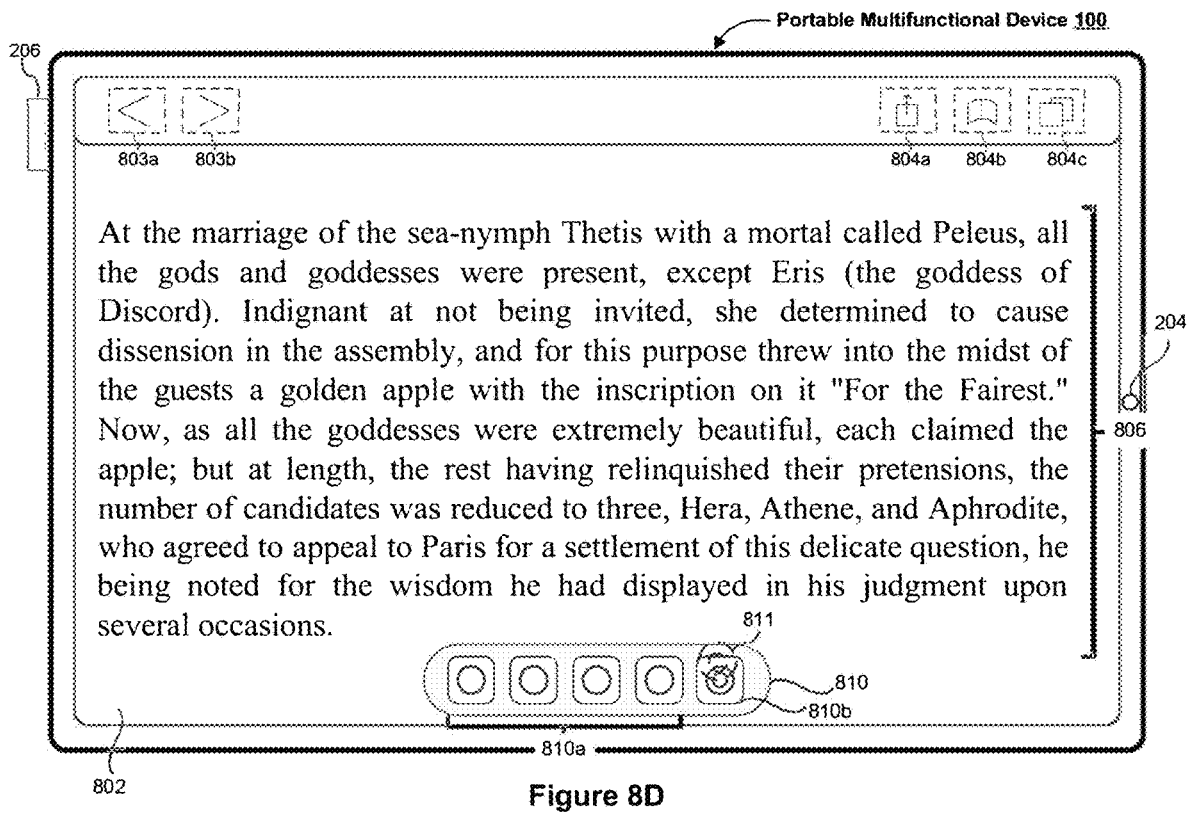
Figure 8E:
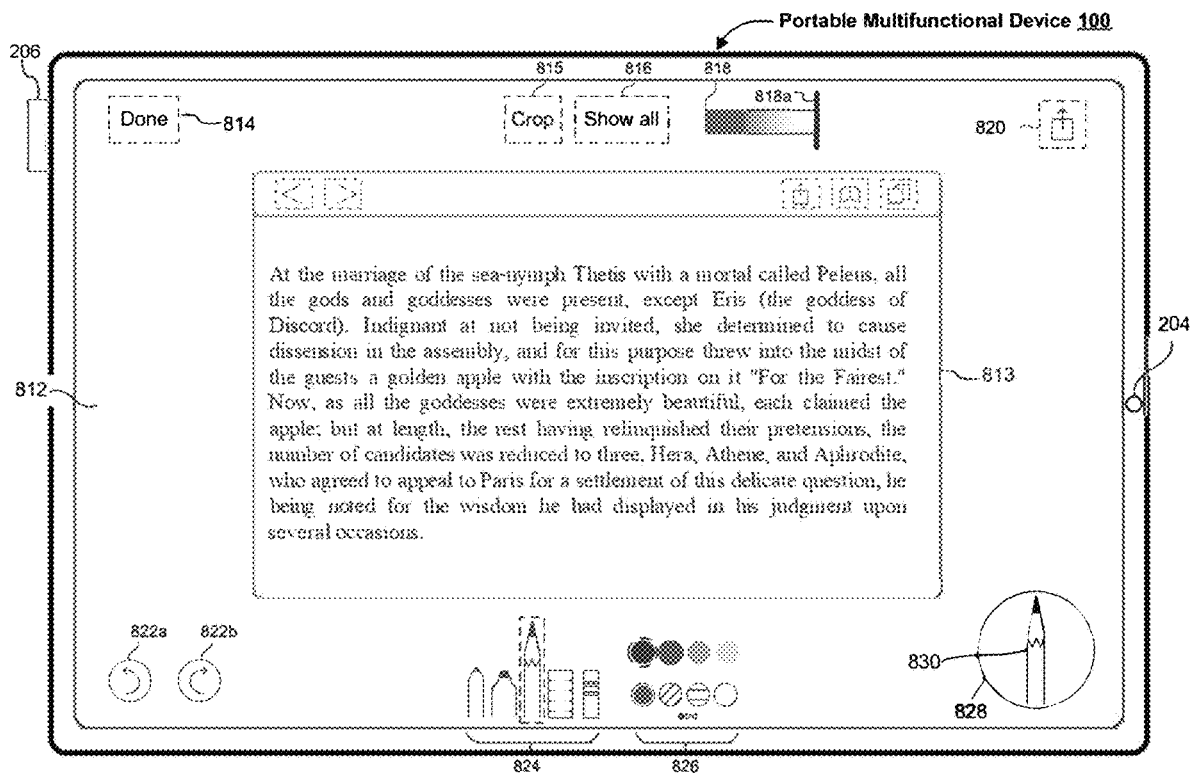

As illustrated in FIG. 8D, the electronic device 100 detects a first screenshot capture input 811 directed to the screenshot capture affordance 810*b*. The first screenshot capture input 811 is a first input type. In response to detecting the first screenshot capture input 811, the electronic device 100 captures the content 802 as a screenshot image and displays a screenshot editing interface 812 including the screenshot image 813 in FIG. 8E. The screenshot editing interface 812 also includes various affordances 814-816, 818, 820, 822*a*, 822*b*, 824, and 826 for editing (e.g., annotating) and manipulating the screenshot image 813. The screenshot editing interface 812 also includes a drawing tool indicator 828 indicating that the currently selected drawing tool is a black-tipped pencil 830.

Figure 8F:
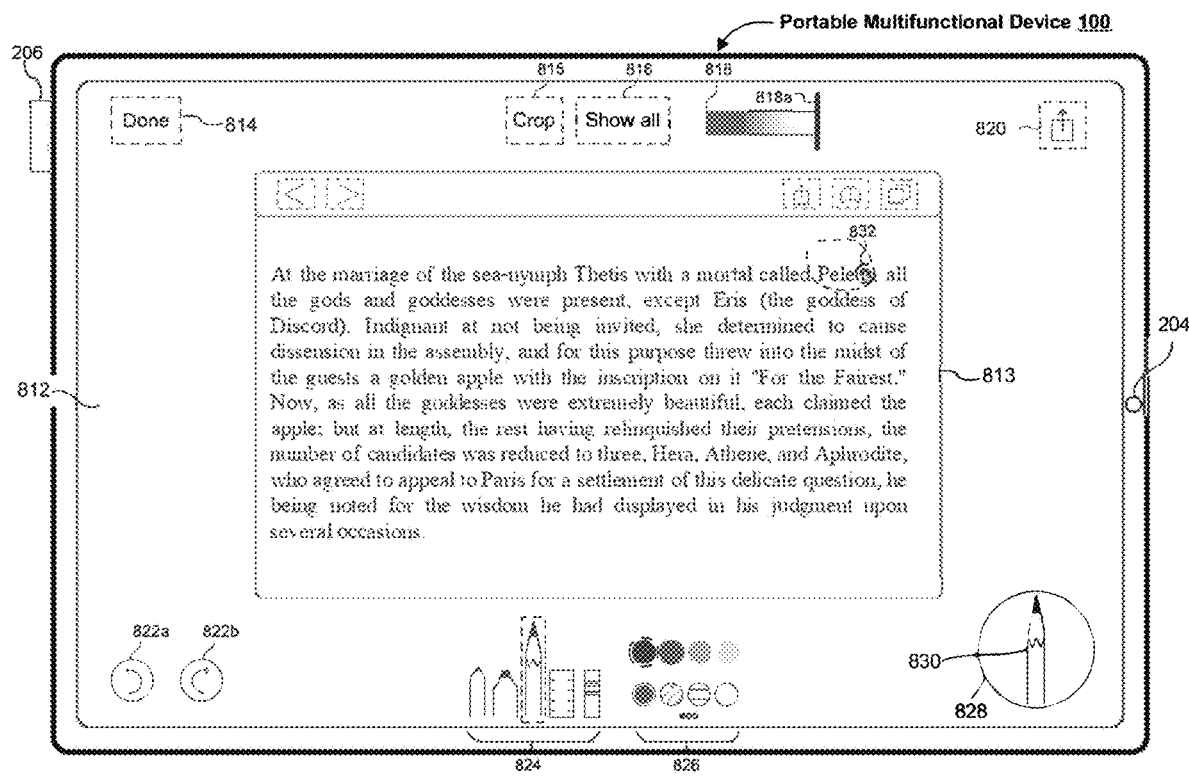
Figure 8G:
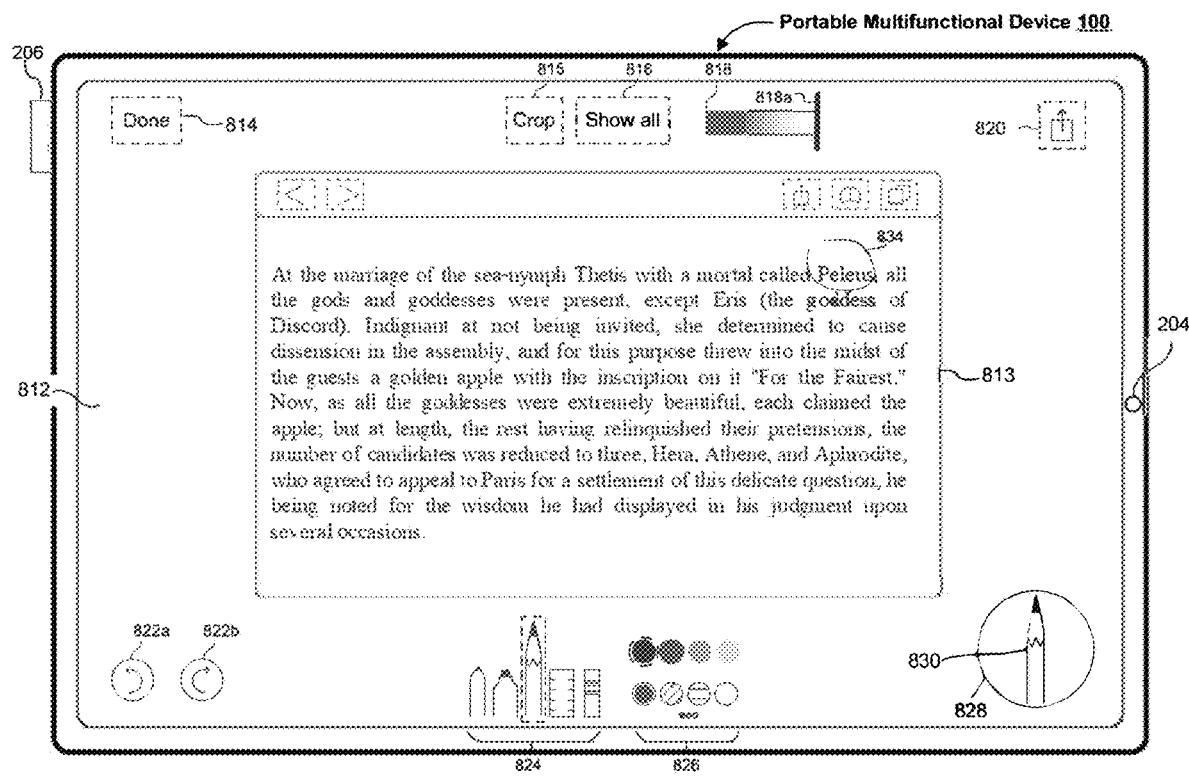
Figure 8H:
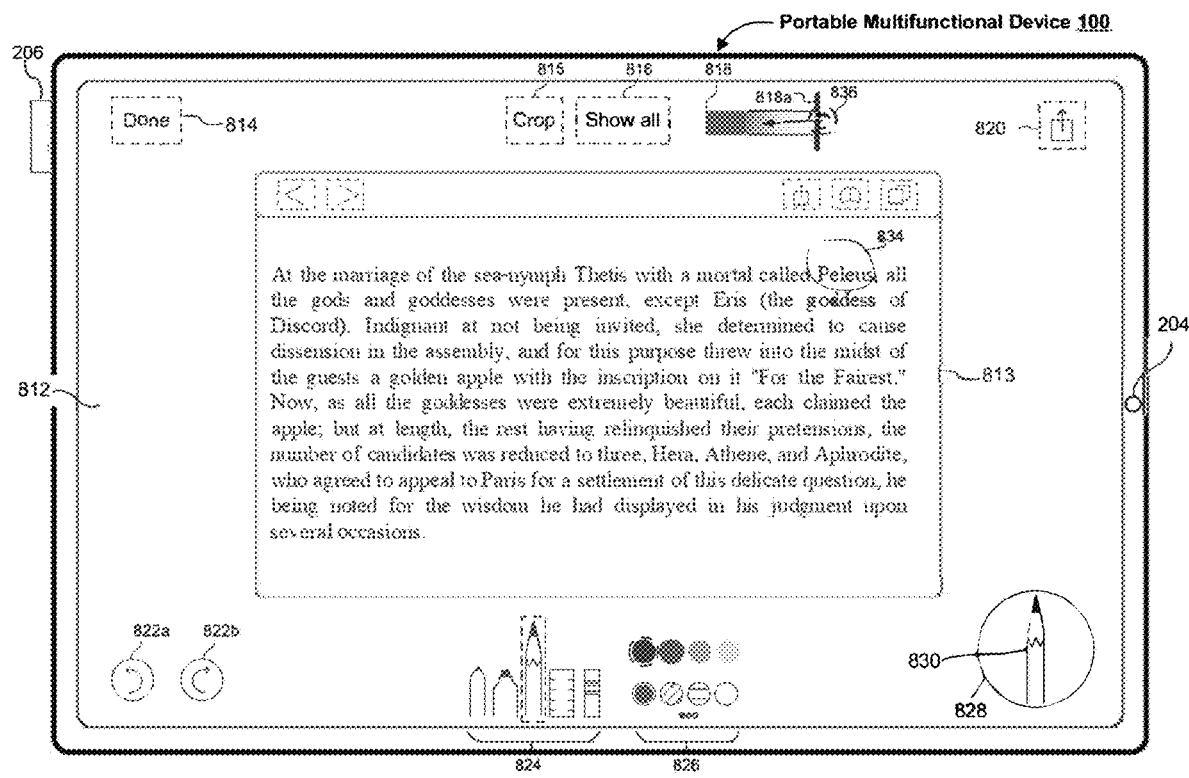
Figure 8I:
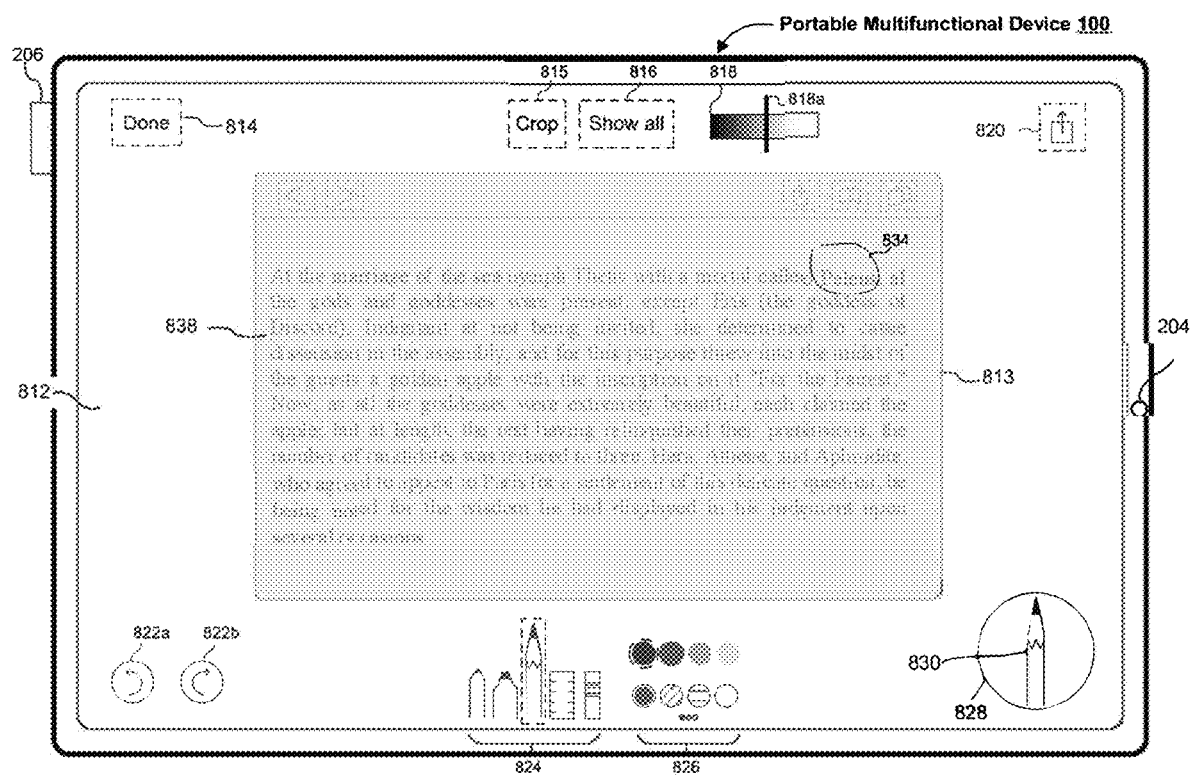
Figure 8J:
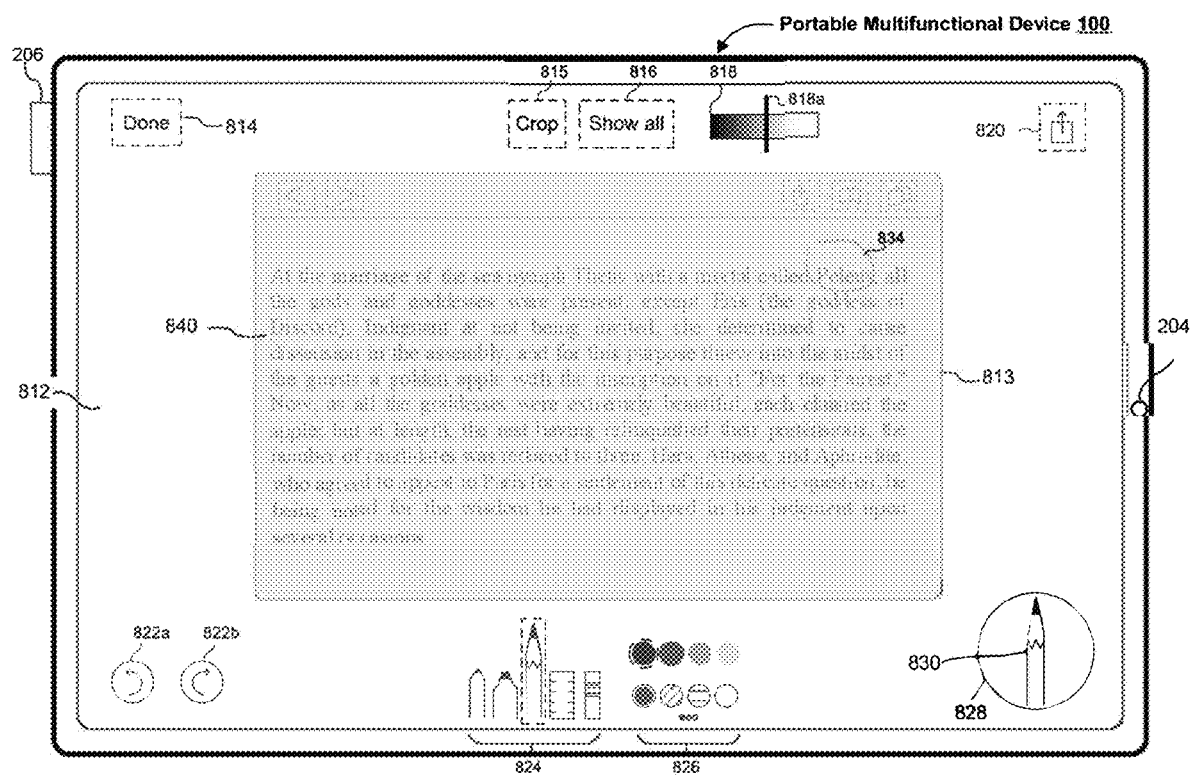
Figure 8K:
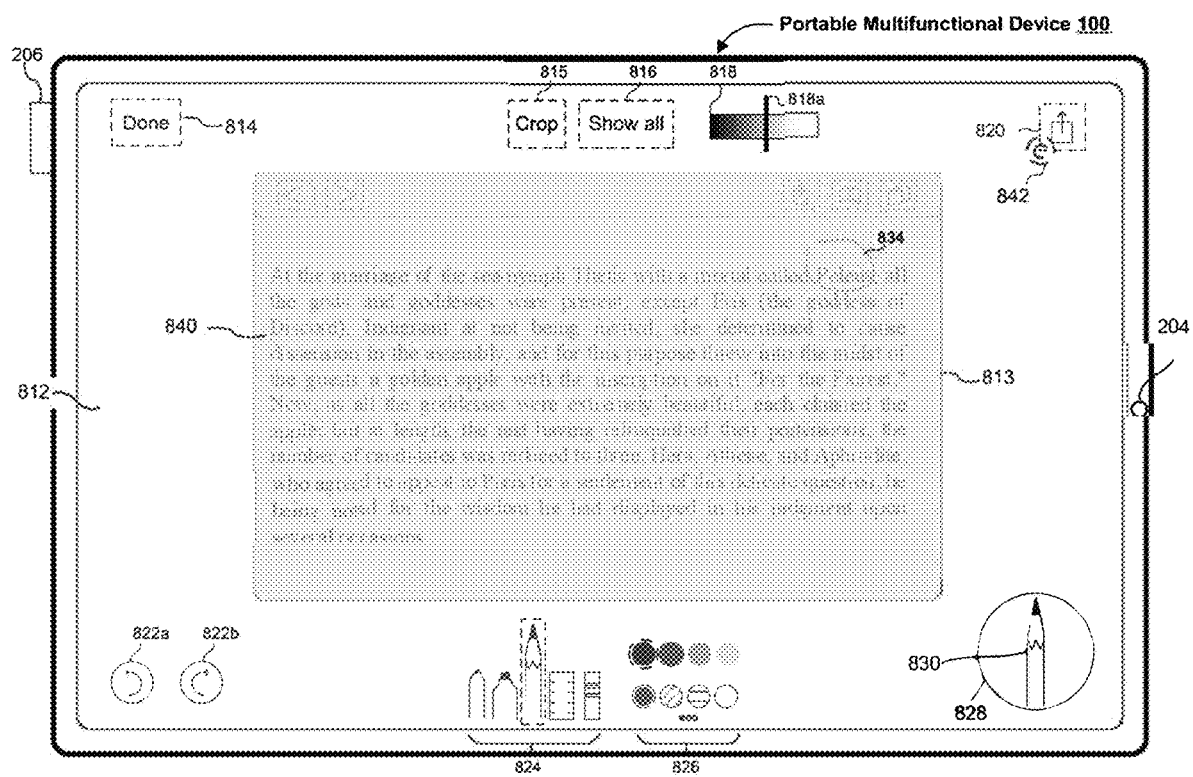
Figure 8L:
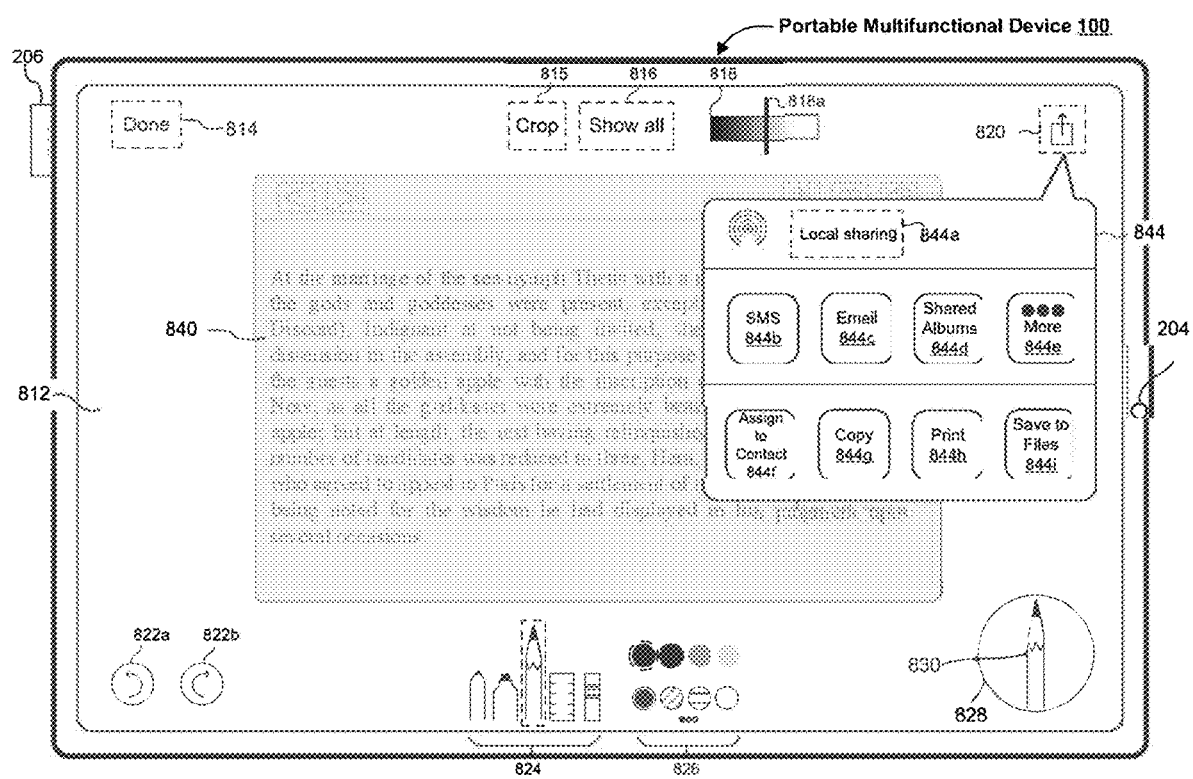
Figure 8M:
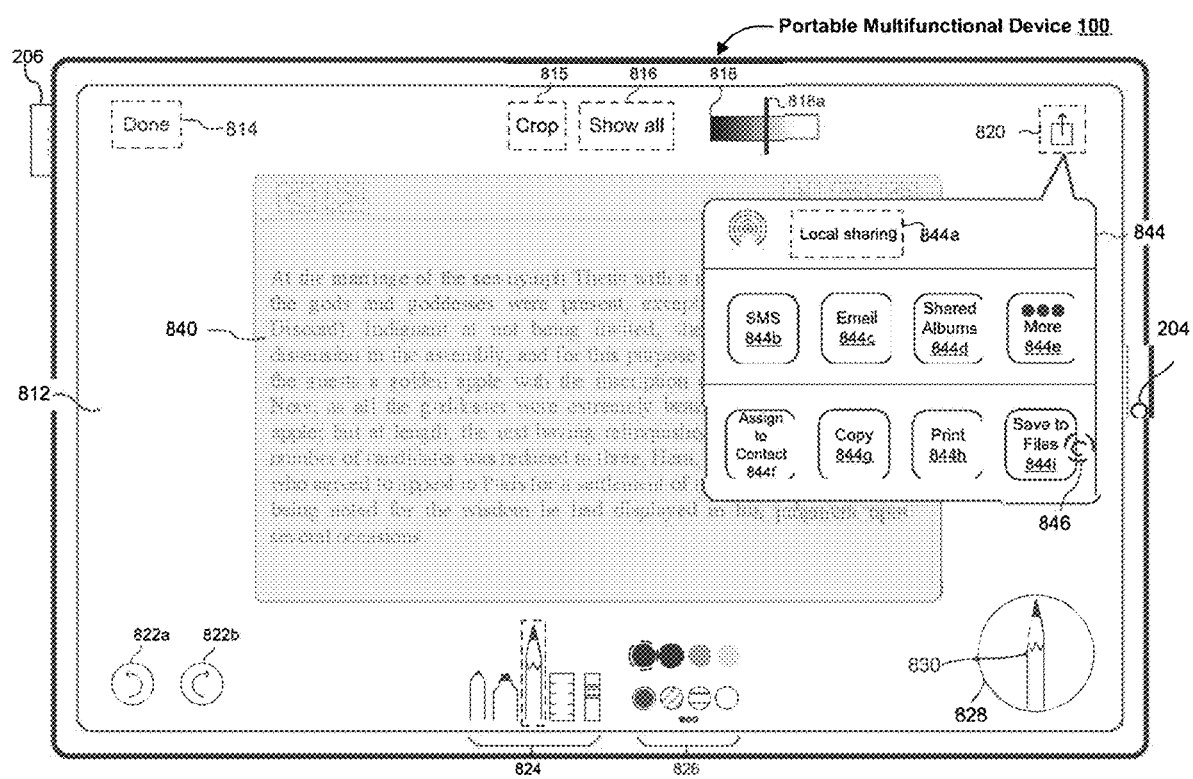
Figure 8N:
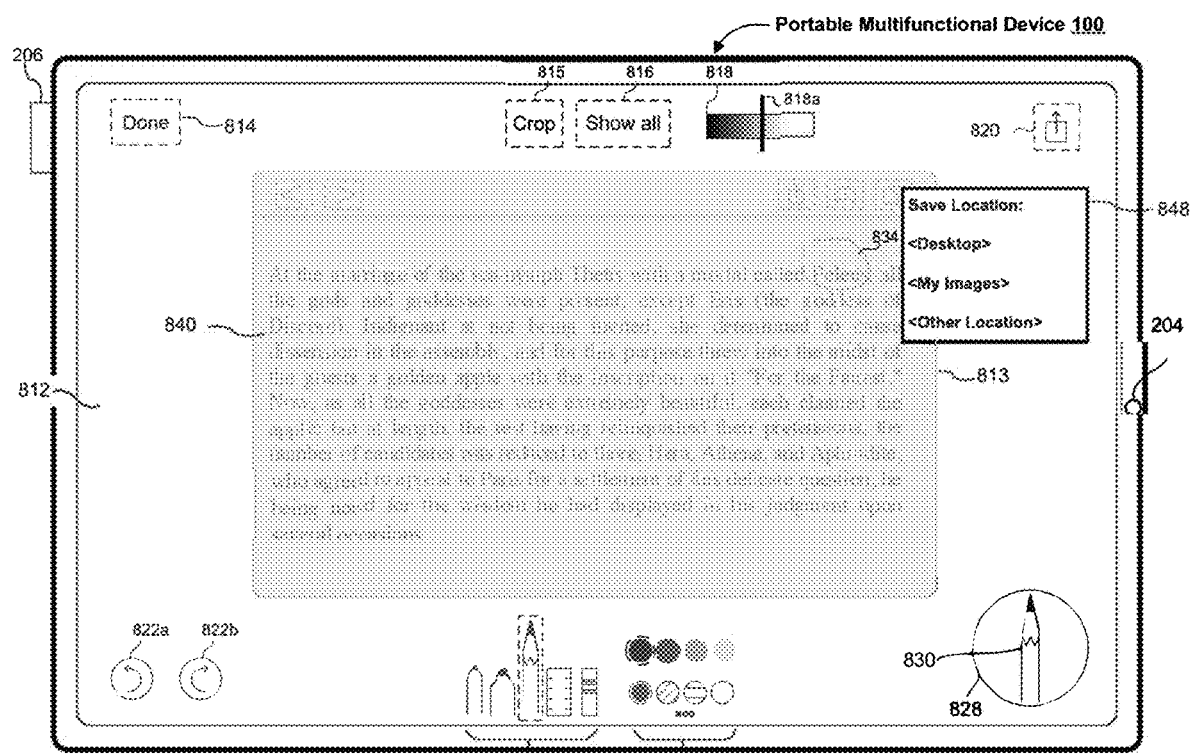
Figure 8O:
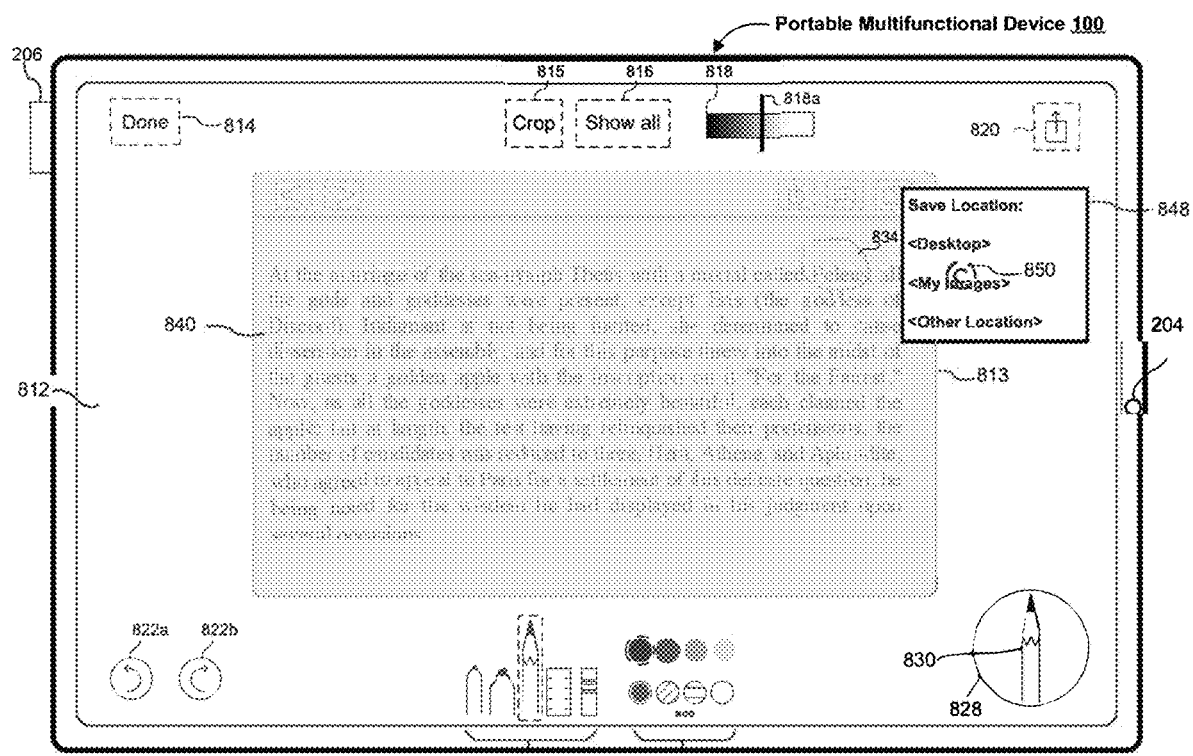
Figure 8P:
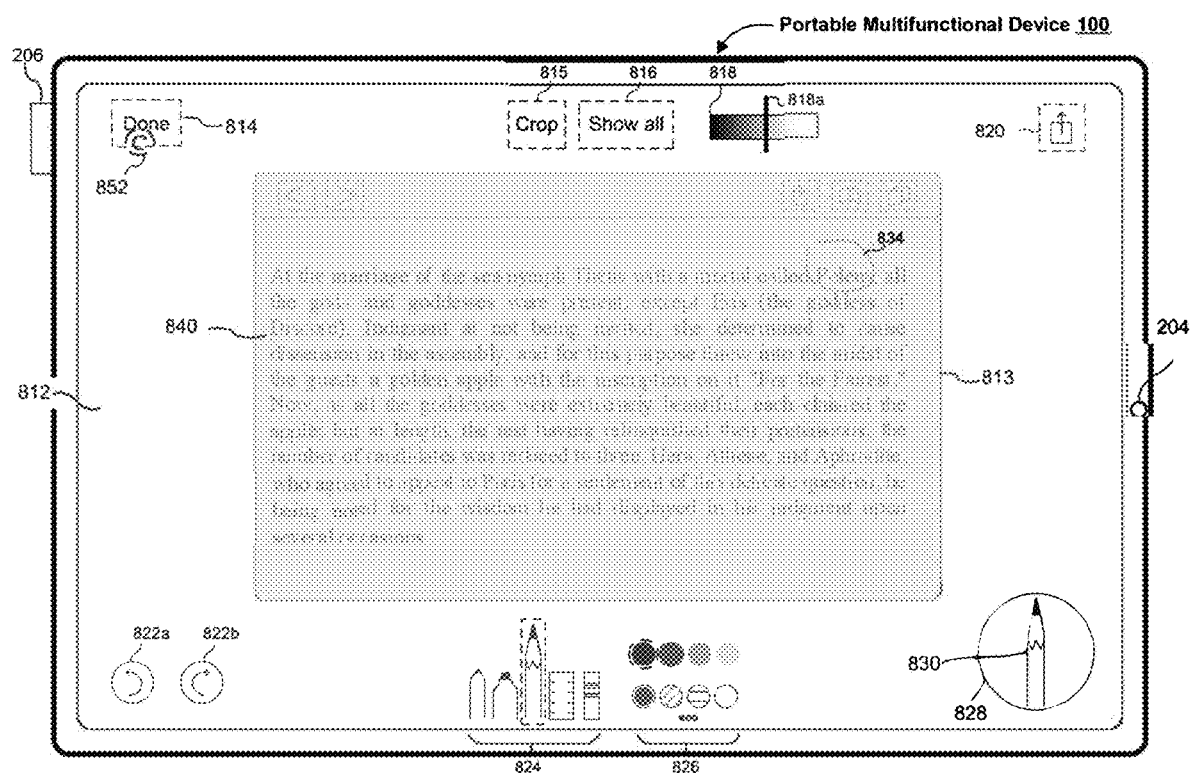
Figure 8Q:
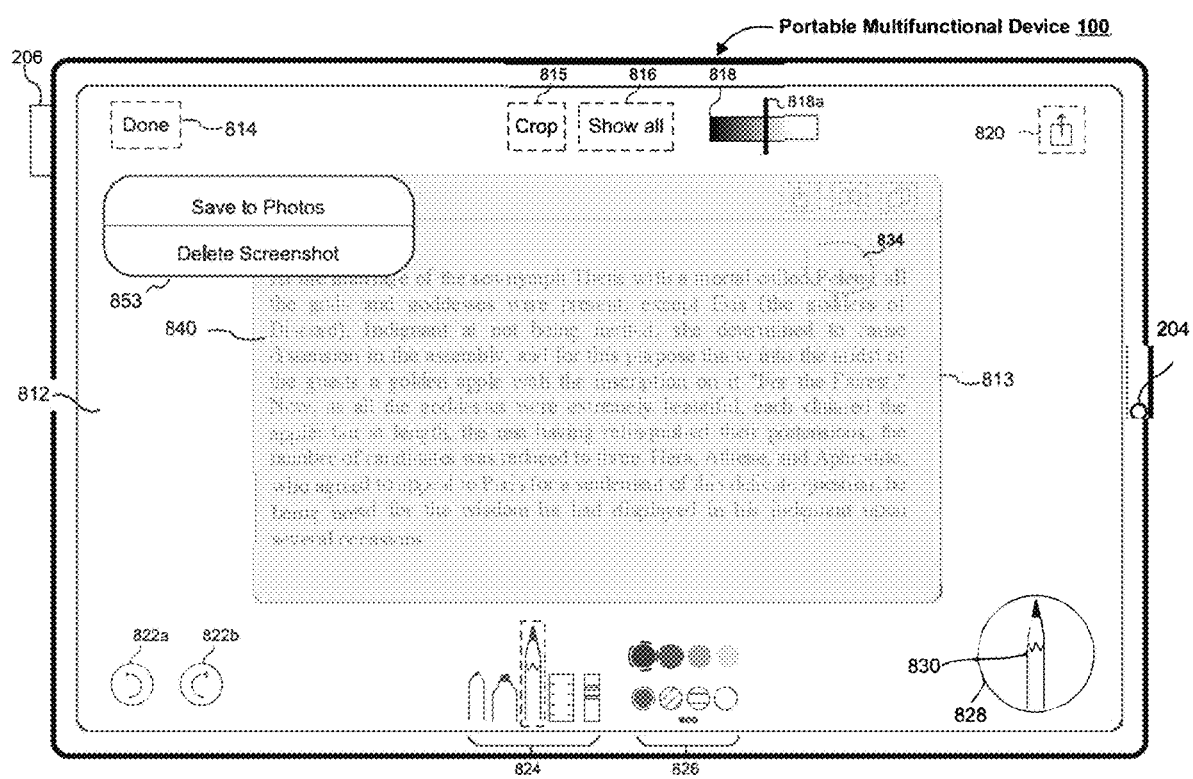
Figure 8R:
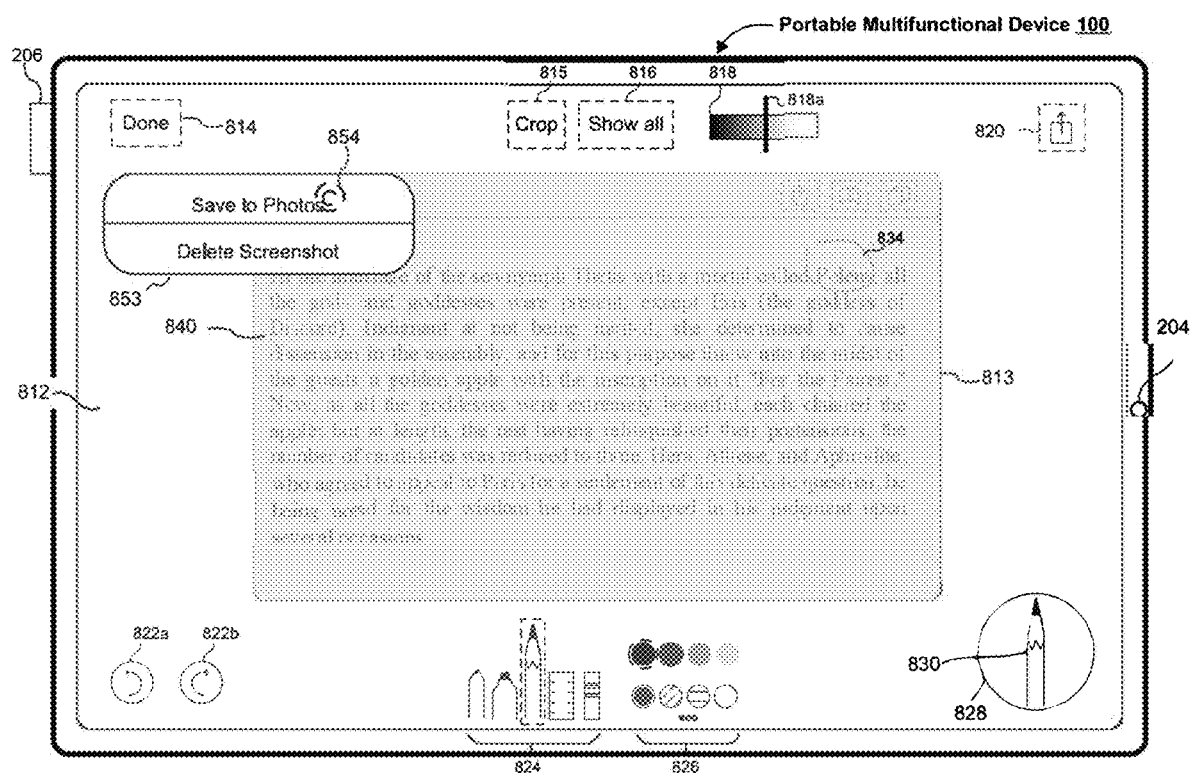
Figure 8S:
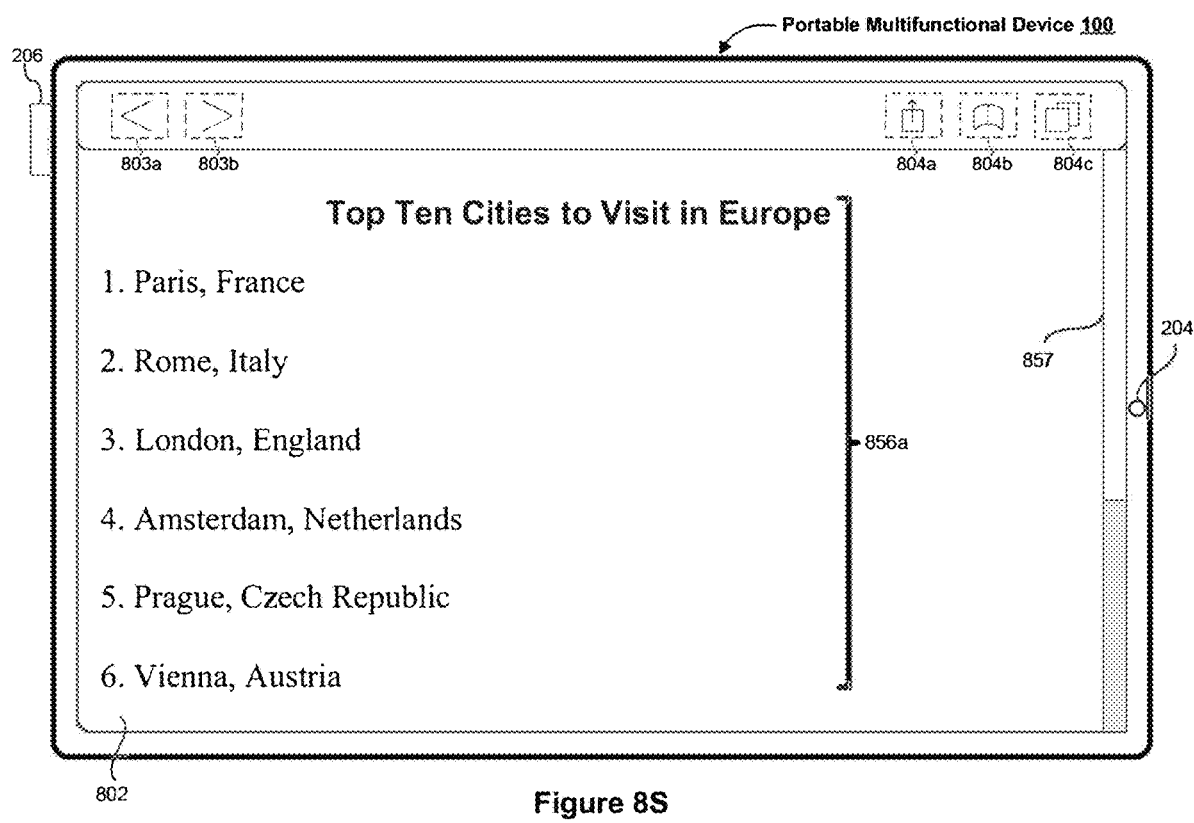

According to some embodiments, in response to activation (e.g., selection with a contact) of the affordance 814 (e.g., the done affordance), the electronic device 100 displays a done interface that enables saving or discarding (e.g., deleting) the screenshot image 813, as is illustrated in FIGS. 8P-8R.

According to some embodiments, in response to activation (e.g., selection with a contact) of the affordance 815 (e.g., the crop affordance), the electronic device 100 enters a cropping mode and enables cropping of the screenshot image 813. For example, the electronic device 100 displays movable cropping handles around corners of the screenshot image 813.

According to some embodiments, in response to activation (e.g., selection with a contact) of the affordance 816 (e.g., the show all affordance), the electronic device 100 displays additional content within the screenshot image 813 that was not displayed on the display when the first screenshot capture input 811 was detected. Examples of this functionality are provided below, with reference to FIGS. 8X, 8Y, and 8AI-8AL.

According to some embodiments, in response to activation (e.g., selection with a contact or with a drag of the opacity value indicator 818*a*) of the affordance 818 (e.g., the opacity level affordance), the electronic device 100 changes an opacity of a filtering layer that is overlaid on the screenshot image 813. Examples of this functionality are provided below, with reference to FIGS. 8H-8J, 8Z, and 8AA.

According to some embodiments, in response to activation (e.g., selection with a contact) of the affordance 820 (e.g., the share affordance), the electronic device 100 displays a transport interface overlaid on the screenshot editing interface 812 provided to share the screenshot image 813 via one or more communication means, such as email, SMS, etc., and/or to perform one of a plurality of operations on the web page such as a copy operation, a print operation, etc. Examples of this functionality are provided below, with reference to FIGS. 8K-8O.

According to some embodiments, in response to activation (e.g., selection with a contact) of the affordance 822*a* (e.g., the undo affordance), the electronic device 100 reverts one or more previous modifications to the screenshot image 813. According to some embodiments, in response to activation (e.g., selection with a contact) of the affordance 822*b* (e.g., the redo affordance), the electronic device 100 reapplies one or more previously reverted modifications to the screenshot image 813.

According to some embodiments, in response to activation (e.g., selection with a contact) of one of the set of affordances 824 (e.g., the set of drawing tools affordance), the electronic device 100 sets the currently selected drawing tool and, in various circumstances, changes the currently selected tool 830. According to some embodiments, in response to activation (e.g., selection with a contact) of one of the set of affordances 826 (e.g., the color pots), the electronic device 100 sets the currently selected drawing tool color and, in various circumstances, changes the color of the currently selected tool 830 (e.g., changes the tip of the tool).

As illustrated in FIG. 8F, the electronic device 100 detects an annotation input 832 that circle the word "Peleus" within the screenshot image 813. In response to detecting the annotation input 832 in FIG. 8F, the electronic device 100 displays a corresponding annotation 834 in FIG. 8G. The characteristics of the annotation 834 are based on the currently selected drawing tool 824 (e.g., a pencil), including its color 826 (e.g., black).

As illustrated in FIG. 8H, the electronic device 100 detects a drag input 836 directed to the opacity value indicator 818a of the opacity level affordance 818. The drag input 836 moves the opacity value indicator 818a to a respective opacity value, as illustrated in FIG. 8I. In some embodiments, in response to detecting a tap input directed to the respective opacity value, the electronic device 100 moves the opacity value indicator 818a to the respective opacity value.

In some embodiments, in response to detecting the drag input 836 in FIG. 8H, the electronic device changes an opacity of a first filtering layer 838 that is overlaid on the screenshot image 813 to the respective opacity value, as is illustrated in FIG. 8I. Notably, the electronic device 100 overlays the first filtering layer 838 on the screenshot image 813 and overlays the annotation 834 on the first filtering layer 838, as illustrated in FIG. 8I.

In some embodiments, in response to detecting the drag input 836 in FIG. 8H, the electronic device changes an opacity of a second filtering layer 840 that is overlaid on the screenshot image 813 and the annotation 834 to the respective opacity value, as is illustrated in FIG. 8J. Notably, the electronic device 100 overlays the second filtering layer 840 on the screenshot image 813 and on the annotation 834, as illustrated in FIG. 8J.

As illustrated in FIG. 8K, the electronic device 100 detects an input 842 directed to the share affordance 820. In response to detecting the input 842 in FIG. 8K, the electronic device 100 displays a transport interface 844 overlaid on the screenshot editing interface 812 in FIG. 8L. The transport interface 844 includes a local sharing affordance 844a provided to share the screenshot image 813 via a local interface (e.g., BLUETOOTH, NFC, WiFi, and/or the like), remote sharing affordances 844b-844e provided to share the screenshot image 813 via corresponding communication means (e.g., SMS, email, cloud storage, and others), and operation affordances 844f-844i provided to perform corresponding operations on the screenshot image 813.

As illustrated in FIG. 8M, the electronic device 100 detects an input 846 directed to an affordance 844i (e.g., save to files affordance). In response to detecting the input 846 in FIG. 8M, the electronic device 100 displays a first save interface 848 in FIG. 8N. The first save interface 848 provides various save locations for the screenshot image 813, the second filtering layer 840, and the annotation 834. As illustrated in FIG. 8O, the electronic device 100 detects a subsequent input 850 requesting to save the screenshot image 813 to the "My images" folder. Accordingly, the electronic device 100 saves the screenshot image 813 to the "My images" folder and ceases to display the first save interface 848 in FIG. 8P. In some embodiments, in response to detecting the subsequent input 850, the electronic device 100 saves the screenshot image 813 and the second filtering layer 840 as separately editable.

As illustrated in FIG. 8P, the electronic device 100 detects an input 852 directed to the done affordance 814. In response to detecting the input 852 in FIG. 8P, the electronic device 100 displays a second save interface 853 in FIG. 8Q. The second save interface 853 includes a "Save to Photos" affordance and a "Delete Screenshot" affordance. As illustrated in FIG. 8R, the electronic device 100 detects a subsequent input 854 directed to the "Save to Photos" affordance. Accordingly, the electronic device 100 saves the screenshot image 813 to a "Photos" area and ceases to display the second save interface 853. In some embodiments, in response to detecting the subsequent input 854, the electronic device 100 stores the screenshot image 813 and the second filtering layer 840 as a flattened image.

FIGS. 8S-8Y illustrate updating a screenshot image in order to include additional content that was not displayed on the display when the electronic device 100 captured a screenshot image in response to detecting a screenshot capture input of a second input type. In some embodiments, the electronic device 100 updates the screenshot image captured in response to detecting the screenshot capture input of the first input type, such as illustrated in FIG. 8D. Referring back to FIG. 8S, the electronic device 100 displays content 802 including a partial list 856a of the "Top Ten Cities to Visit in Europe." Notably, the remainder of the list 856b (e.g., cities 7-10) is not displayed in FIG. 8S, but would be viewable in response to a scroll down input on a scrollbar 857.

Figure 8T:
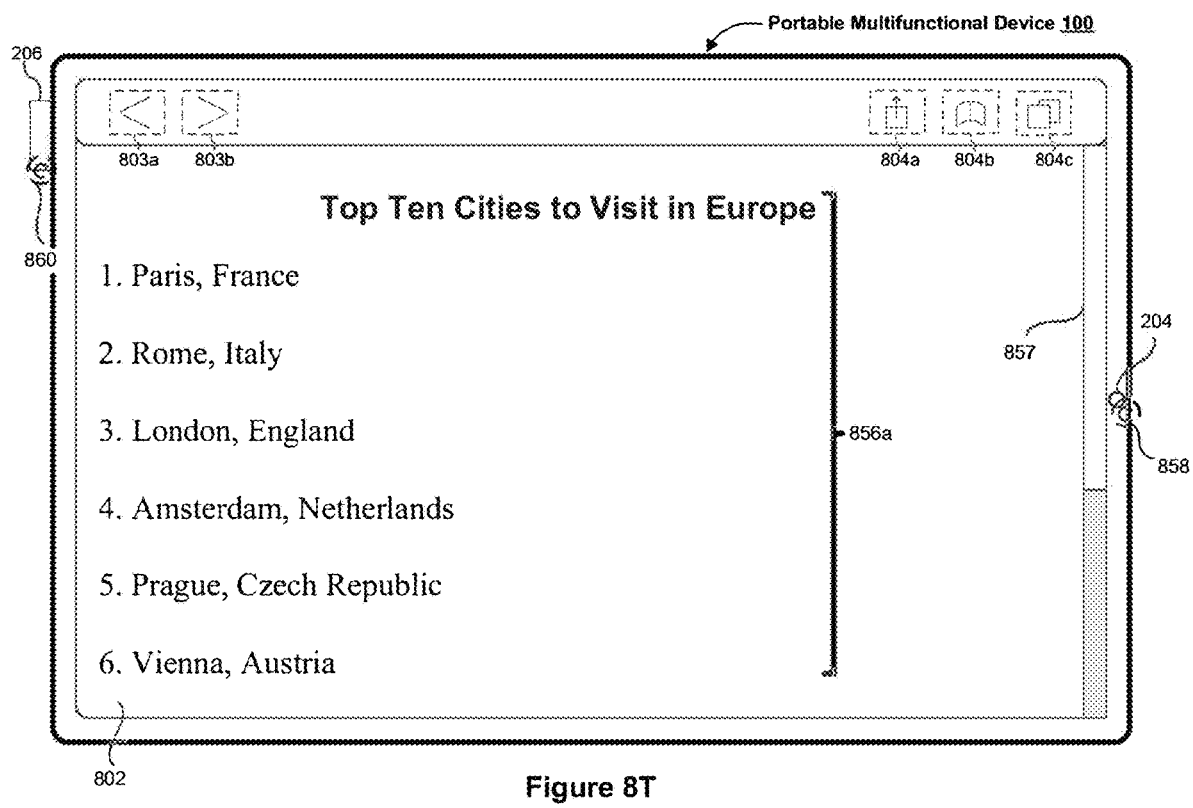

As illustrated in FIG. 8T, the electronic device 100 detects second screenshot capture inputs 858 and 860 directed to the home button 204 and the push button 206, respectively. Collectively, the second screenshot capture inputs 858 and 860 are a second input type different from the first input type associated with the first screenshot capture input 811 in FIG. 8D. Accordingly, in some embodiments, the second input type corresponds to hardware inputs, such as presses to hardware buttons (e.g., the home button 204 and the push button 206), whereas the first input type corresponds to a touch input or mouse input directed to a particular affordance (e.g., the first screenshot capture input 811 directed to the screenshot capture affordance 810b in FIG. 8D).

Figure 8U:
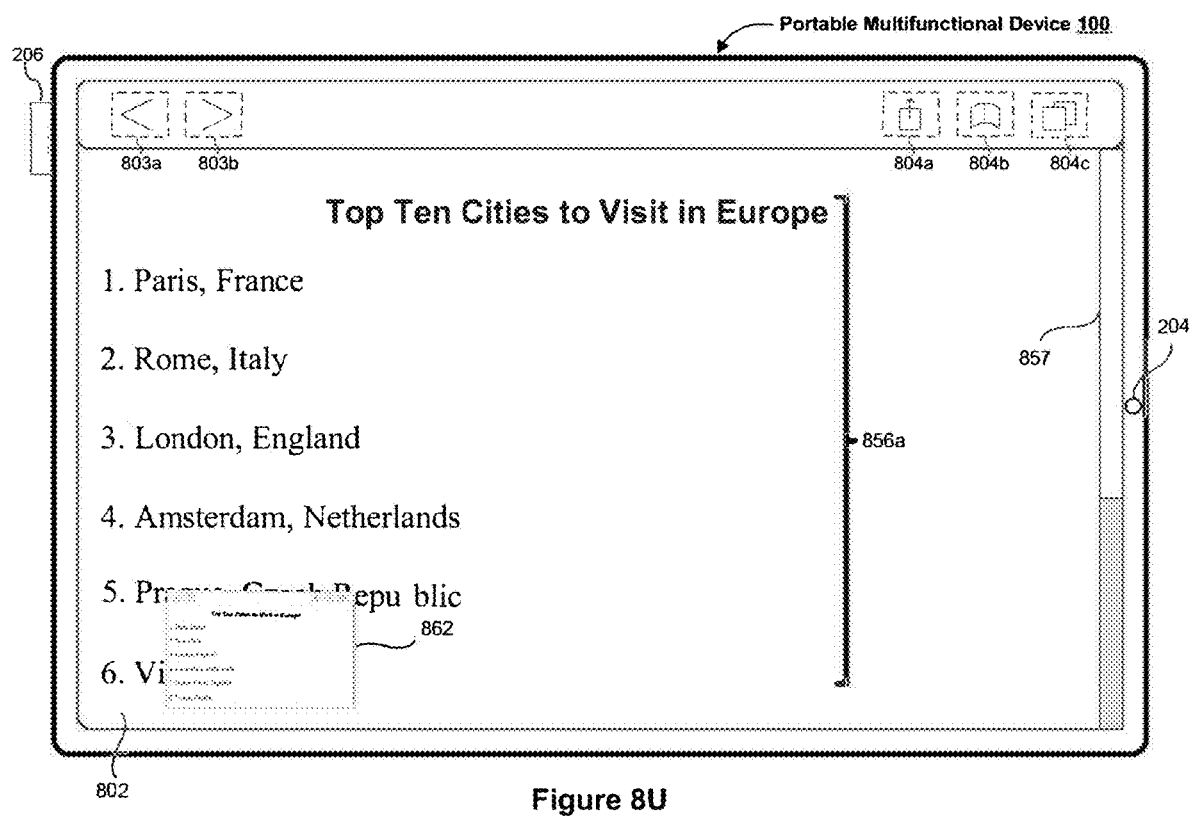

In response to detecting the second screenshot capture inputs 858 and 860 in FIG. 8T, the electronic device 100 displays a thumbnail representation 862 of a first screenshot image 866 overlaid on the content 802 in FIG. 8U. In some embodiments, the electronic device 100 sizes the thumbnail representation 862 according to the dimensions of the display of the electronic device 100. For example, the first screenshot image 866 is shrunk in order to generate the thumbnail representation 862 based on predefined dimensions, a predefined aspect ratio, and/or a predefined resolution.

Figure 8V:
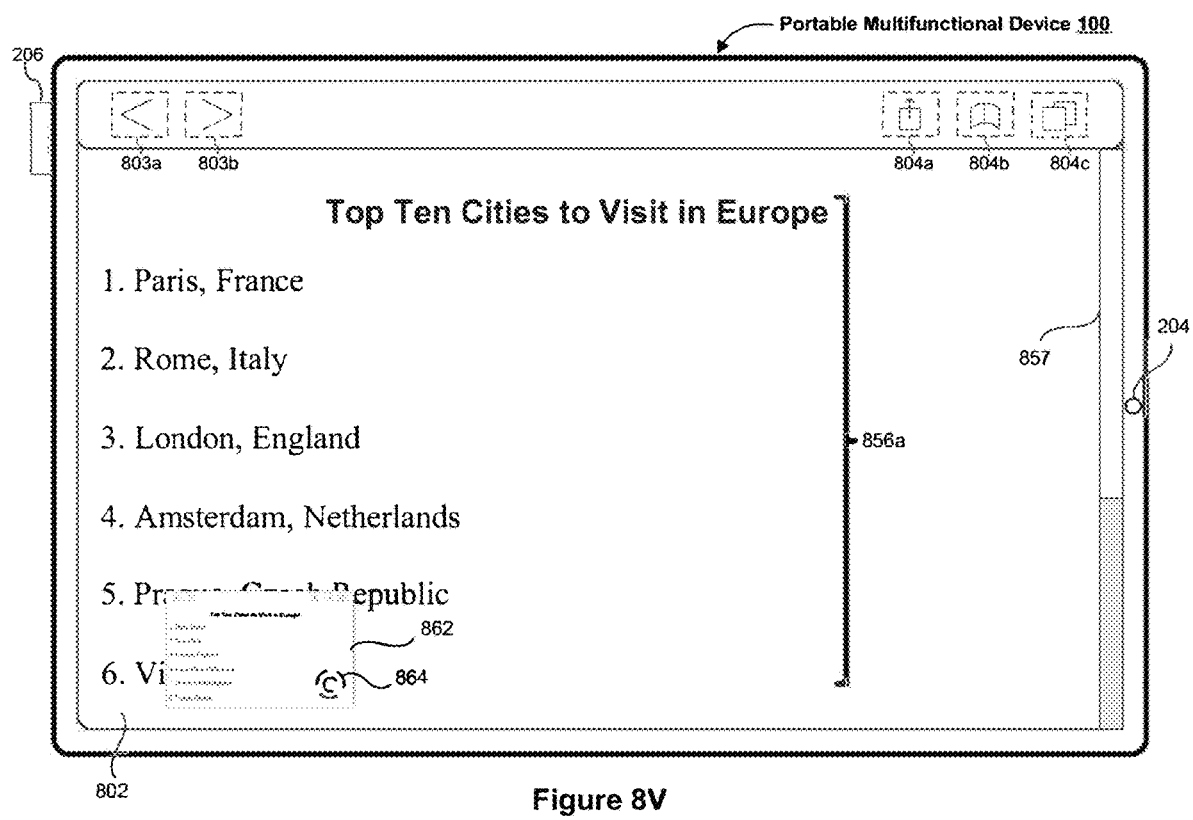
Figure 8W:
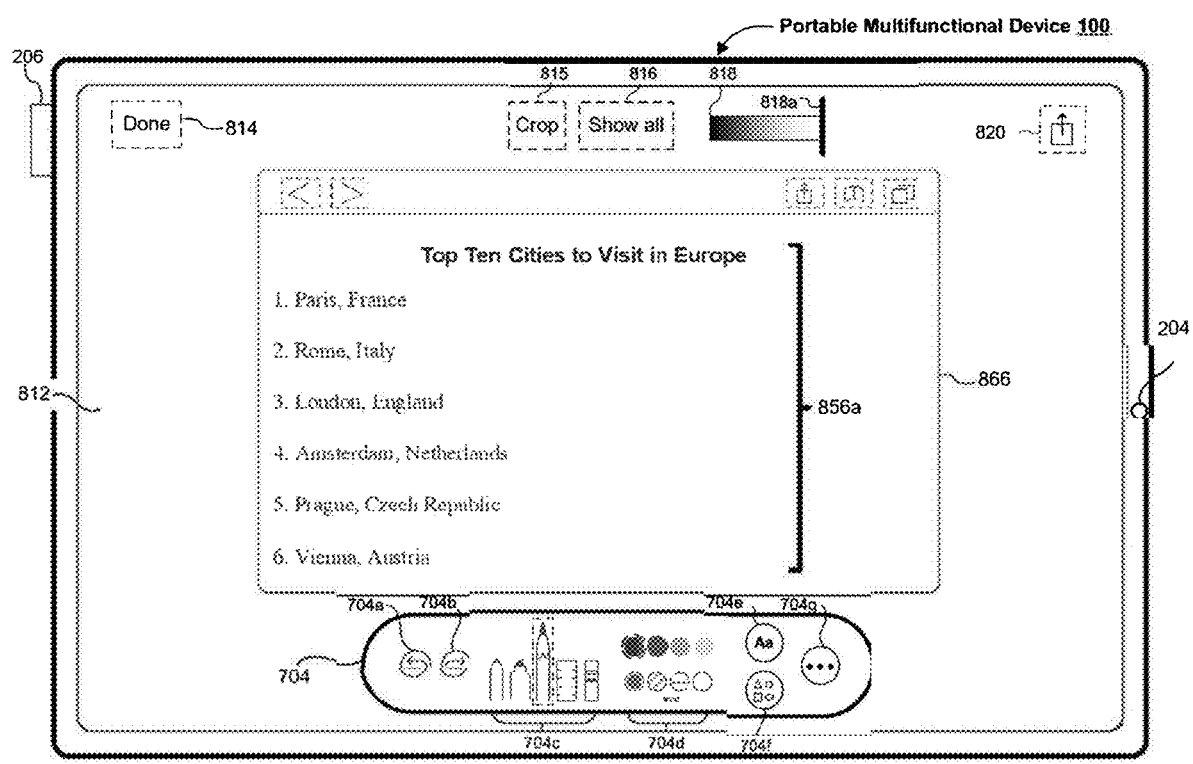

As illustrated in FIG. 8V, the electronic device 100 detects a first input 864 directed to the thumbnail representation 862. In response to detecting the first input 864 in FIG. 8V, the electronic device 100 displays the screenshot editing interface 812 (e.g., as described above with reference to FIG. 8E) including the first screenshot image 866 in FIG. 8W. Notably, as with the content 802 displayed in FIG. 8S, the first screenshot image 866 includes the partial list 856a but not the remainder of the list 856b. In some embodiments, as illustrated in FIG. 8W, the electronic device 100 displays the first drawing palette 704 having the first appearance. The first drawing palette 704 is movable within the screenshot editing interface 812, as is described, below, with reference to FIGS. 8AB-8AE.

Figure 8X:
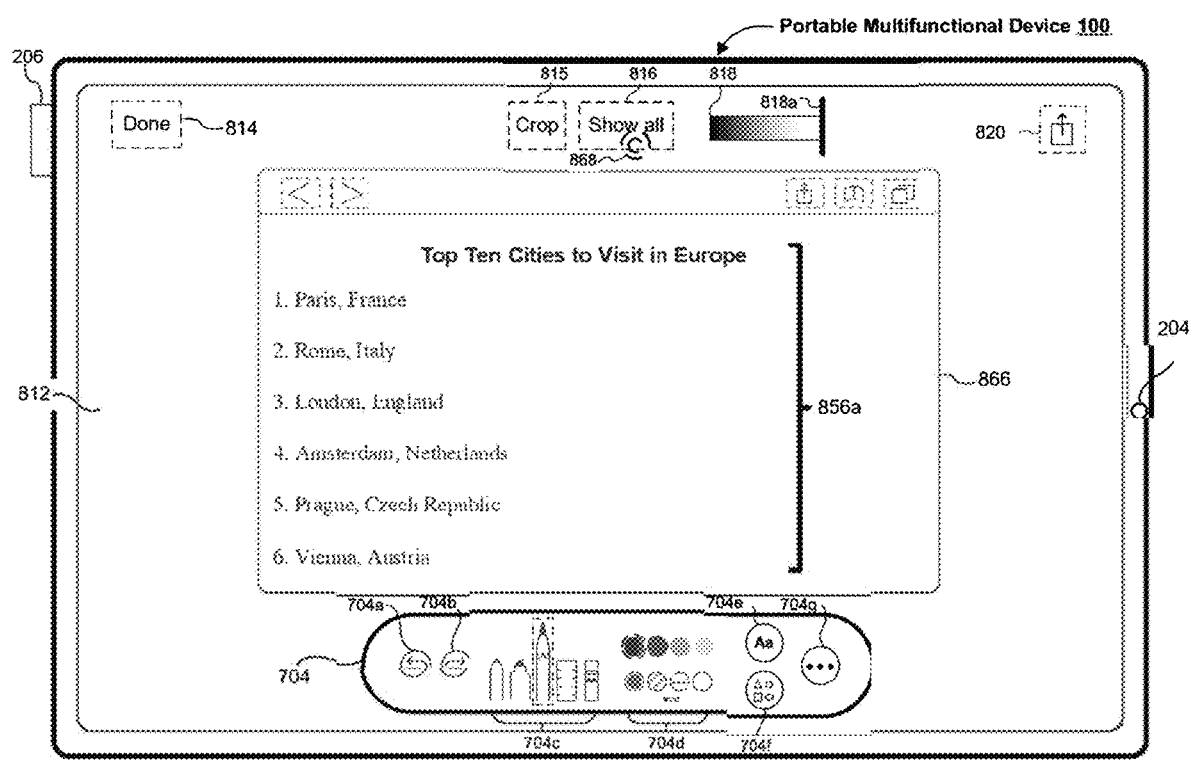

As illustrated in FIG. 8X, the electronic device 100 detects an input 868 directed to the affordance 816 (e.g., the show all affordance). In response to detecting the input 868 in FIG. 8X, the electronic device 100 displays a second screenshot image 870 in FIG. 8Y. As compared with the first screenshot image 866, the second screenshot image 870 includes additional content 856*b* corresponding to the remainder of the list.

Figure 8Y:
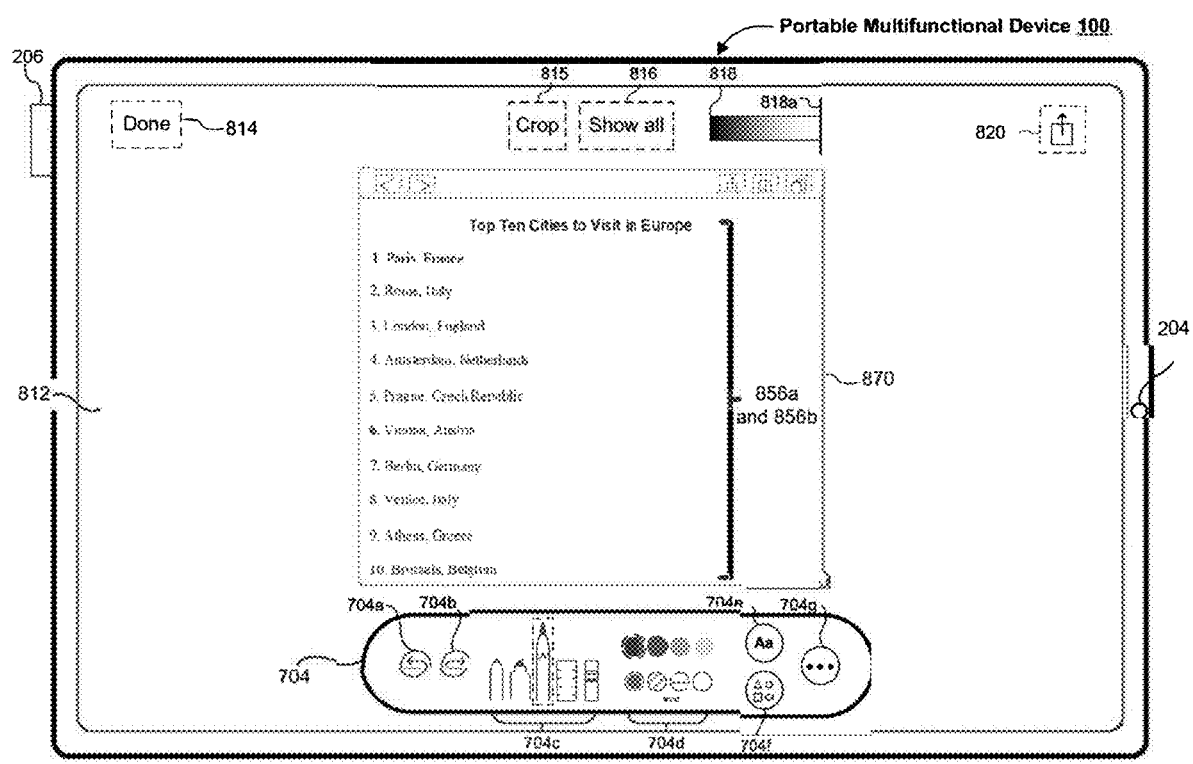
Figure 8Z:
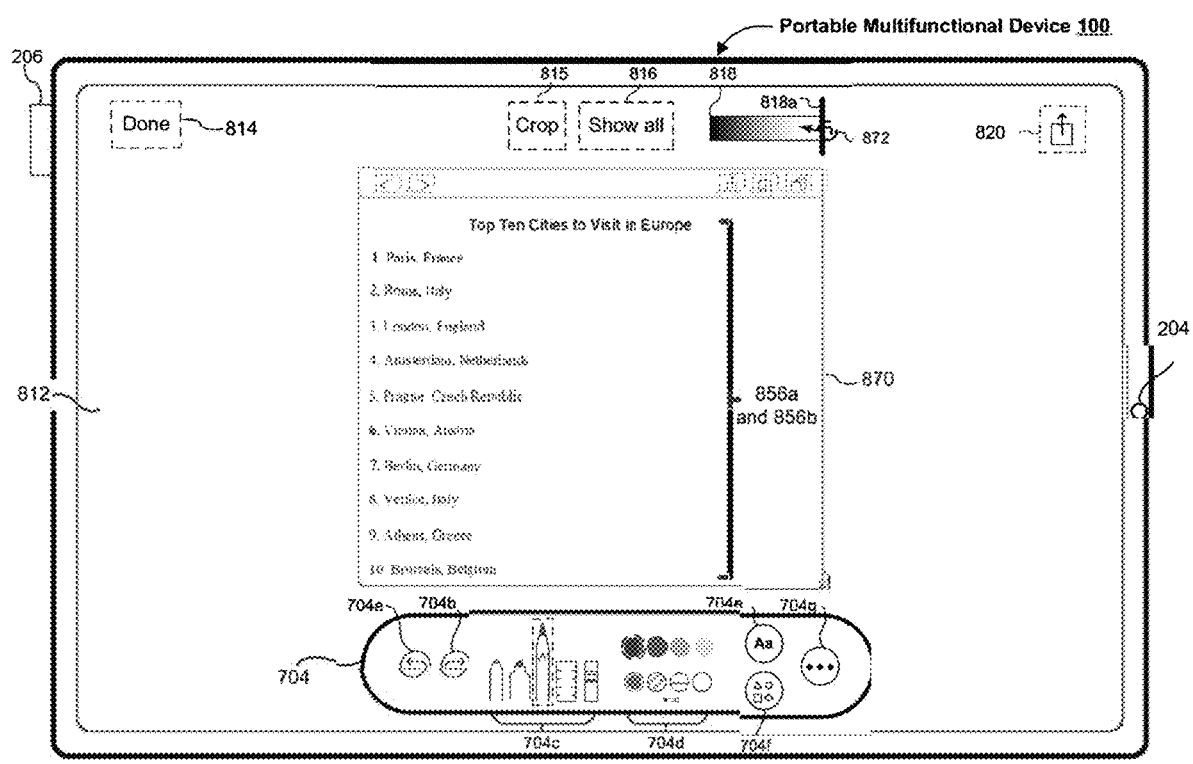
Figure 8A:
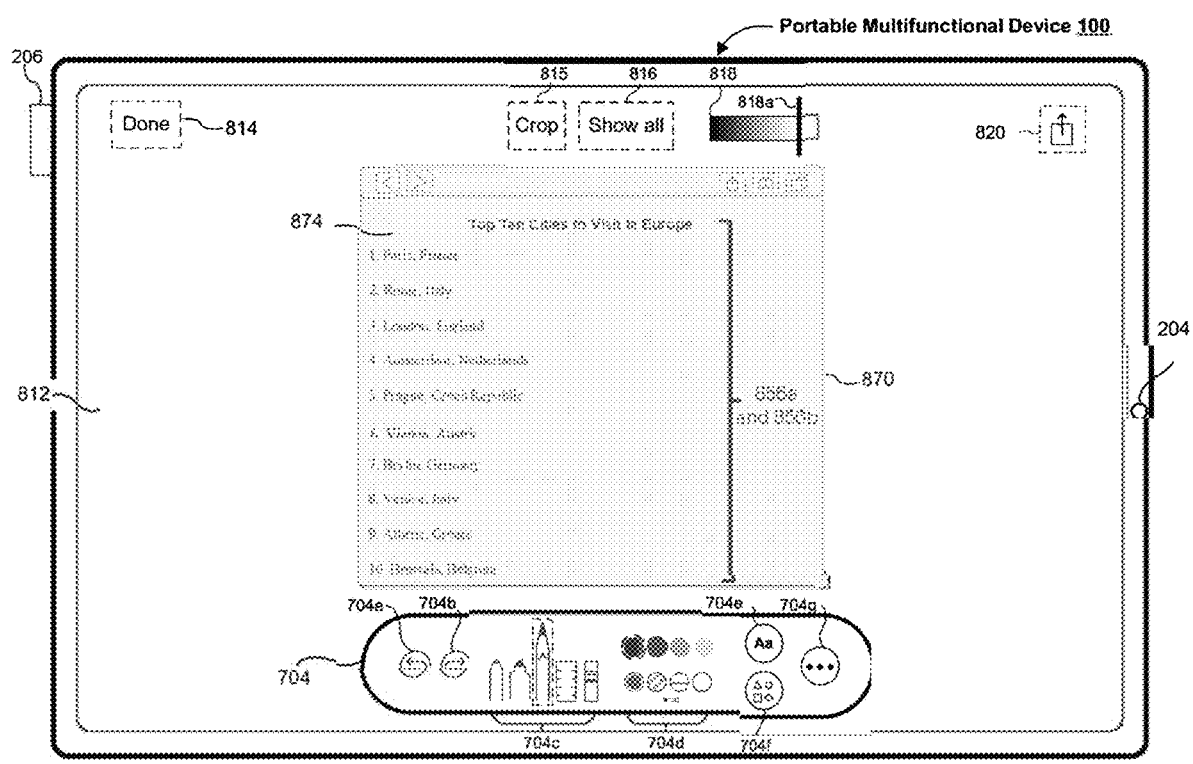
Figure 8A:
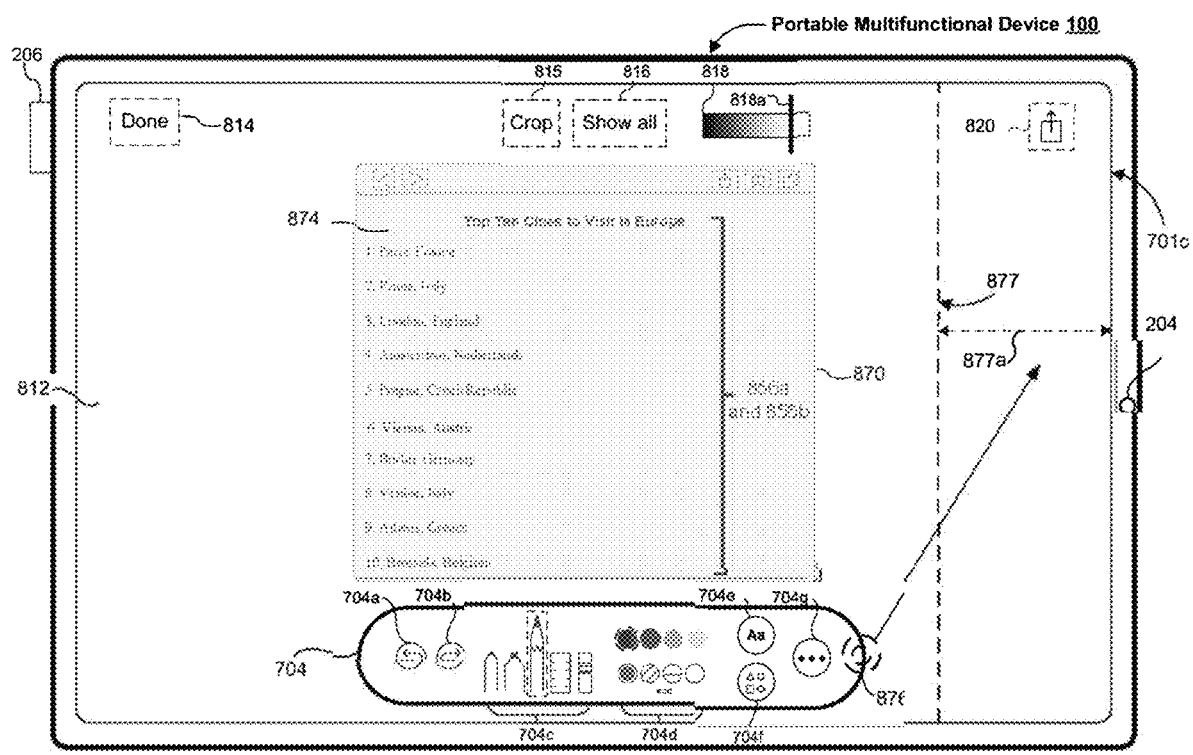
Figure 8A:
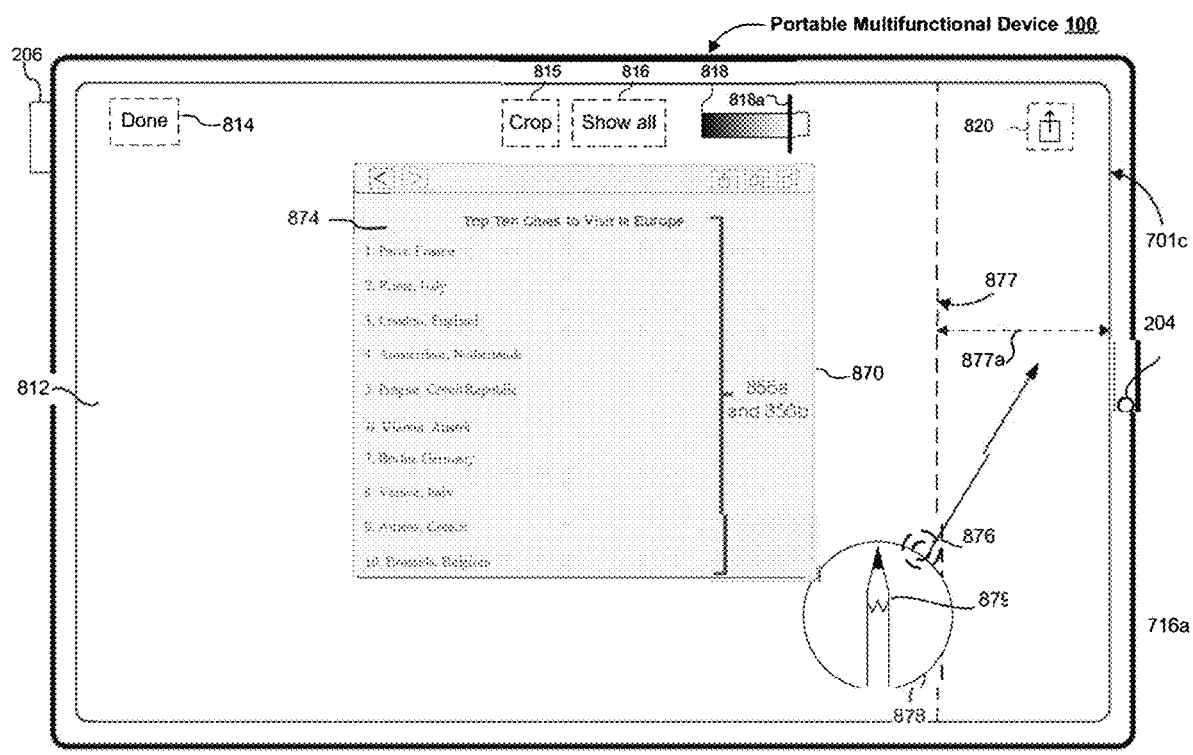
Figure 8A:
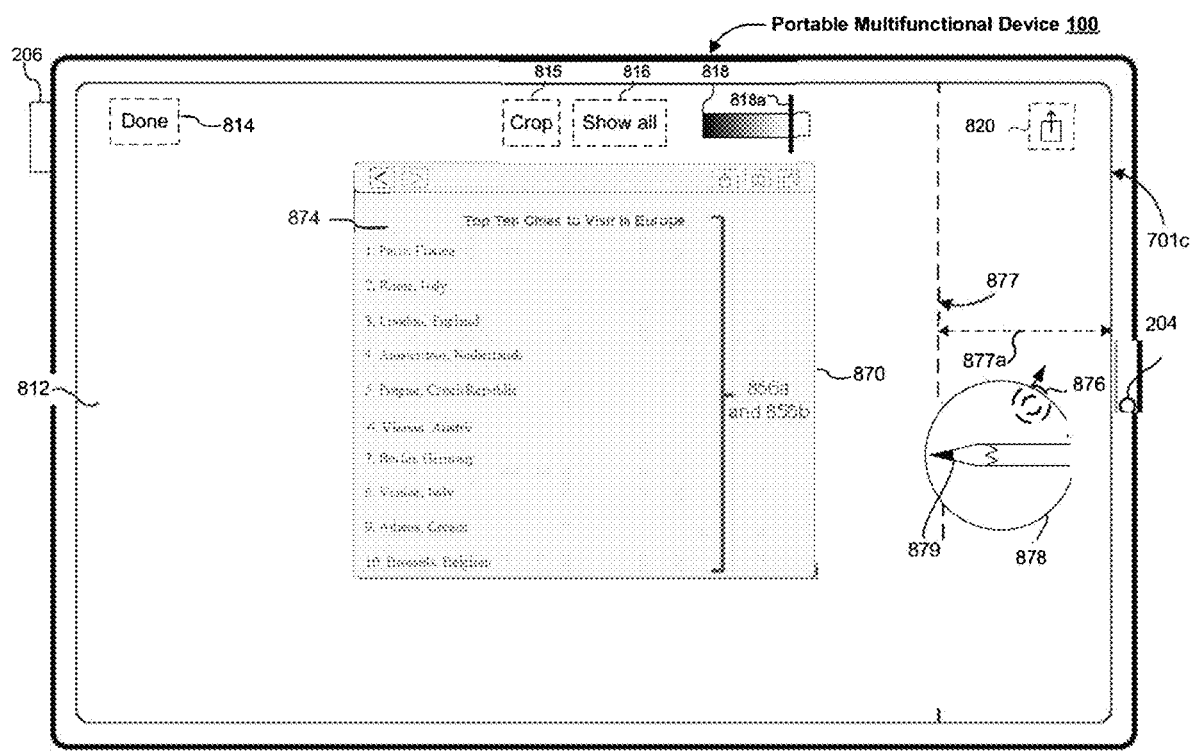
Figure 8A:
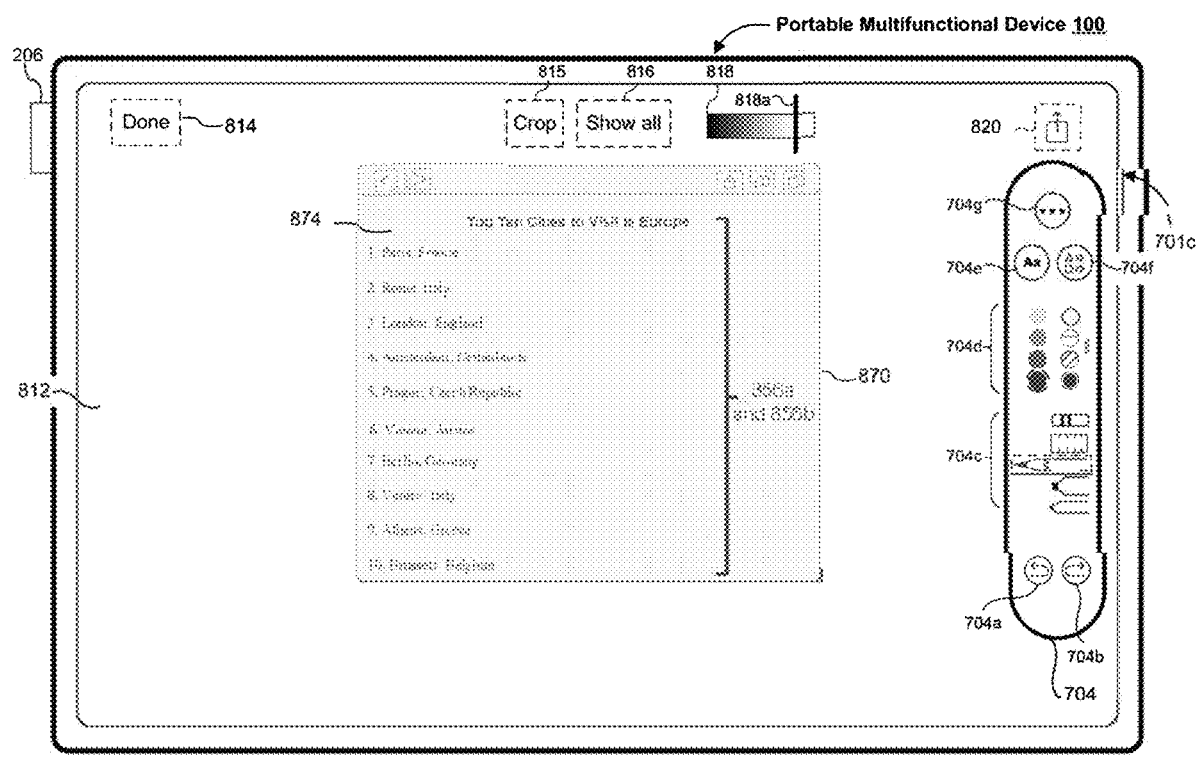
Figure 8A:
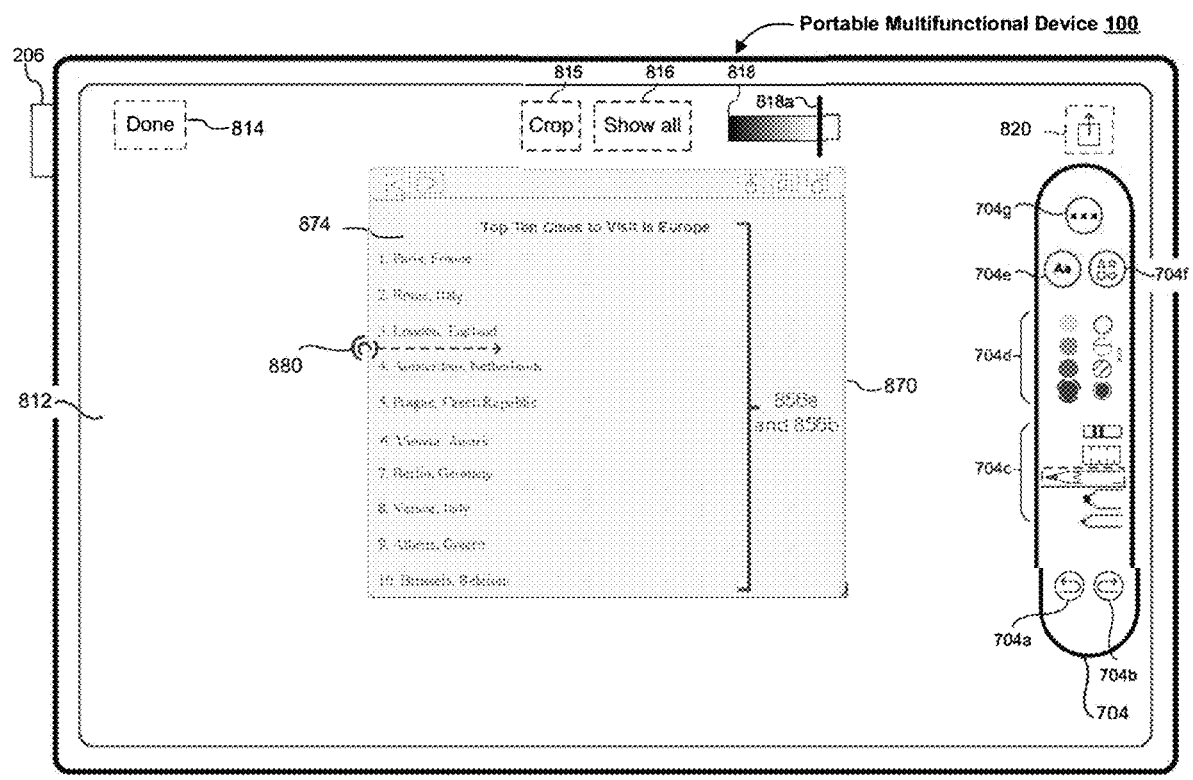
Figure 8A:
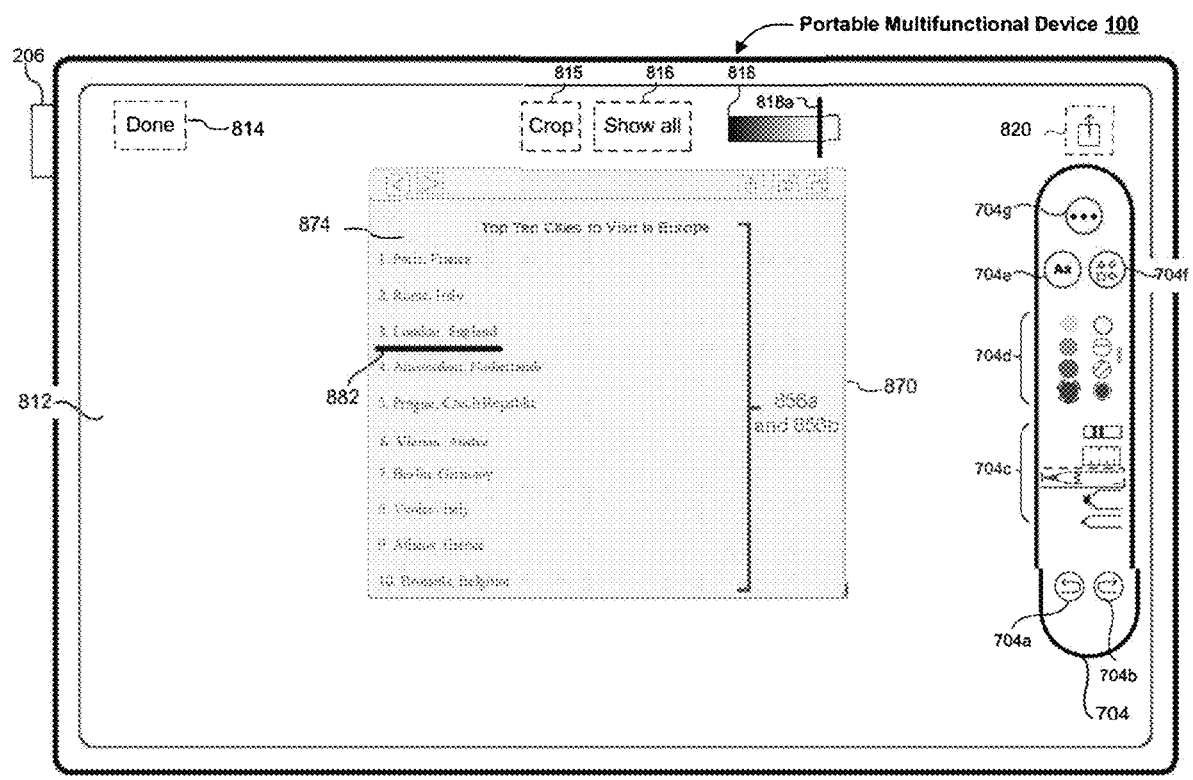
Figure 8A:
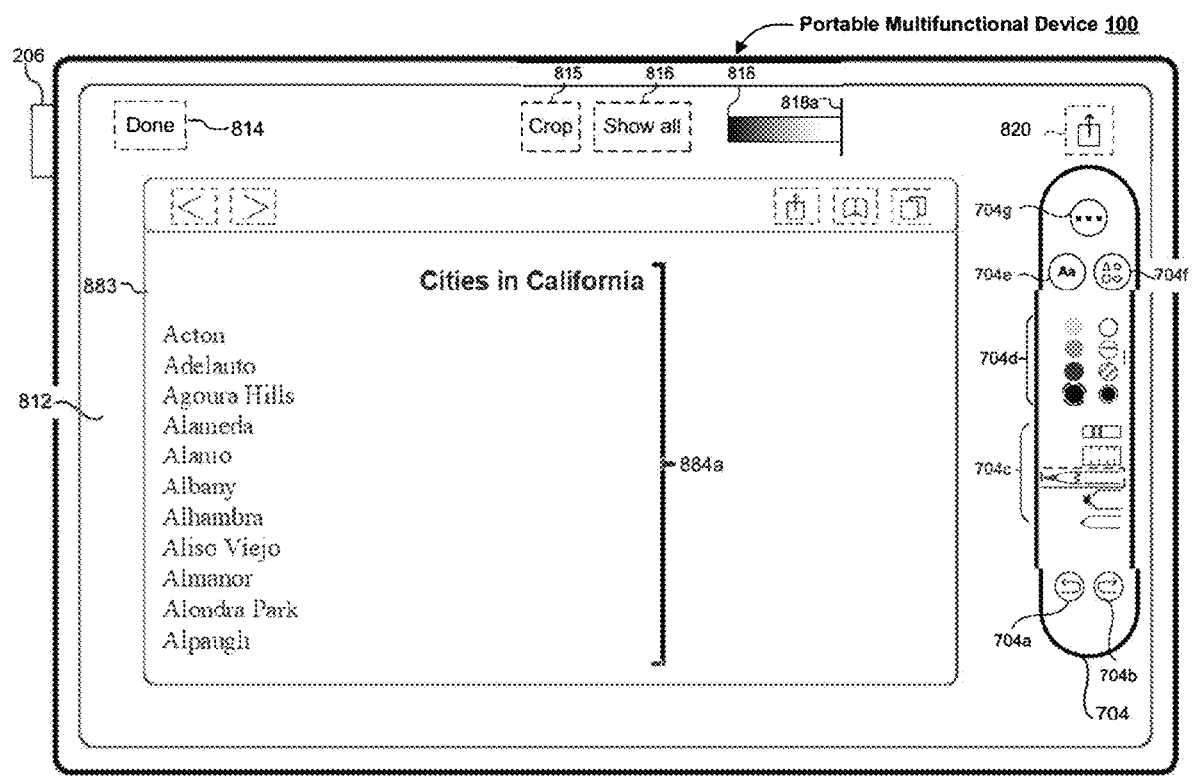
Figure 8A:
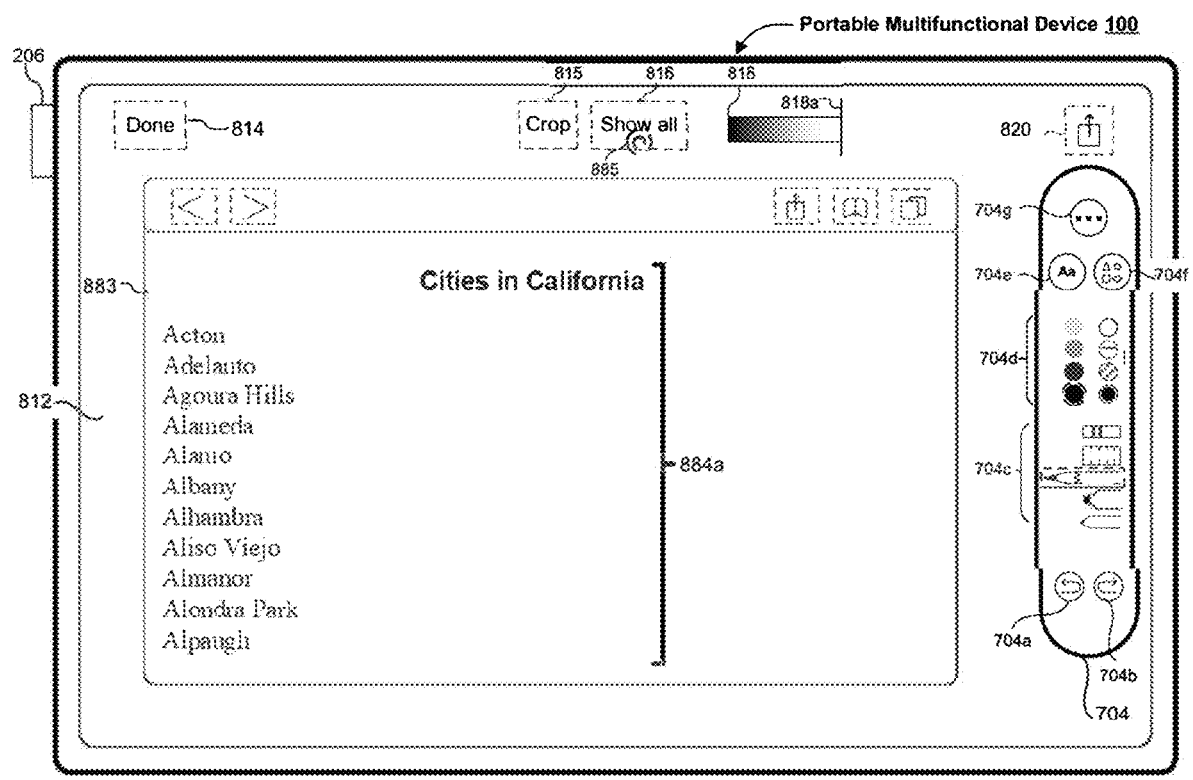
Figure 8A:
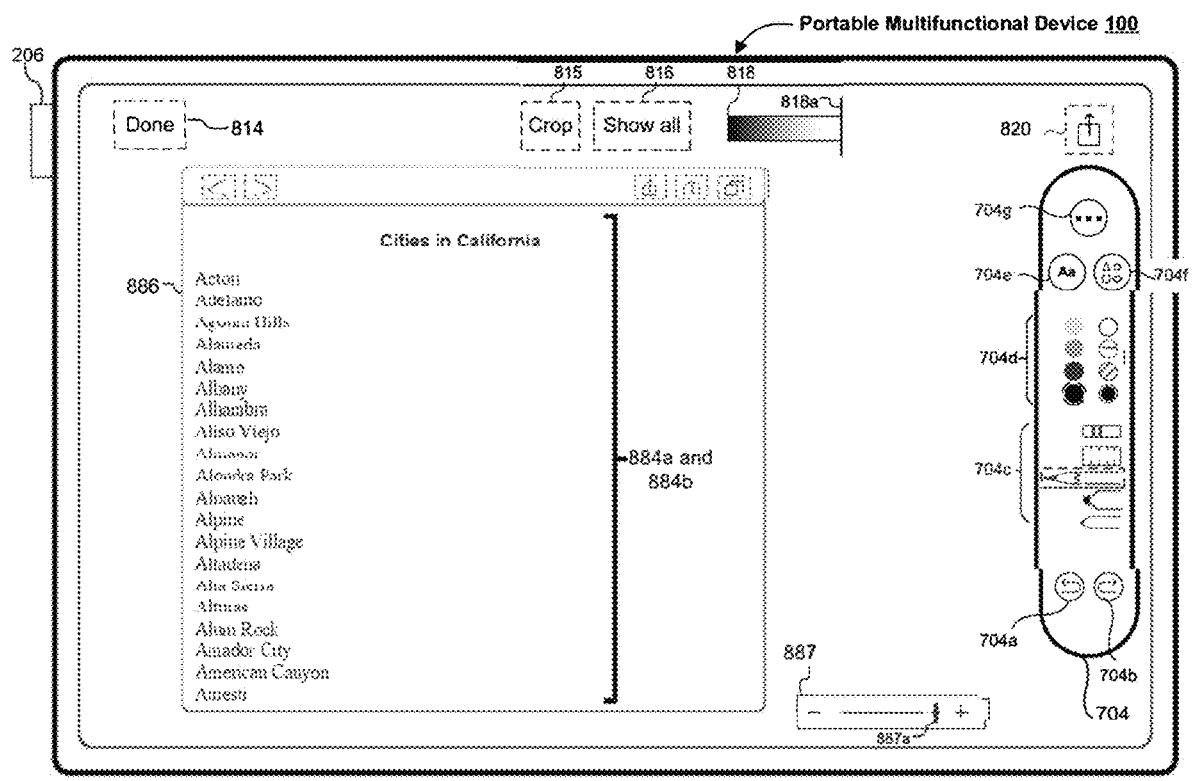
Figure 8A:
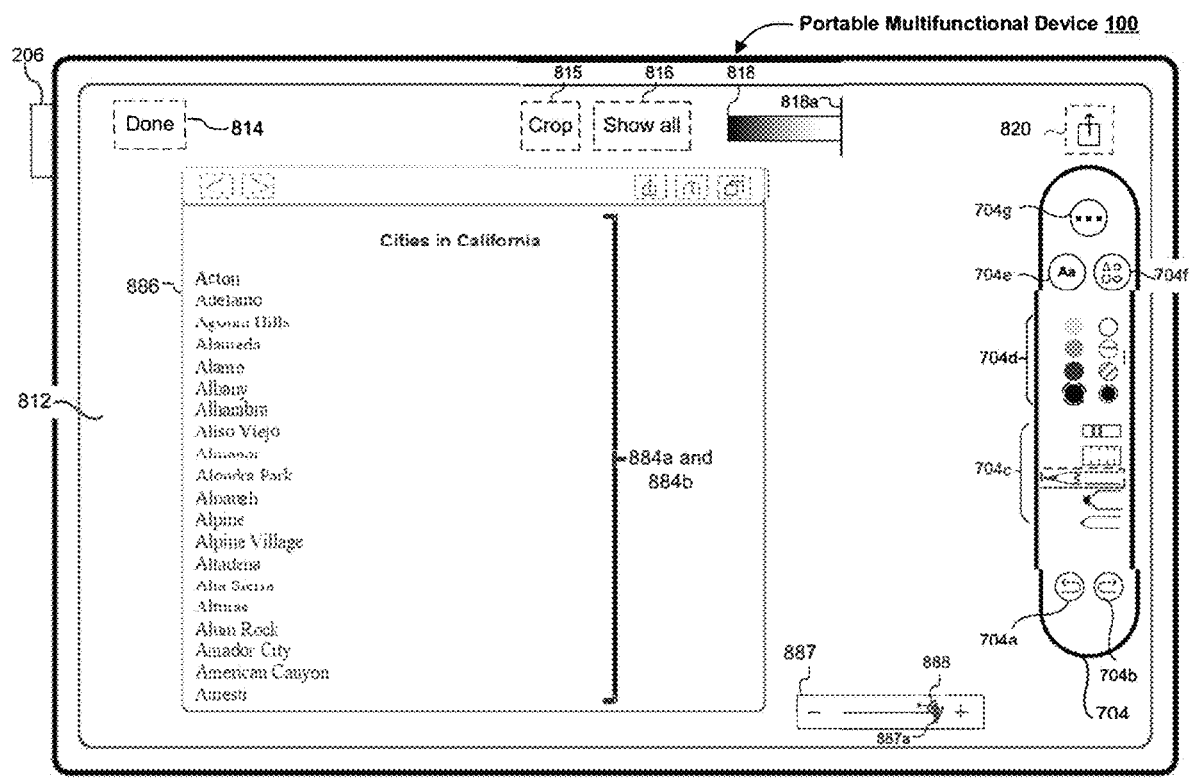
Figure 8A:
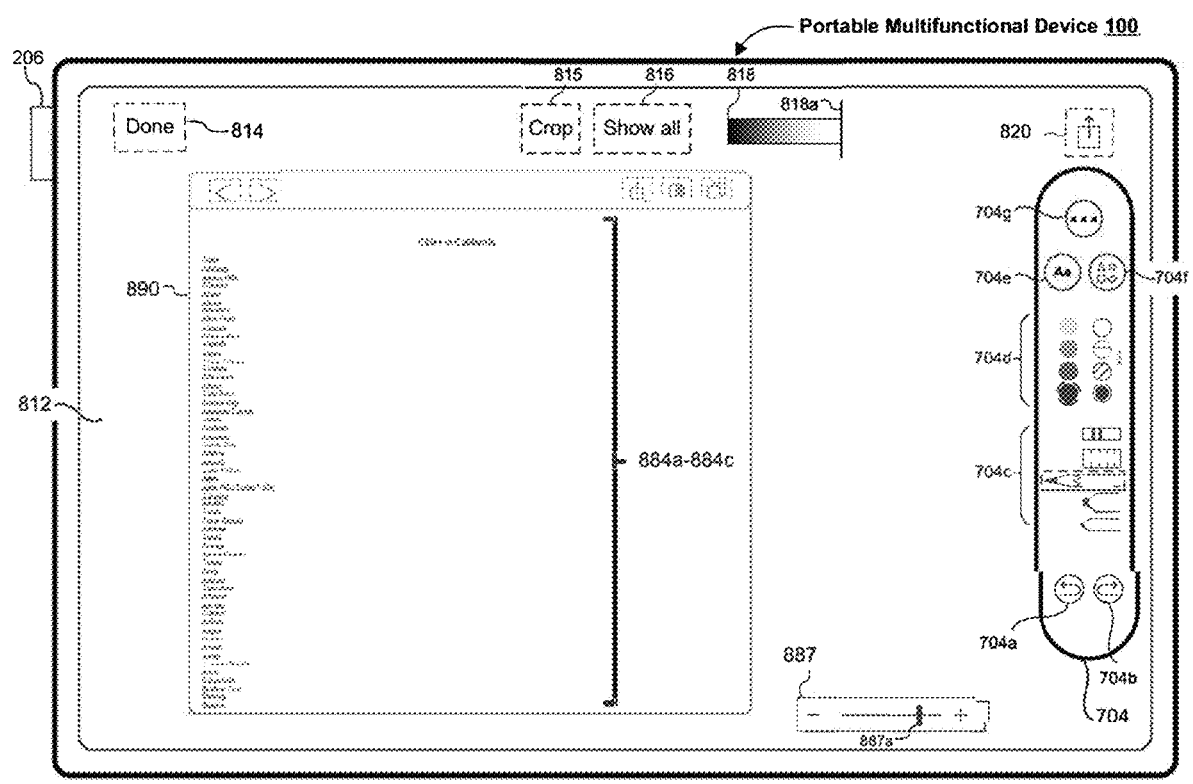

As illustrated in FIG. 8Z, the electronic device 100 detects an input 872 directed to the opacity value indicator 818*a* of the opacity level affordance 818. The input 872 moves the opacity value indicator 818*a* to a respective opacity value, as illustrated in FIG. 8AA. In response to detecting the input 872 in FIG. 8Z, the electronic device 100 changes an opacity of a filtering layer 874 that is overlaid on the second screenshot image 870 to the respective opacity value in FIG. 8AA.

As illustrated in FIG. 8AB, the electronic device 100 detect a drag input 876 that requests movement of the first drawing palette 704 to along the right edge of the screenshot editing interface 812. The drag input 876 proceeds beyond a threshold line 877 that is a corresponding distance 877*a* away from the third edge 701*c*. The threshold line 877 and the corresponding distance 877*a* are illustrated for explanatory purposes only.

In response to detecting the drag input 876 in FIG. 8AB, the electronic device 100 replaces the first drawing palette 704 with a drawing tool indicator 878 in FIG. 8AC. The drawing tool indicator 878 includes a black-tipped pencil 879 in order to indicate that the currently selected drawing tool is a black-tipped pencil. As illustrated in FIG. 8AC, because the drag input 768 has yet to cross the threshold line 877, the electronic device 100 displays the black-tipped pencil 879 as facing upwards in order to match the orientation of the set of drawing tool affordances 704*c* within the first drawing palette 704 in FIG. 8AB.

In response to detecting the drag input 768 crossing the threshold line 877 in FIG. 8AD, the electronic device 100 rotates the black-tipped pencil 879 to face leftwards in FIG. 8AD. The electronic device 100 rotates the black-tipped pencil 879 in this way in order to match the orientation of the set of drawing tool affordances 704*c* within the first drawing palette 704 along the third edge 701*c* in FIG. 8AE.

In response to detecting completion of the drag input 768, the electronic device 100 replaces the drawing tool indicator 878 with the first drawing palette 704 having the first appearance along the third edge 701*c* in FIG. 8AE. As compared with the first drawing palette 704 along the bottom edge in FIG. 8AB, the first drawing palette 704 in FIG. 8AE is rotated in order to be along (e.g., be substantially parallel to) the third edge 701*c*.

As illustrated in FIG. 8AF, the electronic device 100 detects an annotation input 880 that underlines the third city, "London, England." Accordingly, in FIG. 8AG, the electronic device 100 displays a corresponding annotation 882 underlining "London, England," wherein the annotation 882 reflects the currently selected tool being a black-tipped pencil.

FIGS. 8AH-8AL illustrate updating a screenshot image in order to include additional content that was not displayed on the display when a corresponding screenshot capture input was detected according to some embodiments. As illustrated in FIG. 8AH, the electronic device 100 displays the screenshot editing interface 812 including a first screenshot image 883 including a first list of a first set of "Cities in California" 884*a*.

As illustrated in FIG. 8AI, the electronic device 100 detects an input 885 directed to the show all affordance 816. In response to detecting the input 885 in FIG. 8AI, the electronic device 100 displays, in FIG. 8AJ, a second screenshot image 886 including the first list of the first set of cities 884*a* displayed within the first screenshot image 883 and a second list of a second set of cities 884*b* not displayed within the first screenshot image 883. Moreover, the electronic device 100 displays a scrubber interface 887. The scrubber interface 887 includes a selectable content-level indicator 887*a* that enables changing how much content (e.g., how many listed cities) the electronic device 100 displays within the screenshot editing interface 812.

As illustrated in FIG. 8AK, the electronic device 100 displays an input 888 directed to the content-level indicator 887*a*. Namely, the input 888 moves the content-level indicator 887*a* leftwards (e.g., towards the '-' indicator) in order to request that additional content be displayed within the screenshot editing interface 812. In response to detecting the input 888 in FIG. 8AK, the electronic device 100 displays a third screenshot image 890 including the first list of the first set of cities 884*a*, the second list of the second set of cities 884*b*, and a third list of a third set of cities 884*c* not displayed within the first screenshot image 883 in FIG. 8AH or within the second screenshot image 886 in FIG. 8AL.

FIGS. 9A-9Z are examples of capturing a screenshot image based on detected stylus inputs in accordance with some embodiments. The user interfaces in these figures are used to illustrate the processes described below, including the processes in FIGS. 11A-11C. Although some of the examples which follow will be given with reference to inputs on a touch-screen display (where the touch-sensitive surface and the display are combined, for example on the touch screen 112), in some embodiments, the electronic device 100 detects inputs on the touch-sensitive surface 651 that is separate from the display 650, as shown in FIG. 6B.

As illustrated in FIG. 9A, the electronic device 100 displays content 902 including a lion 906 (e.g., an image of a lion), and various affordances including a back affordance 903*a*, a forward affordance 903*a*, a share affordance 904*a*, a bookmarks affordance 904*b*, and a tabs affordance 904*c*.

Figure 9B:
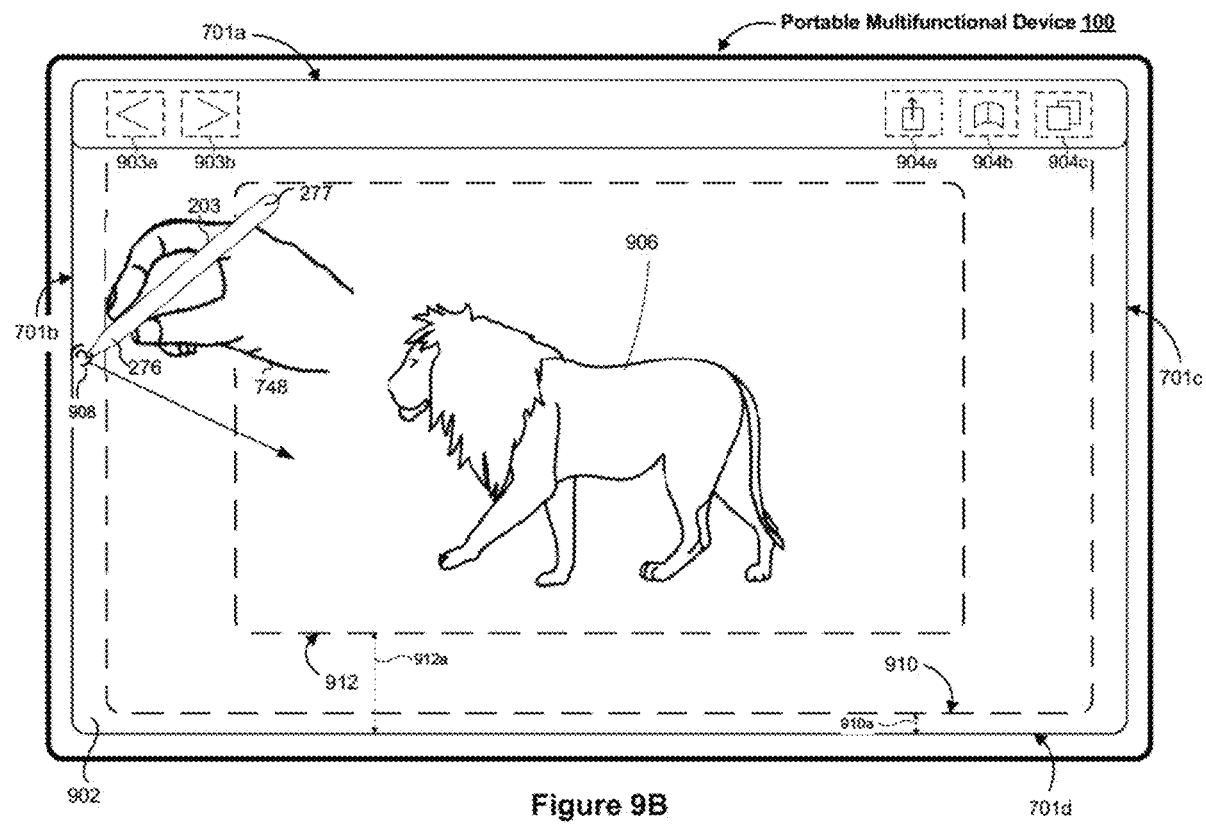

As illustrated in FIG. 9B, the electronic device 100 detects, on its touch-sensitive surface, a first stylus movement 908 of a stylus 203 that is being held by a hand 748 of a user. The first stylus movement 908 is away from a corresponding outer edge 701*b* of the touch-sensitive surface towards a release point within the touch-sensitive surface, as indicated by the end of the arrow. As illustrated in FIG. 9B, in some embodiments, the first stylus movement 908 originates outside of a first region 910 that is a first threshold distance 910*a* from the edges 701*a*-701*d* of the electronic device 100. As further illustrated in FIG. 9B, in some embodiments, the first stylus movement 908 ends at a release point that is within (e.g., crosses into) a second region 912 that is a second threshold distance 912*a* from the edges 701*a*-701*d* of the electronic device 100. The first region 910, the first threshold distance 910*a*, the second region 912, and the second threshold distance 912*a* are illustrated for purely explanatory purposes.

Figure 9C:
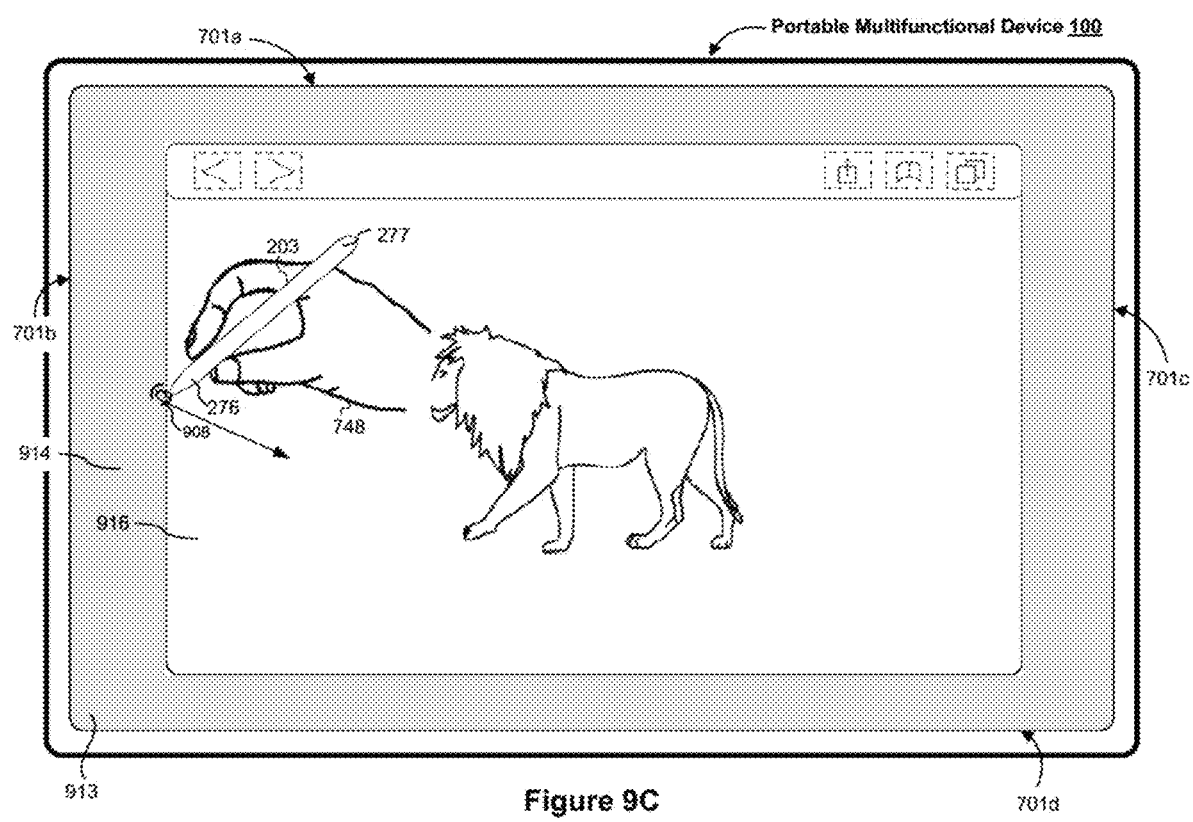

As illustrated in FIG. 9C, the first stylus movement 908 proceeds nearer to the release point. In response to detecting that the first stylus movement 908 originates outside of the first region 910 in FIG. 9B, the electronic device 100 changes the display in FIG. 9C. Namely, the electronic device 100 replaces the content 902 with a screenshot preview interface 913. The screenshot preview interface 913 includes an outer region 914 (e.g., solid gray area) that bounds the current location of the first stylus movement 908 and a screenshot preview region 916 that is associated (e.g., contiguously associated) with the outer region 914. The screenshot preview region 916 provides a preview of a screenshot image 918. On the other hand, in response to detecting that a stylus movement does not originate outside of the first region 910, the electronic device 100 does not replace the content 902 with the screenshot preview interface 913.

Figure 9D:
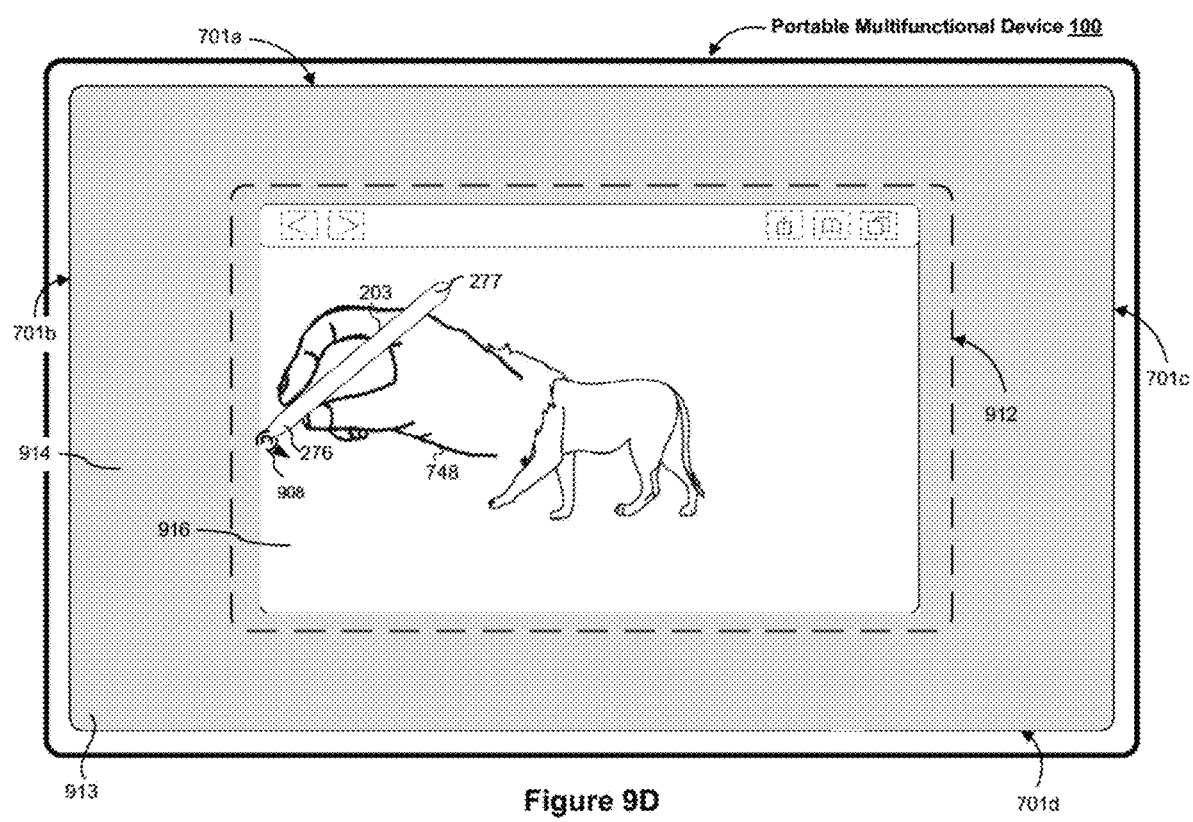

The electronic device 100 shrinks the screenshot preview region 916 as the first stylus movement 908 proceeds towards the second region 912. For example, as illustrated in FIG. 9D, as the first stylus movement 908 proceeds nearer still to the release point as compared with FIG. 9C, the electronic device 100 correspondingly shrinks the screenshot preview region 916 and enlarges the outer region 914 in FIG. 9D.

Figure 9E:
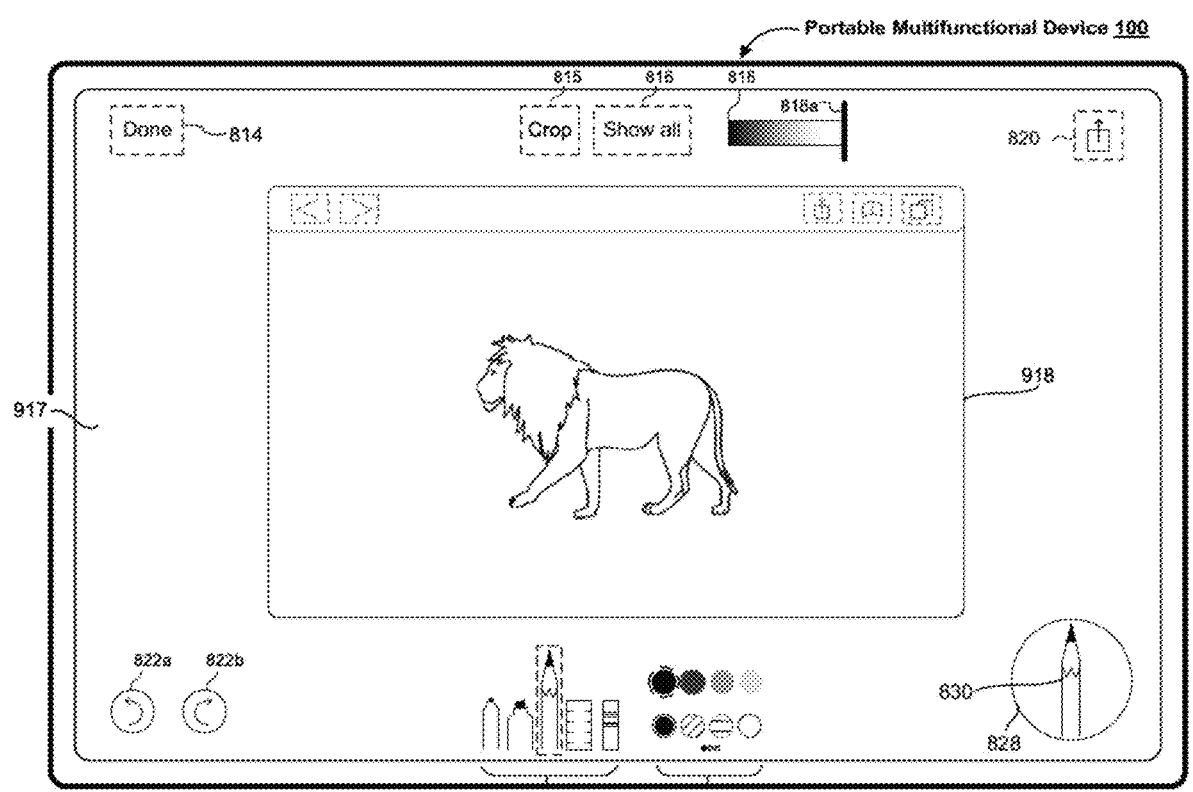

In response to determining that the release point of the first stylus movement 908 is within the second region 912, the electronic device 100 replaces the screenshot preview interface 913 with a screenshot editing interface 917 in FIG. 9E. The screenshot editing interface 917 includes the screenshot image 918, affordances 814-816, 818, 820, 822*a*, 822*b*, 824, and 826, and a drawing tool indicator 828.

Figure 9F:
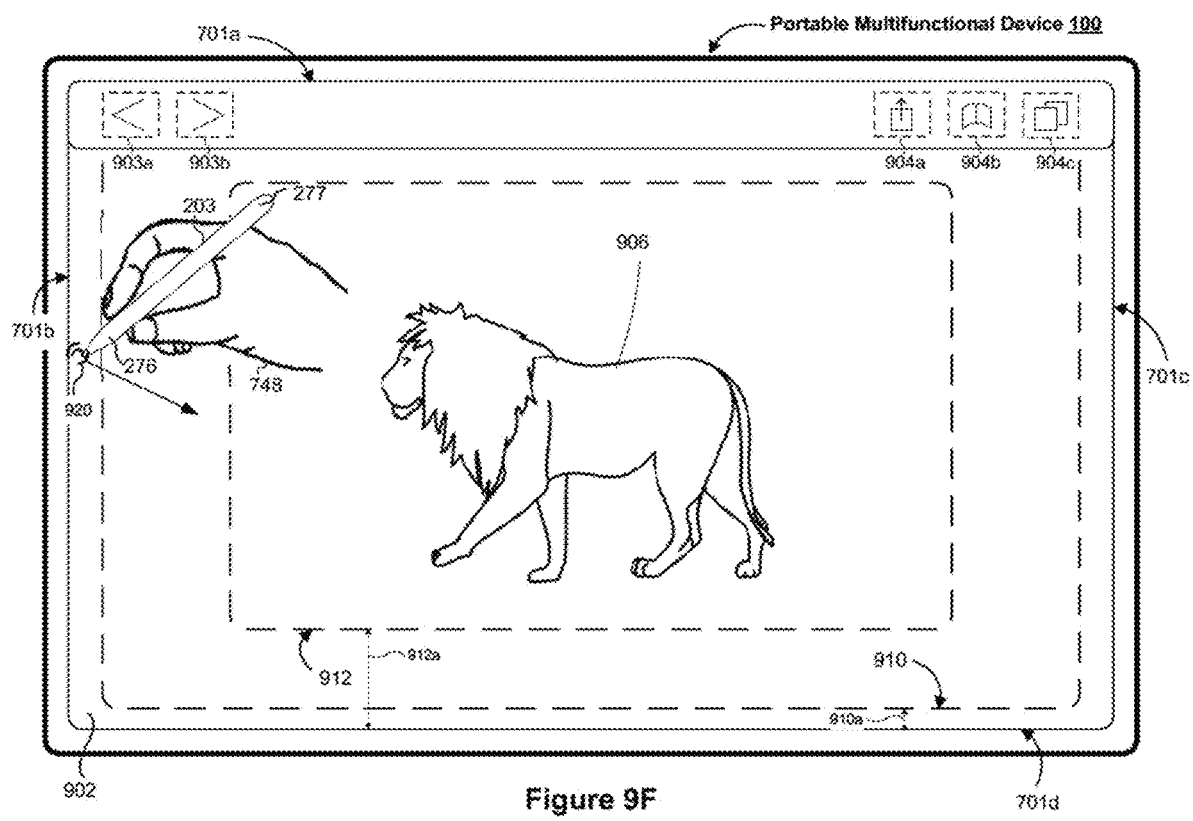
Figure 9G:
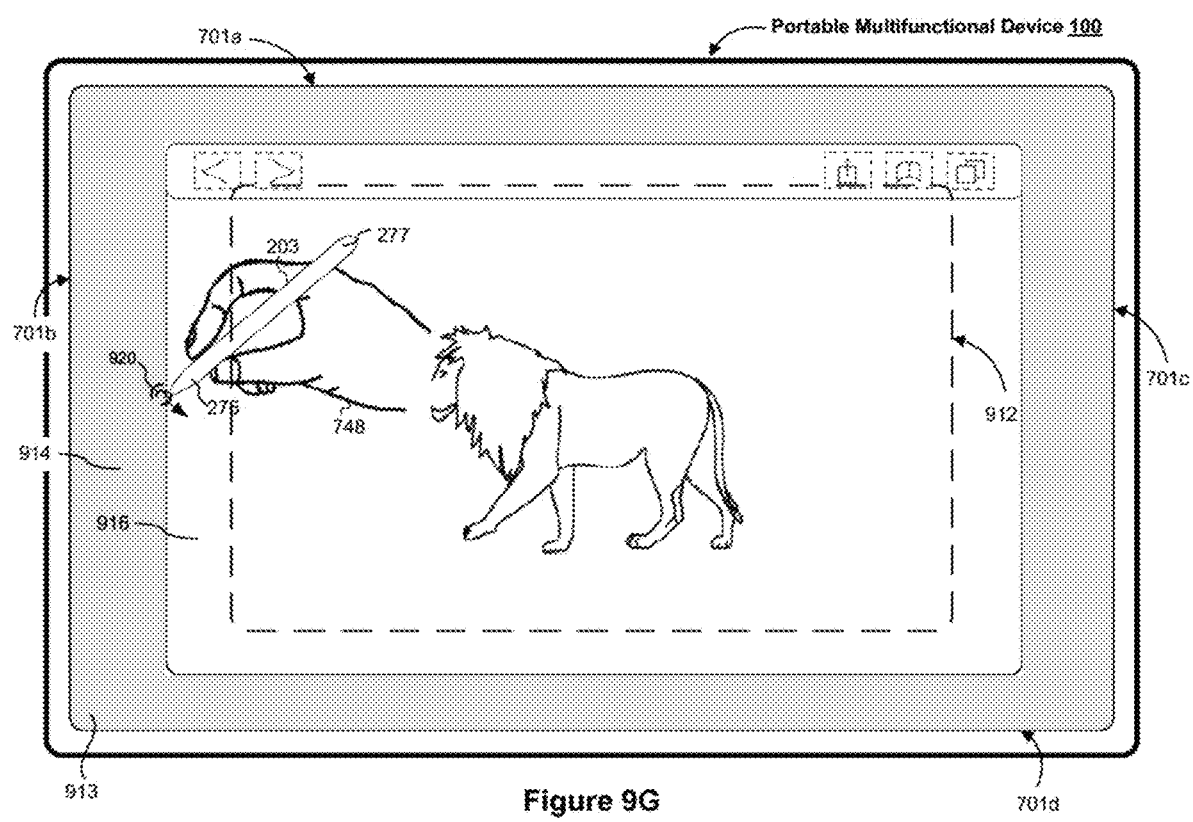
Figure 9H:
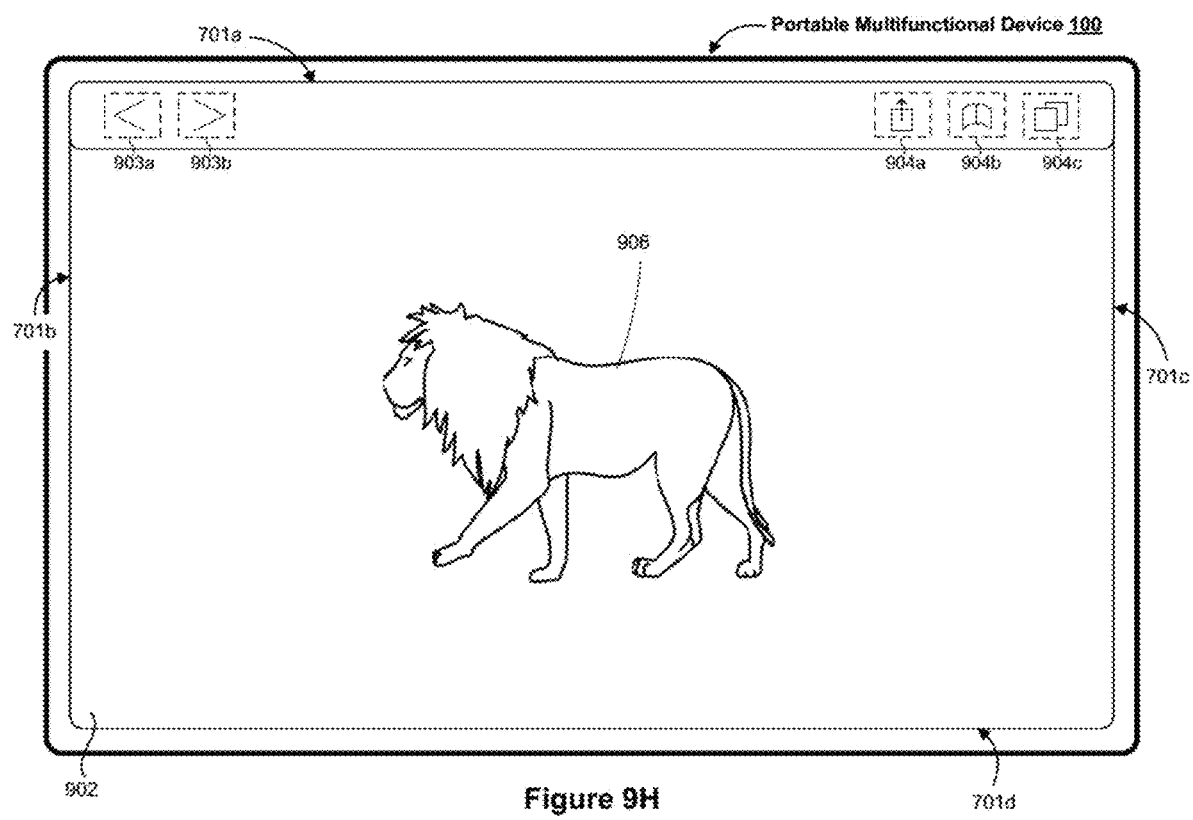

As illustrated in FIG. 9F, while the electronic device 100 is displaying the content 902, the electronic device 100 detects a second stylus movement 920 that originates outside of the first region 910. As illustrated in FIG. 9G, as the second stylus movement 920 progresses closer to the second region 912, the electronic device 100 replaces the content 902 with the screenshot preview interface 913 including the outer region 914 and the screenshot preview region 916. However, because the release point of the second stylus movement 920 is not within the second region 912, the electronic device 100 does not display the screenshot editing interface 917. Instead, as illustrated in FIG. 9H, in response to detecting completion of the second stylus movement 920, the electronic device 100 displays the content 902 without capturing a screenshot image.

Figure 9I:
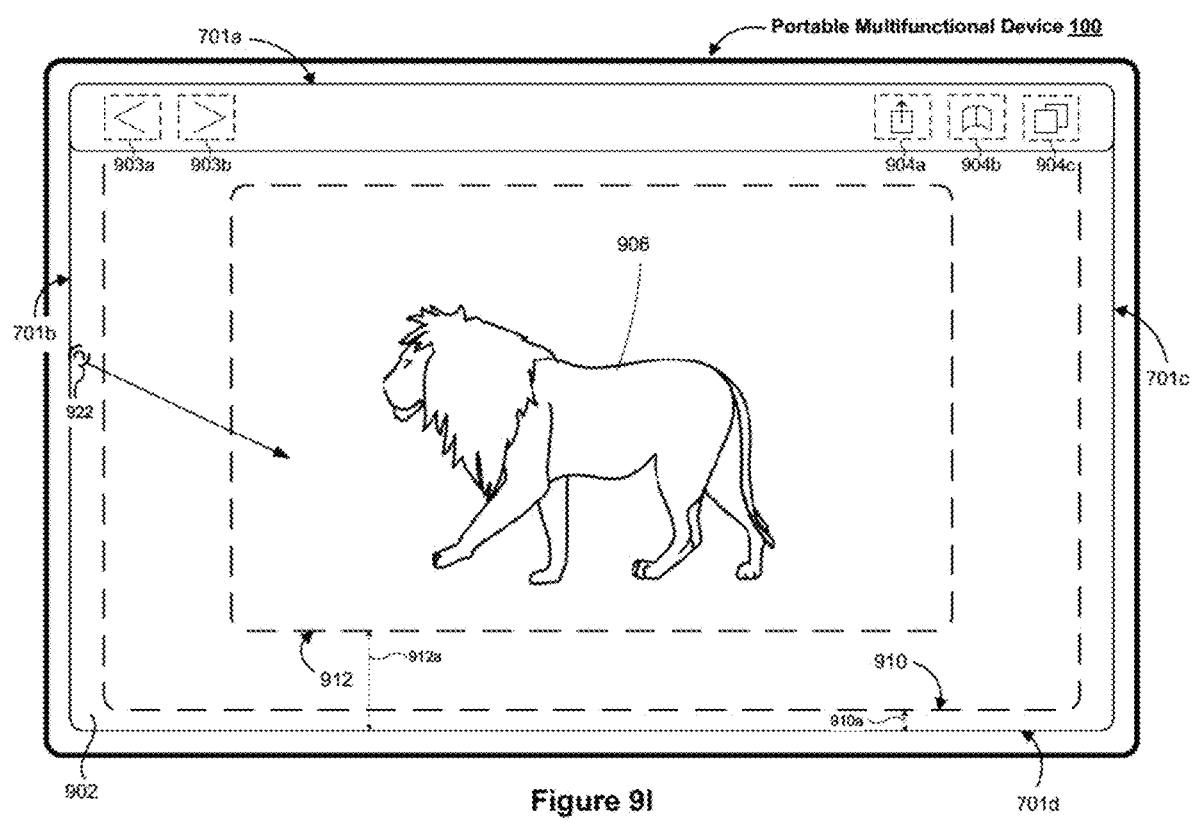
Figure 9J:
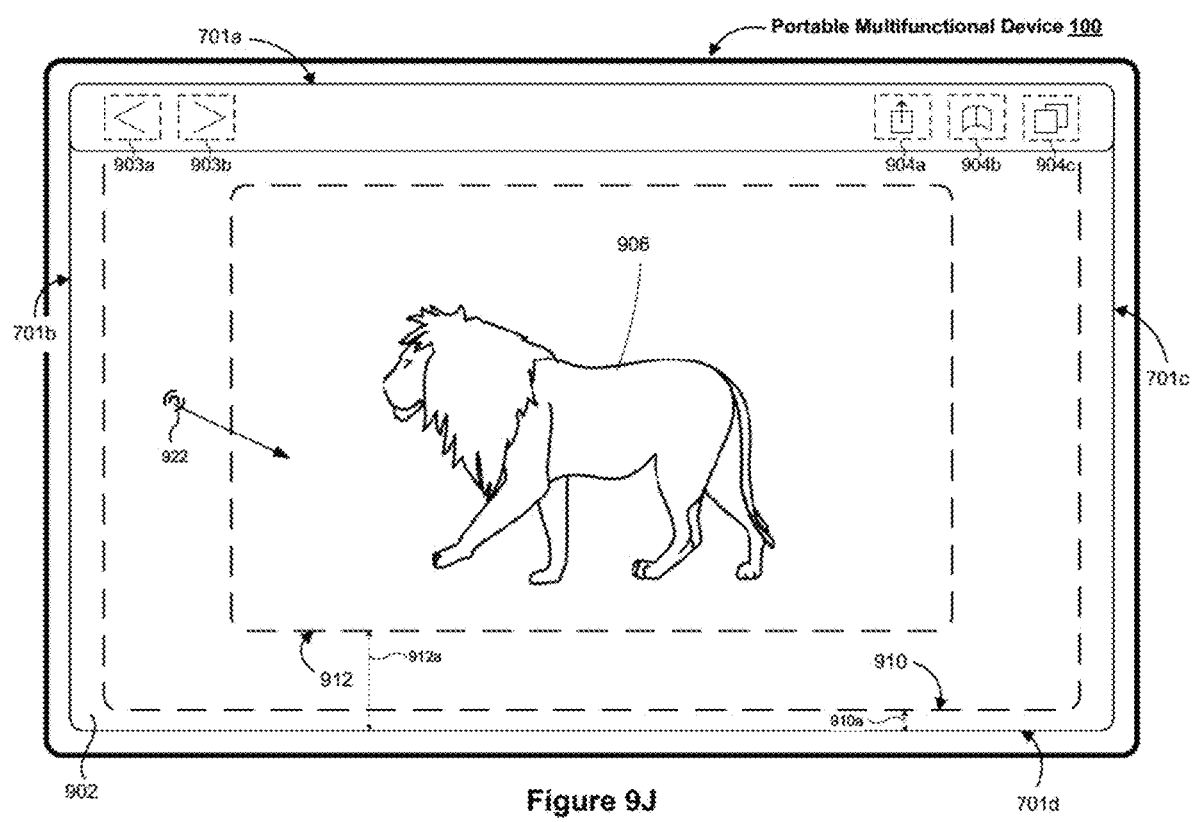
Figure 9K:
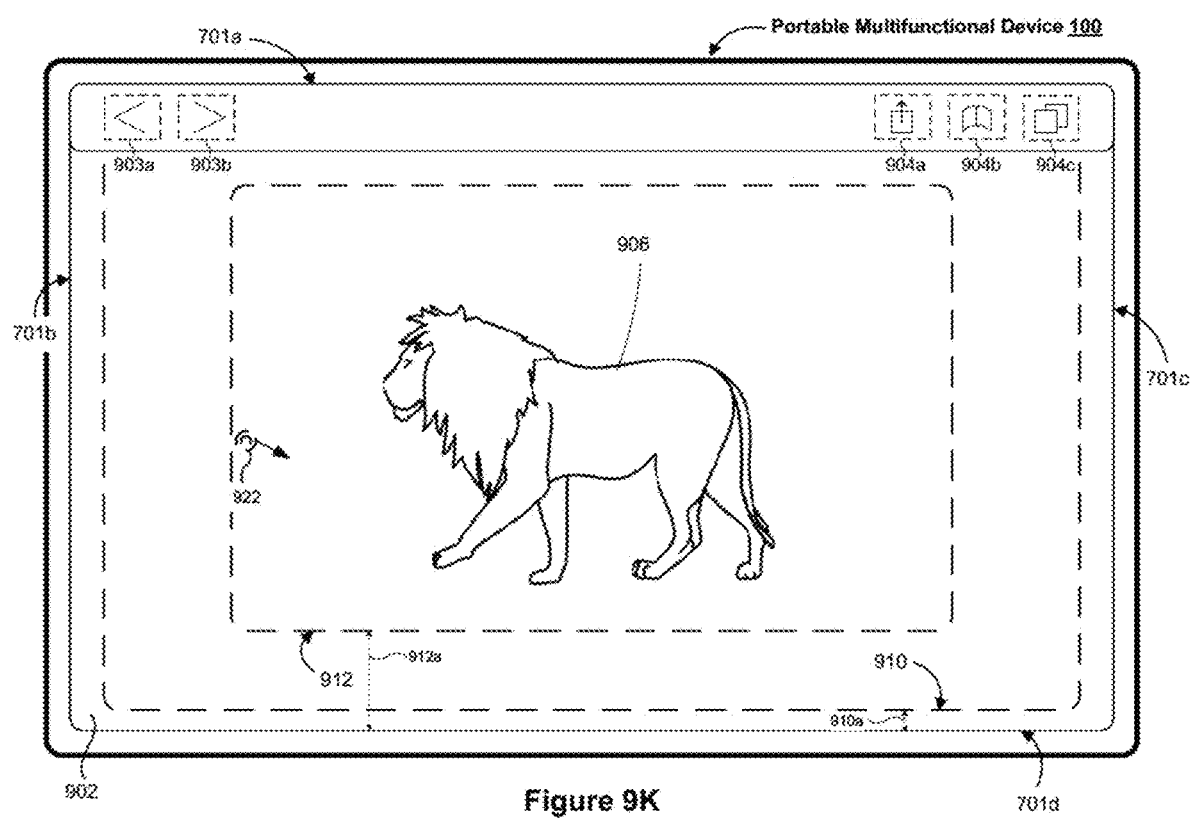
Figure 9L:
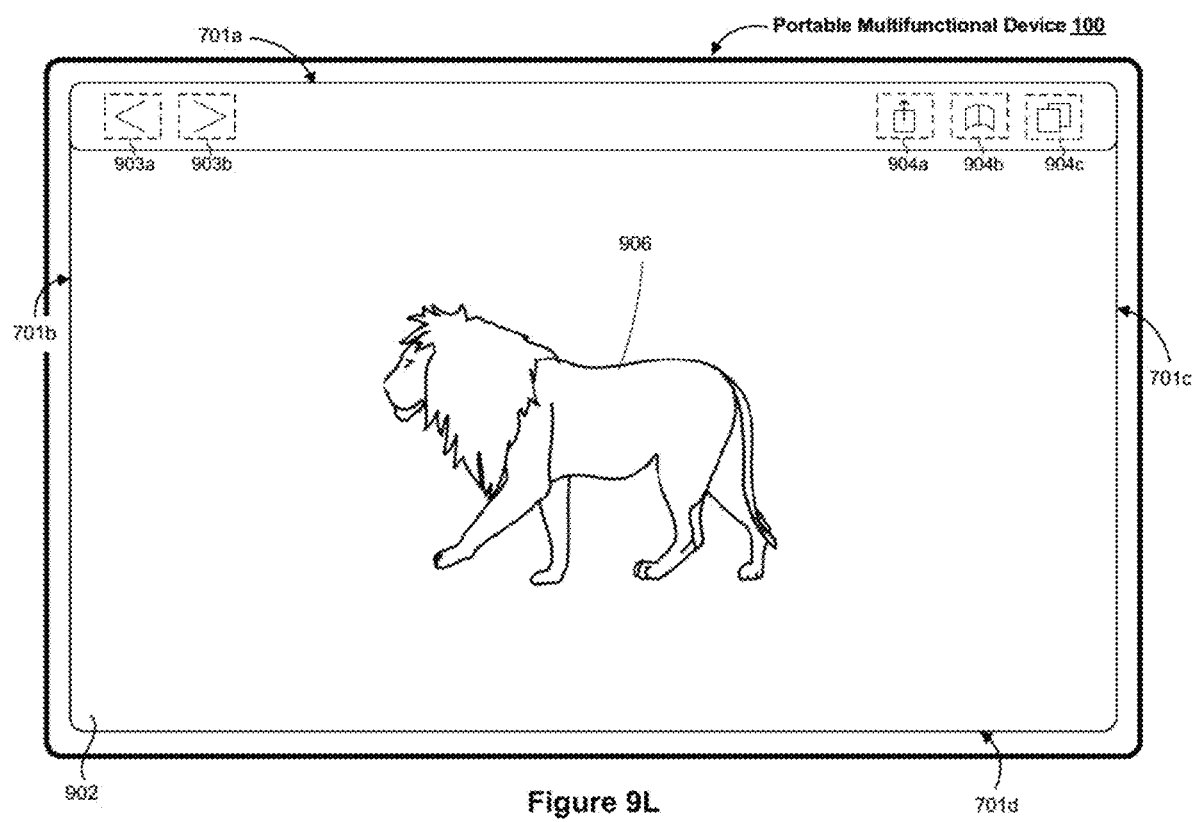

As illustrated in FIG. 9I, the electronic device 100 detects a first drag input 922 that is not a stylus drag input. For example, the electronic device 100 detects the first drag input 922 as a finger dragging across the touch-sensitive surface of the electronic device 100. As illustrated in FIGS. 9I-9K, the first drag input 922 originates within the first region 910 in FIG. 9I and completes within the second region 912. However, because the first drag input 922 is not a stylus drag input, the electronic device 100 does not display a screenshot preview interface 913 as the first drag input 922 proceeds towards the end point and does not display the screenshot editing interface 917 in response to detecting completion of the first drag input 922 within the second region 912. Instead, as illustrated in FIG. 9L, the electronic device 100 displays the content 902 in response to detecting completion of the first drag input 922.

Figure 9M:
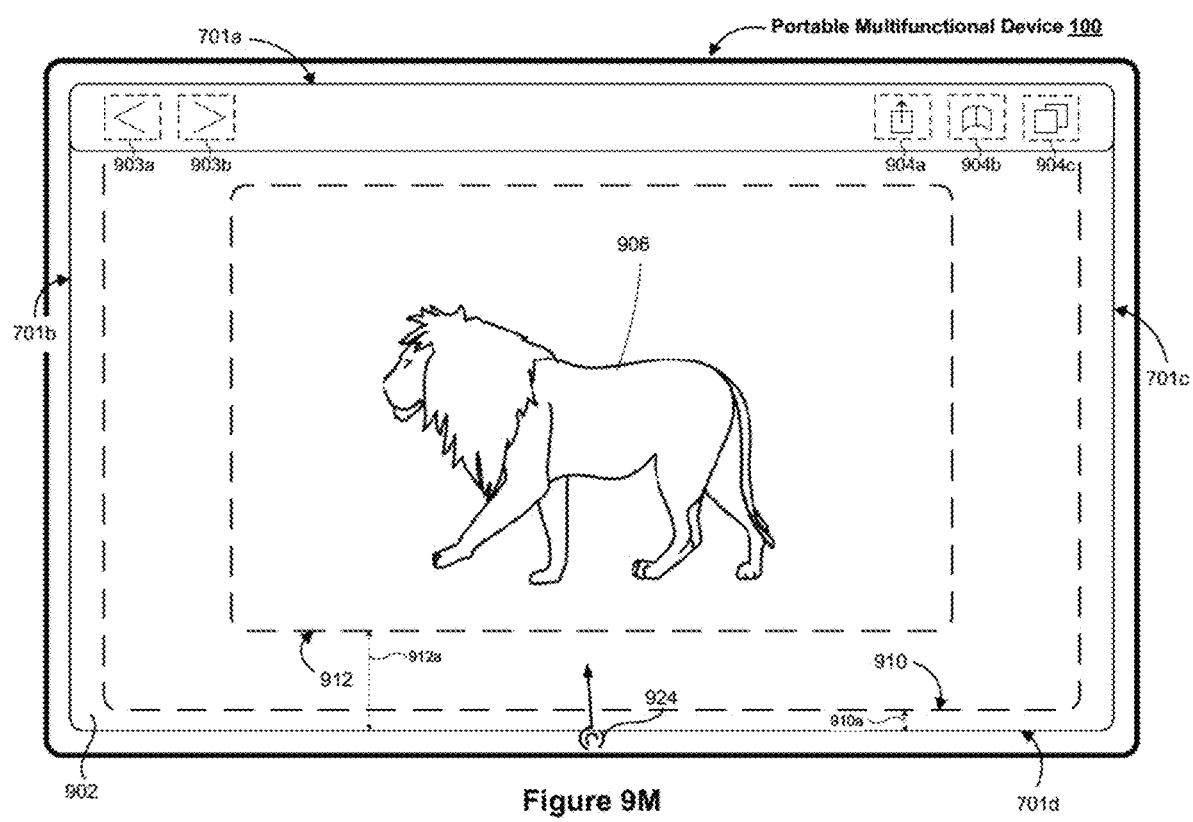

As illustrated in FIG. 9M, the electronic device 100 detects a second drag input 924 that is not a stylus drag input. In some embodiments, the second drag input 924 is away from a bottom edge (e.g., the fourth edge 701*d*) of the touch-sensitive surface towards within the user interface.

Figure 9N:
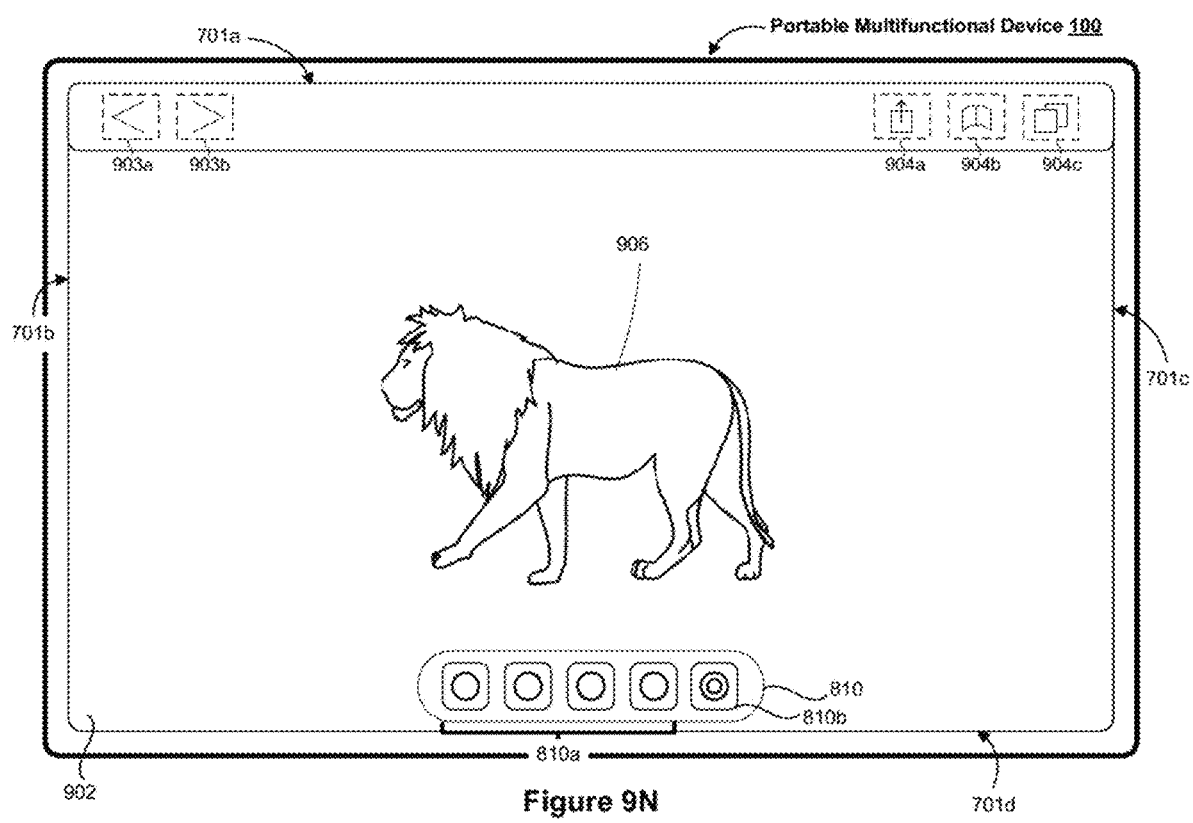

In some embodiments, as illustrated in FIGS. 9M and 9N, in response to detecting the second drag input 924 cross into an area between the first region 910 and the second region 912, the electronic device 100 displays an interface 810 (e.g., a dock or control center). The interface 810 includes a plurality of application representations 810*a* corresponding to a plurality of applications. The interface 810 further includes a screenshot capture affordance 810*b*.

Figure 9O:
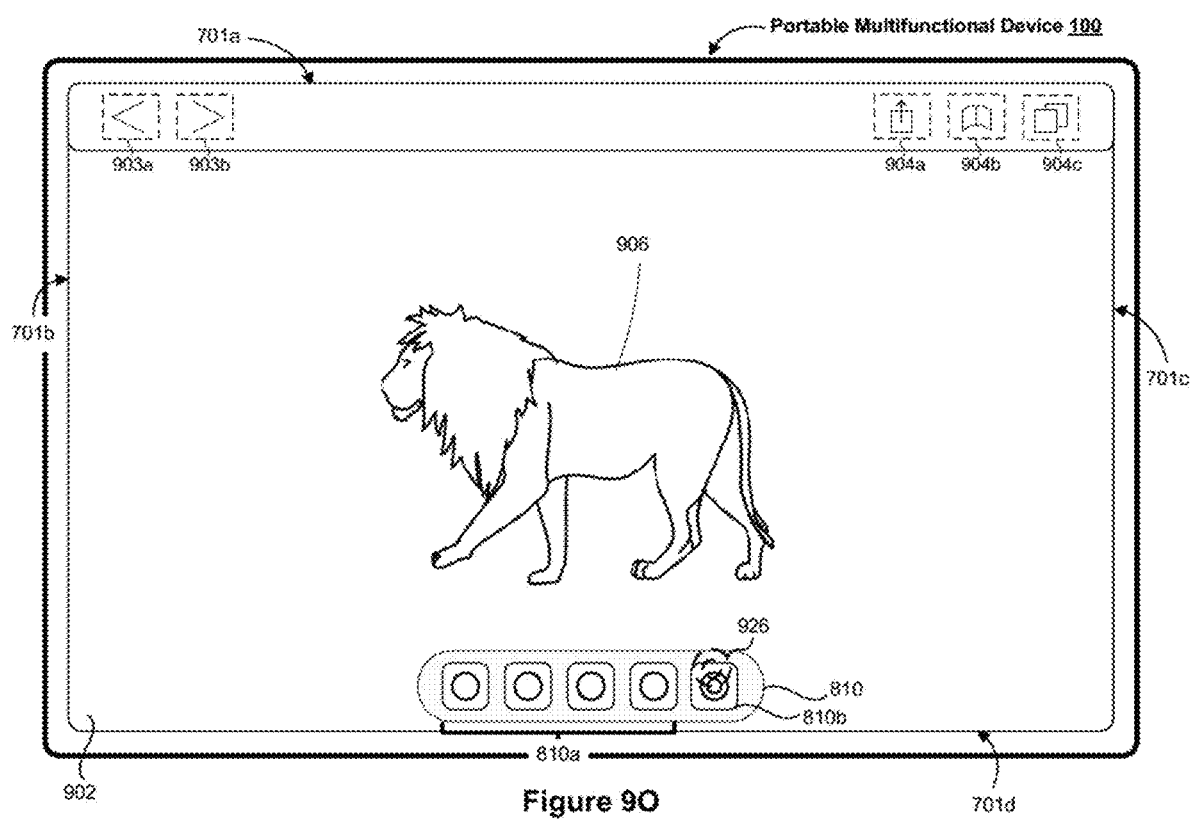
Figure 9P:
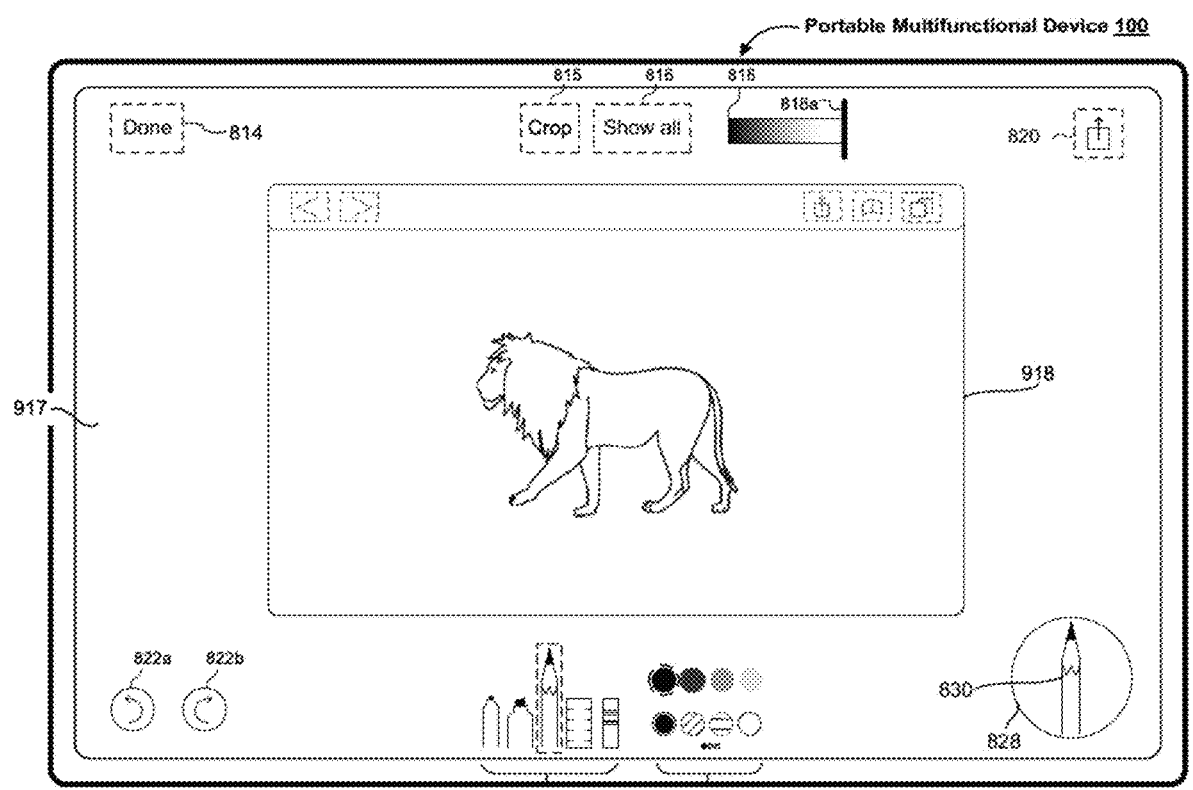

As illustrated in FIG. 9O, the electronic device 100 detects an input 926 directed to the screenshot capture affordance 810*b*. In response to detecting the input 926 in FIG. 9O, the electronic device 100 displays the screenshot editing interface 918 in FIG. 9P.

Figure 9Q:
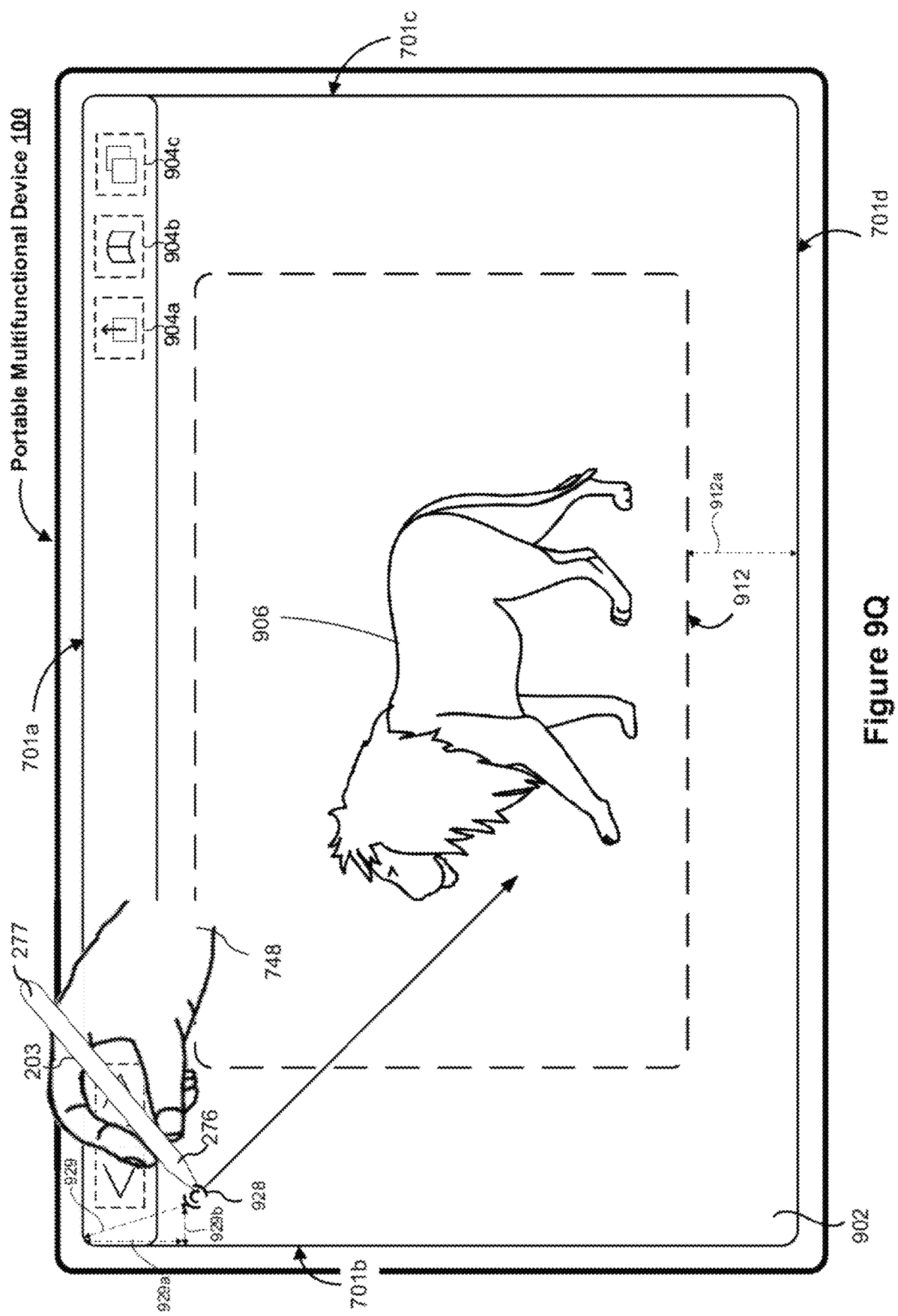

As illustrated in FIG. 9Q, the electronic device 100 detects, on its touch-sensitive surface, a third stylus movement 928 of a stylus 203 that is being held by a hand 748 of a user. The third stylus movement 928 originates at a threshold distance 929 from a particular corner of the touch-sensitive surface towards a release point within the touch-sensitive surface. As illustrated in FIG. 9Q, the particular corner of the touch-sensitive surface corresponds to where the first edge 701*a* intersects with the second edge 710*b*. Accordingly, the threshold distance 929 includes a vertical distance threshold 929*a* away from the first edge 701*a* and a horizontal distance threshold 929*b* away from the second edge 701*b*. One of ordinary skill in the art will appreciate that the third stylus movement 928 may originate at the threshold distance from any of the four corners. In some embodiments, the corner swipe gesture is restricted to a subset of the corners. For example, in some embodiments, the movement triggers a corresponding response when it is detected at one of the top two corners, but not when it is detected at one of the bottom two corners. As another example, in some embodiments, the movement triggers a corresponding response when it is detected at one of the bottom two corners, but not when it is detected at one of the top two corners. In some embodiments, the corner swipe gesture is restricted to gestures performed with a stylus rather than a finger (e.g., a corresponding movement of a finger detected from a corner of the touch-screen display would not trigger the response). In some embodiments, the corner swipe gesture is restricted to gestures performed with a finger rather than a stylus (e.g., a corresponding movement of a stylus detected from a corner of the touch-screen display would not trigger the response).

As illustrated in FIG. 9R, as the third stylus movement 928 proceeds nearer to the release point, the electronic device 100 changes the display. Namely, the electronic device 100 replaces the content 902 with the screenshot preview interface 913 that includes the outer region 914 and screenshot preview region 916.

Figure 9S:
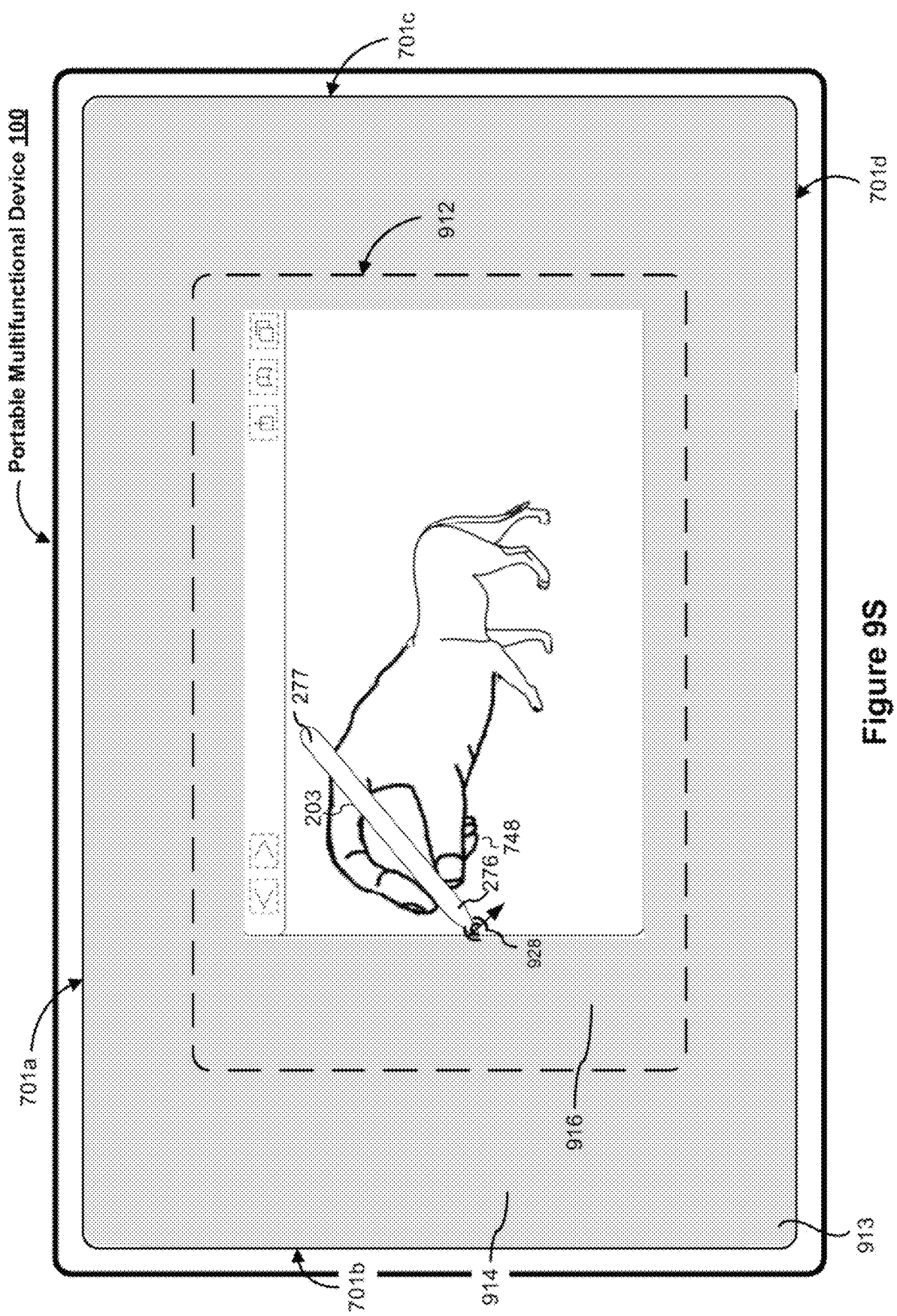
Figure 9T:
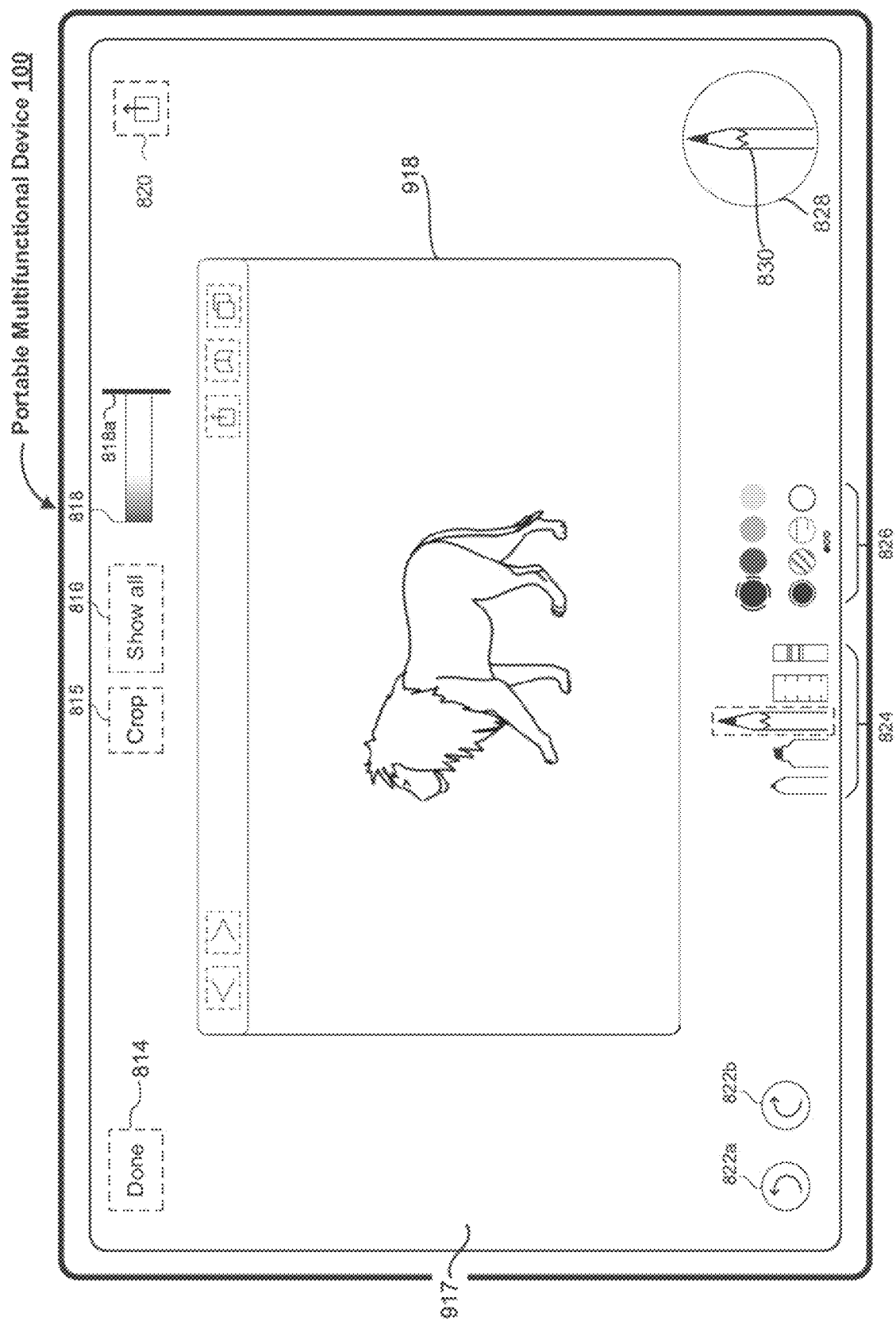

As illustrated in FIG. 9S, the electronic device 100 shrinks the screenshot preview region 916 as the third stylus movement 928 proceeds to within the second region 912. In response to detecting release of the third stylus movement 928 within the second region 912, the electronic device 100 replaces the screenshot preview interface 913 with a screenshot editing interface 917, as illustrated in FIG. 9T.

Figure 9U:
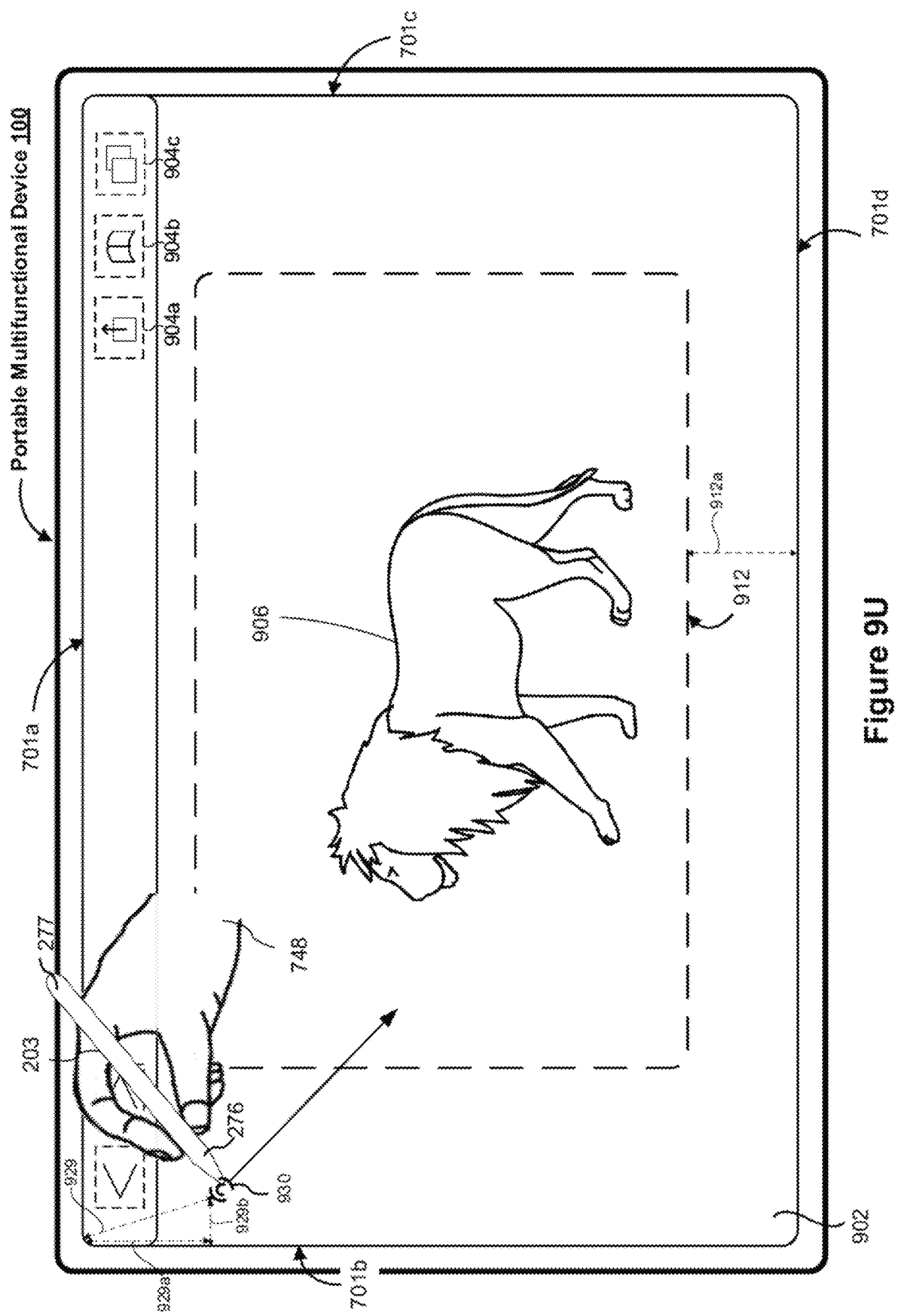

In some implementations, as illustrated in FIGS. 9U-9X, rather than displaying the screenshot editing interface 917 based on a stylus movement originating at a corner, the electronic device 100 displays a screenshot capture menu 938. As illustrated in FIG. 9U, the electronic device 100 detects, on its touch-sensitive surface, a fourth stylus movement 930 of a stylus 203 that is being held by a hand 748 of a user. The fourth stylus movement 930 originates at the threshold distance 929 from the particular corner of the touch-sensitive surface towards a release point within the touch-sensitive surface.

Figure 9V:
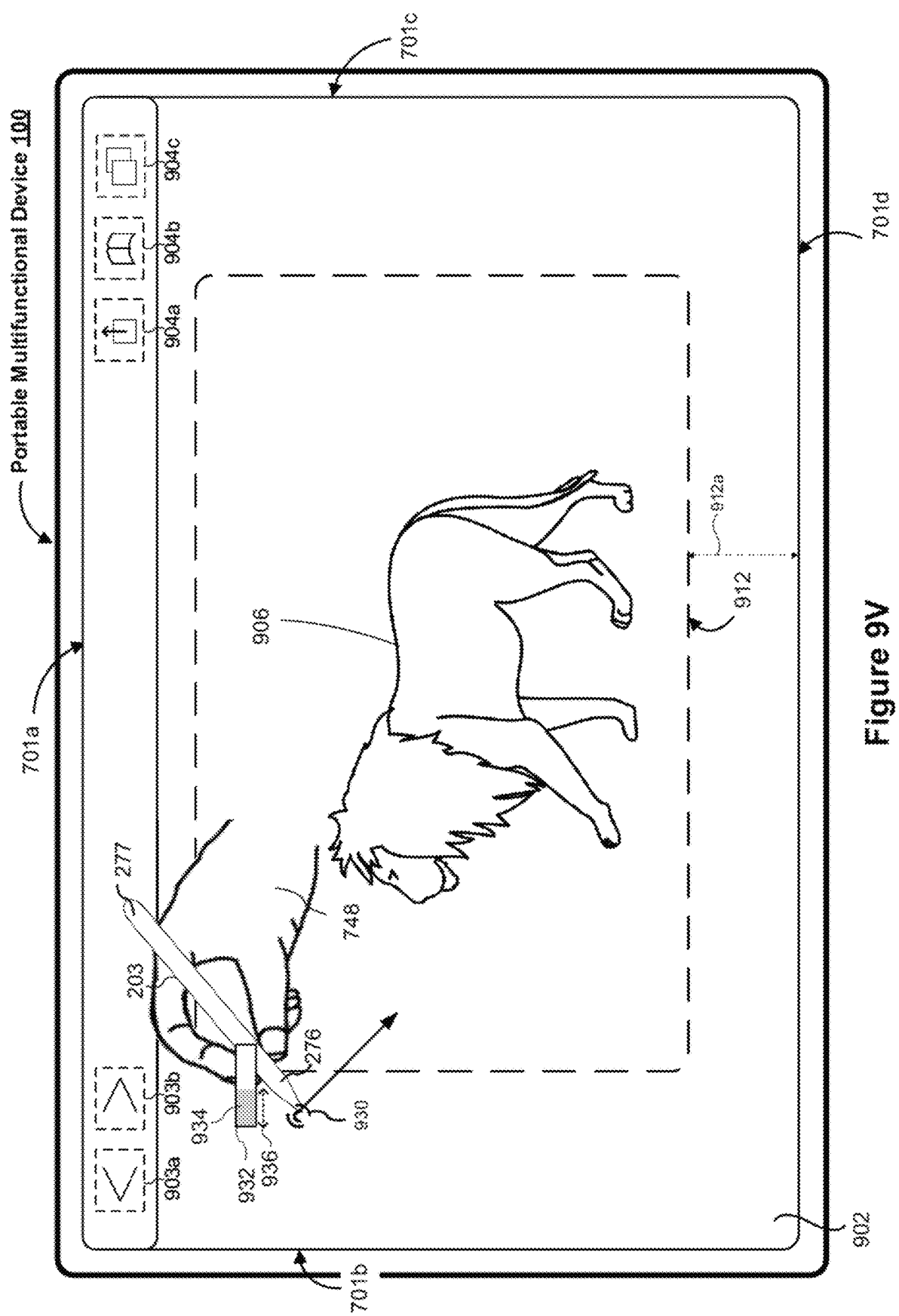

As illustrated in FIG. 9V, as the fourth stylus movement 930 proceeds nearer to the release point, the electronic device 100 changes the display. In contrast to the example provided above with reference to FIGS. 9Q-9T, the electronic device 100 foregoes displaying the screenshot preview interface 913 and instead displays a stylus movement indicator 932. The stylus movement indicator 932 indicates how near the fourth stylus movement 930 is to crossing into the second region 912. As will be described below, in response to detecting the fourth stylus movement 930 cross into the second region 912, the electronic device 100 displays the screenshot capture menu 938. Namely, as illustrated in FIG. 9V, the stylus movement indicator 932 includes an amount 934 of color corresponding to approximately half of the stylus movement indicator 932 because the fourth stylus movement 930 is approximately halfway to crossing into the second region 912 from its starting point. One of ordinary skill in the art will appreciate that the stylus movement indicator 932 may indicate how near is to crossing into the second region 912 in different ways.

Figure 9W:
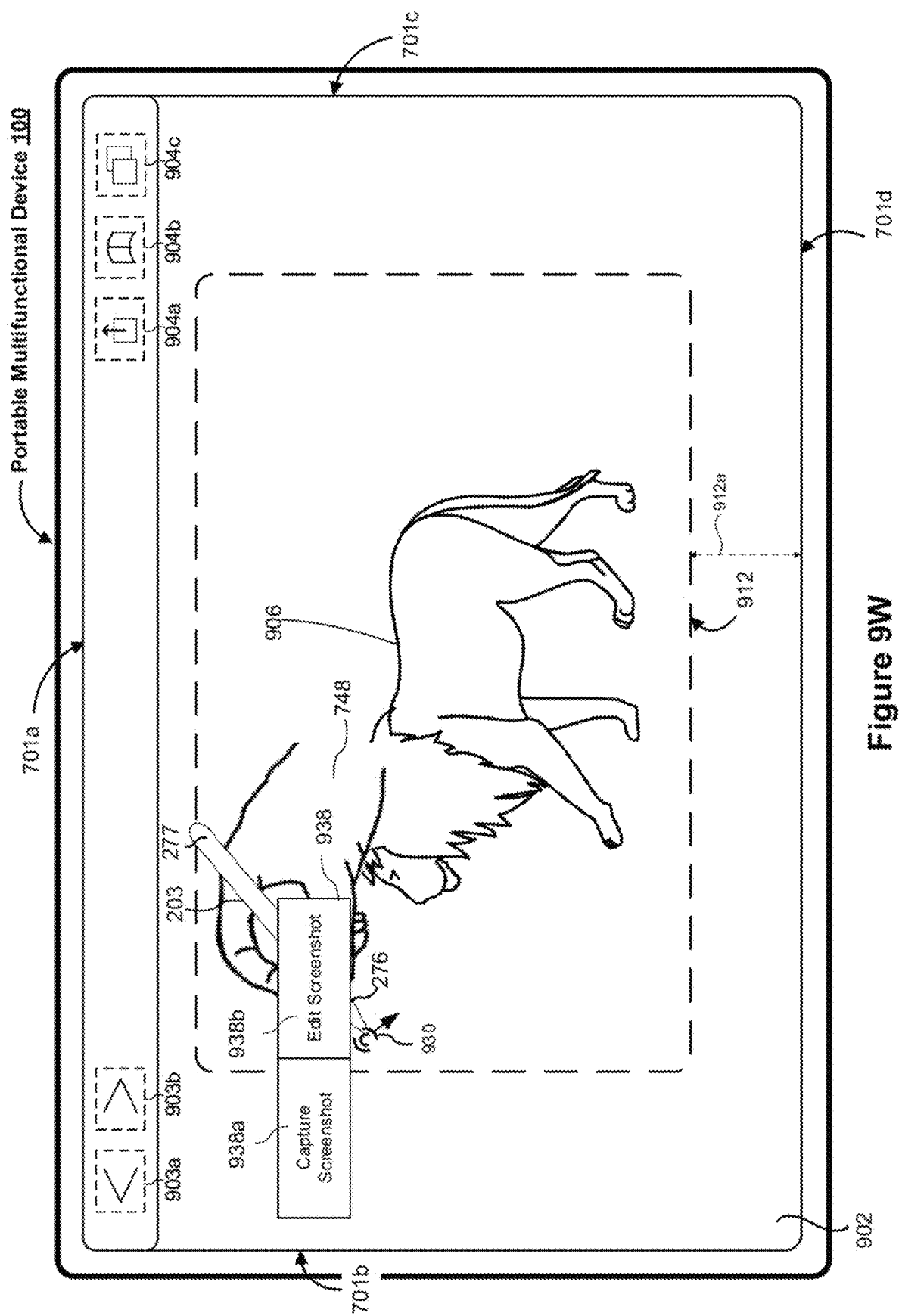
Figure 9X:
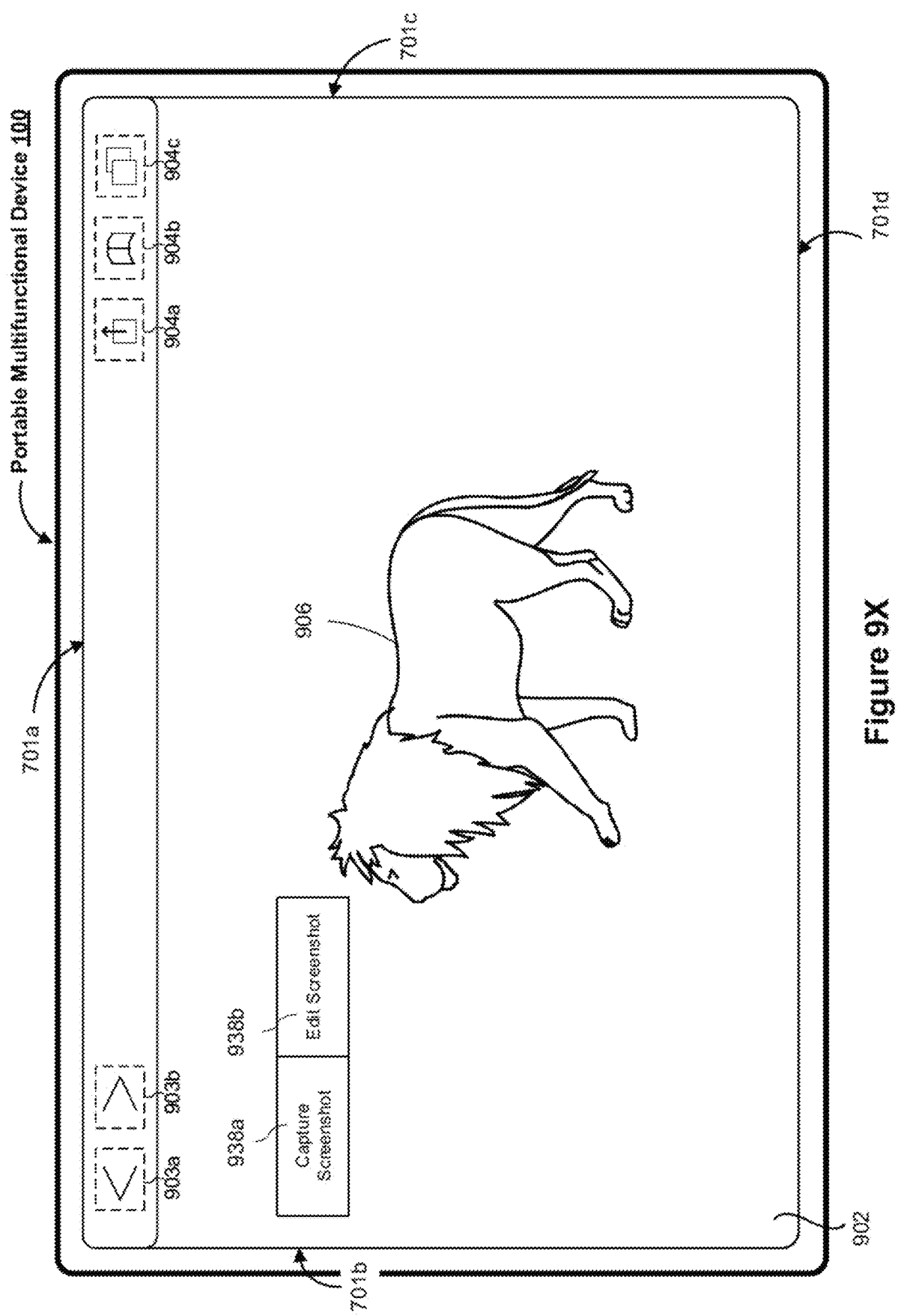

As illustrated in FIG. 9W, the electronic device 100 detects the fourth stylus movement 930 crossing into the second region 912. Accordingly, the electronic device 100 replaces the stylus movement indicator 932 with the screenshot capture menu 938 in FIG. 9W. The screenshot capture menu 938 includes a capture screenshot affordance 938a and an edit screenshot affordance 938b. In response to detecting release of the fourth stylus movement 930 within the second region 912, the electronic device 100 maintains displays of the screenshot capture menu 938, as illustrated in FIG. 9X.

In response to detecting an input directed to the capture screenshot affordance 938a, the electronic device 100 captures a screenshot image without displaying the screenshot image or a screenshot editing interface. In some implementations, the electronic device 100 pastes the captured screenshot in response to detecting a subsequent paste input.

Figure 9Y:
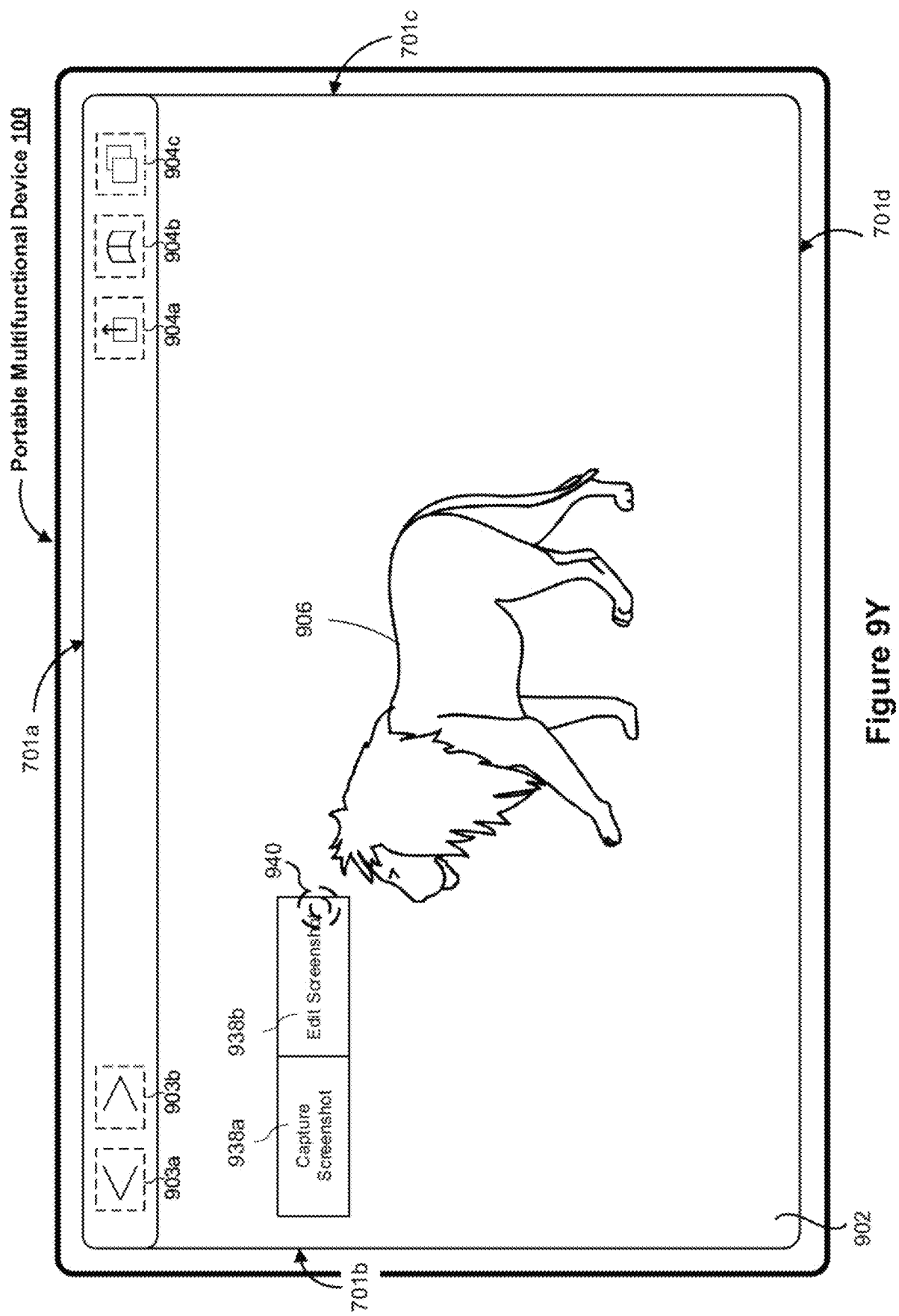
Figure 9Z:
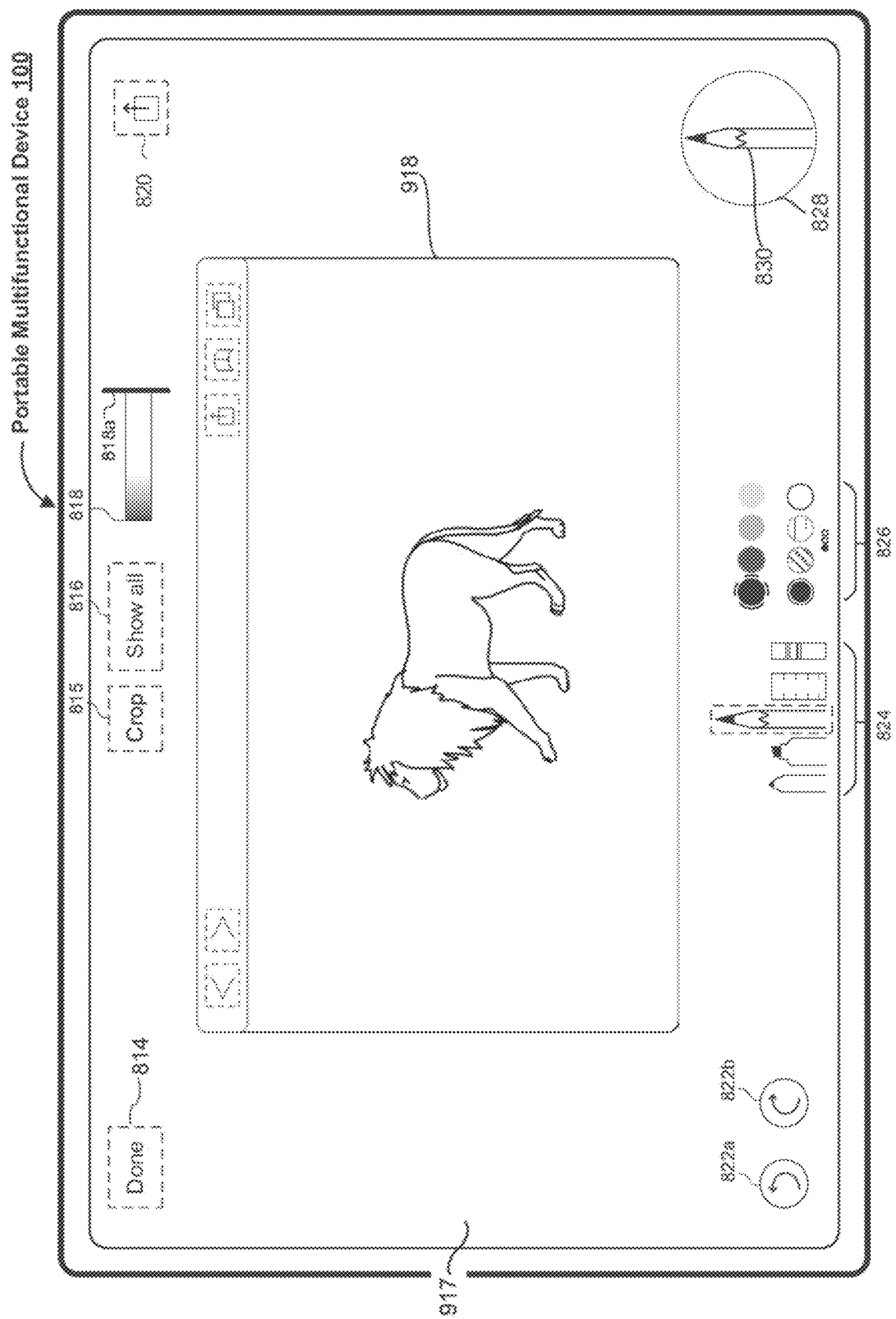

On the other hand, as illustrated in FIGS. 9Y and 9Z, in response to detecting an input 940 directed to the edit screenshot affordance 938b in FIG. 9Y, the electronic device 100 displays the screenshot editing interface 917, as illustrated in FIG. 9Z.

FIGS. 10A-10D are a flow diagram of a method 1000 for repositioning a drawing palette in accordance with some embodiments. In some embodiments, the method 1000 is performed at an electronic device (e.g., the electronic device 300 in FIG. 3, or the portable multifunction device 100 in FIG. 1A and FIGS. 7A-7CF) with one or more processors, a non-transitory memory, an input device, and a display device. Some operations in the method 1000 are, optionally, combined and/or the order of some operations is, optionally, changed.

An electronic device that, in response to receiving a request to move a drawing palette, repositions the drawing palette and, in various circumstances, changes the appearance of (e.g., resizes or reduces the number of content manipulation affordances) the drawing palette improves the operability of the electronic device. For example, repositioning the drawing palette results in a larger useable display area for drawing operations and other content modification operations. Moreover, the electronic device is configured to perform one of multiple reposition operations in response to a single input based on a target location requested by the input. Accordingly, cluttering of the user interface is reduced by avoiding display of distinct multiple affordances corresponding to the multiple reposition operations.

Figure 10A:
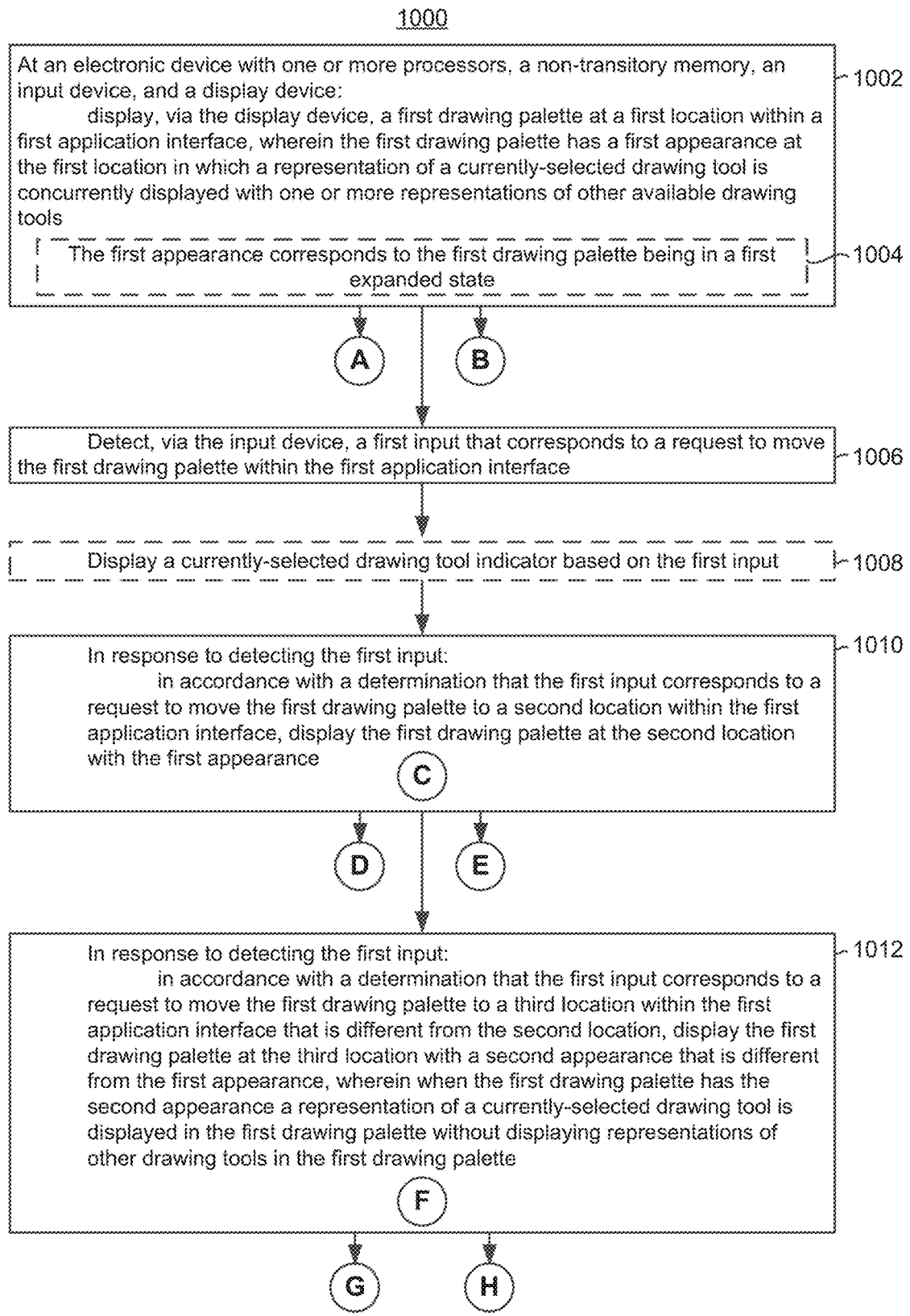

With respect to FIG. 10A, the electronic device displays (1002), via the display device, a first drawing palette at a first location within a first application interface, wherein the first drawing palette has a first appearance at the first location in which a representation of a currently selected drawing tool is concurrently displayed with one or more representations of other available drawing tools. For example, the first application interface corresponds to a drawing application. As another example, the first drawing palette is anchored to a corner or an edge of the first application interface.

In some embodiments, the electronic device displays the first drawing palette having a first appearance and positioned along (e.g., substantially parallel to) an edge of the first application interface. For example, with reference to FIG. 7A, the electronic device 100 displays the first drawing palette 704 along the fourth edge 701d of the first application interface 702. Continuing with this example, as compared with a second appearance of the first drawing palette 704, the first appearance of the first drawing palette 704 includes more content manipulation affordances (e.g., 704a-704g) and, in various embodiments, is larger in size than the second appearance of the first drawing palette 704.

In some embodiments, the first appearance corresponds (1004) to the first drawing palette being in a first expanded state. The electronic device displays multiple content manipulation affordances while the first drawing palette is in the first expanded state, avoiding the need for inputs that bring up the multiple content manipulation affordances. Accordingly, the electronic device experiences less wear-and-tear and uses less battery and processing resources. As one example, with reference to FIG. 7A, the electronic device 100 displays the first drawing palette 704 in the first expanded state including multiple content manipulation affordances 704a-704g.

The electronic device detects (1006), via the input device, a first input that corresponds to a request to move the first drawing palette within the first application interface. For example, the first input corresponds to a drag input, such as the drag input 708 in FIGS. 7B-7D directed to the first drawing palette 704. As another example, the first input corresponds to a flick input, such as the flick input 729 directed to the first drawing palette 704 in FIGS. 7AC and 7AD. In some embodiments, the first input corresponds to a touch input or a stylus input detected on a touch-sensitive surface of the electronic device. As another example, the first input corresponds to a mouse-input, such as a click-and-drag input.

In some embodiments, the electronic device displays (1008) a currently selected drawing tool indicator based on the first input. Displaying the representation of the path of the first input provides feedback to the user, ensuring that the drawing palette is moved as intended by the user and thus reducing the likelihood of further user interaction to provide different movement. Reducing the amount of user interaction with the electronic device reduces wear-and-tear of the electronic device and, for battery-powered devices, increases battery life of the electronic device. For example, the drawing tool indicator includes a visual representation of the currently selected drawing tool and, in various embodiments, its color (e.g., a circle with a picture of a pencil inside). As another example, the electronic device displays the drawing tool indicator when the first input is within a threshold distance from a corresponding edge or corner of the first application interface. In some embodiments, the electronic device rotates the drawing tool indicator based on a comparison between a respective orientation of the first drawing palette at a starting location and a respective orientation of the first drawing palette at an ending location.

As one example, with reference to FIGS. 7C and 7D, the electronic device 100 displays the drawing tool indicator 709 as the drag input 708 proceeds towards the first edge

701*a*. The drawing tool indicator 709 includes a black-tipped pencil 710*a* in order to indicate that a black-tipped pencil is the currently selected drawing tool. As another example, with reference to FIGS. 7P and 7Q, the electronic device 100 rotates the drawing tool indictor 709 as a corresponding drag input 723 cross into the fifth region 716*e* in order to match the orientation of the first drawing palette 704 in the fifth region 716*e*. As yet another example, with reference to FIGS. 7AD-7AF, the electronic device 100 rotates the drawing tool indicator 709 in order to match the orientation of the first drawing palette 704 in the seventh region 716*g*. Because the first input 729 corresponds to a flick input type, the electronic device 100 progressively rotates the drawing tool indicator 709 in FIGS. 7AD-7AF.

In response to detecting the first input: in accordance with a determination that the first input corresponds to a request to move the first drawing palette to a second location within the first application interface, the electronic device displays (1010) the first drawing palette at the second location with the first appearance. For example, the electronic device moves the first drawing palette including multiple content manipulation affordances from one edge of the first application interface to another edge of the first application interface. In some embodiments, the first drawing palette at the second location has the same orientation as the first drawing palette at the first location, such as illustrated in FIGS. 7B-7E. In some embodiments, the first drawing palette at the second location has a different orientation than the first drawing palette at the first location, such as illustrated in FIGS. 7O-7R and 7AC-7AG.

In response to detecting the first input: in accordance with a determination that the first input corresponds to a request to move the first drawing palette to a third location within the first application interface that is different from the second location, the electronic device displays (1012) the first drawing palette at the third location with a second appearance that is different from the first appearance, wherein, when the first drawing palette has the second appearance, a representation of a currently selected drawing tool is displayed in the first drawing palette without displaying representations of other drawing tools in the first drawing palette. For example, the electronic device moves the first drawing palette including multiple content manipulation affordances from one edge of the first application interface to a corner of the first application interface.

As one example, with reference to FIGS. 7AN-7AP, in response to determining that the drag input 734 corresponds to a request to move the first drawing palette 704 from the second region 716*b* to the first region 716*a*, the electronic device 100 displays the first drawing palette 704 in the first region 716*a* with the second appearance in FIG. 7AP. The first drawing palette 704 with the second appearance includes the currently selected drawing tool indicator 735*a*, but not representations of other drawing tools. In some embodiments, as illustrated in FIGS. 7AN-7AP, the orientation of the first drawing palette 704 having the first appearance in FIG. 7AN (e.g., facing leftwards) matches the orientation of the first drawing palette 704 having the second appearance in FIG. 7AP. In embodiments where the source location and the destination location do not share an edge (e.g., the seventh region 716*g* and the third region 716*c*), the orientation of the first drawing palette having the first appearance may not match the orientation of the first drawing palette having the second appearance.

Figure 10B:
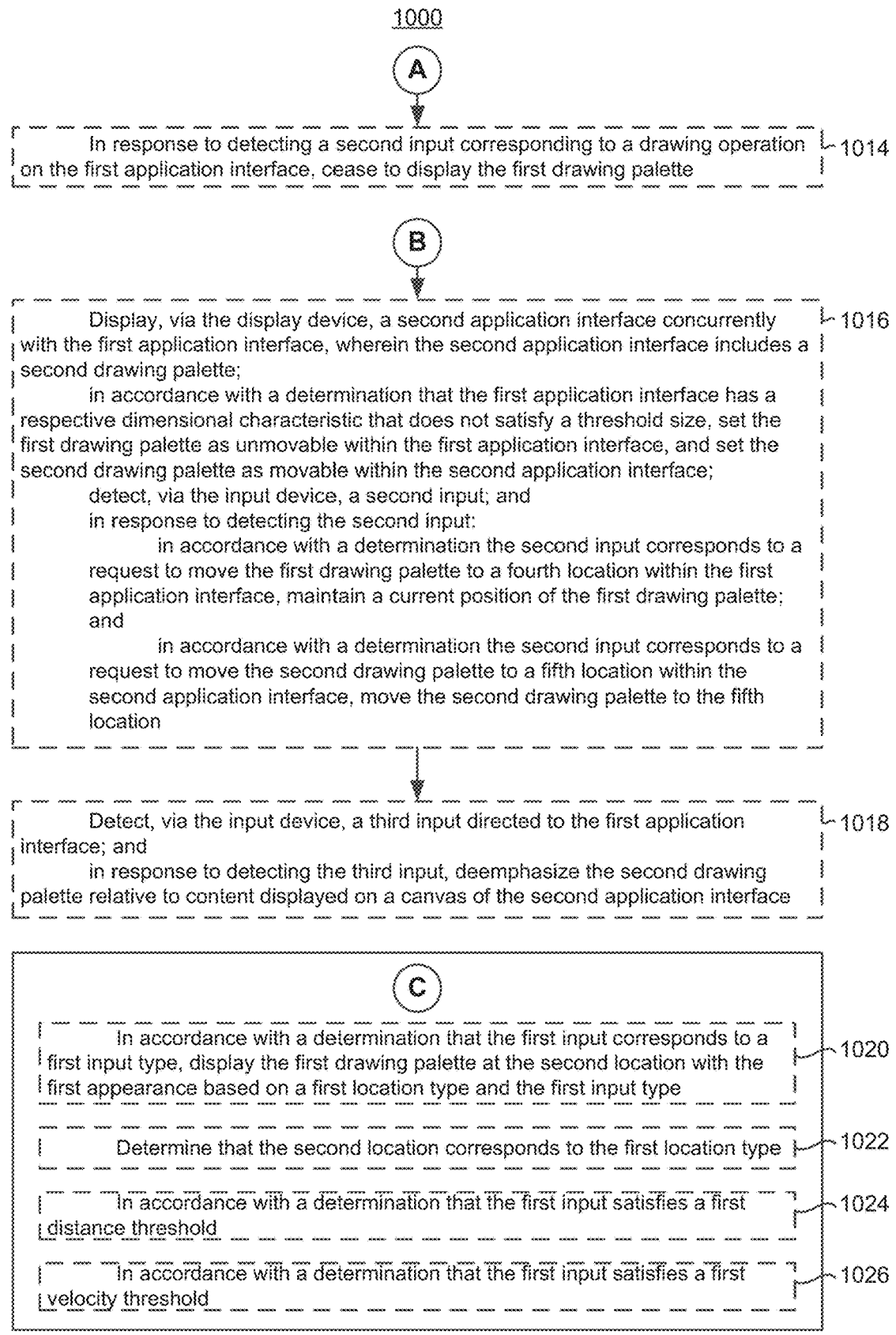

With reference to FIG. 10B, in some embodiments, in response to detecting a second input corresponding to a drawing operation on the first application interface, the electronic device ceases (1014) to display the first drawing palette. Ceasing to display the first drawing palette increases the useable display area of the first application interface.

In some embodiments, the electronic device displays (1016), via the display device, a second application interface concurrently with the first application interface, wherein the second application interface includes a second drawing palette. In accordance with a determination that the first application interface has a respective dimensional characteristic that does not satisfy a threshold size, the electronic device sets (1016) the first drawing palette as unmovable within the first application interface, and sets the second drawing palette as movable within the second application interface. Moreover, the electronic device detects (1016), via the input device, a second input. In response to detecting the second input: in accordance with a determination the second input corresponds to a request to move the first drawing palette to a fourth location within the first application interface, the electronic device maintains (1016) a current position of the first drawing palette; and in accordance with a determination the second input corresponds to a request to move the second drawing palette to a fifth location within the second application interface, the electronic device moves (1016) the second drawing palette to the fifth location. Maintaining the current position of the first drawing palette, rather than moving the first drawing palette, reduces processing power and battery-usage by the electronic device. For example, the electronic device concurrently displays a first reduced-size representation of the first drawing palette within a first reduced-size representation of the first application interface and/or a second reduced-size representation of the second drawing palette within a second reduced-size representation of the second application interface. As another example, a respective dimensional characteristic corresponds to a width of a corresponding application interface, and the respective dimensional characteristic satisfies the threshold size when the width is sufficiently high (e.g., the corresponding application interface takes up more the 50% of the display region). In some embodiments, the first drawing application interface and the second drawing application interface are application windows of the same application. In some embodiments, the first drawing application interface and the second drawing application interface are application windows of different applications. In some embodiments, the first drawing application interface and the second drawing application interface are contiguously associated with (e.g., share a border line) or proximate to each other.

As one example, in response to detecting the drag input 778 in FIG. 7BY, the electronic device 100 determines that the first application interface 702 has a respective dimensional characteristic (e.g., the first width 764) that does not satisfy a threshold size and determines that the second application interface 758 has a respective dimensional characteristic (e.g., the second width 766) that satisfies the threshold size. Accordingly, as illustrated in FIG. 7BZ, the electronic device 100 replaces the first drawing palette 704 with a toolbar 777 within a fixed toolbar region in the first application interface 702 and maintains the second drawing palette 762 in the second application interface 758. Continuing with this example, in response to detecting the drag input 780 directed to the toolbar 777 in FIG. 7CA, the electronic device 100 maintains the current position of the toolbar 777 in FIG. 7CB. Continuing with this example, in response to detecting the drag input 782 directed to the second drawing palette 762 in FIG. 7CC, the electronic device 100 accordingly moves the second drawing palette 762 in FIGS. 7CD-7CF.

In some embodiments, the electronic device detects (1018), via the input device, a third input directed to the first application interface, and in response to detecting the third input, deemphasizes (1018) the second drawing palette relative to content displayed on a canvas of the second application interface. Deemphasizing the second drawing palette indicates that the first drawing palette and the first application interface are currently active, enhancing operability of the electronic device and making the electronic device more efficient. For example, the number of mistaken user inputs is reduced, which, additionally, reduces power usage and improves battery life of the electronic device by enabling the user to use the electronic device more quickly and efficiently.

For example, the third input corresponds to a drawing operation with respect to the first application interface, such as selection of a particular content manipulation affordance and/or drawing a mark on a canvas of the first application interface. As another example, deemphasizing corresponds to reducing focus, such as reducing brightness (e.g., dimming), increasing opacity, etc. In some embodiments, in response to detecting a fourth input directed to the second application interface, the electronic device restores the focus of the second drawing palette and, in various embodiments, reduces focus of the first drawing palette relative to content displayed on a canvas of the first application interface.

As one example, with reference to FIG. 7BV, the electronic device 100 detects a drawing input 774 directed to the second application interface 758. In response to detecting the drawing input 774, the electronic device 100 deemphasizes the first drawing palette 704 relative to the content 767 within the first application interface 702, as illustrated in FIG. 7BW. In response to detecting completion of the drawing input 774, the electronic device 100 restores (e.g., reemphasizes) the first drawing palette 704.

In some embodiments, in accordance with a determination that the first input corresponds to a first input type, the electronic device displays (1020) the first drawing palette at the second location with the first appearance based on a first location type and the first input type. By displaying the first drawing palette at the second location based on the first input type, the electronic device avoids moving the first drawing palette to the second location in response to input(s) that do not correspond to the first input type. Accordingly, the electronic device utilizes less processing power and battery usage. For example, the first input type corresponds to a drag input that completes within a particular predefined region (e.g., sufficiently near an edge or corner) of the first application interface. As another example, the first input type corresponds to a flick input in the direction of a particular predefined region (e.g., towards an edge), wherein the flick input satisfies a velocity threshold.

As one example, with reference to FIG. 7W, the electronic device 100 detects the drag input 726 directed to the first drawing palette 704 at a first location along the second edge 701b. In response to determining that the drag input 726 is of a drag input type and that the drag input 726 crosses into the fifth region 716e, the electronic device 100 displays the first drawing palette 704 at a second location along the third edge 701c in FIG. 7Z. As another example, with reference to FIG. 7AC, the electronic device 100 detects the flick input 729 directed to the first drawing palette 704 at a first location along the third edge 701c. In response to determining that the flick input 729 is of a flick input type and that the flick input 729 satisfies the velocity threshold, the electronic device 100 displays the first drawing palette 704 at a second location along the first edge 701a in FIG. 7AG.

In some embodiments, the determination that the first input corresponds to the request to move the first drawing palette to the second location includes (1022) determining that the second location corresponds to a first location type. By displaying the first drawing palette at the second location based on determining that the second location corresponds to the first location type, the electronic device avoids moving the first drawing palette to the second location in response to input(s) that do not request movement to the first location type. Accordingly, the electronic device saves processing power and battery usage. For example, the first location type corresponds to a location that is within a threshold distance from a corresponding edge (e.g., top edge, bottom edge, side edge) of the display. As another example, the first location type corresponds to a location that is within a first threshold distance from a first edge of the display and a second threshold distance away from a second edge of the display, wherein the second edge intersects with and is substantially perpendicular to the first edge. As one example, with reference to FIG. 7B, the electronic device 100 determines that the drag input 708 requests movement of the first drawing palette 704 to a first location by determining that the target location is of an edge type (e.g., the first edge 701a) and not a corner type.

In some embodiments, in accordance with a determination that the first input satisfies a first distance threshold (e.g., with respect to the second location), the electronic device determines (1024) that the first input corresponds to the request to move the first drawing palette to the second location and displays (1024) the first drawing palette at the second location with the first appearance. By moving the first drawing palette when the first input satisfies the first distance threshold, the electronic device avoids erroneously moving the first drawing palette in response to an input not intended to move the first drawing palette, such as an input that changes the currently selected drawing tool within the first drawing palette. Accordingly, the operability of efficiency of the electronic device is enhanced, resulting in reduced processor utilization and battery usage. In some embodiments, the first input satisfies the first distance threshold when the release location of the first input is within a threshold distance from a corresponding edge. On the other hand, in some embodiments, when the release location of the first input is not within a threshold distance from the corresponding edge, the electronic device moves the first drawing palette back to where it was located prior to detecting the first input.

As one example, with reference to FIG. 7W, the electronic device 100 determines that the drag input 726 crosses the distance threshold 720 that is a corresponding distance 720a away from the third edge 701c. Accordingly, the electronic device 100 displays the first drawing palette 704 along the third edge 701c in FIG. 7Z. As a counterexample, in response to determining that the drag input 713 in FIG. 7I does not cross the distance threshold 706 that is a corresponding distance 706a away from the first edge 701a, the electronic device 100 does not move the first drawing palette 704 to the first edge 701a and instead displays the first drawing palette 704 at its previous position (e.g., along the fourth edge 701d) in FIG. 7L.

In some embodiments, in accordance with a determination that the first input satisfies a velocity threshold, the electronic device determines (1026) that the first input corresponds to the request to move the first drawing palette to the second location and displays (1026) the first drawing palette at the second location with the first appearance. In some embodiments, the electronic device moves the first drawing palette based on a short-duration input (e.g., a flick input) that satisfies the velocity threshold. Accordingly, the electronic device avoids utilizing processing power and battery that would otherwise be used for longer-duration input (e.g., a drag input). For example, the first input corresponds to a flick input associated with a direction towards a particular region of an application interface and associated with a sufficiently high magnitude (e.g., speed, or acceleration of the flick input) in the particular direction. As one example, with reference to FIG. 7AC, the electronic device 100 detects the flick input 729 and determines that the flick input 729 has a horizontal component 729*a* and a vertical component 729*b* collectively associated with a direction towards the seventh region 716*g*, as indicated by the corresponding explanatory direction line 730. Moreover, the electronic device 100 determines that the flick input 729 is associated with a sufficiently high magnitude towards the seventh region 716*g*. Accordingly, as illustrated in FIGS. 7AD-7AG, the electronic device 100 moves the first drawing palette 704 to the seventh region 716*g*.

With reference to FIG. 10C, in some embodiments, while displaying the first drawing palette at the second location with the first appearance and having a first orientation, wherein the second location corresponds to a first location type, the electronic device: detects (1028), via the input device, a second input that corresponds to a request to move the first drawing palette to a fourth location within the first application interface, wherein the fourth location corresponds to the first location type. In response to detecting the second input in accordance with a determination that the fourth location is on an opposite side of the display as compared with the second location, the electronic device displays (1028) the first drawing palette at the fourth location with the first appearance and having the first orientation. In accordance with a determination that the fourth location is not on the opposite side of the display as compared with the second location, the electronic device displays (1028) the first drawing palette at the fourth location with the first appearance and having a second orientation different from the first orientation. By changing or maintaining the orientation of the first drawing palette according to a spatial relationship between the initial location and the destination location of the first drawing palette, the electronic device increases the amount of useable display area that would otherwise be covered (and thus rendered unusable) by the first drawing palette. For example, the second location corresponds to a first edge of the first application interface, and the second input corresponds to a request to move the first drawing palette to a second edge that is different from the first edge. As another example, as compared with the first orientation, the second orientation of the first drawing palette is rotated approximately 90 degrees. As yet another example, the electronic device displays the first drawing palette according to the first orientation when the first drawing palette is located at a top or bottom edge and displays the first drawing palette according to the second orientation when the first drawing palette is located at a side edge (e.g., left or right edge). In some embodiments, the electronic device resizes the first drawing palette at the fourth location because the second location of the first drawing palette corresponds to a shorter edge of the first application interface and the fourth location of the first drawing palette corresponds to a longer edge of the first application interface.

As one example, with reference to FIGS. 7B-7E, in response to determining that the fourth location (e.g., along the first edge 701*a*) is on the opposite side of the display as compared with the second location (e.g., fourth edge 701*d*) having a first orientation, the electronic device 100 displays, in FIG. 7E, the first drawing palette 704 at the fourth location with the first appearance and having the first orientation. As one example, with reference to FIGS. 7O-7R, in response to determining that the fourth location (e.g., along the third edge 701*c*) is not on the opposite side of the display as compared with the second location (e.g., fourth edge 701*d*) having a first orientation, the electronic device 100 displays, in FIG. 7R, the first drawing palette 704 at the fourth location with the first appearance and having a second orientation that is different from the first orientation. Namely, the second orientation is rotated approximately 90 degrees relative to the first orientation.

In some embodiments, the second appearance corresponds (1032) to the first drawing palette being in a condensed state. The first drawing palette in a condensed state covers less display space, and therefore the electronic device provides a larger useable display area. For example, the condensed state corresponds to a shrunken drawing palette. As another example, the electronic device displays the first drawing palette in the condensed stated when the first drawing palette is anchored to or proximate to a corner of the first application interface. In some embodiments, the first drawing palette in the condensed state includes fewer content manipulation affordances than does the first drawing palette in other states. In some embodiments, the first drawing palette in the condensed state is smaller than the first drawing palette in other states.

As one example, the electronic device 100 displays the first drawing palette 704 in the condensed state in FIG. 7AP so that the first drawing palette 704 is displayed proximate to a corresponding corner (e.g., the bottom right corner). As another example, the electronic device 100 displays the first drawing palette 704 in the condensed state in FIG. 7BA so that the first drawing palette 704 is displayed proximate to a corresponding corner (e.g., the top left corner).

In some embodiments, in accordance with a determination that the first input corresponds to a second input type that is different from the first input type, the electronic device displays (1034) the first drawing palette at the third location with the second appearance based on the first location type and the second input type. By displaying the first drawing palette at the third location based on the second input type, the electronic device avoids moving the first drawing palette to the third location in response to input(s) that do not correspond to the second input type. Accordingly, the electronic device saves processing power and battery usage. For example, the second input type corresponds to a flick or drag towards or to a corner.

As one example, in response to detecting that the drag input 734 corresponds to a drag input type towards a respective corner in FIG. 7AN, the electronic device 100 displays the first drawing palette 704 proximate to the respective corner in FIG. 7AP. As another example, in response to detecting that the drag input 744 corresponds to a drag input type towards a respective corner in FIG. 7AX, the electronic device 100 displays the first drawing palette 704 proximate to the respective corner in FIG. 7BA.

In some embodiments, the determination that the first input corresponds to the request to move the first drawing palette to the third location includes (1036) determining that that the third location corresponds to a second location type that is different from the first location type. By displaying the first drawing palette at the third location based on determining that the third location corresponds to the second location type, the electronic device avoids moving the first drawing palette to the third location in response to input(s) that do not request movement to the second location type. Accordingly, the electronic device utilizes less processing power and battery usage. For example, the second location type corresponds to a corner.

As one example, in response to detecting that the drag input 734 corresponds to a drag input type towards a respective corner in FIG. 7AN, the electronic device 100 displays the first drawing palette 704 proximate to the respective corner in FIG. 7AP. As another example, in response to detecting that the drag input 744 corresponds to a drag input type towards a respective corner in FIG. 7AX, the electronic device 100 displays the first drawing palette 704 proximate to the respective corner in FIG. 7BA.

In some embodiments, in accordance with a determination that the first input satisfies a second distance threshold different from the first distance threshold, the electronic device determines (1038) that the first input corresponds to the request to move the first drawing palette to the third location and displays (1038) the first drawing palette at the third location with the second appearance. By moving the first drawing palette when the first input satisfies the second distance threshold, the electronic device avoids erroneously moving the first drawing palette in response to an input not intended to move the first drawing palette, such as an input that changes the currently selected drawing tool within the first drawing palette. Accordingly, the operability of efficiency of the electronic device is enhanced, resulting in reduced processor utilization and battery usage. For example, the first input satisfies the second first distance threshold when the release location of the first input is within threshold distance(s) from a corner.

As one example, in response to detecting that the drag input 734 in FIG. 7AN crosses a second distance threshold 718 that is a corresponding distance 718a from the first edge 701a (e.g., within the first region 716a), the electronic device 100 displays the first drawing palette 704 within the first region 716a having the second appearance in FIG. 7AP. As another example, in response to detecting that the drag input 744 in FIG. 7AX crosses a distance threshold 722 that is a corresponding distance 722a from the fourth edge 701d and crosses a distance threshold 720 that is a corresponding distance 720a from the third edge 701c (e.g., within the sixth region 716f), the electronic device 100 displays the first drawing palette 704 within the sixth region 716f having the second appearance in FIG. 7BA.

With reference to FIG. 10D, in some embodiments, while displaying the first drawing palette in the condensed state at the third location, the electronic device: detects (1040), via the input device, a touch input directed to the first drawing palette; and in response to detecting the touch input, displays (1040) the first drawing palette in a second expanded state that is different from the first expanded state, wherein the first drawing palette in the second expanded state includes more drawing tools than the first drawing palette in the condensed state. By including more drawing tools within a single user interface, the electronic devices avoided detecting additional inputs corresponding to selections of respective drawing tools. For example, the second expanded state corresponds to a preview drawing palette that provides a preview of selectable drawing tools and closes in response to selection of a particular drawing tool. In some embodiments, the first drawing palette in the second expanded state (e.g., the preview drawing palette 738 in FIG. 7AS) includes fewer drawing tools than the first drawing palette in the first expanded state (e.g., the full-sized drawing palette 704 in FIG. 7E). In some embodiments, the electronic device expands the first drawing palette in the condensed state according to the current orientation of the first drawing palette in the condensed state in order to display the first drawing palette in the second expanded state. In some embodiments, the electronic device displays the first drawing palette in the second expanded state in response to detecting the touch input for a threshold amount of time.

As one example, in response to detecting the touch input 736 directed to the first drawing palette 704 in the condensed state in FIG. 7AR, the electronic device 100 displays the first drawing palette 704 in the second expanded state in FIG. 7AS. Notably, in FIG. 7AR, because the currently selected drawing tool indicator 735a is oriented (e.g., pointing) leftwards, the electronic device 100 expands the first drawing palette 704 upwards in order to maintain the orientation, as illustrated in FIG. 7AS. On the other hand, the electronic device 100 expands the first drawing palette 704 rightwards in FIG. 7BD in order to maintain the upward-facing orientation of the currently selected drawing tool indicator 735a in FIG. 7BC.

In some embodiments, the electronic device detects (1042), via the input device, a second input directed to a particular content manipulation affordance within the first drawing palette in the second expanded state. In response to detecting the second input, the electronic device sets (1042) a current content manipulation setting associated with the first drawing palette according to the particular content manipulation affordance. By enabling selection of the particular content manipulation affordance within the first drawing palette, the electronic device reduces inputs related to opening and closing additional user interfaces for selecting a content manipulation affordance. Accordingly, the electronic device expends fewer processing and battery resources. In some embodiments, the second input corresponds to a drag input (e.g., finger drag) along the first drawing palette in the second expanded state, wherein the release point of the drag input corresponds to the particular content manipulation affordance. In some embodiments, the second input corresponds to a stylus touch input directed the particular content manipulation affordance. For example, the particular content manipulation affordances corresponds to a particular tool, color, operation (e.g., undo/redo), and/or the like.

As one example, while the electronic device 100 is displaying the preview palette 738 in FIG. 7AT, the electronic device 100 detects a drag input 740 that selects the gray-tipped pencil tool affordance 738c. Accordingly, the electronic device 100 sets the gray-tipped pencil as the currently selected drawing tool and updates the currently selected drawing tool indicator 735a as the gray-tipped pencil in FIG. 7AU. As another example, while the electronic device 100 is displaying the preview palette 738 in FIG. 7BE, the electronic device 100 detects a stylus tap input 750 that selects the black-tipped pencil affordance 738a. Accordingly, the electronic device 100 sets the black-tipped pencil as the currently selected drawing tool and updates the currently selected drawing tool indicator 735a to be the black-tipped pencil in FIG. 7BF.

In some embodiments, while displaying the first drawing palette at the second location or the third location, the electronic device: detects (1044), via the input device, a tap input directed to the first drawing palette. In response to detecting the tap input, the electronic device moves (1044) the first drawing palette to the first location. Moving the first drawing palette back to the first location in response a tap input, rather than a drag input or flick input, reduces processor and battery utilization due to the tap input having a shorter duration. In some embodiments, the tap input corresponds to one of a single tap or a double tap. As one example, the tap input is a single tap when the first drawing palette is in a first expanded state, such as the tap input 711 directed to the first drawing palette 704 in a second location in FIG. 7F. Accordingly, the electronic device 100 moves the first drawing palette 704 back to a first location, as illustrated in FIGS. 7G-7I. As another example, in response to detecting a tap input directed to the first drawing palette in a condensed state (e.g., the first drawing palette 704 in FIG. 7AP), the electronic device moves the first drawing palette to its previous position.

Figure 11A:
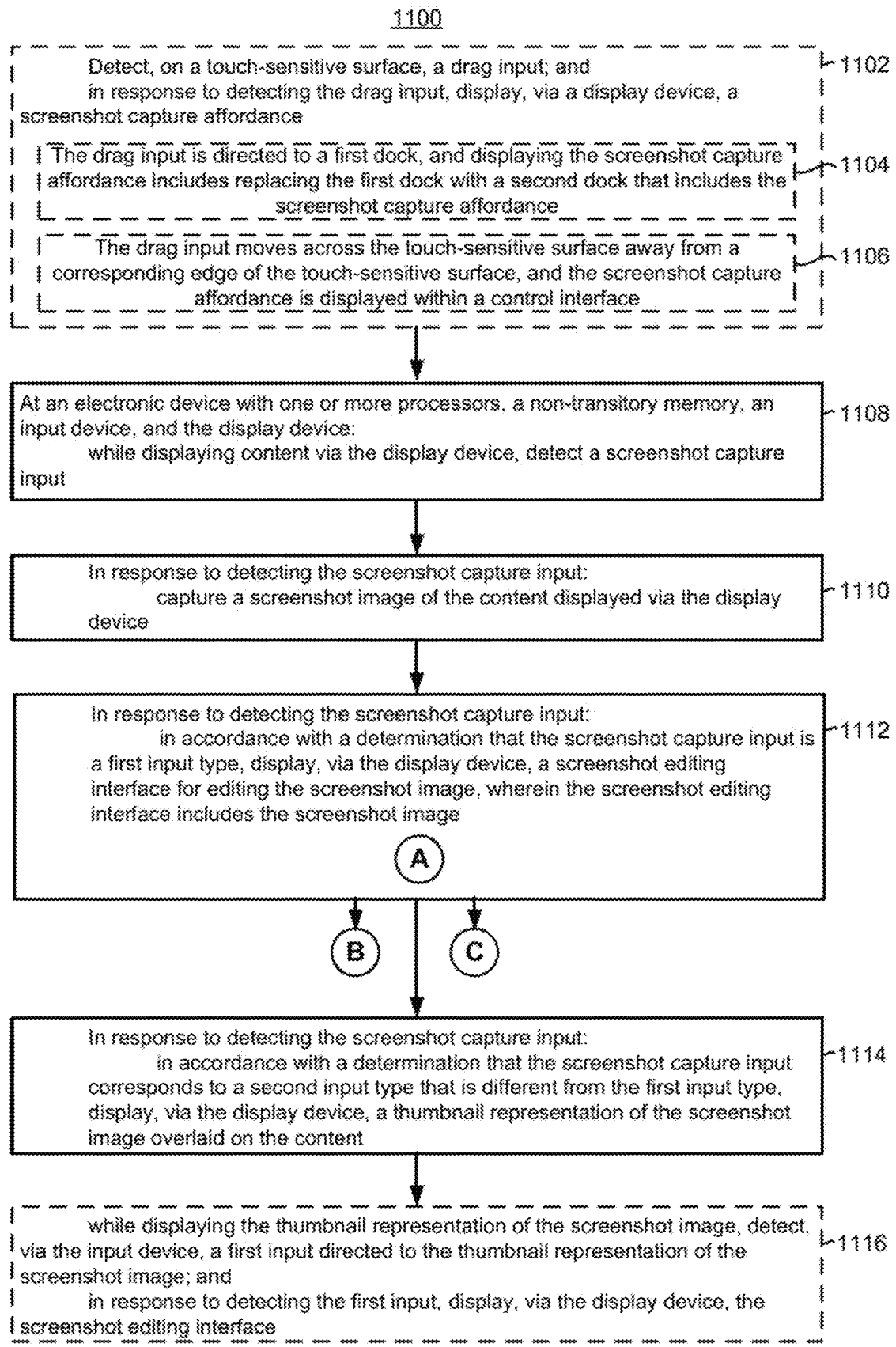
Figure 12A:
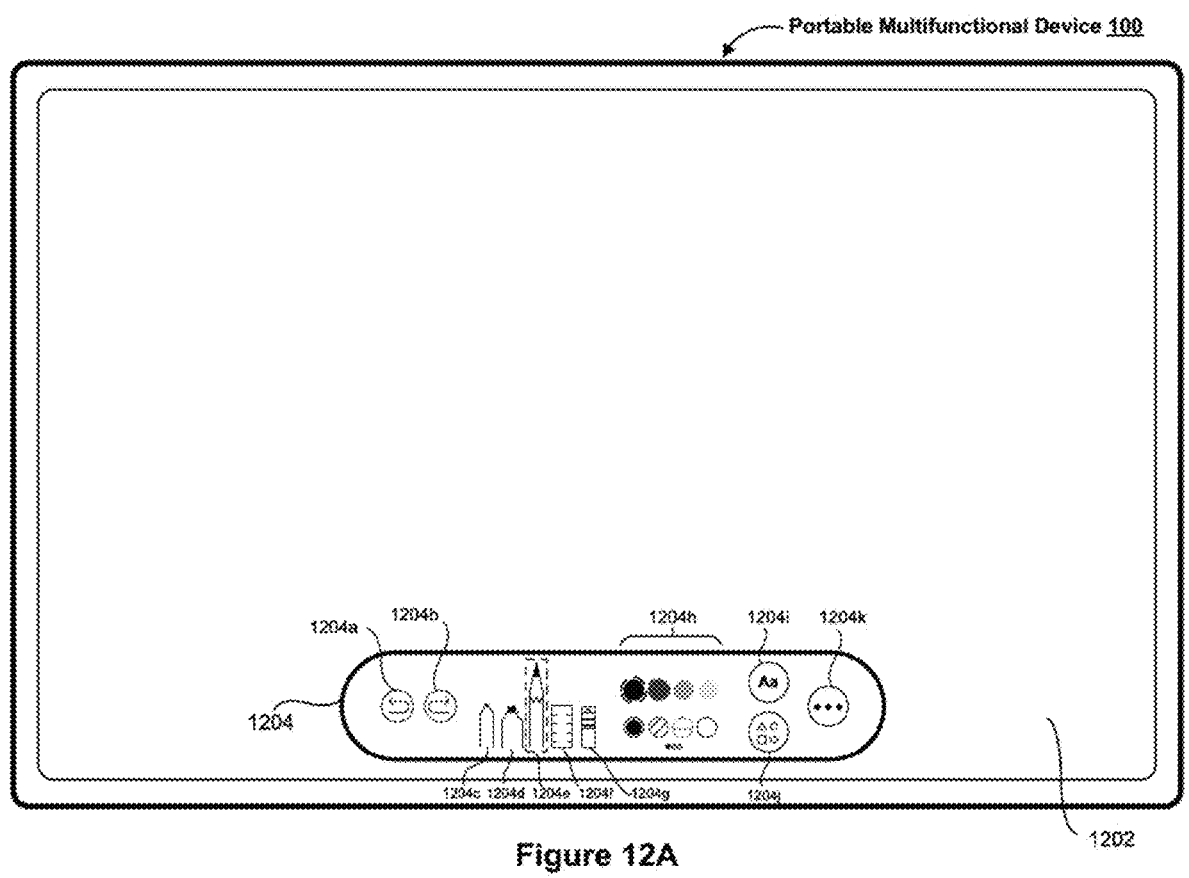
FIGS. 12A-12AP are examples of user interfaces for selectively erasing portions of an object in accordance with some embodiments.

FIGS. 11A-11C are a flow diagram of a method 1100 for invoking and utilizing a screenshot editing interface in accordance with some embodiments. In some embodiments, the method 1100 is performed at an electronic device (e.g., the electronic device 300 in FIG. 3, or the portable multifunction device 100 in FIG. 1A, FIGS. 8A-8AL, and/or FIGS. 9A-9Z) with one or more processors, a non-transitory memory, an input device, and a display device. Some operations in the method 1100 are, optionally, combined and/or the order of some operations is, optionally, changed.

The method 1100 includes, in response to detecting a single screenshot capture input, displaying a screenshot editing interface for editing a screenshot image or a thumbnail representation of the screenshot image based on an input type of the screenshot capture input. Accordingly, the method 1100 provides additional control options without cluttering the user interface with additional displayed controls. Moreover, the method 1100 provides an intuitive way to edit a screenshot image. The method 1100 reduces the cognitive burden on a user when editing a screenshot image, thereby creating a more efficient human-machine interface. For battery-operated electronic devices, enabling a user to edit a screenshot image faster and more efficiently conserves power and increases the time between battery charges.

With respect to FIG. 11A, in some embodiments, the electronic device detects (1102), on a touch-sensitive surface, a drag input. In response to detecting the drag input, the electronic device displays (1102), via a display device, a screenshot capture affordance. In some embodiments, the electronic device displays the screenshot capture affordance within a user interface that includes other affordances, such as icons corresponding to respective applications. Displaying the user interface with multiple affordances including the screenshot capture affordance reduces the number of inputs for opening different user interfaces including the multiple affordances. Accordingly, the electronic devices utilize less processing resources, improving battery life of the electronic device. For example, the drag input corresponds to a drag up from the bottom of the display area or a drag down from the top of the display area. As one example, in response to detecting the drag input 808 in FIG. 8B, the electronic device 100 displays the screenshot capture affordance 810*b* within an interface including a plurality of application representations 810*a* in FIG. 8C.

In some embodiments, the drag input is directed to a first dock, and displaying the screenshot capture affordance includes (1104) replacing the first dock with a second dock that includes the screenshot capture affordance. By ceasing to display the first dock, the electronic device saves processing resources and battery life while providing the screenshot capture affordance within the second dock for capturing a screenshot image. For example, replacing the first dock with the second dock includes the electronic device expanding the first dock in order to display the second dock.

In some embodiments, the drag input moves across the touch-sensitive surface away from a corresponding edge of the touch-sensitive surface, and the electronic device displays (1106) the screenshot capture affordance within a control interface. In some embodiments, the electronic device displays and expands the control interface from the corresponding edge according to the drag input. By expanding the control interface from the corresponding edge as the drag input proceeds, the electronic device provides feedback in order to avoid having the control interface avoid obscuring (e.g., covering) content on the display. As one example, in response to detecting the upward drag input 808 in FIG. 8B, the electronic device 100 displays the interface 810 that includes the screenshot capture affordance 810*b* upward in FIG. 8C.

While displaying content via the display device, the electronic device detects (1108) a screenshot capture input. For example, the screenshot capture input is directed to the screenshot capture affordance, as is illustrated in FIG. 8B. As another example, the screenshot capture input is a combination of hardware inputs, such as by the electronic device 100 detecting concurrent presses of the home button via a second screenshot capture input 858 and the push button 206 via a second screenshot capture input 860 in FIG. 8T.

In response to detecting the screenshot capture input, the electronic device captures (1110) a screenshot image of the content displayed via the display device. In some embodiments, the electronic device captures the screenshot image and stores the screenshot image in a non-transitory memory (e.g., random-access memory (RAM) or cache). As one example, with reference to FIG. 8D, in response to detecting the first screenshot capture input 811, the electronic device captures a screenshot image of the content 803*a*, 803*b*, 804*a*-804*c*, and 806.

In response to detecting the screenshot capture input: in accordance with a determination that the screenshot capture input is a first input type, the electronic device displays (1112), via the display device, a screenshot editing interface for editing the screenshot image, wherein the screenshot editing interface includes the screenshot image. For example, the first input type corresponds to selecting a screenshot capture affordance displayed on the display. In some embodiments, the first input type corresponds to one of a standard tap input (e.g., finger tap) or a stylus tap input. As one example, in response to detecting the first screenshot capture input 811 in FIG. 8D, the electronic device 100 displays the screenshot editing interface 812 including the screenshot image 813 in FIG. 8E.

In response to detecting the screenshot capture input: in accordance with a determination that the screenshot capture input corresponds to a second input type that is different from the first input type, the electronic device displays (1114), via the display device, a thumbnail representation of the screenshot image overlaid on the content. For example, the second input type is a hardware-based input, such as a press of one or more hardware buttons on the electronic device. As one example, in response to concurrently detecting a respective hardware input 858 directed to the home button 204 and a respective hardware input 860 directed to the push button 206 in FIG. 8T, the electronic device 100 displays the thumbnail representation 862 of the screenshot image overlaid on the content in FIG. 8U.

With reference to FIG. 11B, in some embodiments, the first input type includes (1116) movement of a stylus across a touch-sensitive surface of the electronic device away from an edge of the touch-sensitive surface (e.g., the criteria for determining that an input is an input of the first type that triggers capture of a screenshot and, optionally, entering a screenshot editing interface, includes a requirement that the input be a swipe gesture away from an edge of the touch-sensitive surface). By displaying the screenshot editing interface in response to determining that the screenshot capture input corresponds to the release of the movement of the stylus, the electronic device avoids displaying the screenshot editing interface in response to a non-stylus movement, such as a finger movement. Accordingly, the electronic device saves processing power and battery by not displaying the screenshot editing interface in response to detecting certain types of inputs. For example, in response to detecting the first stylus movement 908 in FIG. 9B-9D, the electronic device 100 displays the screenshot editing interface 917 in FIG. 9E. As a counterexample, in response to detecting the first non-stylus drag input 922 (e.g., a finger drag input) in FIGS. 9I-9K, the electronic device 100 foregoes displaying a screenshot editing interface in FIG. 9L. As another counterexample, in response to detecting the second non-stylus drag input 924 (e.g., a finger drag input) originating at the bottom edge 701*d* of the display interface in FIG. 9M, the electronic device 100 foregoes displaying a screenshot editing interface and displays an interface 810 that includes the screenshot capture affordance 810*b* in FIG. 9N. In some embodiments, as the electronic device detects the movement of the stylus, the electronic device displays an animation representing a corresponding shrinking of the displayed content. For example, with reference to FIGS. 9B-9D, the electronic device shrinks a screenshot preview region 916 according to the first stylus movement 908. In some embodiments, the animation includes an outer region, such as the outer region 914 in FIGS. 9B-9D.

In some embodiments, the release point within the touch-sensitive surface is (1118) a threshold distance away from a target location on the touch-sensitive surface (e.g., the criteria for determining that an input is an input of the first type that triggers capture of a screenshot and, optionally, entering a screenshot editing interface includes a requirement that the input be a swipe gesture from an edge of the touch-sensitive surface and includes a lift off of a contact that performed the gesture at least a threshold distance away from a target location on the touch-sensitive surface). By displaying the screenshot editing interface in response to determining that the release point is the threshold distance away from the target location, the electronic device avoids erroneously displaying the screenshot editing interface. For example, the electronic device avoids displaying the screenshot editing interface in response to a stylus movement intended to add content (e.g., draw a mark) within a canvas of the current application interface. Avoiding erroneously displaying the screenshot editing interface improves the operability of the electronic device. For example, the target location is at or near the center of the touch-sensitive surface.

As one example, in response to determining that the first stylus movement 908 crosses into the second region 912 that is the second threshold distance 912*a* from the edges 701*a*-701*d* in FIG. 9D, the electronic device 100 displays the screenshot editing interface 917 in FIG. 9E. As a counterexample, in response to determining that the second stylus movement 920 does not cross into the second region 912 in FIG. 9G, the electronic device 100 foregoes displaying a screenshot editing interface in FIG. 9H.

In some embodiments, the first input type corresponds to movement of a stylus across a touch-sensitive surface of the electronic device away from a corner of the touch-sensitive surface (e.g., the criteria for determining that an input is an input of the first type that triggers capture of a screenshot and, optionally, entering a screenshot editing interface includes a requirement that the input be a swipe gesture from a corner of the touch-sensitive surface, such as a lower corner of the touch-sensitive surface). In some embodiments, the first input type corresponds (1120) to movement of a stylus across a touch-sensitive surface of the electronic device away from a corner of the touch-sensitive surface By displaying the screenshot editing interface when the movement of the stylus originates at the threshold distance from a corresponding corner, the electronic device avoids erroneously displaying the screenshot editing interface in response to certain stylus movement inputs. Accordingly, the electronic device saves processing power and battery by not displaying the screenshot editing interface in response to detecting certain types of inputs. For example, as illustrated in FIG. 9Q, the electronic device 100 detects the third stylus movement 928 that originates at the threshold distance 929 from a corresponding corner. Continuing with this example, in response to detecting a release point of the third stylus movement 928 is within the second region 912 in FIG. 9S, the electronic device 100 displays the screenshot editing interface 917 in FIG. 9T.

In some embodiments, the screenshot editing interface further includes (1122) a drawing palette at a first location within the screenshot editing interface, and the first drawing palette is movable to a second location within the screenshot editing interface in response to a first input directed to the first drawing palette. An electronic device that includes a movable first drawing palette improves the operability of the electronic device. For example, moving the first drawing palette results in a larger useable display area for drawing operations and other content modification operations. As one example, in response to detecting the drag input 876 that requests movement of the first drawing palette 704 to along the third edge 701*c* in FIGS. 8AB-8AD, the electronic device 100 accordingly moves the first drawing palette 704, as illustrated in FIG. 8AE. Accordingly, the bottom region of the screenshot editing interface 812 covered by the first drawing palette 704 in FIG. 8AB is available for editing operations in FIG. 8AE.

In some embodiments, while displaying the screenshot editing interface that includes an opacity level affordance, the electronic device detects (1124), via the input device, a first input directed to the opacity level affordance, wherein the first input sets the opacity level affordance to a respective opacity value. In response to detecting the first input, the electronic device changes (1124) an opacity of a filtering layer that is overlaid on the screenshot image to the respective opacity value. Changing the opacity of the filtering layer in response to detecting the first input without requiring further inputs enhances the operability of the electronic device by reducing processor and battery utilization. For example, the filtering layer corresponds to a semi-transparent layer. In some embodiments, the screenshot editing interface includes three layers, wherein the screenshot image corresponds to the bottom layer, the filtering layer corresponds to the middle layer, and the markup (e.g., annotation) layer corresponds to the top layer.

As one example, as illustrated in FIG. 8H, the electronic device 100 detects the drag input 836 directed to the opacity value indicator 818*a* of the opacity level affordance 818 that sets the opacity level affordance to a respective opacity value. In response to detecting the drag input 836 in FIG. 8H, the electronic device 100 changes an opacity of a first filtering layer 838 that is overlaid on the screenshot image 813 to the respective opacity value in FIG. 8I. As another example, the electronic device 100 detects the drag input 872 directed to the opacity value indicator 818*a* of the opacity level affordance 818 that sets the opacity level affordance to a respective opacity value in FIG. 8Z. In response to detecting the drag input 872 in FIG. 8Z, the electronic device 100 changes an opacity of a filtering layer 874 that is overlaid on the second screenshot image 870 to the respective opacity value in FIG. 8AA.

In some embodiments, in response to detecting the first input, the electronic device displays (1126), via the display device, the filtering layer overlaid on annotations to the screenshot image. Displaying the filtering layer overlaid on the annotations to the screenshot image results in concurrent filtering of both the screenshot image and the annotations, thereby avoiding multiple filtering operations. Accordingly, the electronic device utilizes less processing power and battery usage. As one example, in response to detecting the drag input 836 that sets the opacity level affordance to a respective opacity value in FIG. 8H, the electronic device 100 displays the second filtering layer 840 having the respective opacity value overlaid on the screenshot image 813 and the annotation 834 in FIG. 8J.

In some embodiments, in response to detecting the first input, the electronic device displays (1128), via the display device, annotations to the screenshot image as overlaid on the filtering layer. Displaying the annotations overlaid on the filtering layer results in the filtering layer obscuring the annotations less (or not at all), resulting in greater visibility of the annotations. More visible annotations reduces filtering-reduction operations, resulting in the electronic device expending fewer processing and battery resources. As one example, in response to detecting the drag input 836 that sets the opacity level affordance to a respective opacity value in FIG. 8H, the electronic device 100 displays the annotation 834 as overlaid on the first filtering layer 838 having the respective opacity value in FIG. 8I.

In some embodiments, in response to detecting, via the input device, a second input directed to a done affordance included within the screenshot editing interface, the electronic device displays (1130), via the display device, a save interface. Moreover, the electronic device detects (1130), via the input device, a third input directed to the save interface. In response to detecting the third input, the electronic device stores (1130) the screenshot image and the filtering layer as a flattened image. The save interface provides an efficient mechanism for a user to manage storage, thus reducing the amount of user interaction to perform storage management operations. The reduction in user interaction reduces wear-and-tear of the electronic device. The reduction in user interaction also results in faster initiation of the performance of the storage management operations and, thus, reduces power drain to perform the storage management operations, increasing battery life of the electronic device. Further, providing an efficient mechanism for a user to manage storage increases the likelihood that a user will perform such management and improve performance of the electronic device. In some embodiments, the electronic device stores the flattened image to a preset allocated memory location (e.g., a "Photos" area). In some embodiments, the flattened image is editable.

As one example, in response to detecting the input 852 directed to the done affordance 814 in FIG. 8P, the electronic device 100 displays a save interface (e.g., the second save interface 853) in FIG. 8Q. Continuing with this example, in response to detecting the subsequent input 854 directed to the "Save to Photos" affordance within the second save interface 853 in FIG. 8R, the electronic device 100 stores the screenshot image 813 and the second filtering layer 840 as a flattened image.

With reference to FIG. 11C, in some embodiments, the screenshot editing interface further includes a respective affordance, and the electronic detects (1132), via the input device, a first input directed to the respective affordance. In response to detecting the first input, the electronic device adds (1132) additional content to the screenshot editing interface that was not displayed on the display when the screenshot capture input was detected. By adding the additional content to the screenshot editing interface, the electronic device avoids additional inputs requesting display of the additional content. For example, the electronic device avoids needing to detect inputs that close the screenshot capture interface, navigate to the additional content, and/or reopen the screenshot capture interface. Accordingly, the electronic device saves processing and battery resources. For example, for paginated document, the electronic device captures all pages into a single screenshot. As another example, the electronic device captures all content, such as multiple presentation slides or a full webpage, as a screenshot or PDF in order to accommodate expansive content. As yet another example, the additional content corresponds to a portion of a document that was available by scrolling the content up or down on the display. In some embodiments, the additional content corresponds to a reduced-sized representation of the content displayed when the electronic device captures the screenshot image. The reduced-size representations may include smaller text, pictures, etc. In some embodiments, the electronic device displays a scrubber in order to facilitate viewing the additional content.

As one example, in response to detecting the input 868 directed to the "Show all" affordance 816 in FIG. 8X, the electronic device 100 displays, in FIG. 8Y, additional content 856*b* (e.g., cities 7-10) that was not displayed when the electronic device detected the screenshot capture input. Namely, the electronic device 100 does not display the additional content 856*b* in FIG. 8T. As another example, in response to detecting the input 885 directed to the "Show all" affordance 816 in FIG. 8AI, the electronic device 100 displays additional content 884*b* and also displays the scrubber interface 887 in FIG. 8AJ. Moreover, the electronic device displays more additional content 884*c* in FIG. 8AL in response to detecting the input 888 directed to the scrubber interface 887 in FIG. 8AK.

In some embodiments, the electronic device detects (1134) a movement of a stylus across a touch-sensitive surface of the electronic device, wherein the movement is away from a corresponding corner of the touch-sensitive surface and originates at a threshold distance away from the corresponding corner; and in response to detecting a release of the movement of a stylus, displays (1134), via the display device, a screenshot capture menu including a capture screenshot affordance and an edit screenshot affordance. In response to detecting a first input directed to the capture screenshot affordance, capturing the screenshot image of the content. In response to detecting a second input directed to the edit screenshot affordance, displaying, via the display device, the screenshot editing interface for editing the screenshot image. Because the screenshot capture menu includes multiple affordances, the electronic device need not detects multiple inputs that each opens a single affordance. Accordingly, the electronic device saves battery and processing resources. For example, with reference to FIGS. 9U-9Z, the electronic device 100 displays the screenshot capture menu 938 based on the fourth stylus movement 930 that is away from a corresponding corner of the touch-sensitive surface and originates at the threshold distance 929 away from the corresponding corner.

In some embodiments, while displaying the thumbnail representation of the screenshot image, the electronic device detects (1136), via the input device, a first input directed to the thumbnail representation of the screenshot image. In response to detecting the first input, the electronic device displays (1136), via the display device, the screenshot editing interface. By displaying the screenshot editing interface in response to the first input directed to the thumbnail representation, the electronic device avoids detecting other inputs for displaying additional interfaces that enable subsequent display of the screenshot editing interface. Accordingly, the electronic device reduces processor and battery utilization. In some embodiments, in response to detecting the first input, the electronic device ceases to display the thumbnail representation. As one example, in response to detecting the first input 864 directed to the thumbnail representation 862 in FIG. 8V, the electronic device 100 displays the screenshot editing interface 812 including the first screenshot image 866 in FIG. 8W.

In some embodiments, in response to detecting, via the input device, a second input directed to a share affordance included within the screenshot editing interface, the electronic device displays (1138), via the display device, a share interface. Moreover, the electronic device detects (1138), via the input device, a third input directed to the share interface. In response to detecting the third input, the electronic device stores (1138) the screenshot image and the filtering layer as an image file, wherein the screenshot image and the filtering layer are separately editable. The share interface provides an efficient mechanism for a user to manage storage, thus reducing the amount of user interaction to perform storage management operations. The reduction in user interaction reduces wear-and-tear of the electronic device. The reduction in user interaction also results in faster initiation of the performance of the storage management operations and, thus, reduces power drain to perform the storage management operations, increasing battery life of the electronic device. Further, providing an efficient mechanism for a user to manage storage increases the likelihood that a user will perform such management and improve performance of the electronic device. For example, in some embodiments, the image file is editable. As another example, the image file is unflattened.

As one example, in response to detecting the input 842 directed to the share affordance 820 in FIG. 8K, the electronic device 100 displays the transport interface 844 including a "Save to Files" affordances 844i in FIG. 8L. Continuing with this example, in response to detecting the input 846 directed to the "Save to Files" affordances 844i in FIG. 8M, the electronic device 100 displays the first save interface 848 in FIG. 8N. Continuing with this example, in response to detecting the input 850 directed to the "My Images" folder location within the first save interface 848 in FIG. 8O, the electronic device 100 stores the screenshot image 813 and the second filtering layer 840 as an image file, wherein the screenshot image 813 and the second filtering layer 840 are separately editable.

FIGS. 12A-12AP are examples of user interfaces for selectively erasing portions of an object in accordance with some embodiments. The user interfaces in these figures are used to illustrate the processes described below, including the processes in FIGS. 13A-13D. Although some of the examples which follow will be given with reference to inputs on a touch-screen display (where the touch-sensitive surface and the display are combined, for example on the touch screen 112), in some embodiments, the electronic device 100 detects inputs on the touch-sensitive surface 651 that is separate from the display 650, as shown in FIG. 6B.

As illustrated in FIG. 12A, the electronic device 100 displays a drawing user interface 1202, such as a drawing application interface or a word processing application interface. The electronic device 100 displays a drawing palette 1204. The first drawing palette 1204 may include a variety of affordances (e.g., drawing tool affordances, editing function affordances, and/or color pots) to facilitate content manipulation operations. One of ordinary skill in the art will appreciate that the drawing palette 1204 may include any number and types of affordances, arranged in any number of ways.

The drawing palette 1204 includes an undo affordance 1204a and a redo affordance 1204b. An input directed to the undo affordance 1204a requests the electronic device 100 to undo a previous operation, such as erasing a previously drawn mark. An input directed to the redo affordance 1204b requests the electronic device 100 to redo a previous undo operation, such as redisplaying the previously erased mark.

The drawing palette 1204 includes a set of drawing tool affordances including a pen affordance 1204c, a marker affordance 1204d (e.g., a highlighter affordance), a pencil affordance 1204e, a ruler affordance 1204f, and an eraser affordance 1204g. Notably, the eraser affordance 1204g has a first appearance (e.g., an 'x' within and near the top of the eraser affordance 1204g), indicating that an eraser tool associated with the eraser affordance 1204g is in an object erase mode of operation. Functionality of the eraser tool while in the object erase mode of operation is described below.

Moreover, while a particular one of the set of drawing tool affordances is selected, an input directed to the drawing user interface 1202 causes the electronic device 100 to perform a corresponding content manipulation operation within the drawing user interface 1202. As illustrated in FIG. 12A, the pencil affordance 1204e is currently selected, indicating the pencil tool is the currently selected drawing tool. An input directed to a respective drawing tool affordance sets the respective drawing tool as the currently selected drawing tool.

The drawing palette 1204 includes a set of color pots 1204h that includes a top row of color affordances for setting a currently selected color and a bottom row of pattern affordances for setting a currently selected pattern associated with the color. As illustrated in FIG. 12A, the color black and a solid pattern are currently selected. An input directed to a respective color affordance or a respective pattern affordance sets the respective color/pattern as currently selected.

The drawing palette 1204 includes a text tool affordance 1204i that enables creation of text content within the drawing user interface 1202. For example, after selection of the text tool affordance 1204i, inputs directed to the drawing user interface 1202 cause the electronic device 100 to display a text box for receiving a text string and cause the electronic device 100 to replace the text box with the text string entered into the text box.

The drawing palette 1204 includes a shapes tool affordance 1204*j* that enables placement of a particular shape within the drawing user interface 1202. In some embodiments, for example, an input directed to the shapes tool affordance 1204*j* brings up a shapes interface including a variety of predetermined shapes (e.g., square, circle, triangle). Subsequently, the electronic device 100 detects an input corresponding to dragging a particular shape from within the shapes interface to a location within the drawing user interface 1202. In response, the electronic device 100 displays the particular shape at the location within the drawing user interface 1202.

Figure 12B:
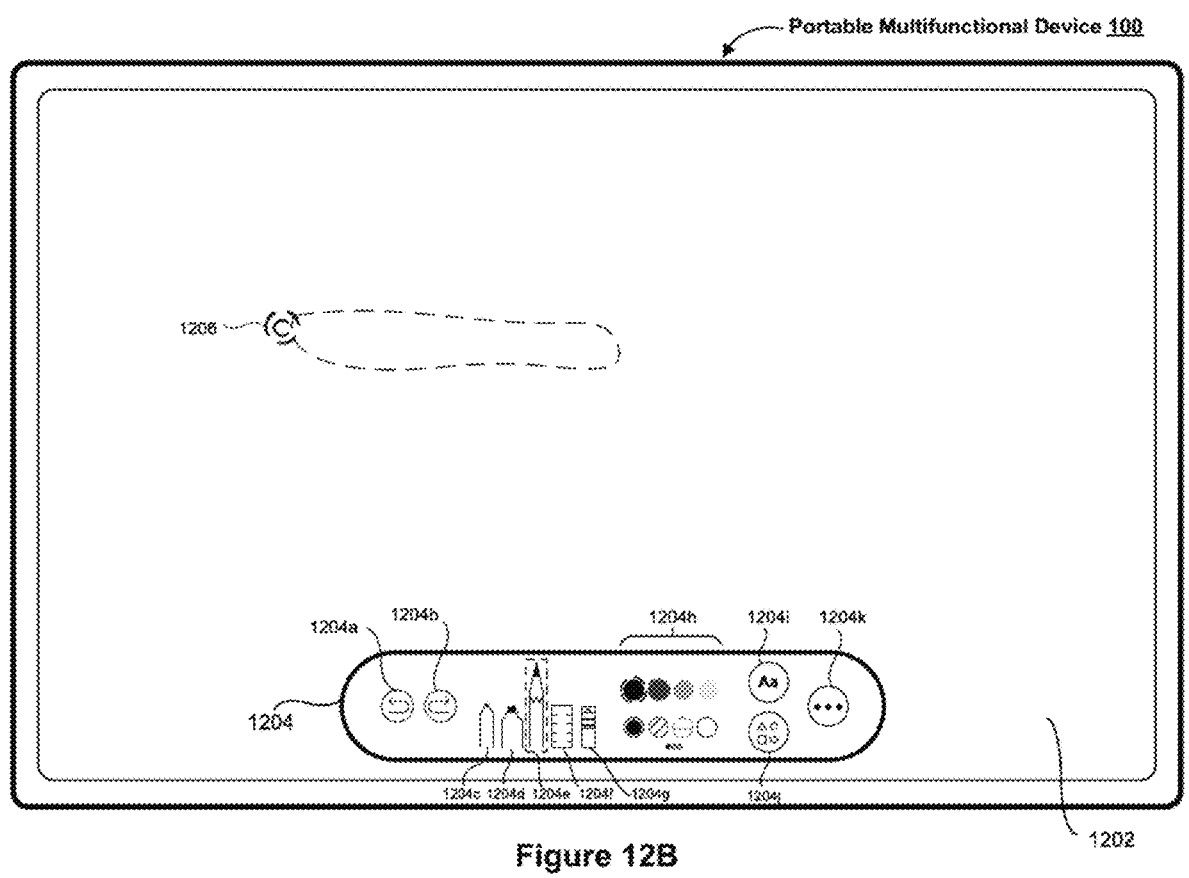
Figure 12C:
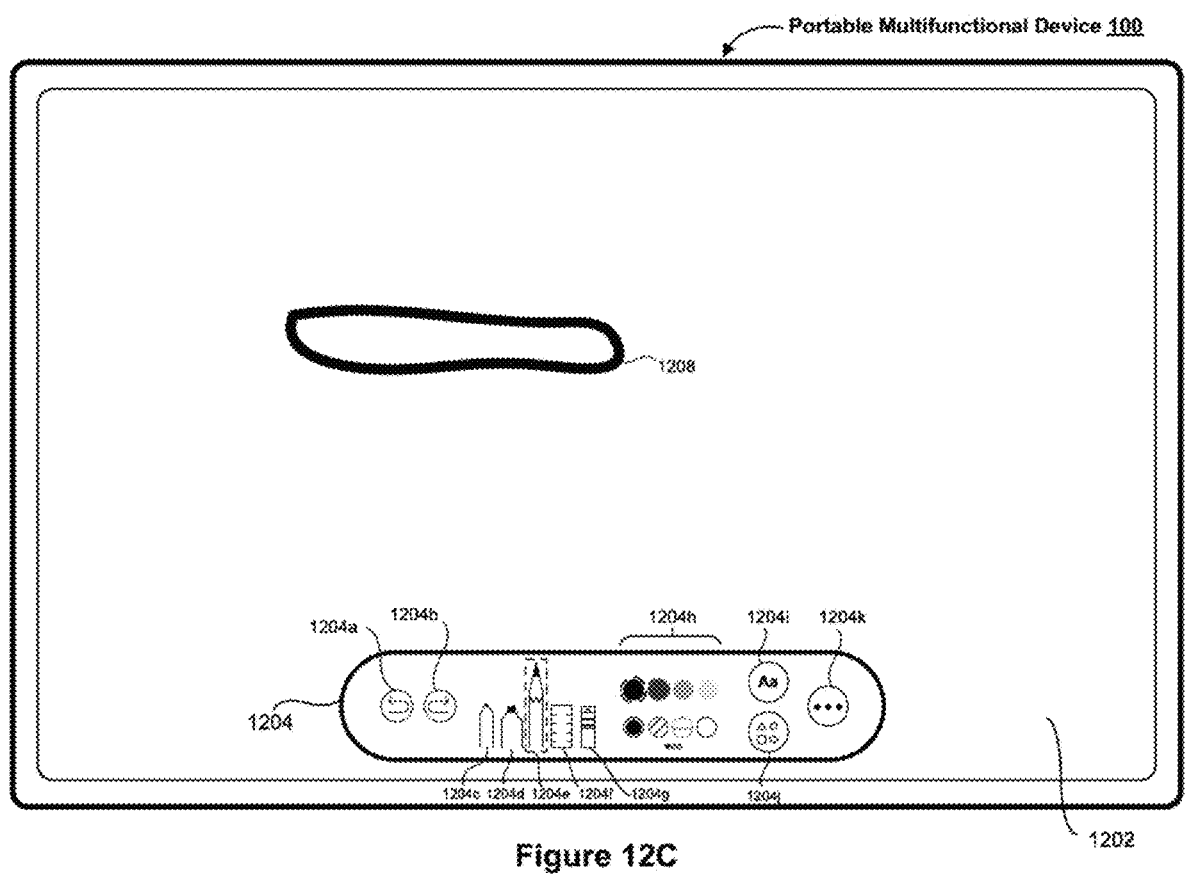

As illustrated in FIG. 12B, the electronic device 100 detects an object insertion input 1206 that corresponds to a request to insert an object 1208 in the drawing user interface 1202. In some embodiments, the object insertion input 1206 corresponds to movement of a contact in the shape illustrated in FIG. 12B. In response to detecting the object insertion input 1206 in FIG. 12B, the electronic device 100 inserts the object 1208 in the drawing user interface 1202, as illustrated in FIG. 12C.

Figure 12D:
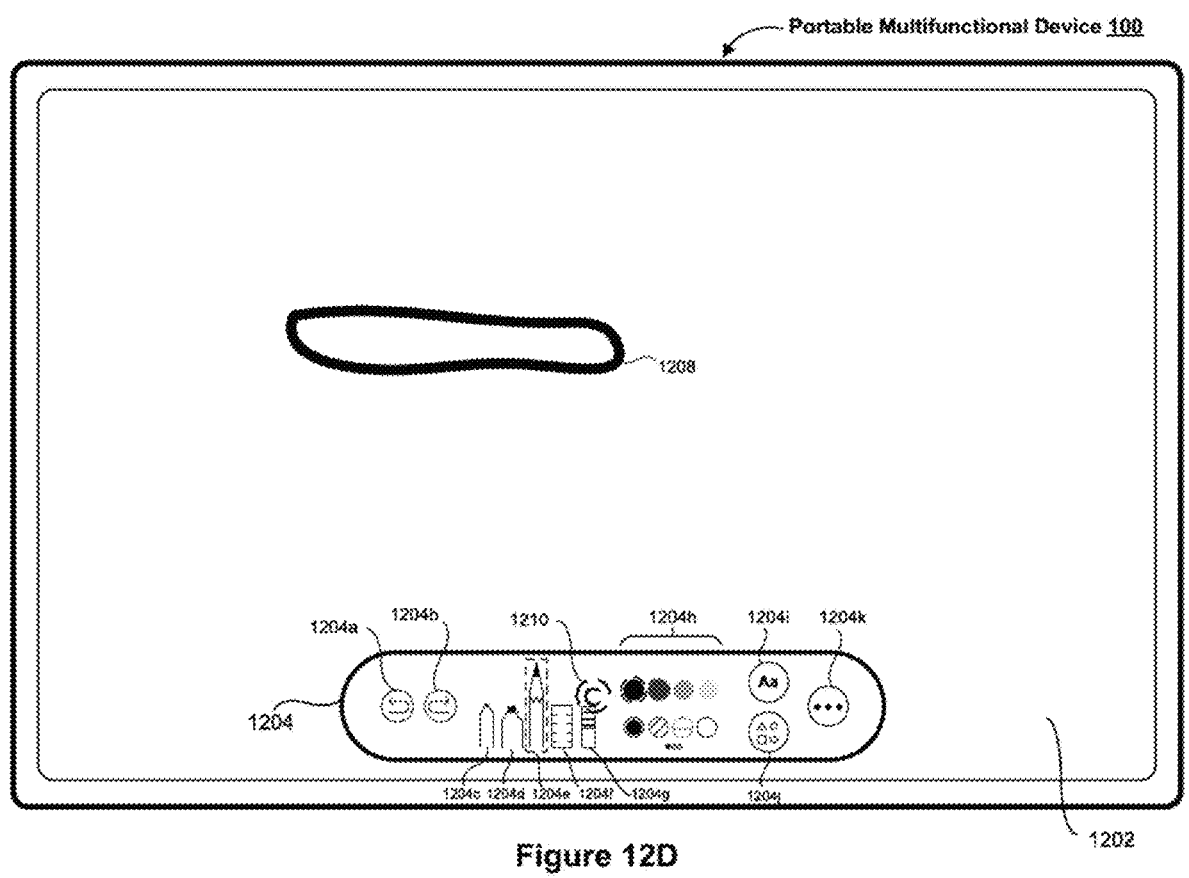
Figure 12E:
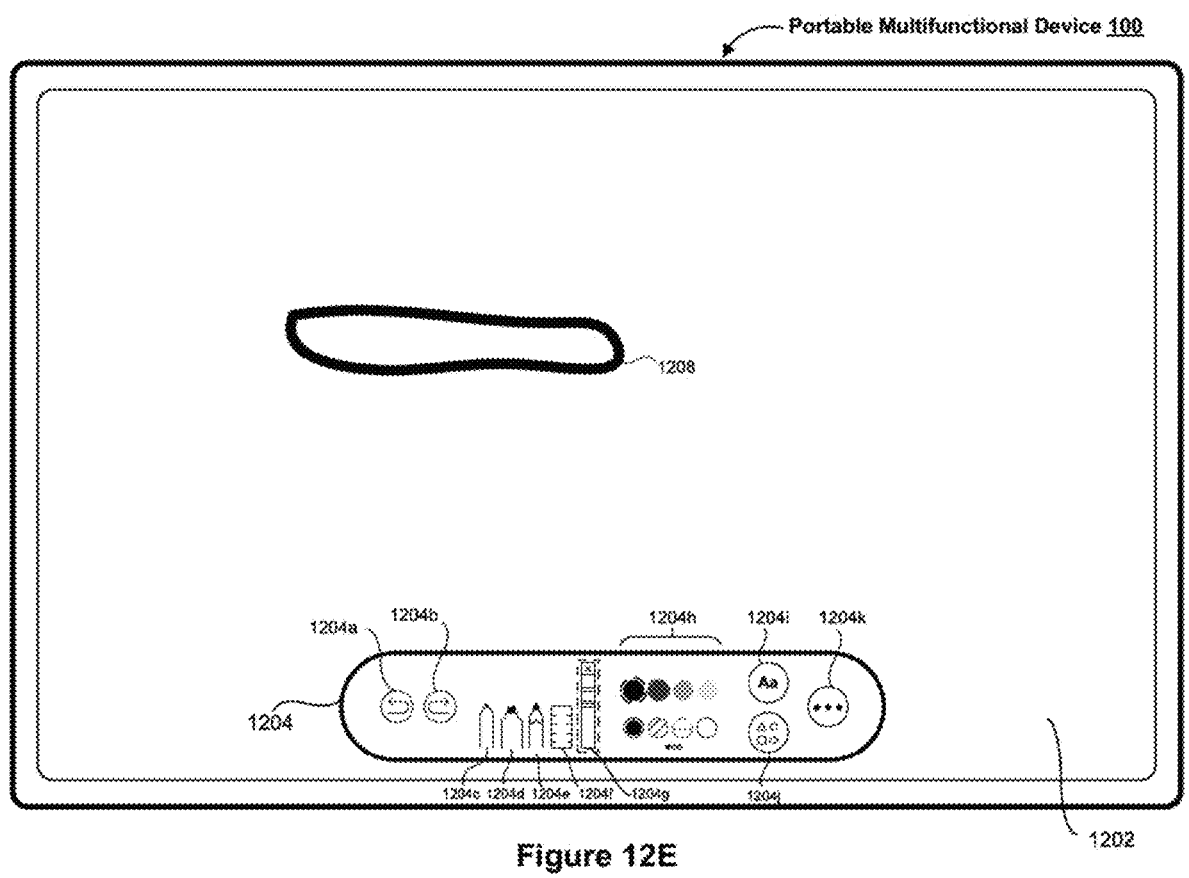

As illustrated in FIG. 12D, the electronic device 100 detects an input 1210 directed to the eraser affordance 1204*g*. In some embodiments, the input 1210 corresponds to a tap input. In response to detecting the input 1210 in FIG. 12D, the electronic device 100 sets the eraser tool as the currently selected tool, as illustrated in FIG. 12E.

Figure 12F:
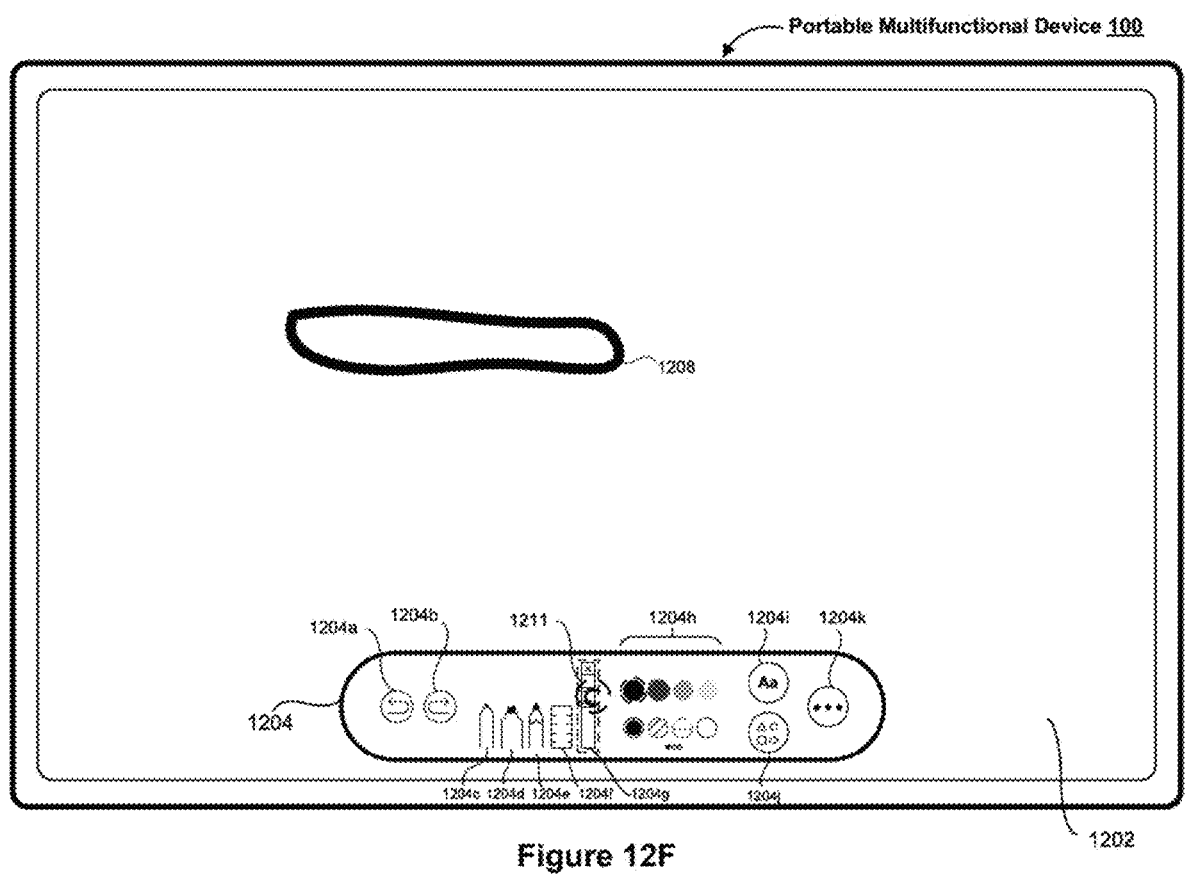
Figure 12G:
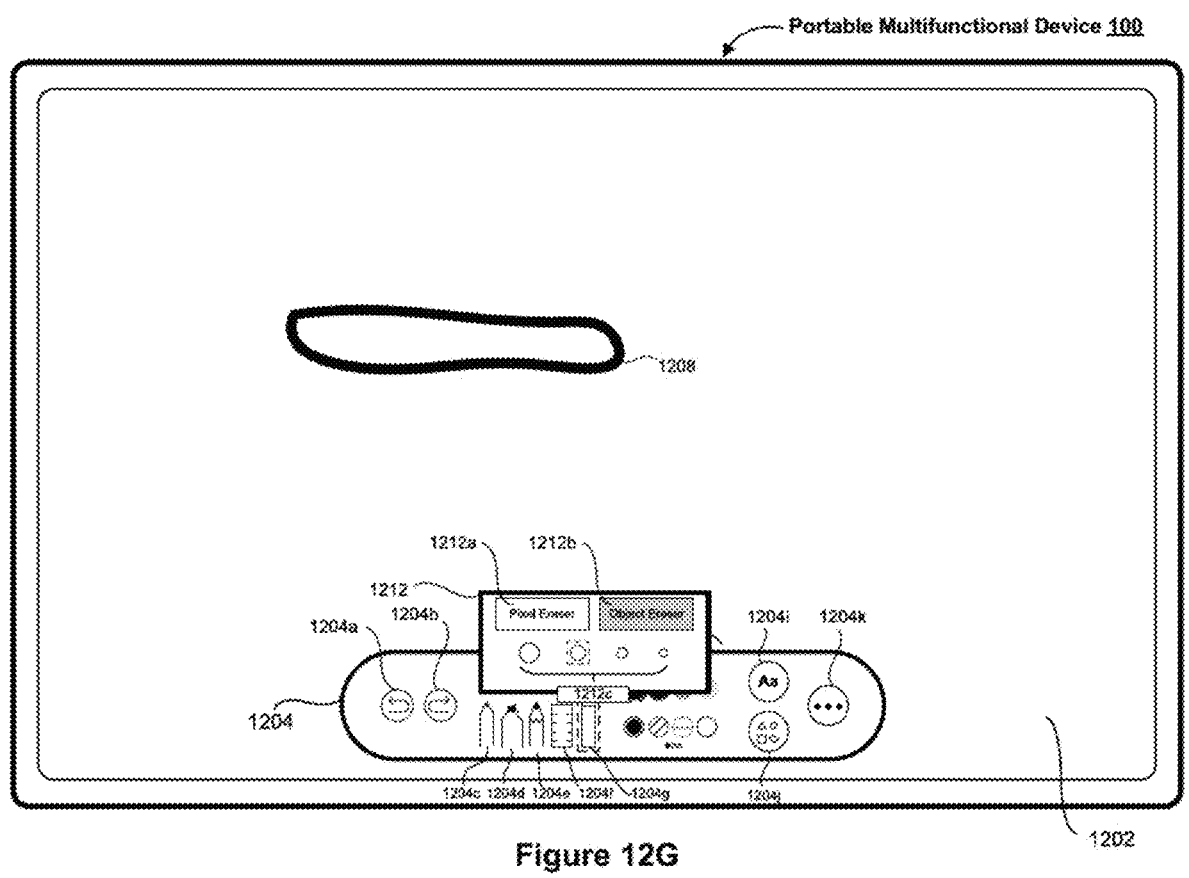

As illustrated in FIG. 12F, the electronic device 100 detects an input 1211 directed to the eraser affordance 1204*g*. In some embodiments, the input 1211 corresponds to a long touch input (e.g., a touch input detected for greater than a threshold amount of time) or a force touch input (e.g., a touch input associated with a level of force that is greater than a threshold amount of force). In response to detecting the input 1211 in FIG. 12F, the electronic device 100 displays an eraser mode interface 1212, as illustrated in FIG. 12G. In some embodiments, the eraser mode interface 1212 is at least partially overlaid on the drawing palette 1204. The eraser mode interface 1212 includes a pixel eraser affordance 1212*a* associated with a pixel erase mode of operation and an object eraser affordance 1212*b* associated with an object erase mode of operation. As illustrated in FIG. 12G, the object eraser affordance 1212*b* is currently selected, indicating that the eraser tool is currently in the object erase mode of operation. The eraser mode interface 1212 further includes a plurality of eraser thickness affordances 1212*c* respectively associated with a plurality of thickness levels. An input directed to a particular eraser thickness affordance of the plurality of eraser affordances 1212*c* sets the thickness associated with the eraser tool to the respective thickness level.

Figure 12H:
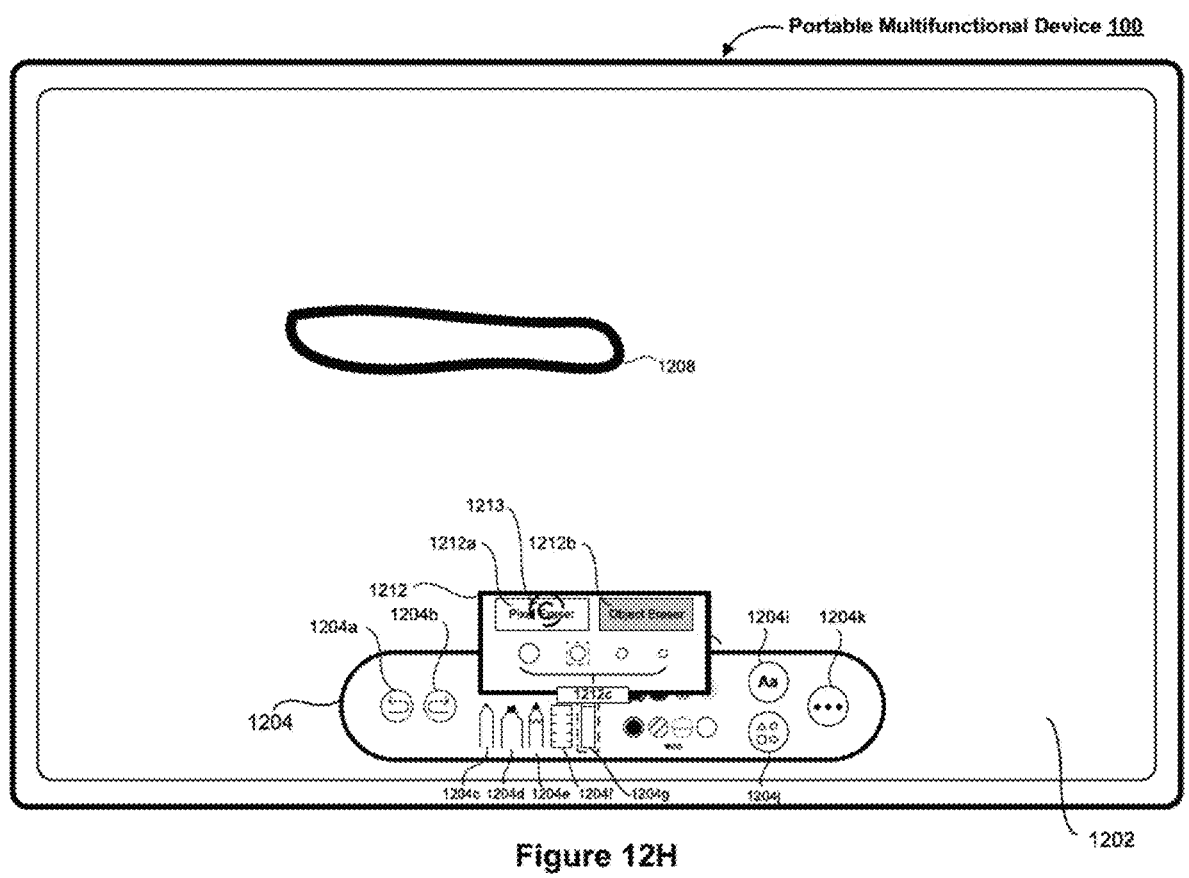
Figure 12I:
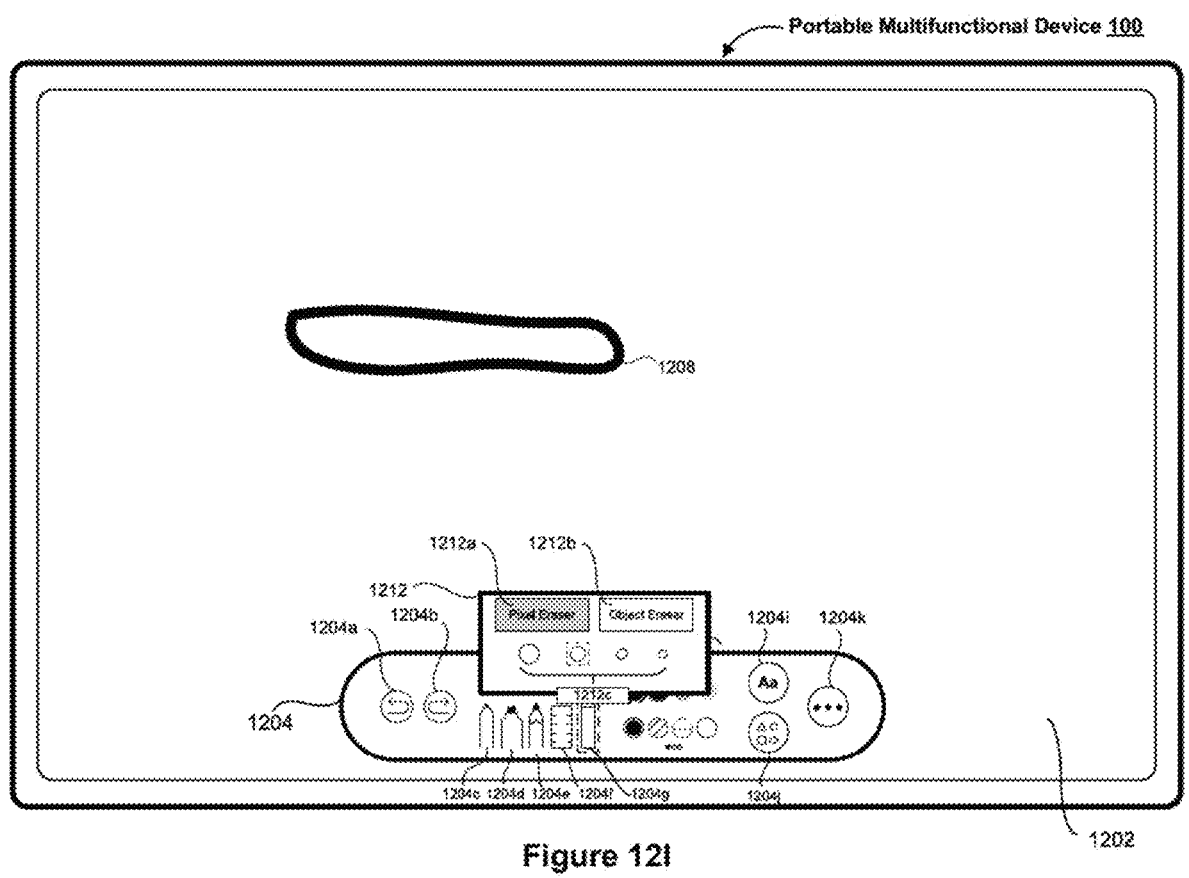
Figure 12J:
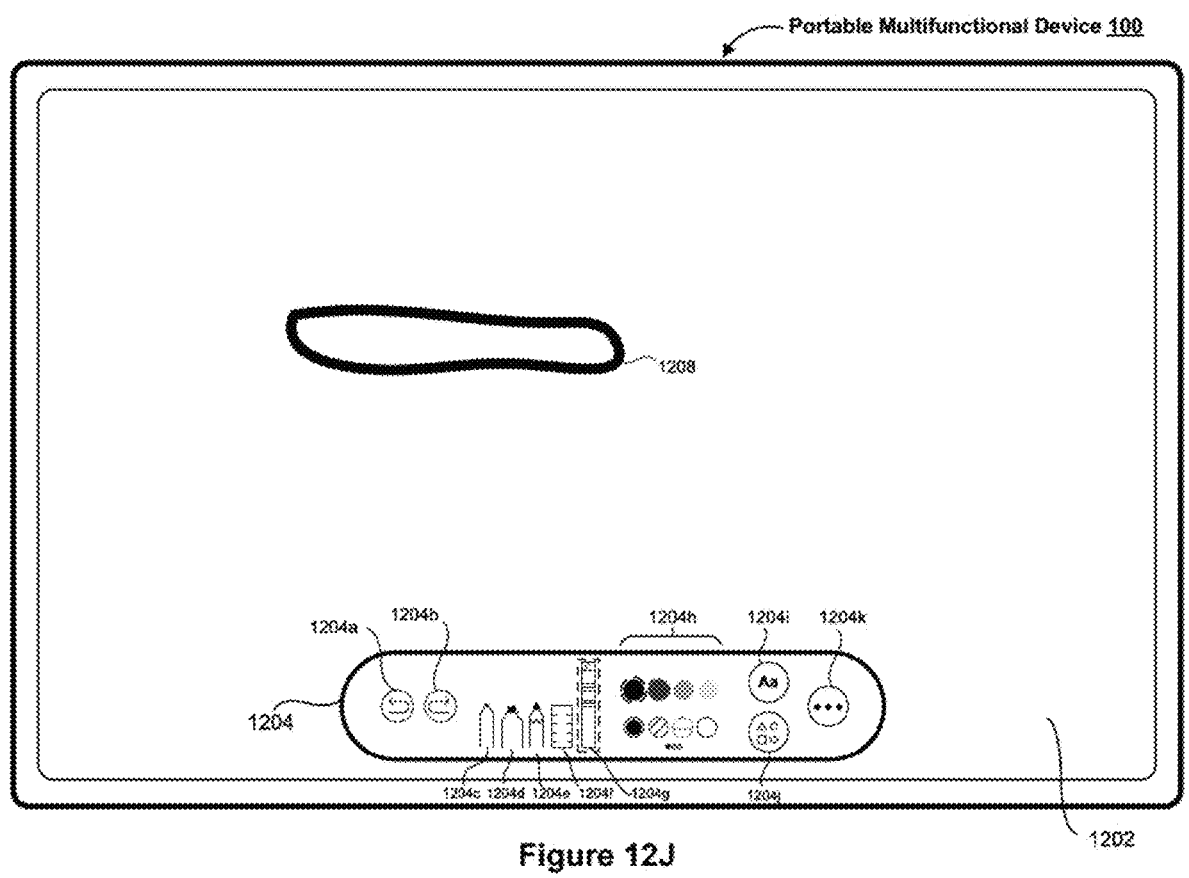

As illustrated in FIG. 12H, the electronic device 100 detects an input 1213 directed to the pixel eraser affordance 1212*a*. In some embodiments, the input 1213 corresponds to a tap input. In response to detecting the input 1213 in FIG. 12H, the electronic device 100 changes the eraser tool from the object erase mode of operation to the pixel erase mode of operation, as indicated by the pixel eraser affordance 1212*a* being selected, as illustrated in FIG. 12I. Moreover, as illustrated in FIG. 12J the electronic device 100 ceases to display the eraser mode interface 1212 and changes the appearance of the eraser affordance 1204*g* from the first appearance to a second appearance (e.g., a shaded area within and near the top of the eraser affordance 1204*g*). In some embodiments, the electronic device 100 ceases to display the eraser mode interface 1212 after a threshold amount of time has passed since detecting the input 1213. In contrast to the first appearance that indicates that the eraser tool is in the object erase mode of operation, the second appearance indicates that the eraser tool is in the pixel erase mode of operation.

Figure 12K:
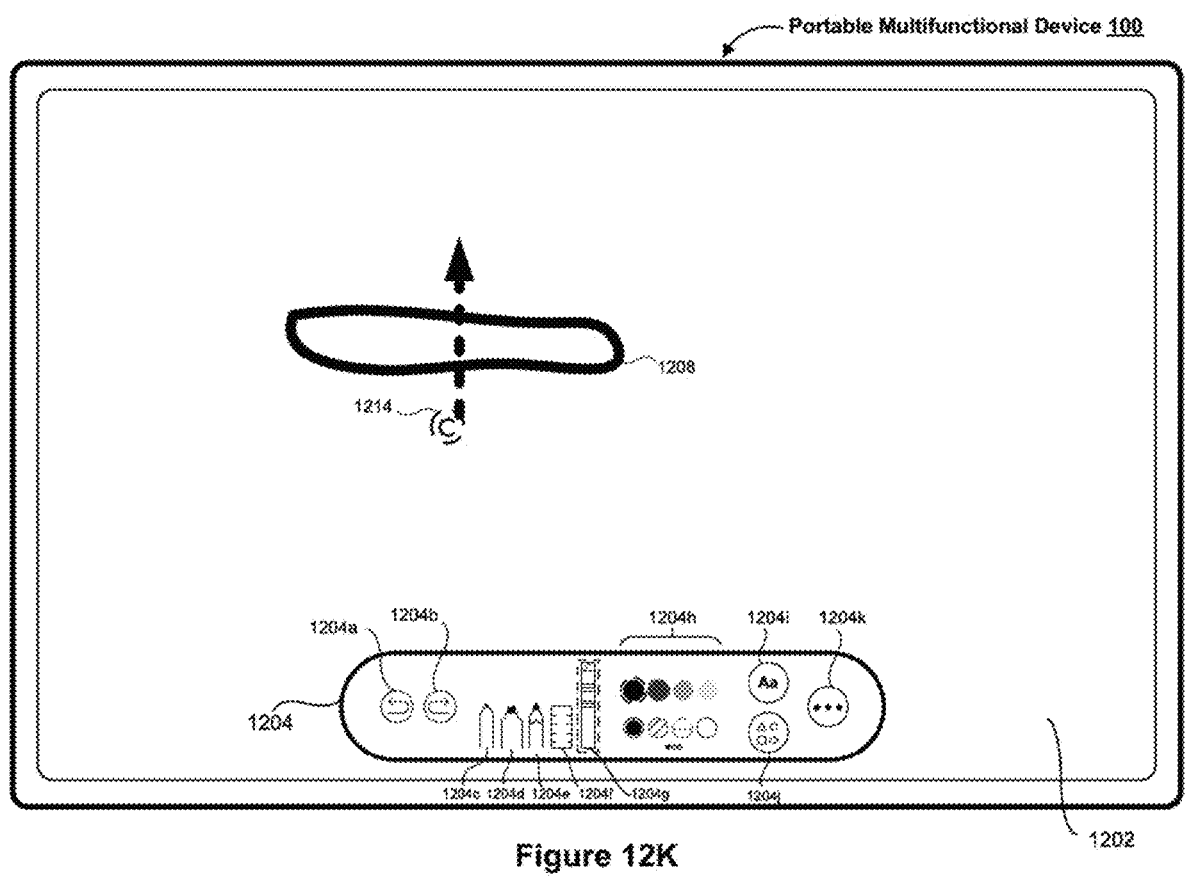
Figure 12L:
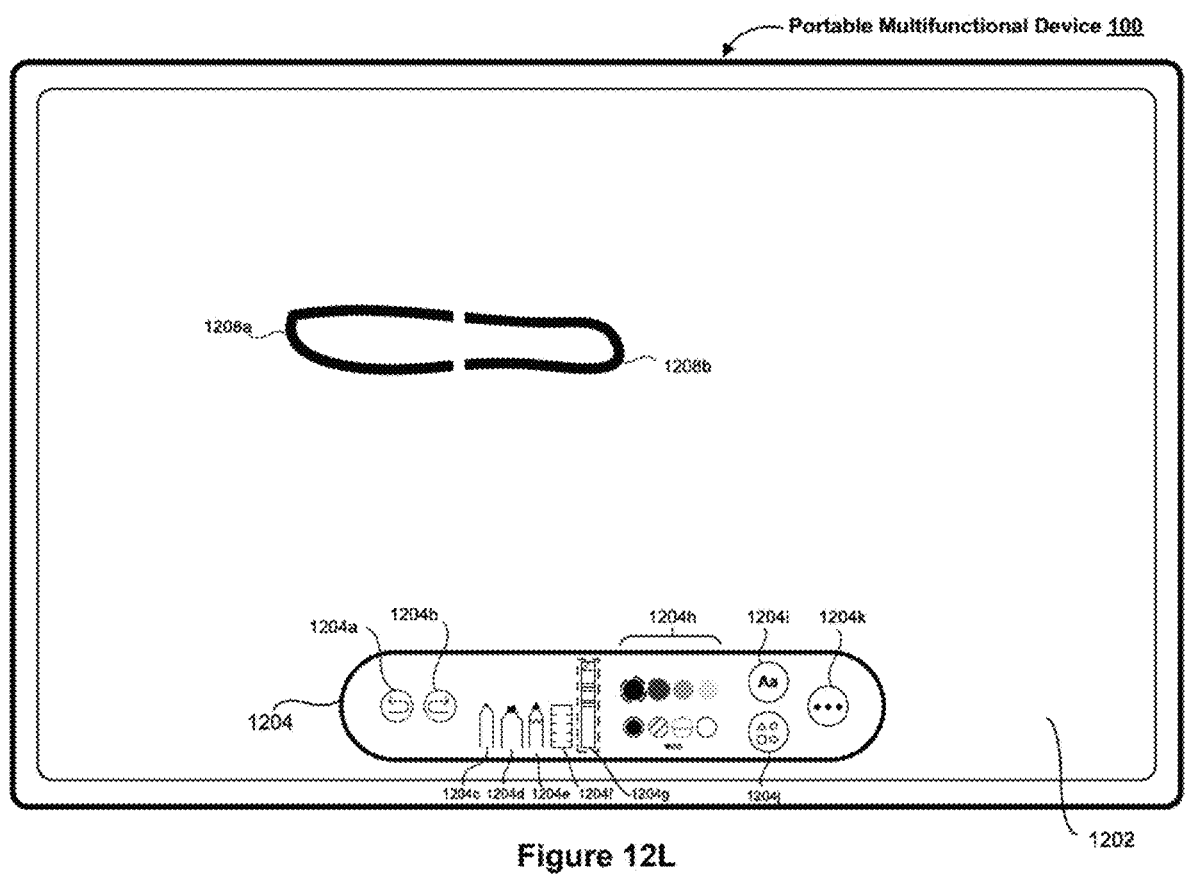

As illustrated in FIG. 12K, the electronic device 100 detects a first pixel erase input 1214. In some embodiments, the first pixel erase input 1214 corresponds to movement of a contact. The first pixel erase input 1214 defines a first path that passes through the object 1208. Accordingly, as illustrated in FIG. 12L, the electronic device 100 ceases to display (e.g., erases) a first portion of the object 1208 while maintaining display of a second portion 1208*a* of the object 1208 and a third portion 1208*b* of the object 1208. Notably, the second portion 1208*a* is not connected to a third portion 1208*b*. In some embodiments, in response to detecting an object erase input (e.g., while the eraser tool is in the object erase mode of operation) that defines the first path, the electronic device 100 ceases to display (e.g., erases) the entirety of the object 1208 instead of ceasing to display pixels in the first path.

Figure 12M:
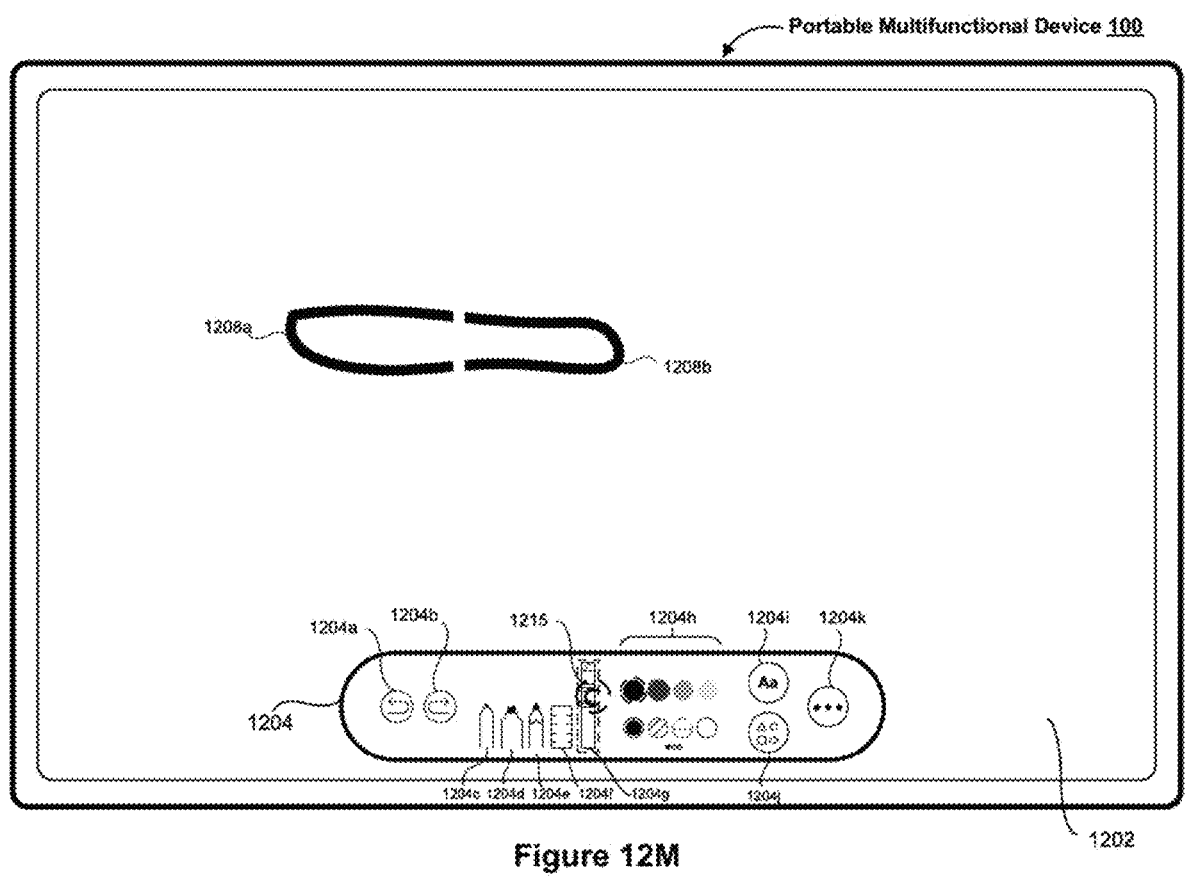
Figure 12N:
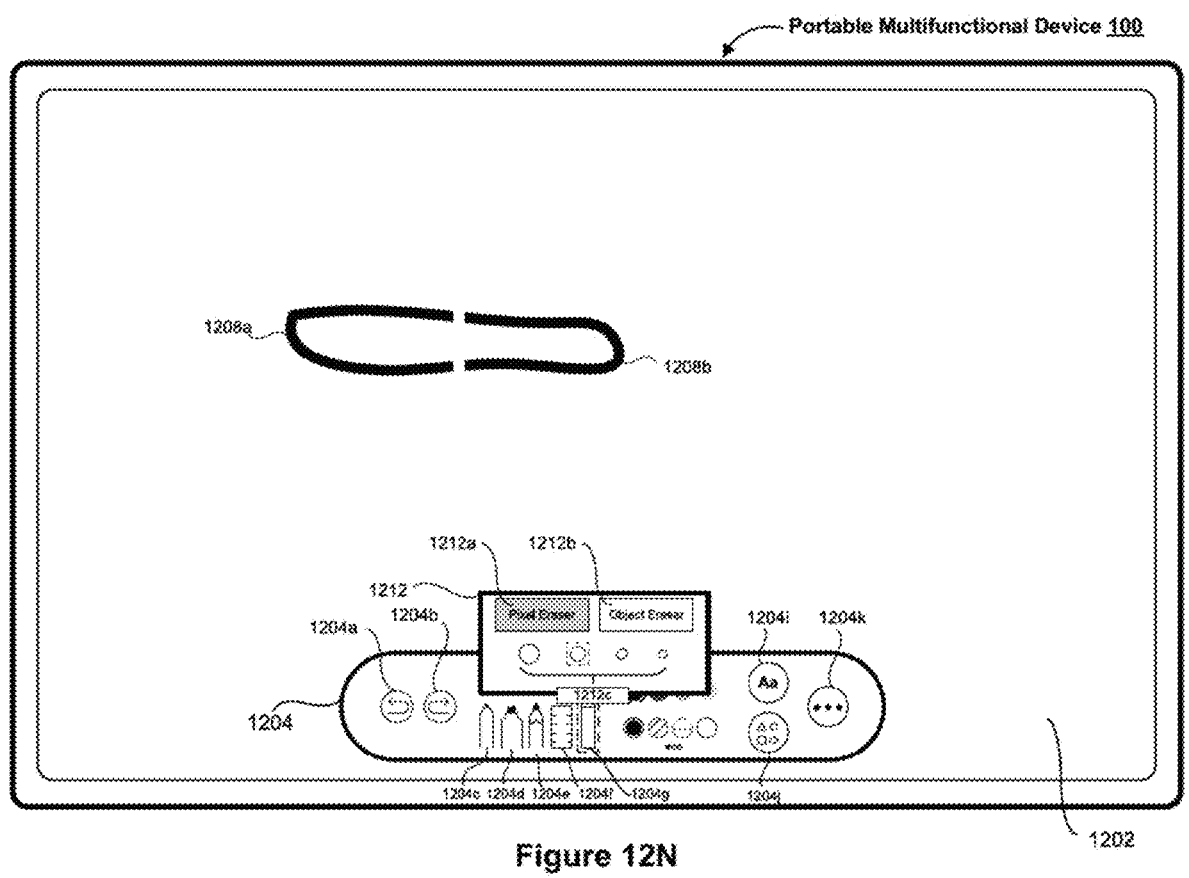

As illustrated in FIG. 12M, the electronic device 100 detects an input 1215 directed to the eraser affordance 1204*g*. In some embodiments, the input 1215 corresponds to a long touch input (e.g., a touch input detected for greater than a threshold amount of time) or a force touch input (e.g., a touch input associated with a level of force that is greater than a threshold amount of force). In response to detecting the input 1215 in FIG. 12M, the electronic device 100 displays the eraser mode interface 1212, as illustrated in FIG. 12N.

Figure 12O:
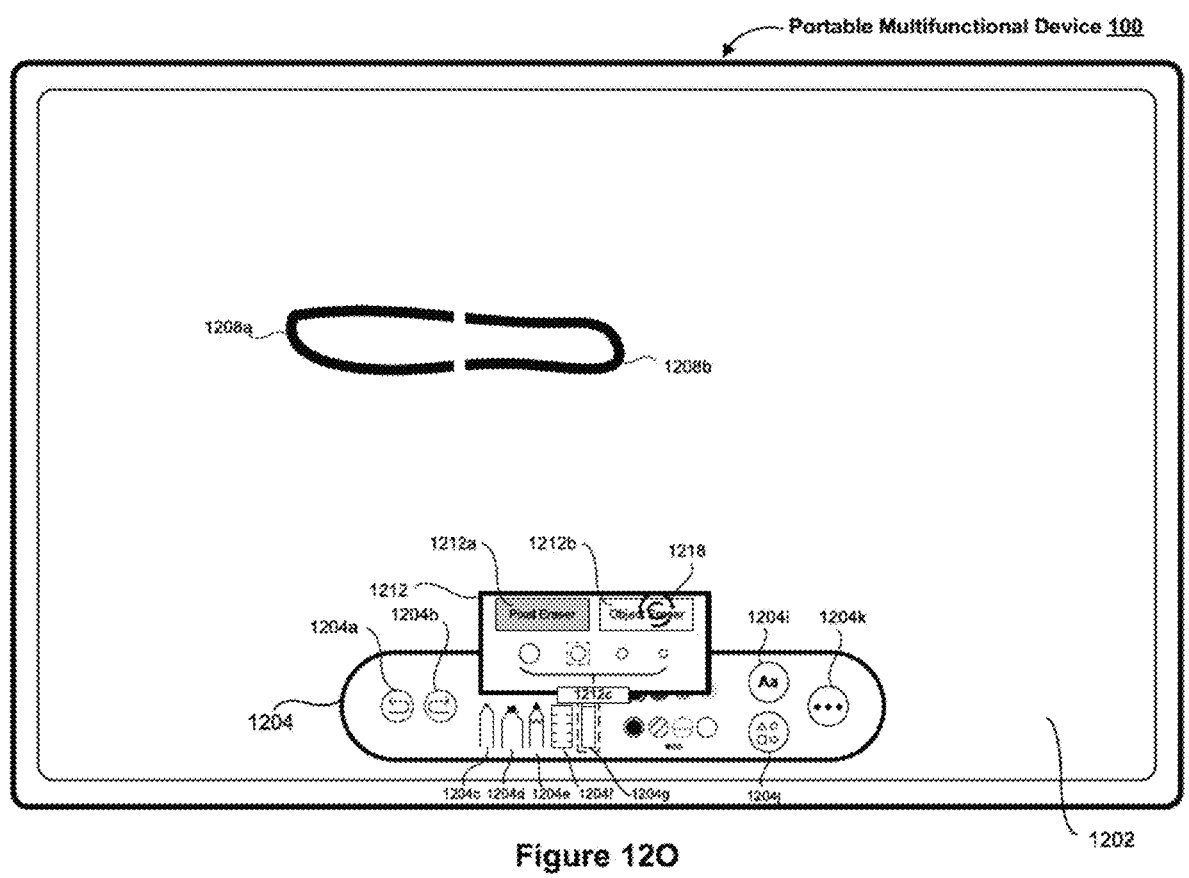
Figure 12P:
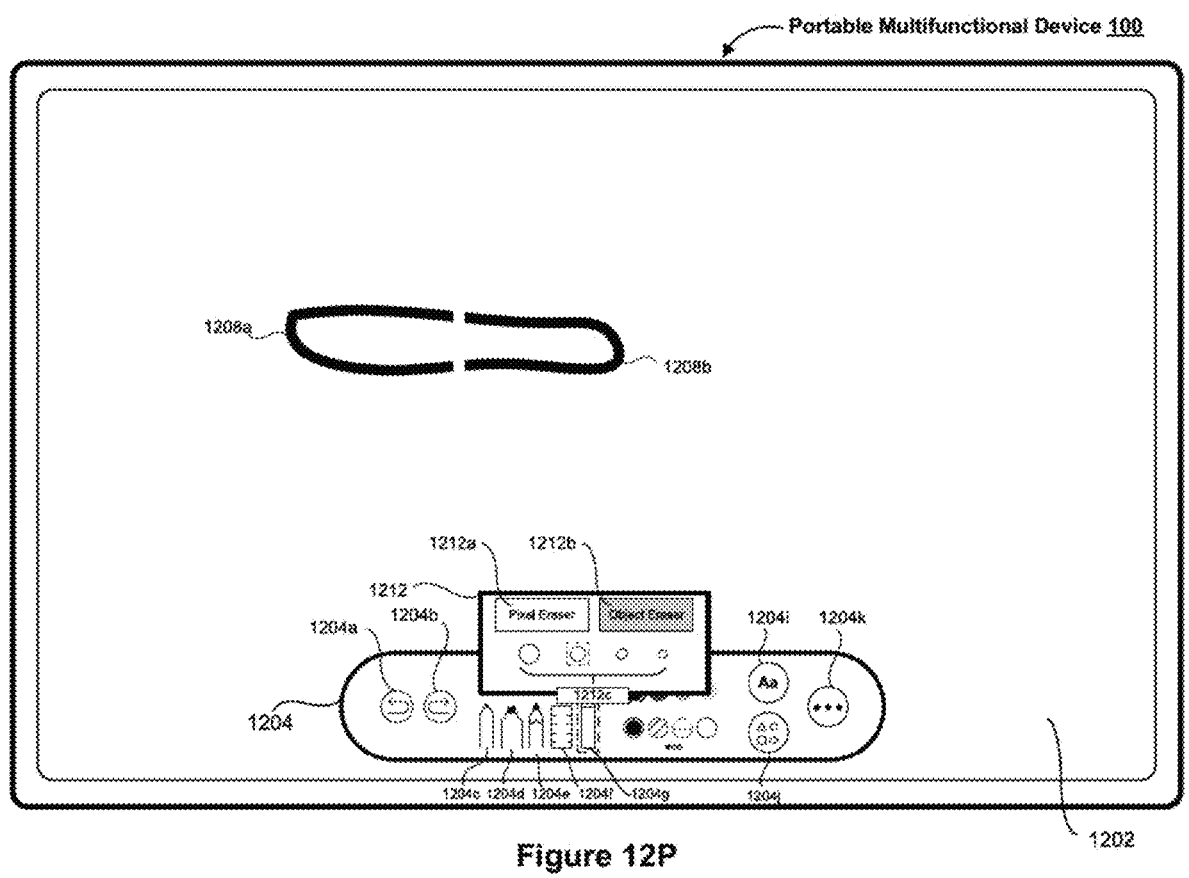
Figure 12Q:
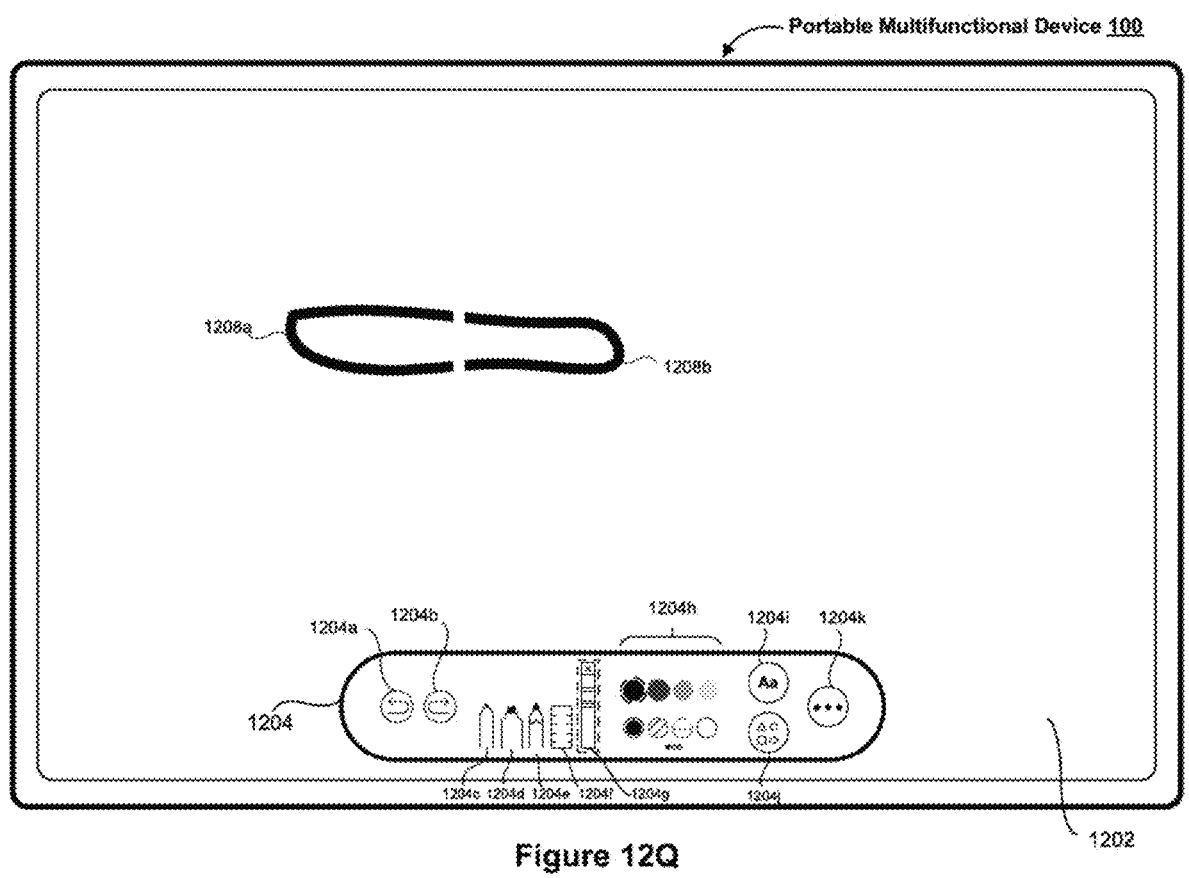

As illustrated in FIG. 12O, the electronic device 100 detects an input 1218 directed to the object eraser affordance 1212*b*. In some embodiments, the input 1218 corresponds to a tap input. In response to detecting the input 1218 in FIG. 12O, the electronic device 100 changes the eraser tool from the pixel erase mode of operation to the object erase mode of operation, as indicated by the object eraser affordance 1212*b* being selected, as illustrated in FIG. 12P. Moreover, as illustrated in FIG. 12Q, the electronic device 100 ceases to display the eraser mode interface 1212 and changes the appearance of the eraser affordance 1204*g* from the second appearance to the first appearance (e.g., "x" at top of the eraser affordance 1204*g*), indicating that the eraser tool is in the object erase mode of operation. In some embodiments, the electronic device 100 ceases to display the eraser mode interface 1212 after a threshold amount of time has passed since detecting the input 1218.

Figure 12R:
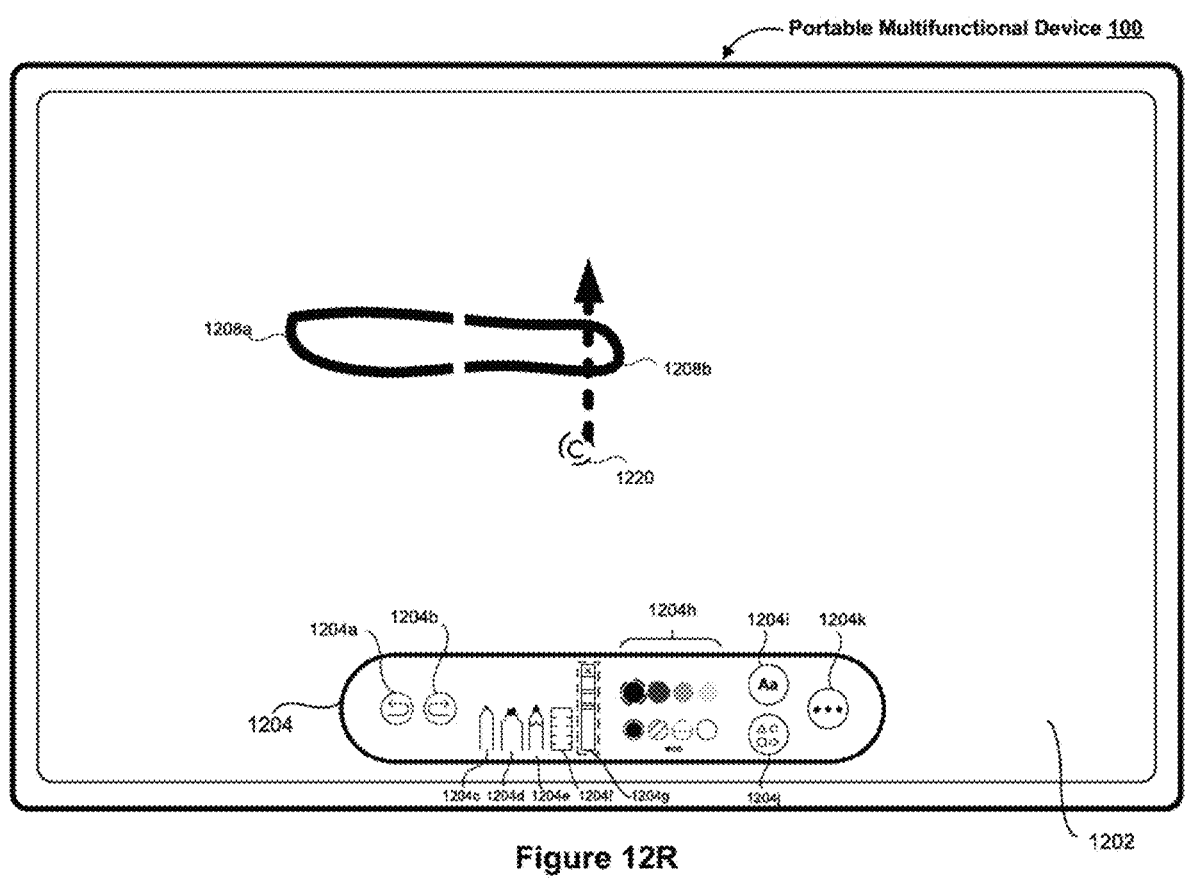
Figure 12S:
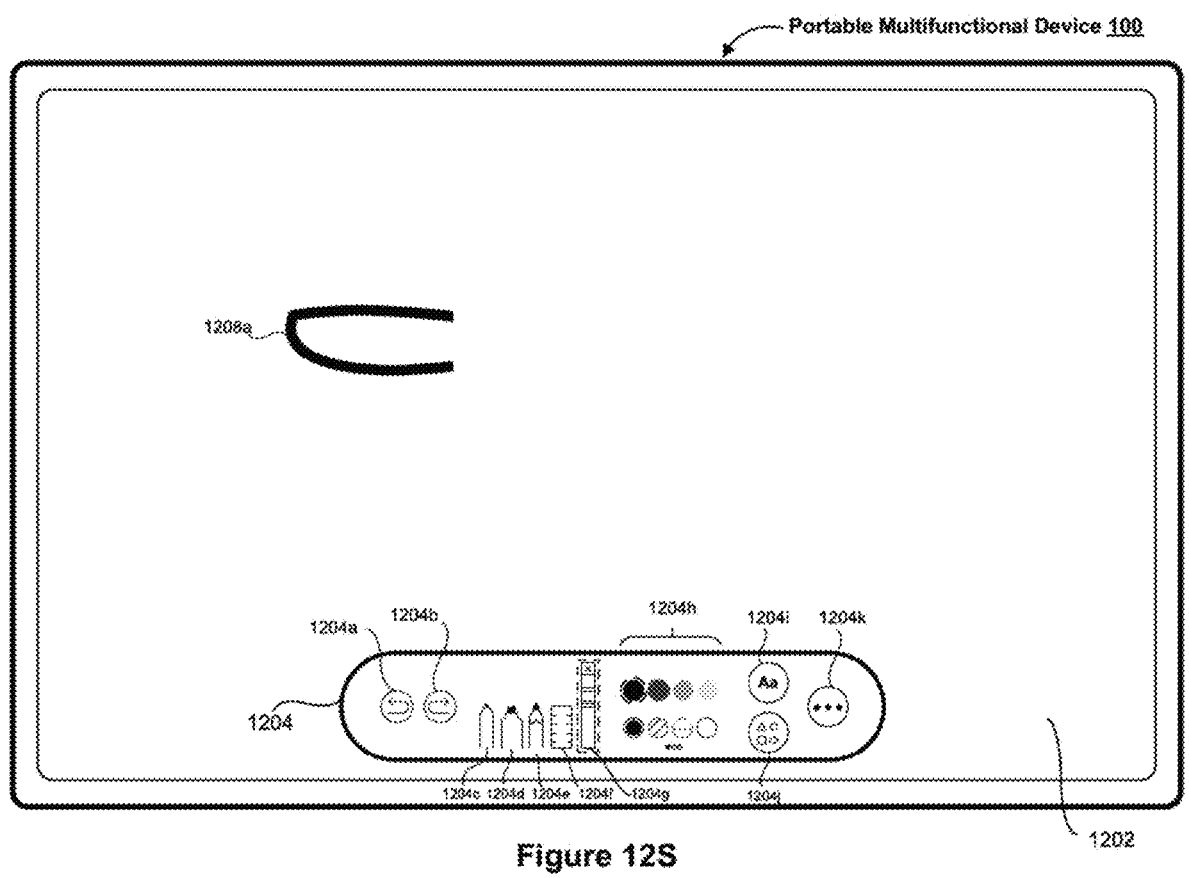

As illustrated in FIG. 12R, the electronic device 100 detects a first object erase input 1220. In various implementations, the first object erase input 1220 corresponds to movement of a contact. The first object erase input 1220 defines a second path intersecting the third portion 1208*b* of the object 108 and not intersecting the second portion 1208*a* of the object 1208. In response to detecting the first object erase input 1220 in FIG. 12R, the electronic device 100 ceases to display the third portion 1208*b* of the object 1208 without ceasing to display the second portion 1208*a* of the object 1208, as illustrated in FIG. 12S. In some embodiments, in response to detecting a pixel erase input (e.g., while the eraser tool is in the pixel erase mode of operation) that defines the second path, the electronic device 100 ceases to display pixels in the second path instead of ceasing to display the entirety of the third portion 1208*b* of the object 1208.

Figure 12T:
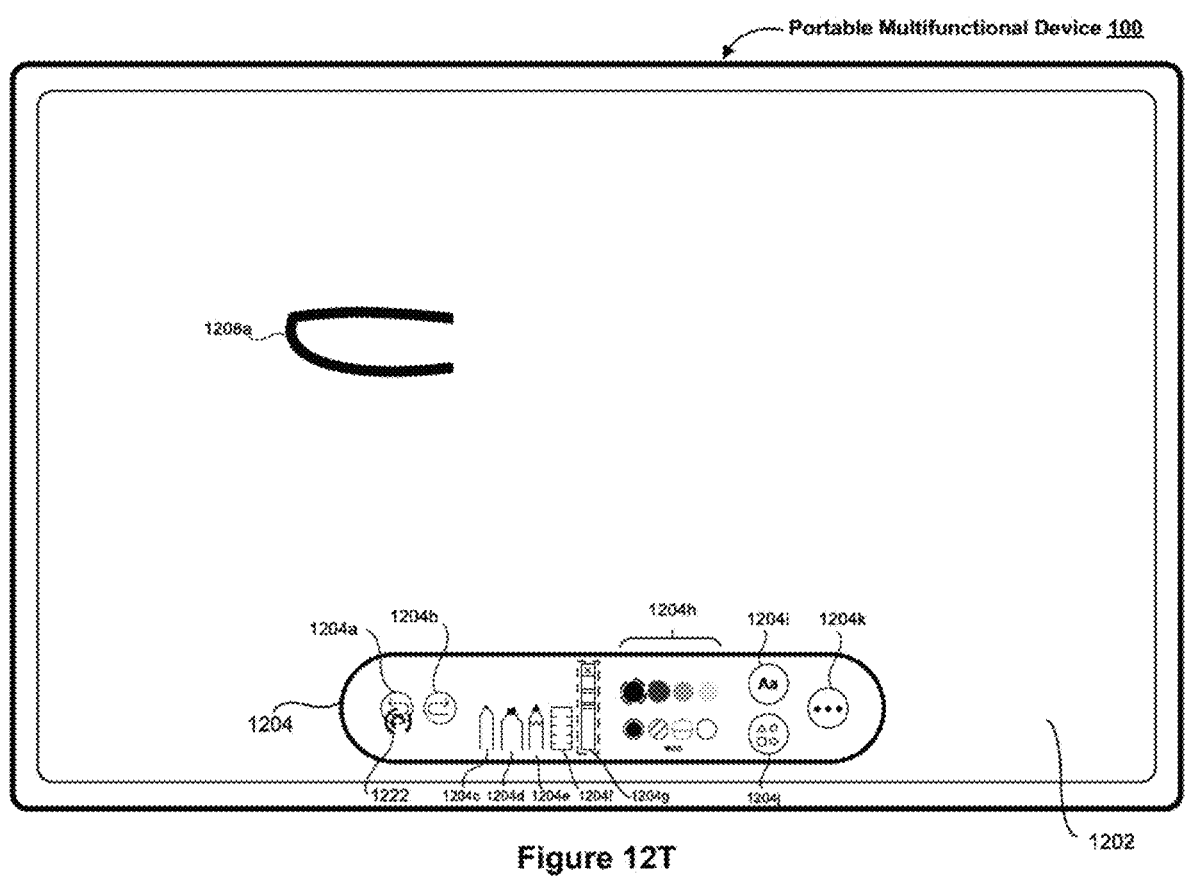
Figure 12U:
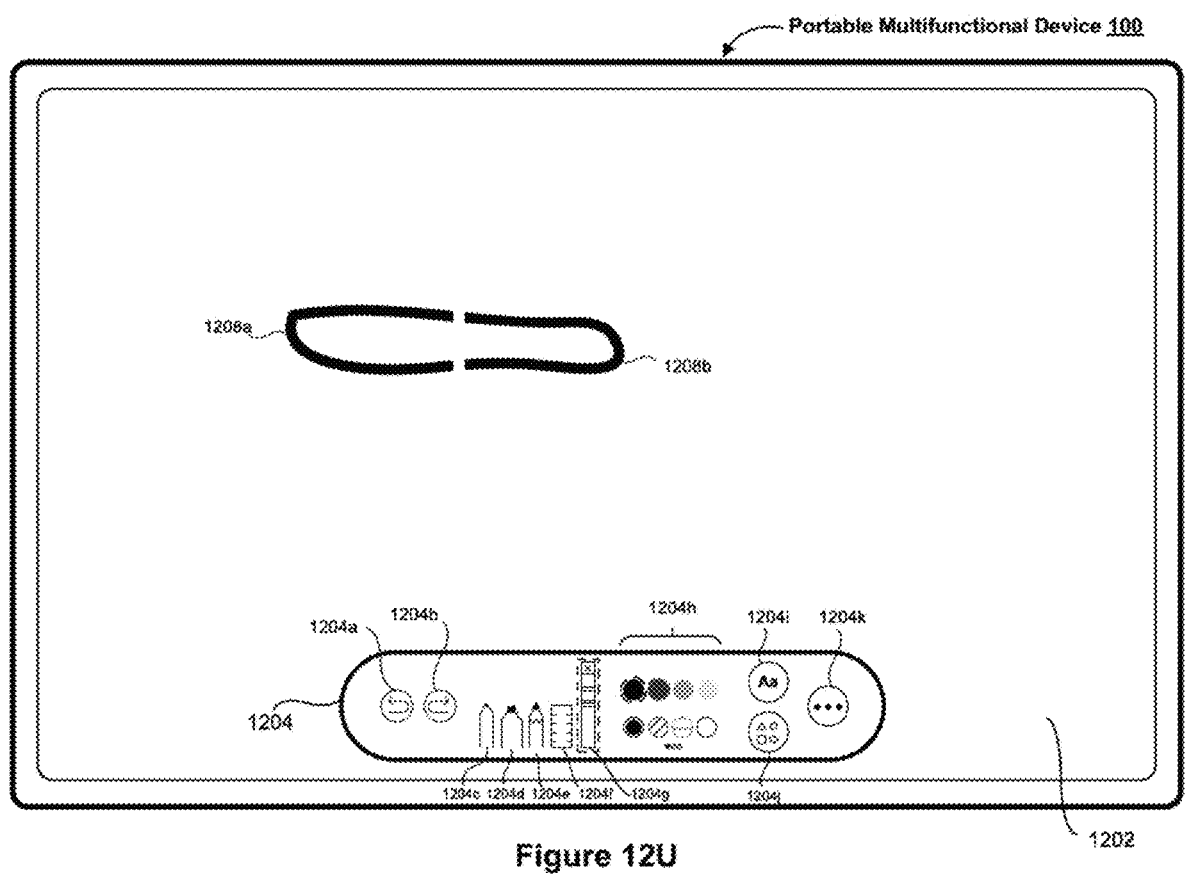

As illustrated in FIG. 12T, the electronic device 100 detects an input 1222 directed to the undo affordance 1204*a*. In some embodiments, the input 1222 corresponds to a tap input. In response to detecting the input 1222 in FIG. 12T, the electronic device 100 undoes ceasing to display the third portion 1208*b* (e.g., redisplays the third portion 1208*b*), as illustrated in FIG. 12U.

Figure 12V:
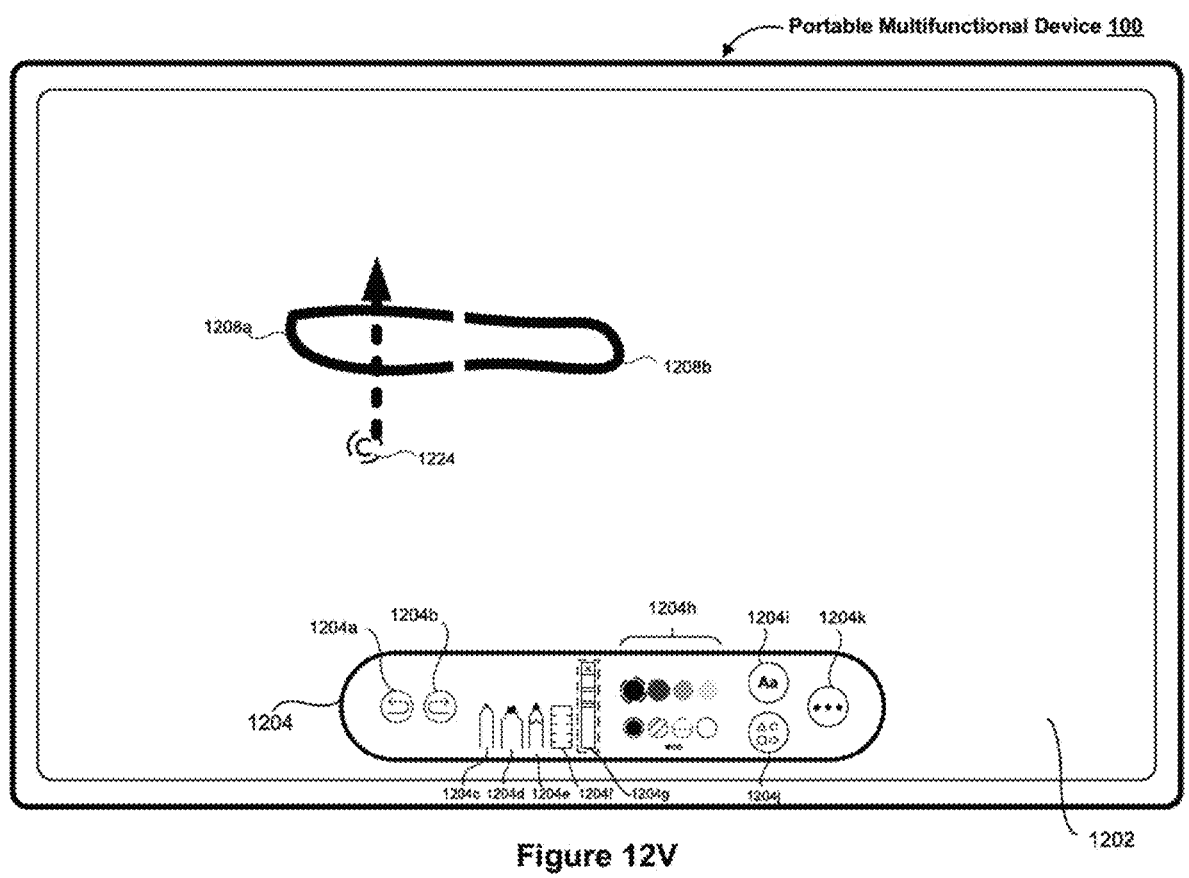
Figure 12W:
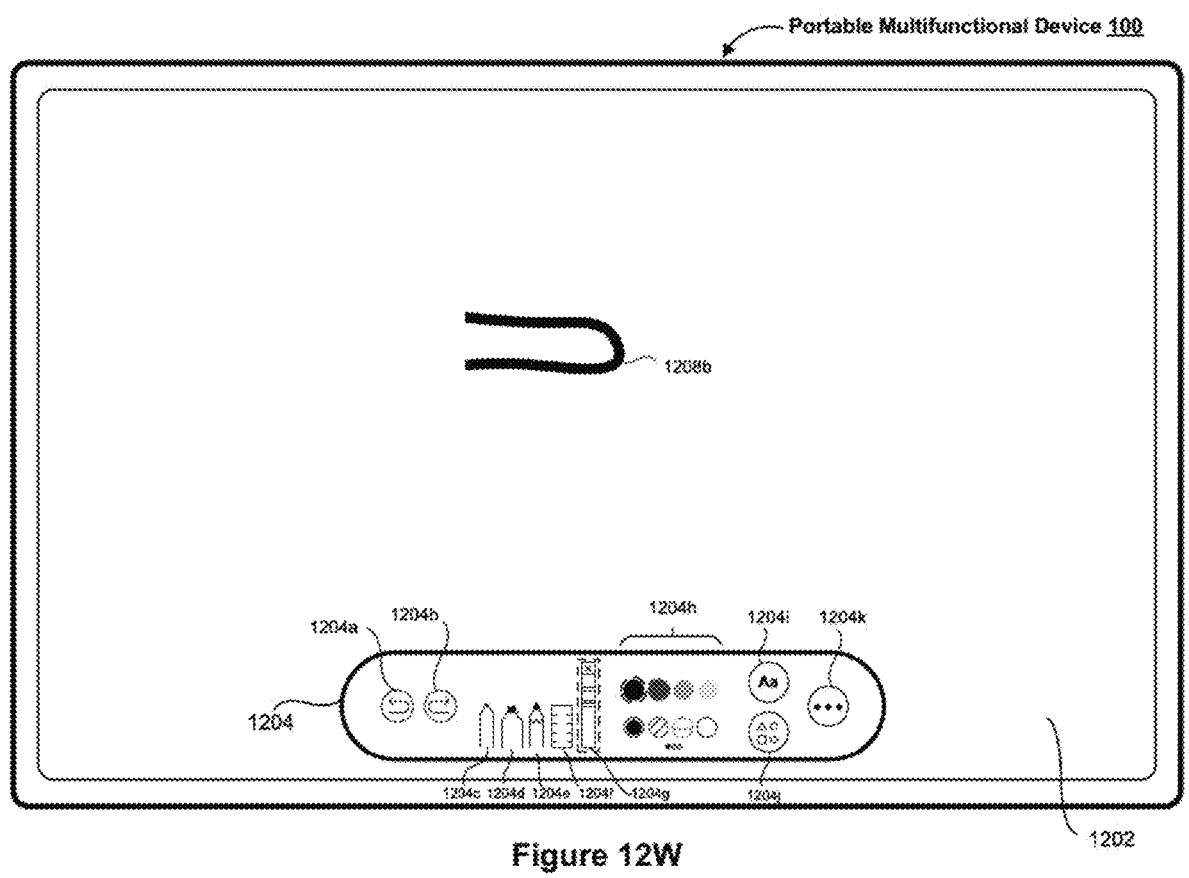

As illustrated in FIG. 12V, the electronic device 100 detects a second object erase input 1224. In some embodiments, the second object erase input 1224 corresponds to movement of a contact. The second object erase input 1224 defines a third path intersecting the second portion 1208*a* of the object 1208 and not intersecting the third portion 1208*b* of the object 1208. In response to detecting the second object erase input 1224 in FIG. 12V, the electronic device 100 ceases to display the second portion 1208*a* of the object 1208 without ceasing to display the third portion 1208*b* of the object 1208, as illustrated in FIG. 12W. In some embodiments, in response to detecting a pixel erase input (e.g., while the eraser tool is in the pixel erase mode of operation) that defines the third path, the electronic device 100 ceases to display pixels in the third path instead of ceasing to display the entirety of the second portion 1208*a* of the object 1208.

Figure 12X:
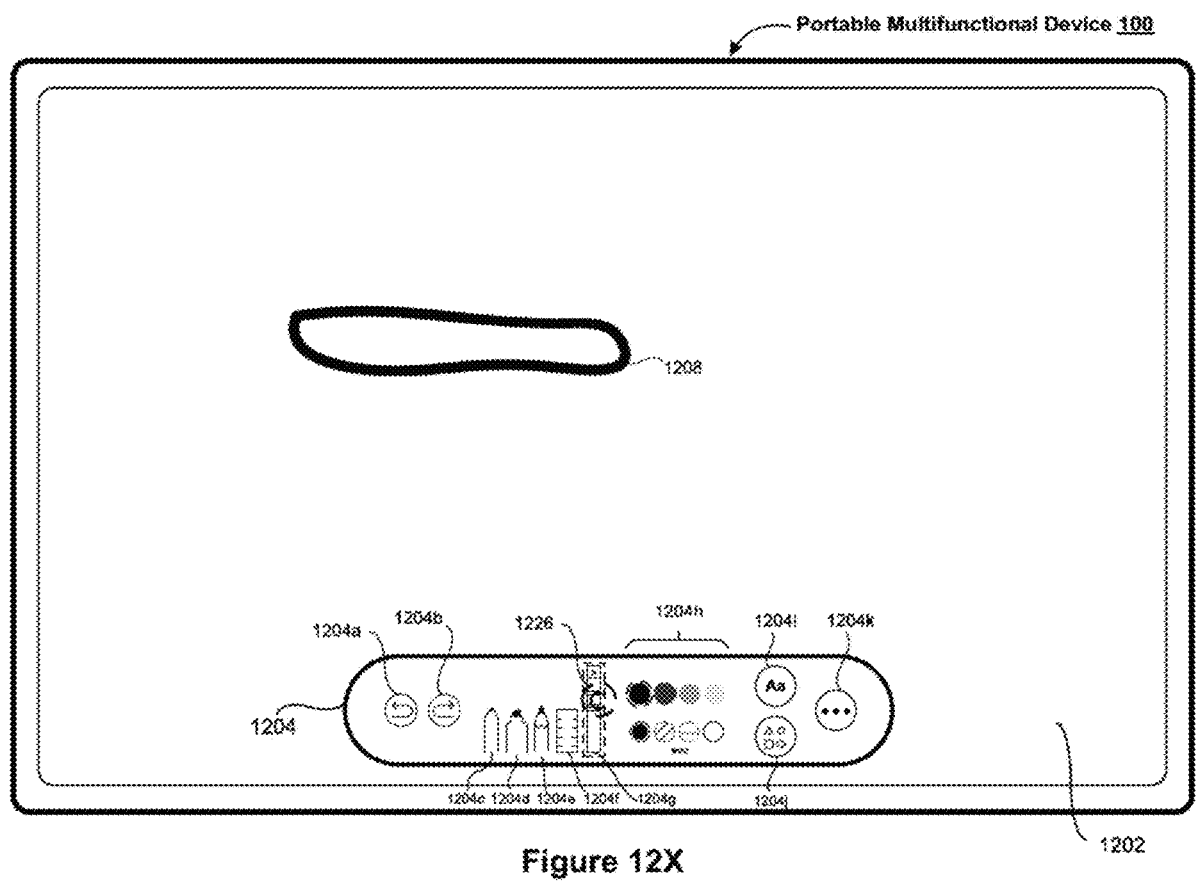

As illustrated in FIGS. 12X-12AP, in some embodiments, the electronic device 100 ceases to display (e.g., deletes) the entirety of the object 1208 in response to detecting an object erase input directed to a fourth portion 1208*c* of the object 1208. Notably, in contrast to the examples described above with reference to FIGS. 12A-12W, the fourth portion 1208*c* of the object 1208 is connected to the remainder of the object 1208 that resulted from a preceding pixel erase input.

Figure 12Y:
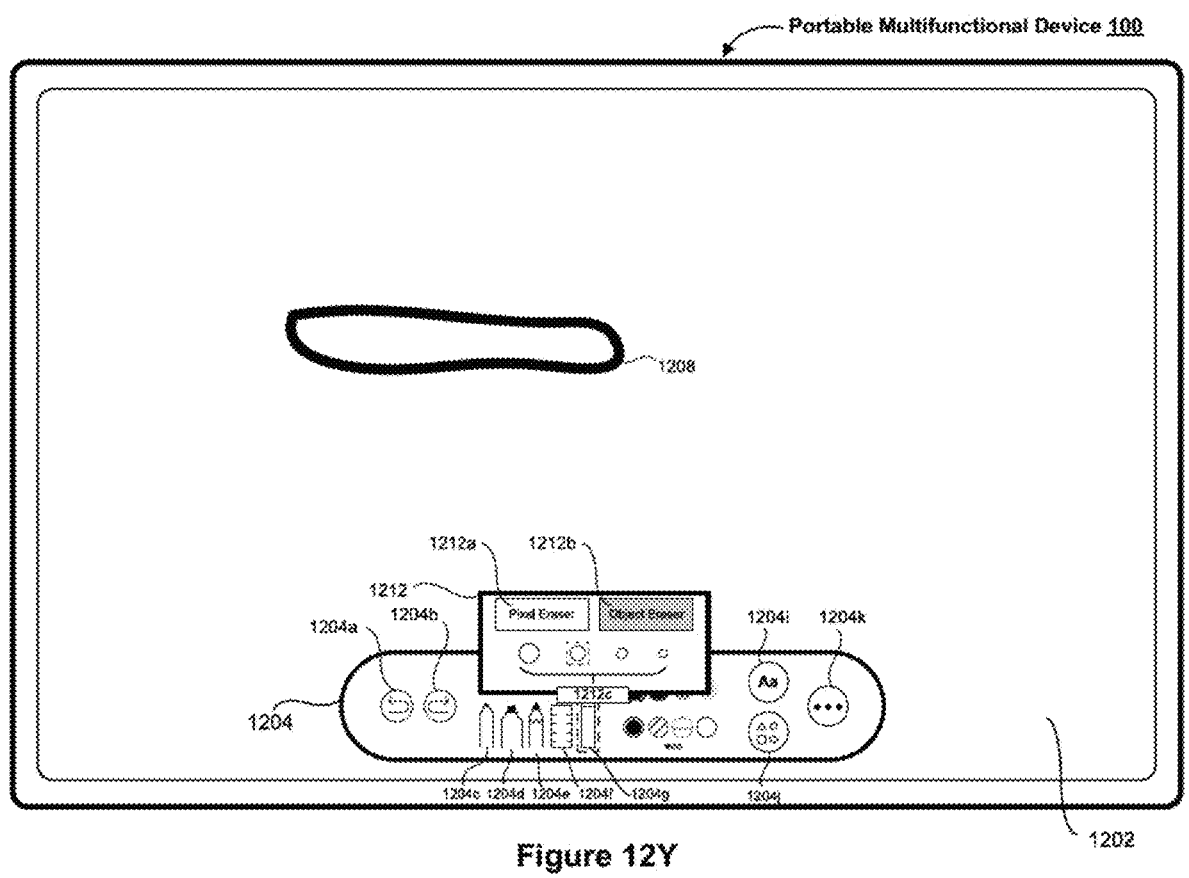

As illustrated in FIG. 12X, the electronic device 100 displays the object 1208 in response to detecting the object insertion input 1206 in FIG. 12B. Moreover, the electronic device 100 detects an input 1226 directed to the eraser affordance 1204*g*. In some embodiments, the input 1226 corresponds to a long touch input (e.g., a touch input detected for greater than a threshold amount of time) or a force touch input (e.g., a touch input associated with a level of force that is greater than a threshold amount of force). In response to detecting the input 1226 in FIG. 12X, the electronic device 100 displays the eraser mode interface 1212, as illustrated in FIG. 12Y.

Figure 12Z:
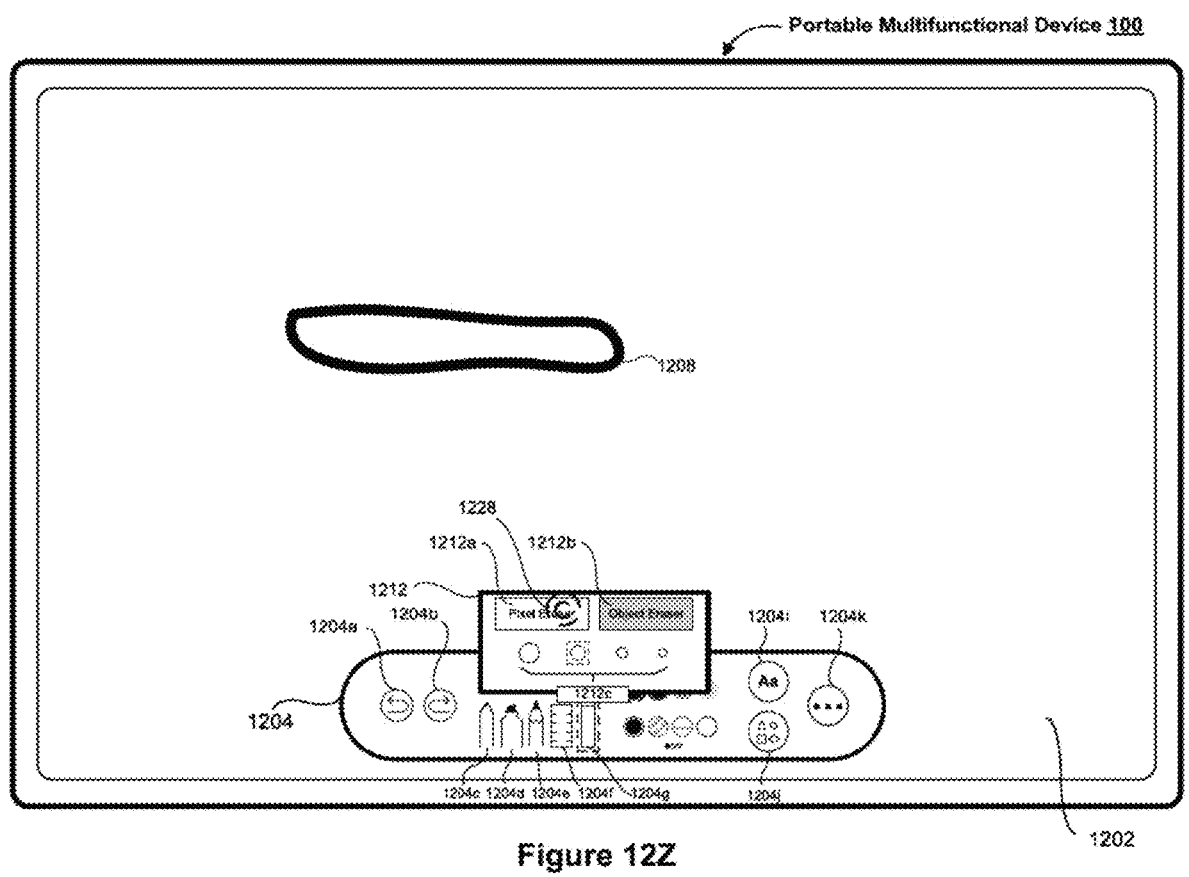
Figure 12A:
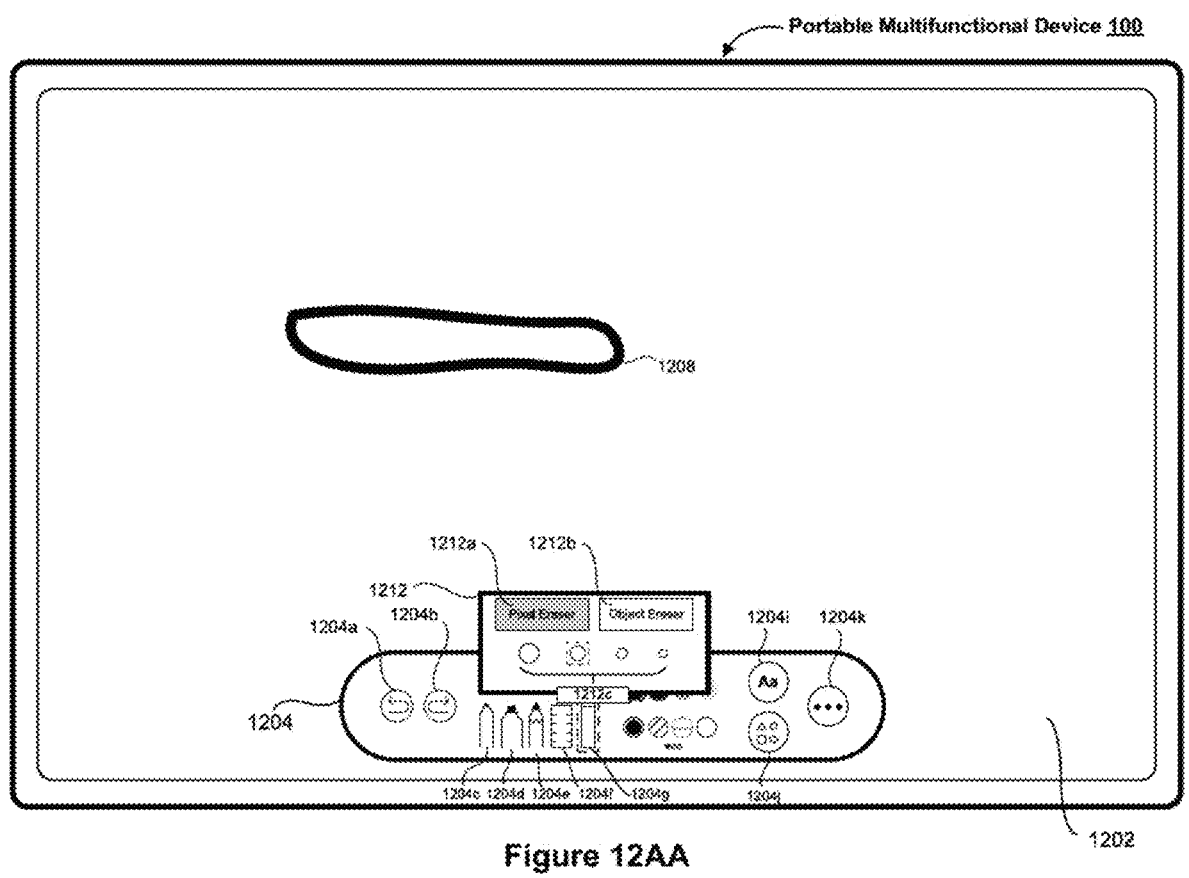
Figure 12A:
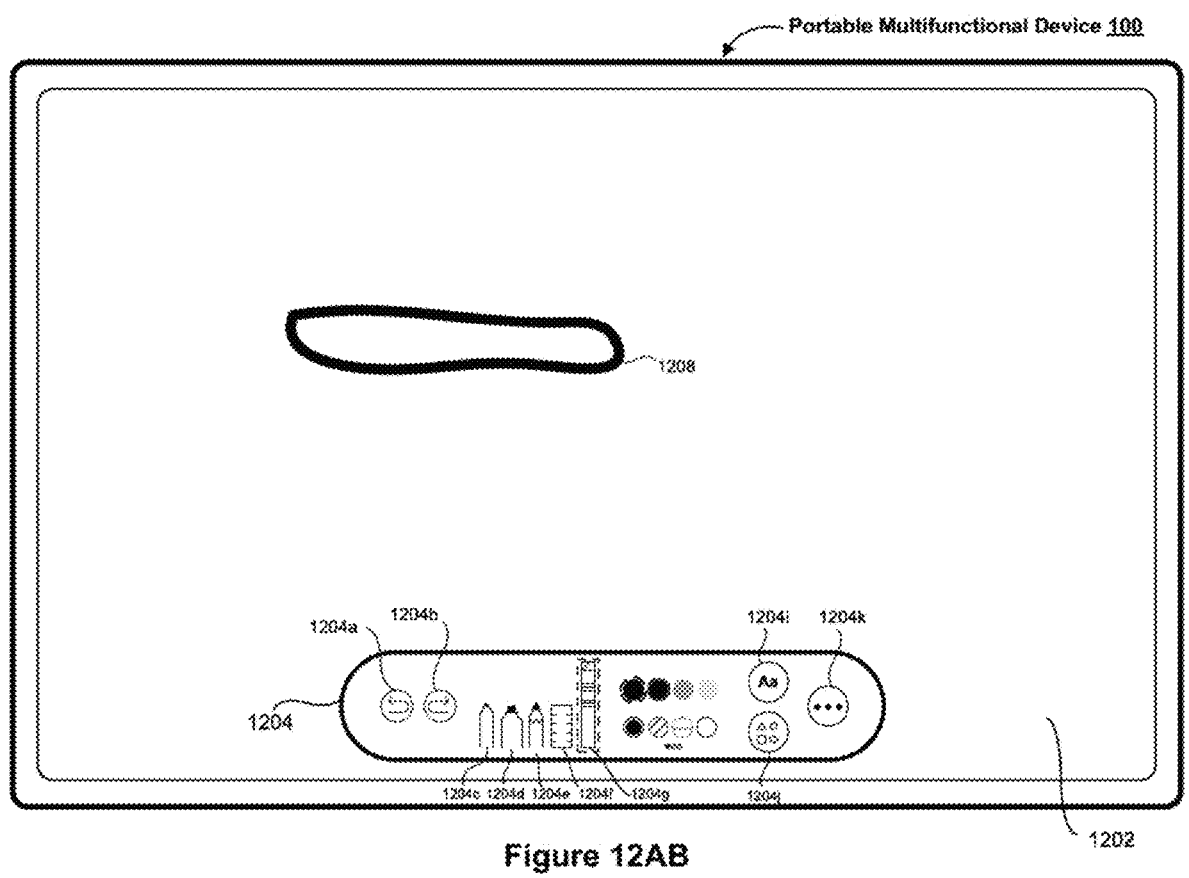
Figure 12A:
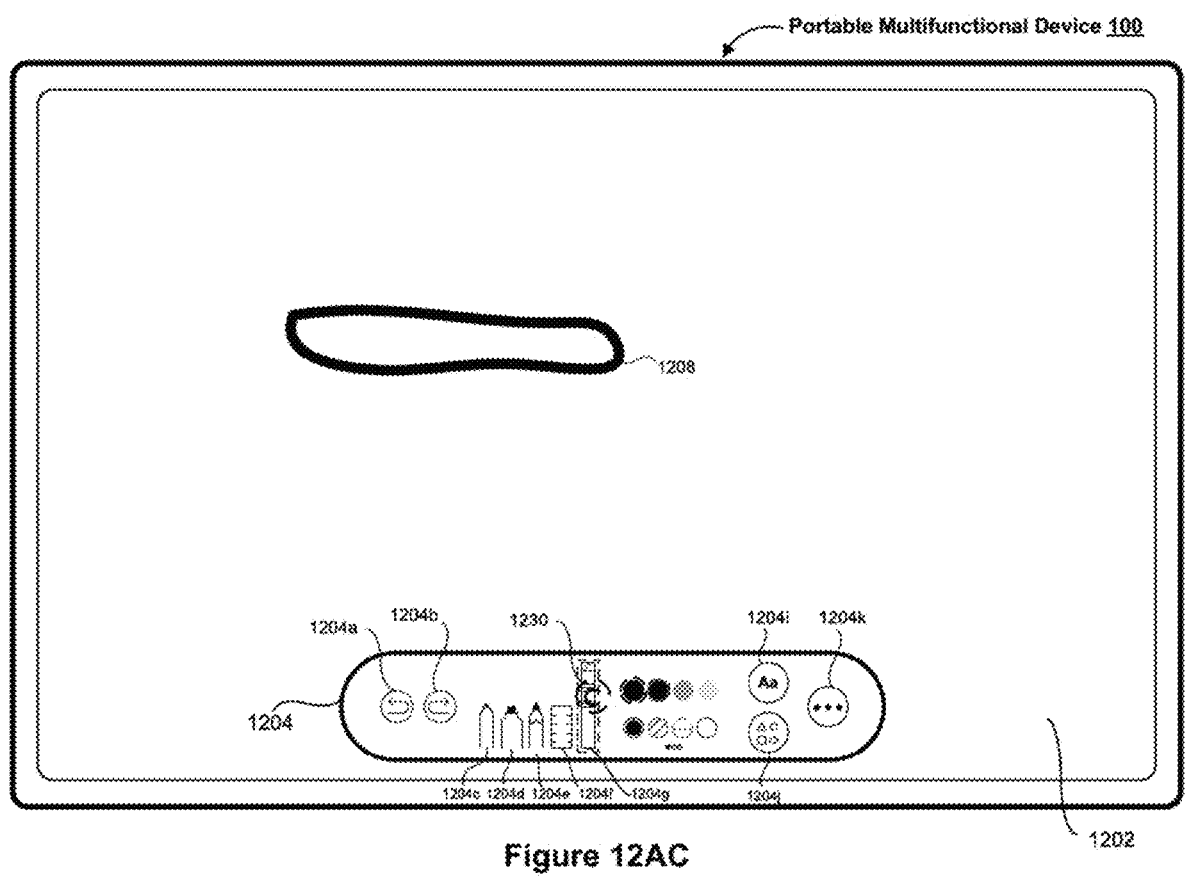
Figure 12A:
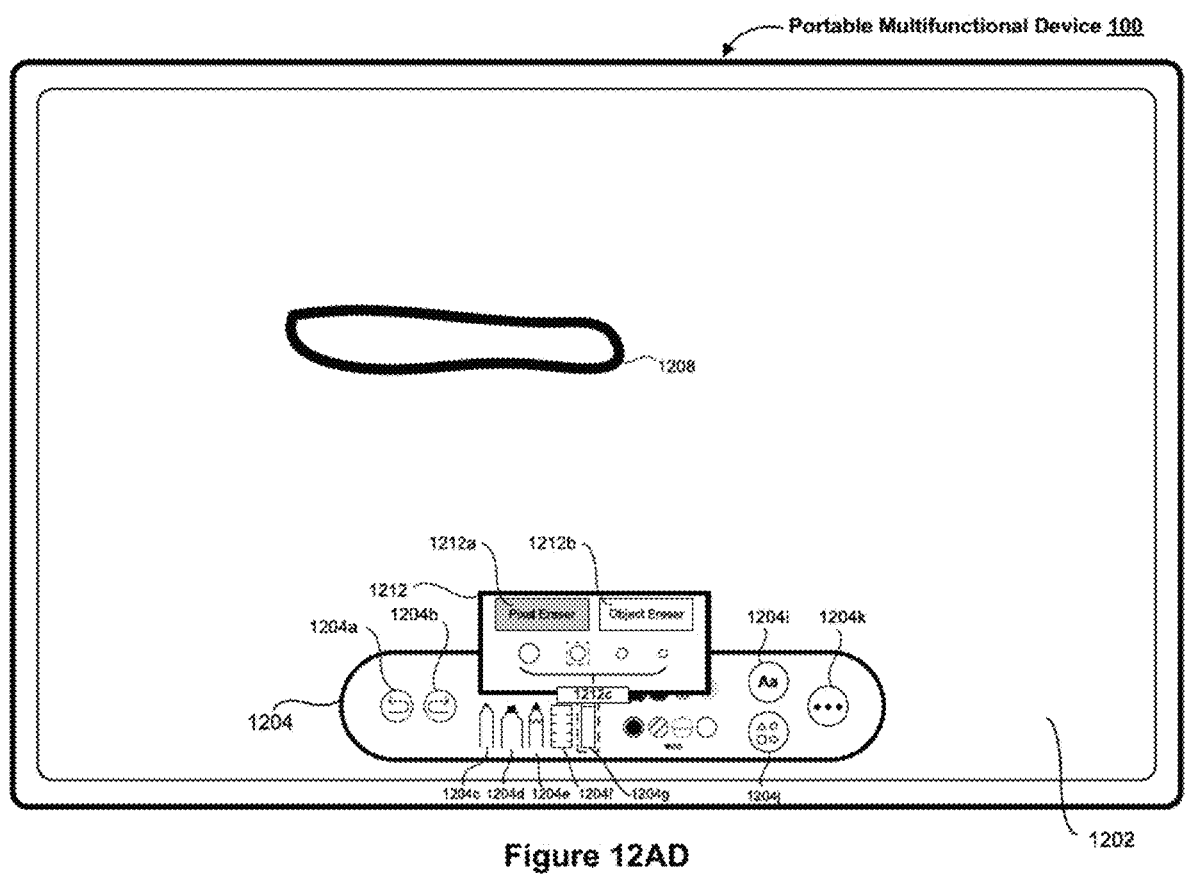
Figure 12A:
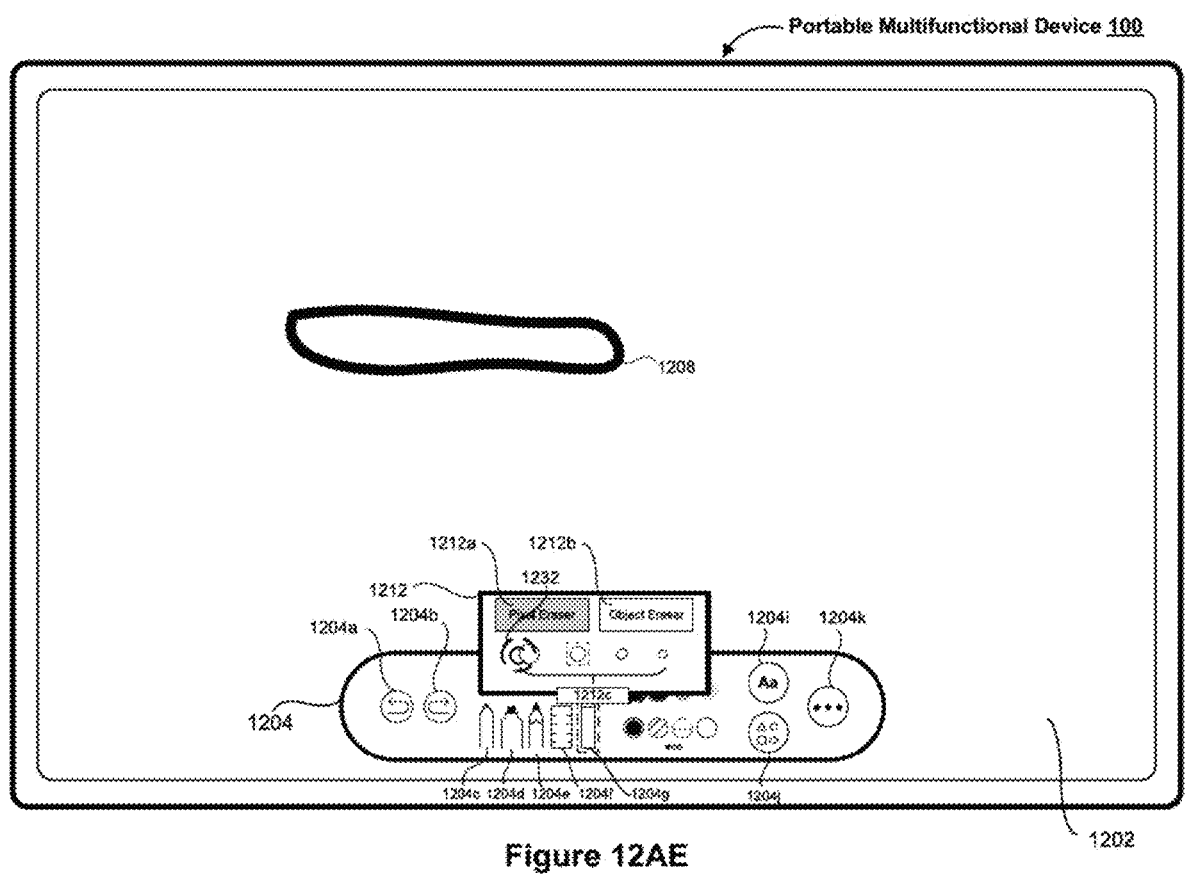
Figure 12A:
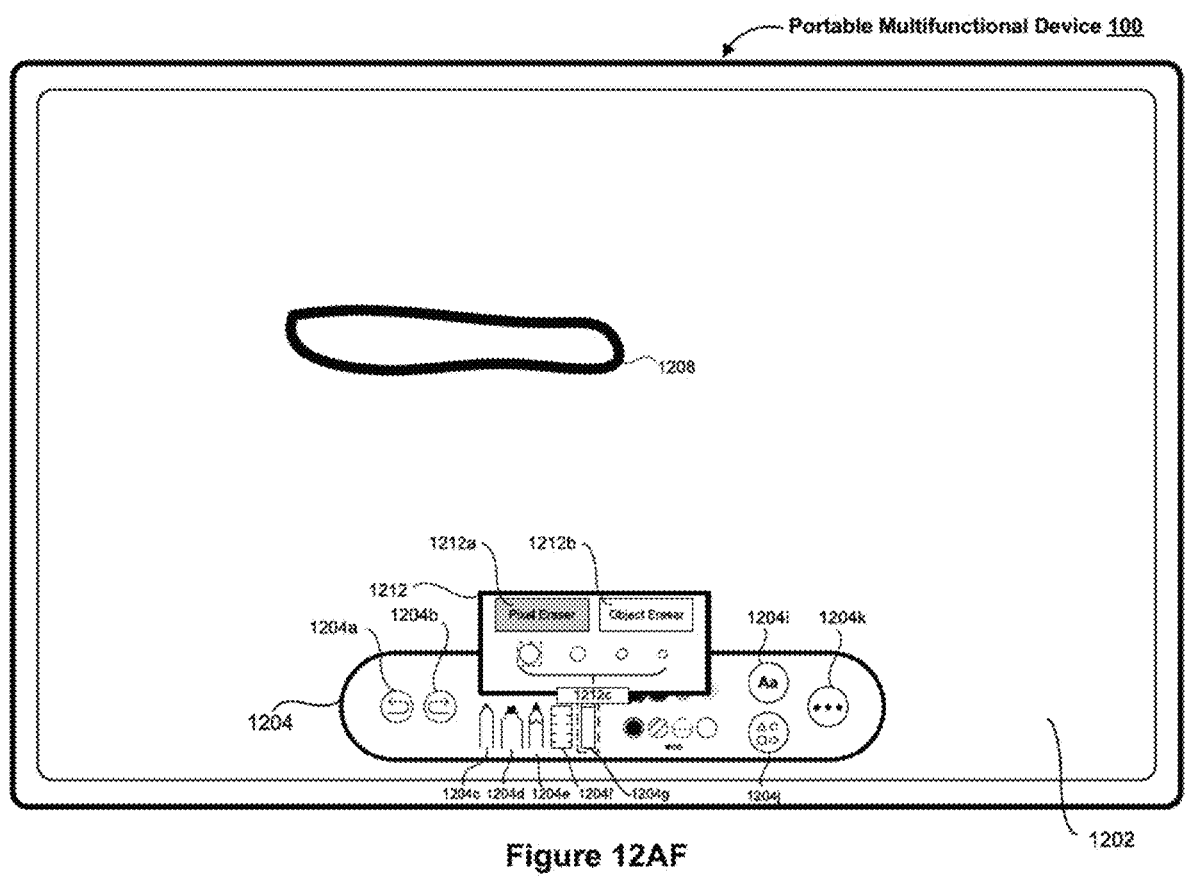
Figure 12A:
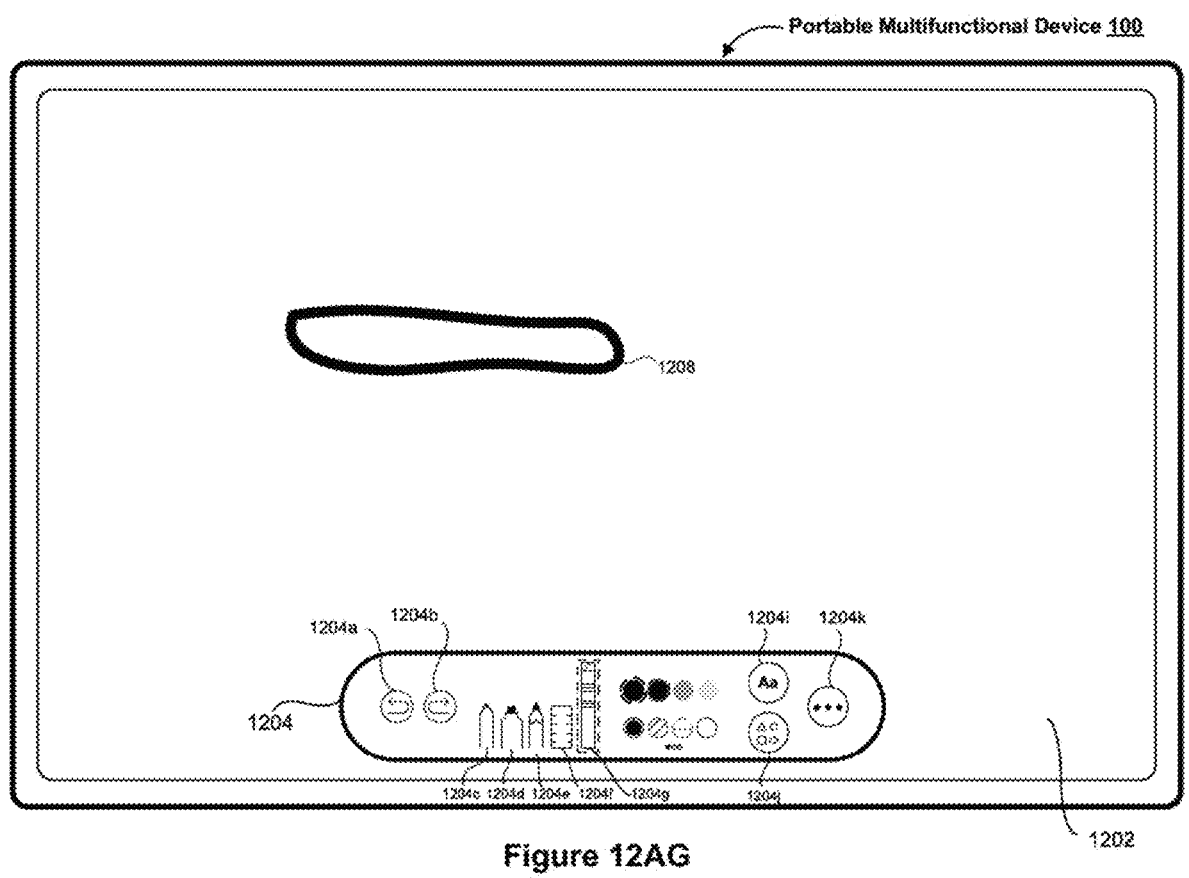
Figure 12A:
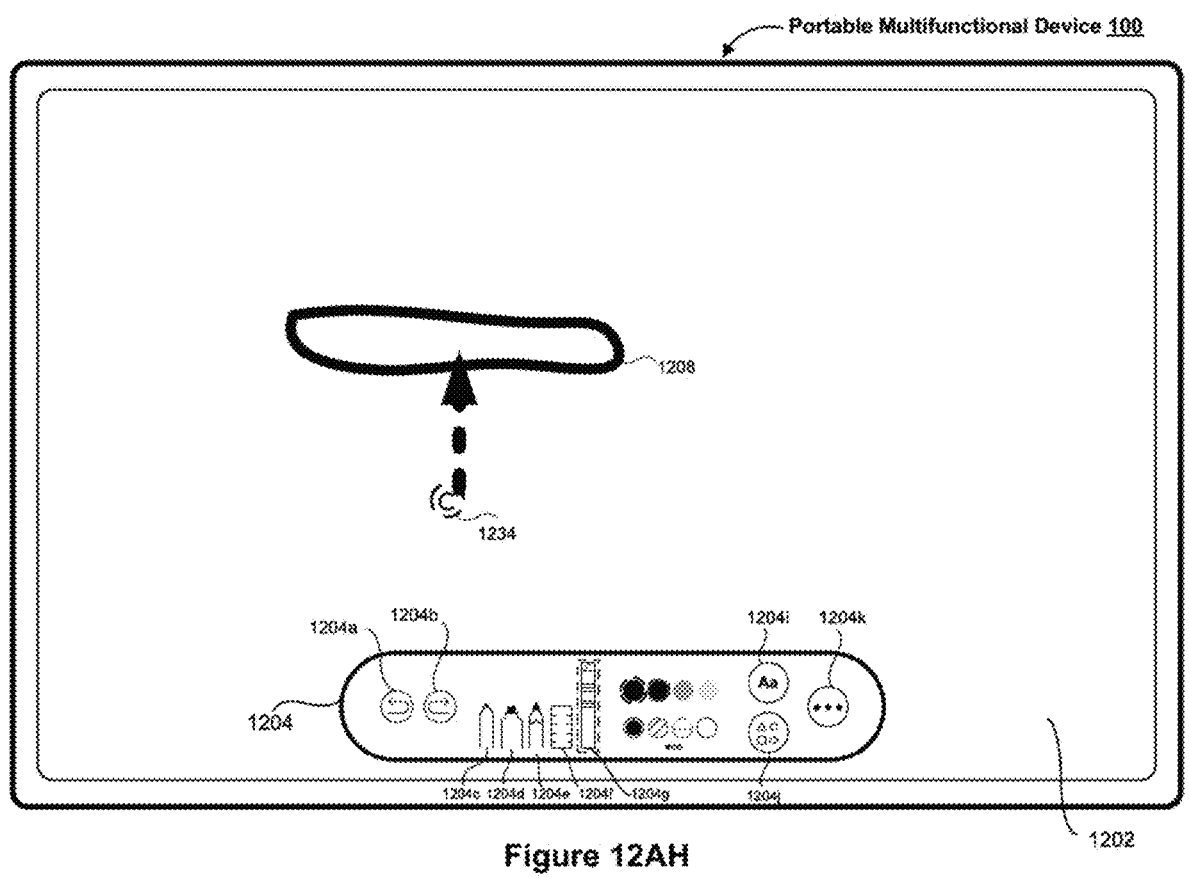
Figure 12A:
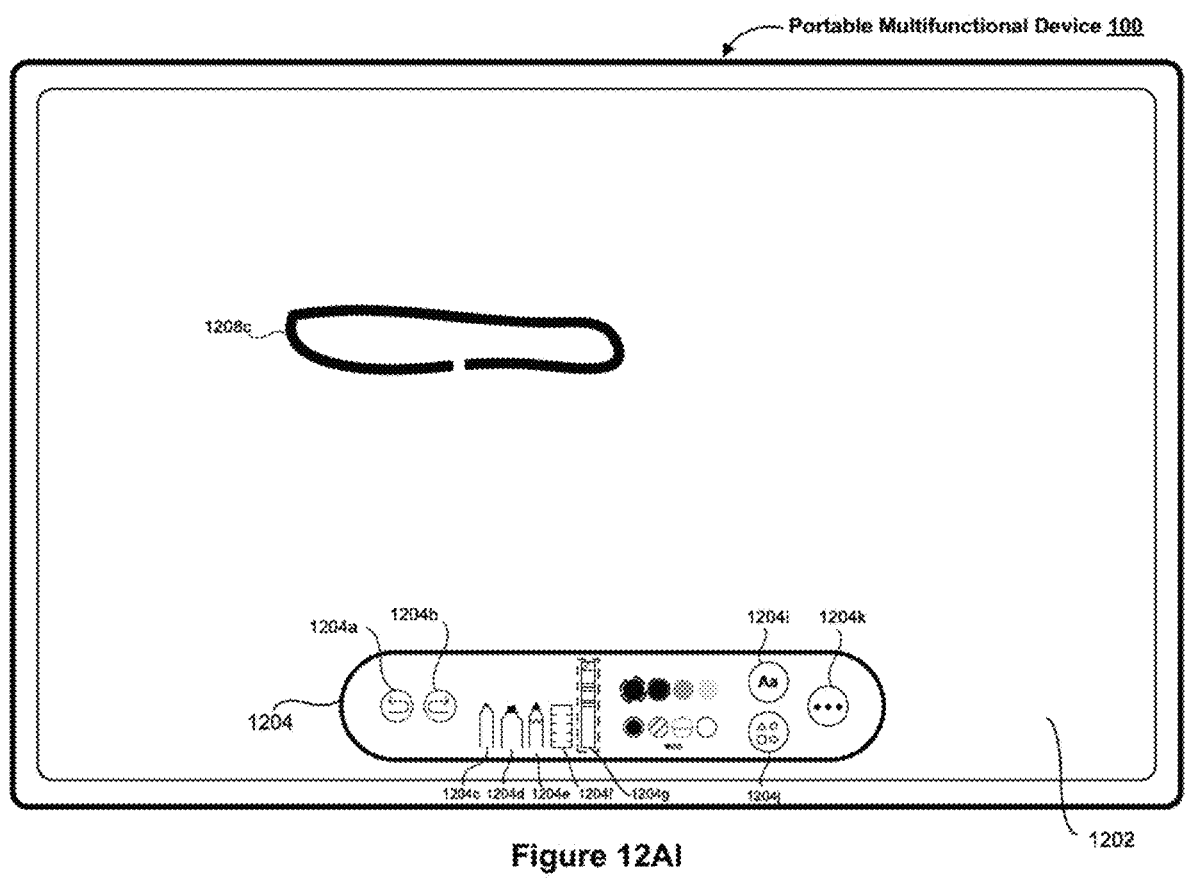
Figure 12A:
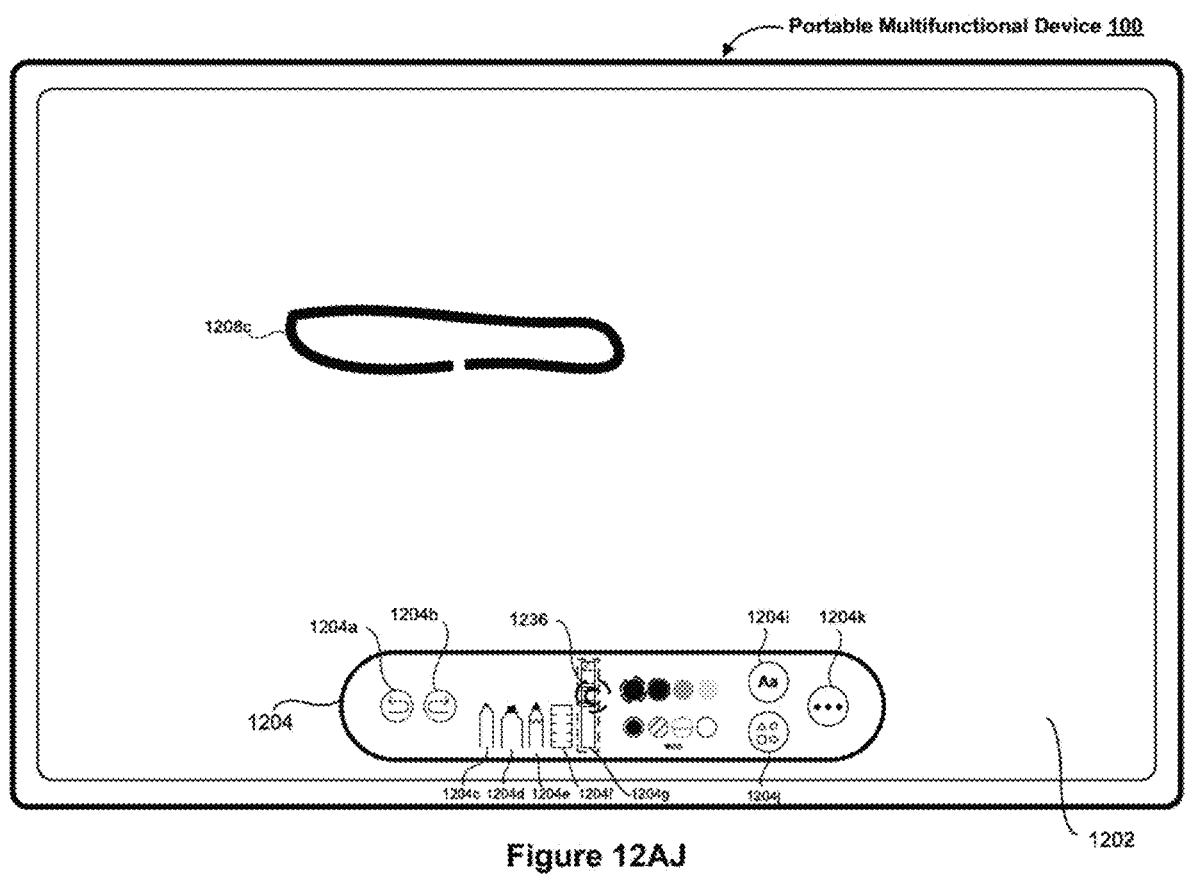
Figure 12A:
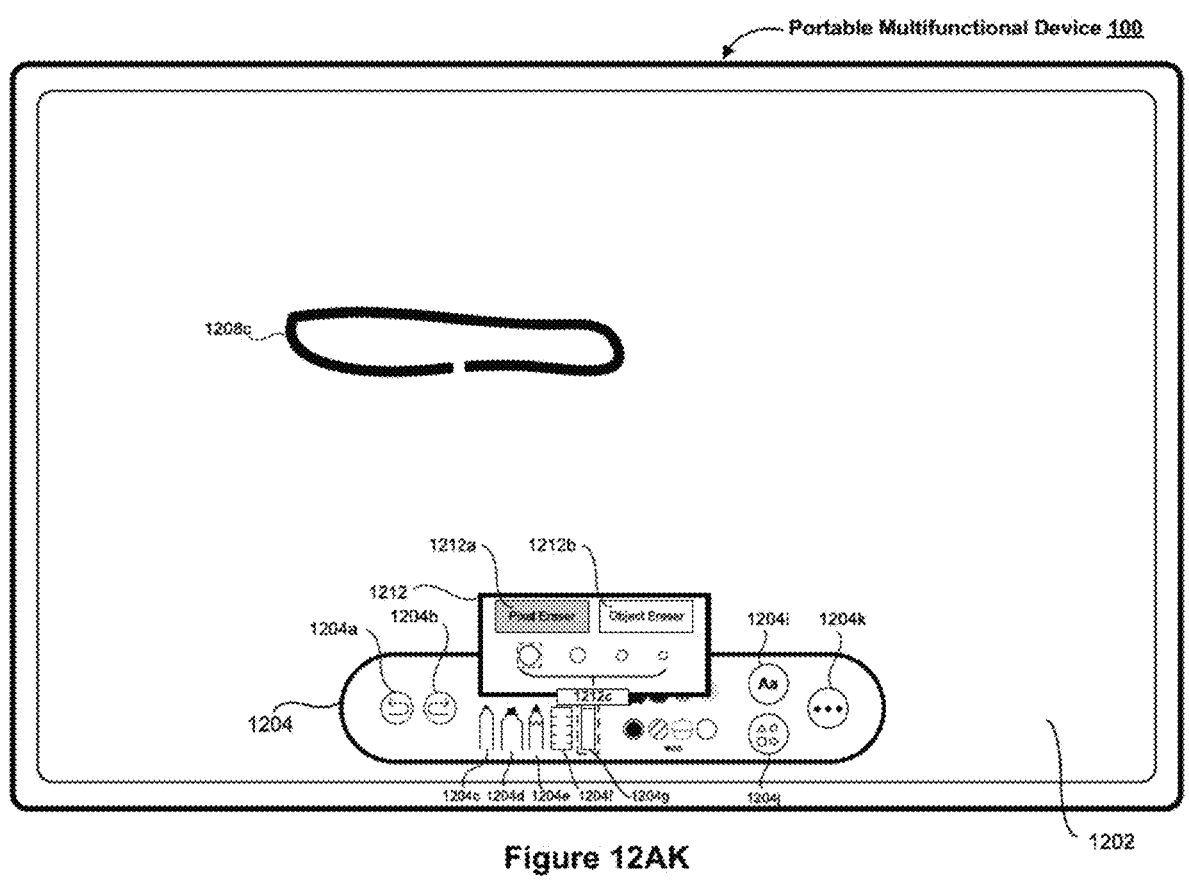
Figure 12A:
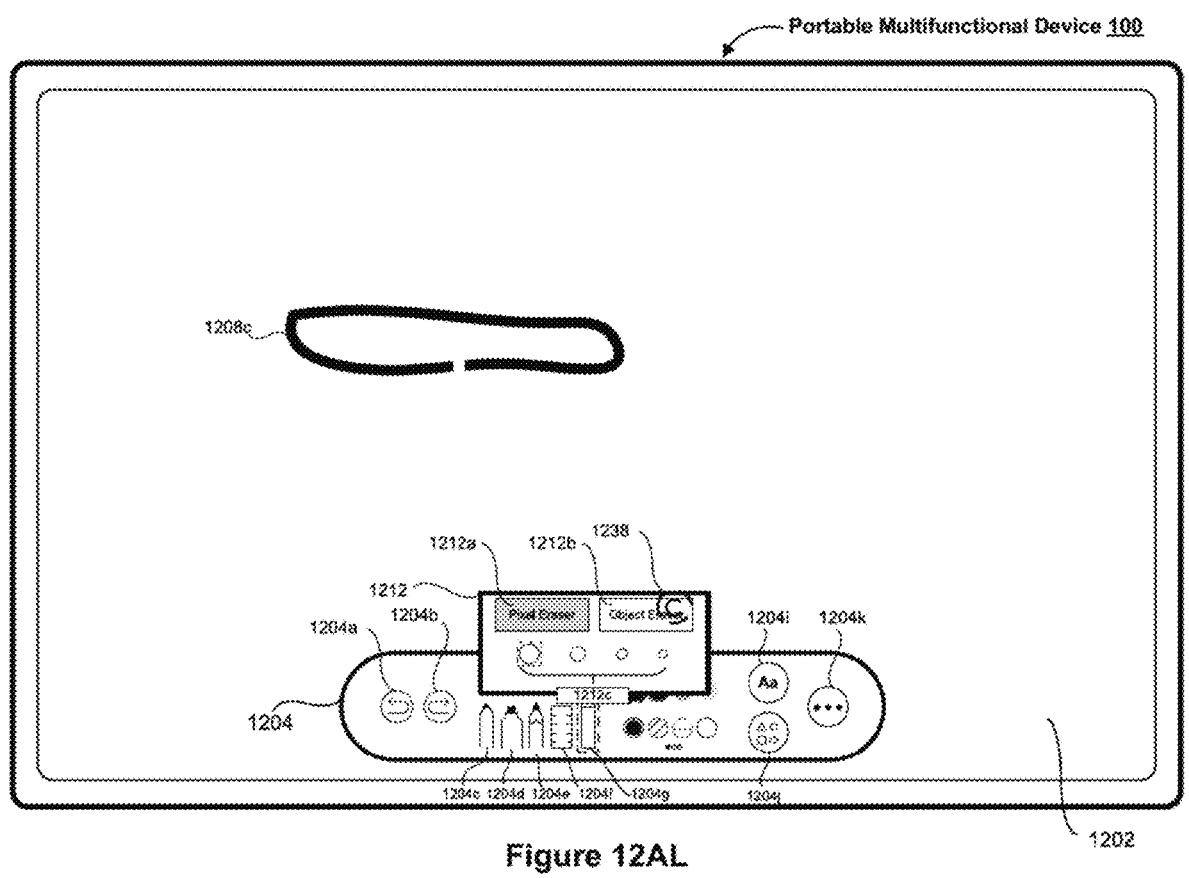
Figure 12A:
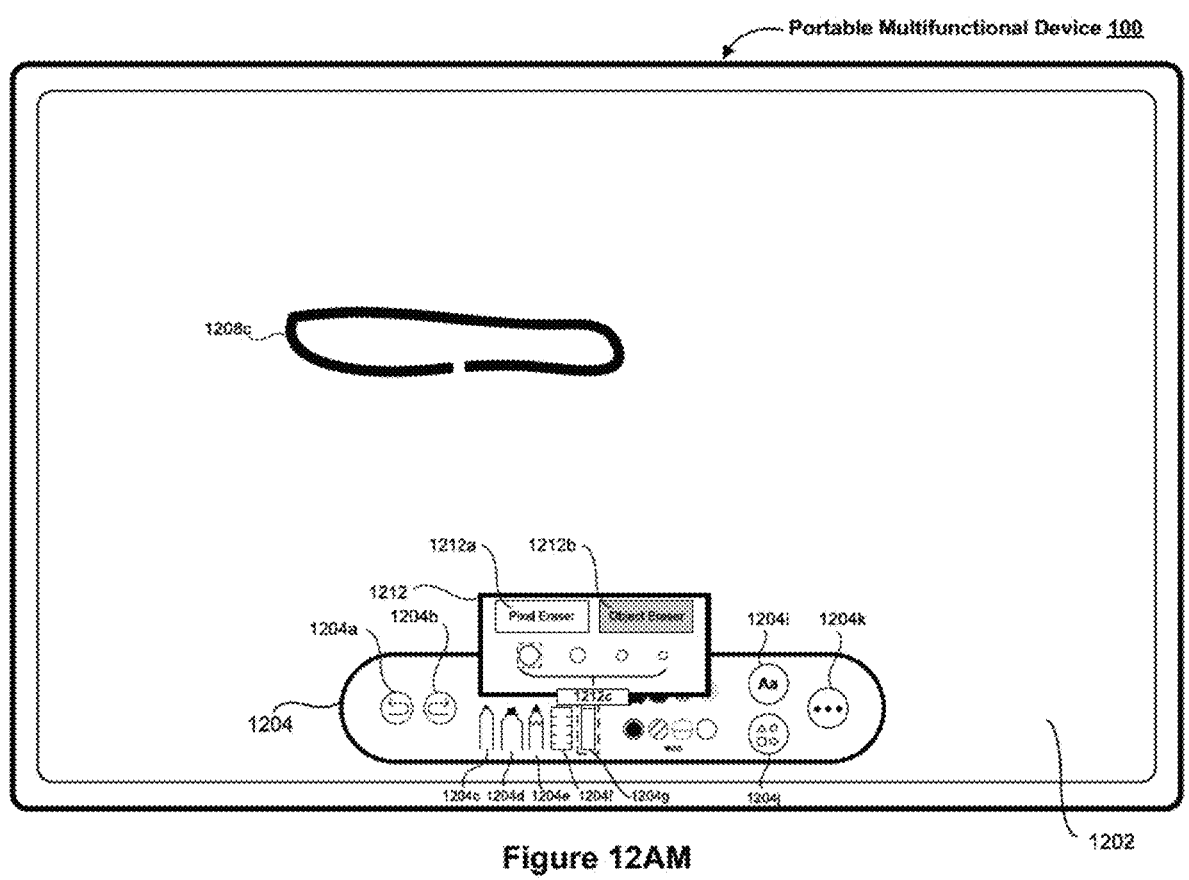
Figure 12A:
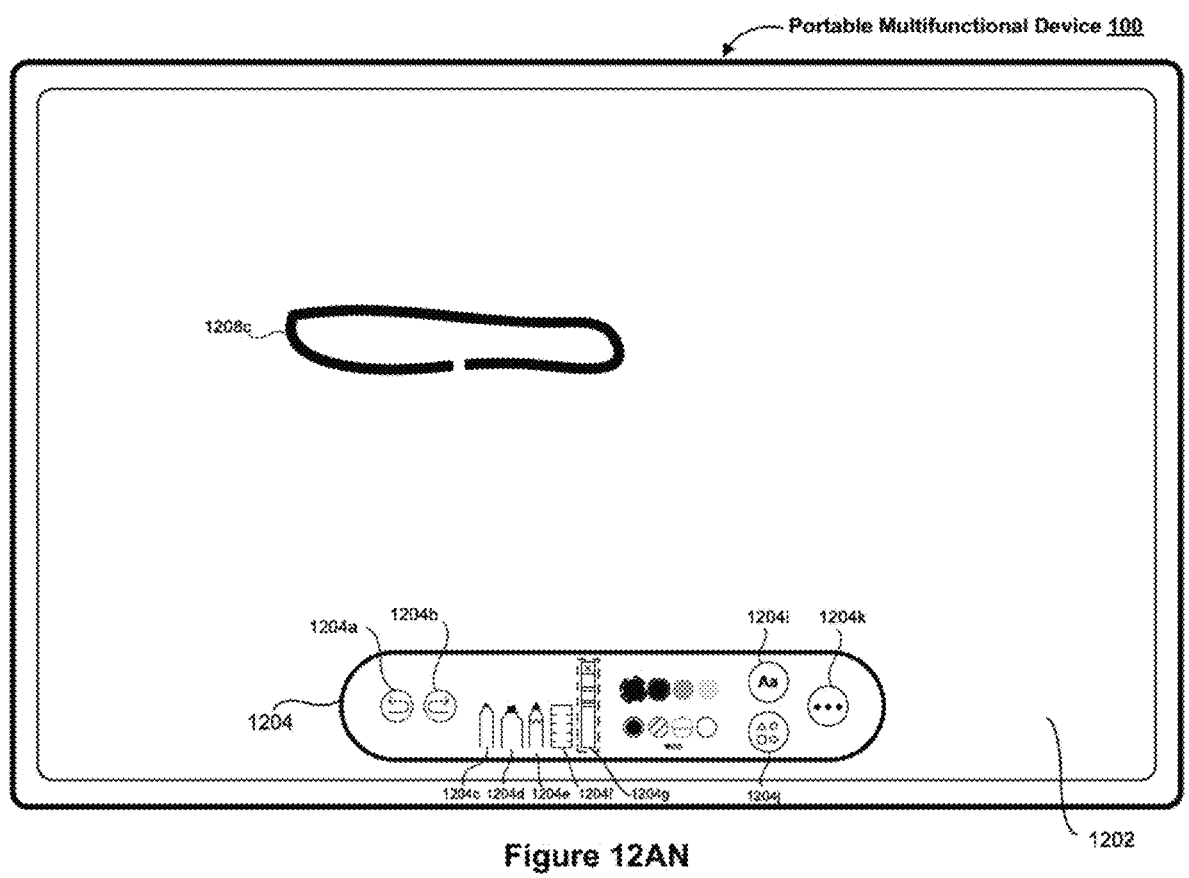
Figure 12A:
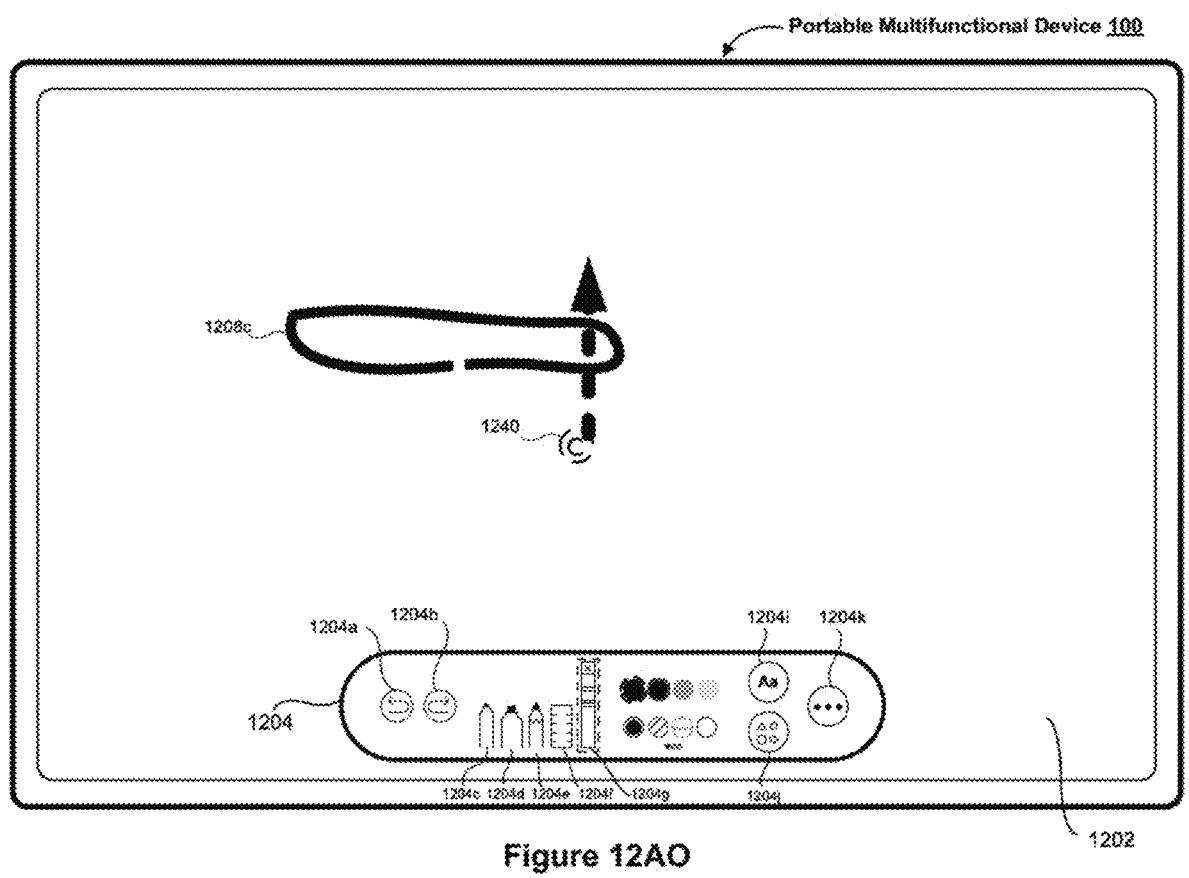
Figure 12A:
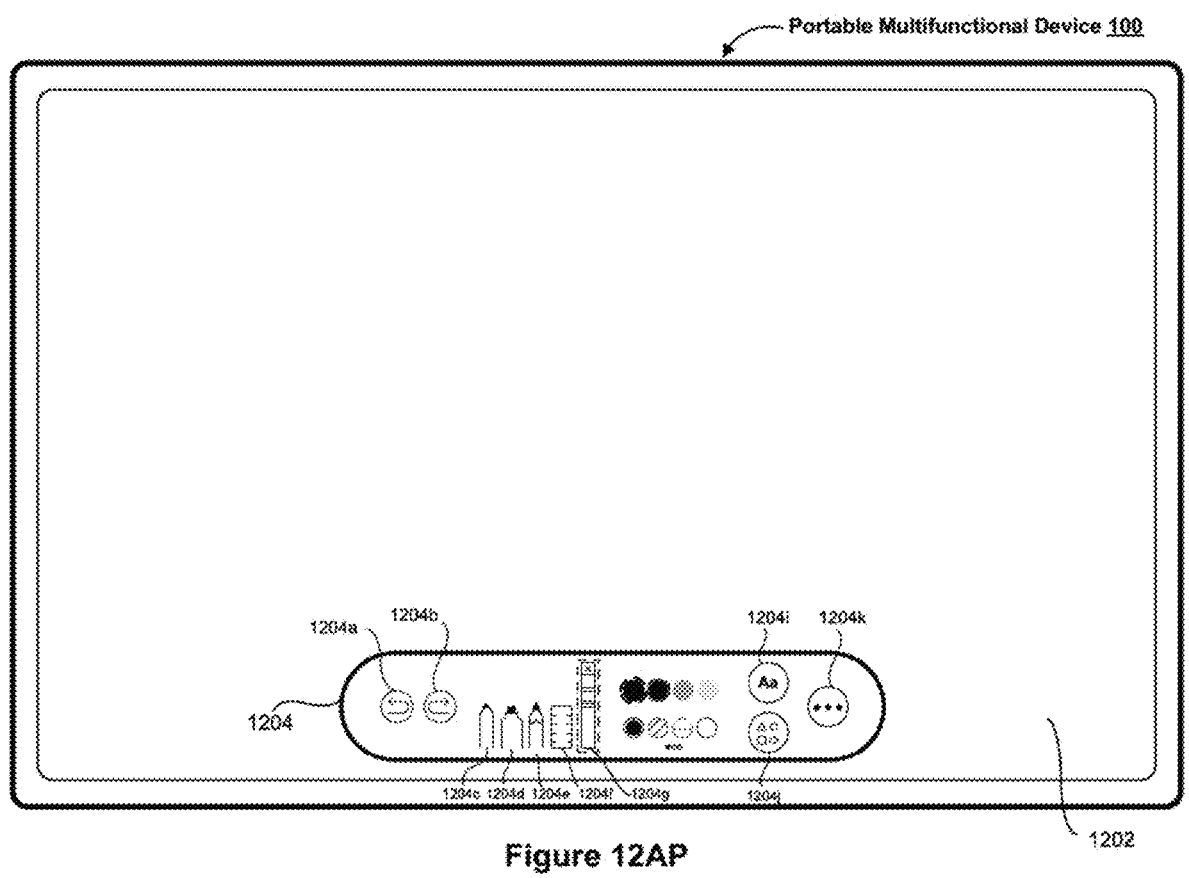

As illustrated in FIG. 12Z, the electronic device 100 detects an input 1228 directed to the pixel eraser affordance 1212*a*. In some embodiments, the input 1228 corresponds to a tap input. In response to detecting the input 1228 in FIG. 12Z, the electronic device 100 changes the eraser tool from the object erase mode of operation to the pixel erase mode of operation, as indicated by the pixel eraser affordance 1212*a* being selected, as illustrated in FIG. 12AA. Moreover, as illustrated in FIG. 12AB, the electronic device 100 ceases to display the eraser mode interface 1212 and changes the appearance of the eraser affordance 1204*g* from the first appearance to the second appearance, indicating that the eraser tool is in the pixel erase mode of operation. In some embodiments, the electronic device 100 ceases to display the eraser mode interface 1212 after a threshold amount of time has passed since detecting the input 1228.

As illustrated in FIG. 12AC, the electronic device 100 detects an input 1230 directed to the eraser affordance 1204*g*. In some embodiments, the input 1230 corresponds to a long touch input (e.g., a touch input detected for greater than a threshold amount of time) or a force touch input (e.g., a touch input associated with a level of force that is greater than a threshold amount of force). In response to detecting the input 1230 in FIG. 12AC, the electronic device 100 displays the eraser mode interface 1212 in FIG. 12AD.

As illustrated in FIG. 12AE, the electronic device 100 detects an input 1232 directed to the thickest eraser thickness affordance of the plurality of eraser thickness affordances 1212*c*. In some embodiments, the input 1232 corresponds to a tap input. In response to detecting the input 1232 in FIG. 12AE, the electronic device 100 sets the thickness of the drawing tool to the thickest thickness level, as illustrated in FIG. 12AF. Accordingly, subsequent erase inputs will erase a larger portion of content as compared with the previous examples. As illustrated in FIG. 12AG, the electronic device 100 ceases to display the eraser mode interface 1212. In some embodiments, the electronic device 100 ceases to display the eraser mode interface 1212 after a threshold amount of time has passed since detecting the input 1232.

As illustrated in FIG. 12AH, the electronic device 100 detects a second pixel erase input 1234. In some embodiments, the second pixel erase input 1234 corresponds to movement of a contact. Notably, in contrast to the provided example, above, with reference to the first pixel erase input 1214, the second pixel erase input 1234 defines a fourth path that does not split the object 1208 into two separate portions. Rather, as illustrated in FIG. 12AI, the second pixel erase input 1234 removes a bottom chunk of the object 1208, leaving the fourth portion 1208*c* as one connected (e.g., contiguous) drawing mark. In some embodiments, in response to detecting an object erase input (e.g., while the eraser tool is in the object erase mode of operation) that defines the fourth path, the electronic device 100 ceases to display (e.g., erases) the entirety of the object 1208 instead of ceasing to display pixels in the fourth path.

As illustrated in FIG. 12AJ, the electronic device 100 detects an input 1236 directed to the eraser affordance 1204*g*. In some embodiments, the input 1236 corresponds to a long touch input (e.g., a touch input detected for greater than a threshold amount of time) or a force touch input (e.g., a touch input associated with a level of force that is greater than a threshold amount of force). In response to detecting the input 1236 in FIG. 12AJ, the electronic device 100 displays the eraser mode interface 1212, as illustrated in FIG. 12AK.

As illustrated in FIG. 12AL, the electronic device 100 detects an input 1238 directed to the object eraser affordance 1212*b*. In some embodiments, the input 1238 corresponds to a tap input. In response to detecting the input 1238 in FIG. 12AL, the electronic device 100 changes the eraser tool from the pixel erase mode of operation to the object erase mode of operation, as indicated by the object eraser affordance 1212*b* being selected, as illustrated in FIG. 12AM. Moreover, as illustrated in FIG. 12AN, the electronic device 100 ceases to display the eraser mode interface 1212 and changes the appearance of the eraser affordance 1204*g* from the second appearance to the first appearance, indicating that the eraser tool is in the object erase mode of operation. In some embodiments, the electronic device 100 ceases to display the eraser mode interface 1212 after a threshold amount of time has passed since detecting the input 1238.

As illustrated in FIG. 12AO, the electronic device 100 detects a third object erase input 1240. In some embodiments, the third object erase input 1240 corresponds to movement of a contact. The third object erase input 1240 defines a fifth path that intersects the fourth portion 1208*c* of the object 1208. As illustrated in FIG. 12AO, the third object erase input 1240 passes through a segment of the fourth portion 1208*c* that is to the right of the previously removed bottom chunk of the object 1208. As illustrated in FIG. 12AP, the third object erase input 1240 removes the entirety of the object 1208 because the fifth path intersects the fourth portion 1208c of the object 1208 and the fourth portion 1208c of the object 1208 corresponds to a single (e.g., not divided into multiple portions) drawing mark. This is in contrast to the two object erase input examples provided above with reference to FIGS. 12R-12W, in which the preceding pixel erase input 1214 divided the object 1208 into two separated (e.g., disconnected) portions, e.g., the second portion 1208a and the third portion 1208b. In some embodiments, in response to detecting an object erase input that passes through a segment of the fourth portion 1208c that is to the left of the previously removed bottom chunk of the object 1208, the electronic device 100 removes the entirety of the object 1208. In some embodiments, in response to detecting a pixel erase input (e.g., while the eraser tool is in the pixel erase mode of operation) that defines the fifth path, the electronic device 100 ceases to display pixels in the fifth path instead of ceasing to display the entirety of the object 1208.

FIGS. 13A-13D are a flow diagram of a method 1300 for selectively erasing portions of an object in accordance with some embodiments. In some embodiments, the method 1300 is performed at an electronic device (e.g., the electronic device 300 in FIG. 3 or the portable multifunction device 100 in FIGS. 12A-12AP) with one or more processors, a non-transitory memory, an input device, and a display device. Some operations in the method 1300 are, optionally, combined and/or the order of some operations is, optionally, changed.

The method 1300 includes, after splitting an object into multiple disconnected portions based on a pixel erase input, an electronic device ceases to display a particular disconnected portion and maintains display of the other remaining portions in response to an object erase input. Accordingly, the electronic device provides greater functionality and control with respect to erasing operations. Moreover, the electronic device need not receive a drag erase input that is spatially coextensive with a disconnected portion of an object in order to erase the disconnected portion. By utilizing the object erase input instead of the drag erase input in order to erase the disconnected portion, the electronic device reduces processing and battery utilization and experiences less wear-and-tear.

Figure 13A:
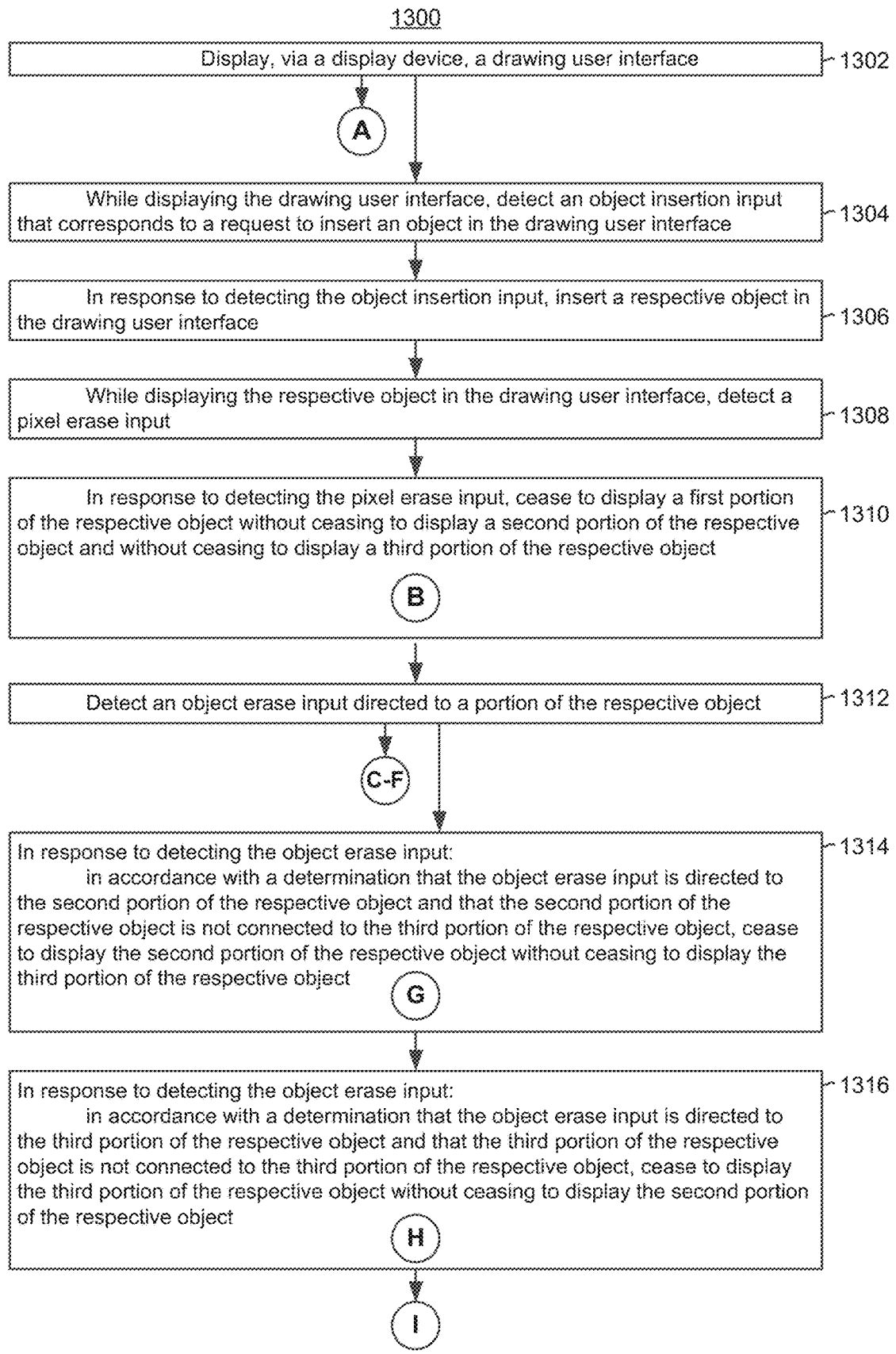

With respect to FIG. 13A, the electronic device displays (1302), via a display device, a drawing user interface. For example, the drawing user interface includes content (e.g., an annotated screenshot image) marked up by an object. As another example, the drawing user interface includes a toolbar region including a plurality of drawing tool selection affordances respectively associated with a plurality of drawing tools. As one example, with reference to FIG. 12A, the electronic device 100 displays a drawing user interface 1202.

While displaying the drawing user interface, the electronic device detects (1304) an object insertion input that corresponds to a request to insert an object in the drawing user interface. For example, the object is a line drawing input, a text entry input, or a request to insert a predetermined object such as a shape. As one example, with reference to FIG. 12B, the electronic device 100 detects the object insertion input 1206 that corresponds to a request to insert a closed object in the drawing user interface 1202.

In response to detecting the object insertion input, the electronic device inserts (1306) a respective object in the drawing user interface. For example, the respective object corresponds to a stroke respective object defined by a continuous user input within the drawing user interface while a drawing tool that is associated with a stroke operation is selected. As another example, the respective object corresponds to one of a shape object, a stroke object, a magnifier object, or a text object. As yet another example, the respective object results from a movement of a contact across a touch-sensitive surface of an electronic device that ends when the contact is released. As yet another example, the respective object results from a mouse-click followed by a drag movement of a cursor across a display that ends when the mouse-click is released. As one example, in response to detecting the object insertion input 1206 in FIG. 12B, the electronic device 100 displays a corresponding object 1208 in FIG. 12C.

While displaying the respective object in the drawing user interface, the electronic device detects (1308) a pixel erase input. As one example, with reference to FIG. 12K, the electronic device 100 detects the first pixel erase input 1214 that defines a respective path that passes through (e.g., splits into two) the object 1208. As another example, with reference to FIG. 12AH, the electronic device 100 detects the second pixel erase input 1234 that defines a respective path that does not pass through the object 1208, but instead removes a segment of the object 1208.

In response to detecting the pixel erase input, the electronic device ceases (1310) to display a first portion of the respective object without ceasing to display a second portion of the respective object and without ceasing to display a third portion of the respective object. For example, in some embodiments, the second and third portions are disjointed (e.g., not connected) with respect to each other. For example, the electronic device 100, in response to detecting the first pixel erase input 1214 in FIG. 12K, maintains display of the second portion 1208a and the third portion 1208b in FIG. 12L, wherein the second portion 1208a and the third portion 1208b are not connected to each other. As another example, in some embodiments, the second and third portions are contiguously associated with (e.g., connected to) each other, as is illustrated in FIGS. 12AH and 12AI.

The electronic device detects (1312) an object erase input directed to a portion of the respective object. For example, the electronic device detects the object erase input after ceasing to display the first portion of the respective object without ceasing to display the second and third portions of the respective object. As one example, the electronic device 100 detects the first object erase input 1220 in FIG. 12R. As one example, the electronic device 100 detects the second object erase input 1224 in FIG. 12V. As one example, the electronic device 100 detects the third object erase input 1240 in FIG. 12AO.

In response to detecting the object erase input: in accordance with a determination that the object erase input is directed to the second portion of the respective object and that the second portion of the respective object is not connected to the third portion of the respective object, the electronic device ceases (1314) to display the second portion of the respective object without ceasing to display the third portion of the respective object. As one example, in response to detecting the first object erase input 1220 in FIG. 12R, the electronic device 100 ceases to display the third portion 1208b of the object 1208 without ceasing to display the second portion 1208a of the object 1208 in FIG. 12S.

In response to detecting the object erase input: in accordance with a determination that the object erase input is directed to the third portion of the respective object and that the third portion of the respective object is not connected to the second portion of the respective object, the electronic device ceases (1316) to display the third portion of the respective object without ceasing to display the second portion of the respective object. As one example, in response to detecting the second object erase input 1224 in FIG. 12V, the electronic device 100 ceases to display the second portion 1208a of the object 1208 without ceasing to display the third portion 1208b of the object 1208 in FIG. 12W.

With reference to FIG. 13B, in some embodiments, while displaying the respective object in the drawing user interface and before detecting the pixel erase input: the electronic device displays (1318) within the drawing user interface, a drawing palette including a plurality of content manipulation affordances; detects (1318), via the input device, a first input directed to an eraser affordance of the plurality of content manipulation affordances, wherein the eraser affordance is associated with an eraser tool; in response to detecting the first input, displays (1318) an eraser mode interface including a plurality of eraser mode affordances; detects (1318), via the input device, a second input directed to a first one of the plurality of eraser mode affordances; and in response to detecting the second input, sets (1318) the eraser tool to a pixel erase mode of operation, wherein the pixel erase input is detected while the eraser tool is in the pixel erase mode of operation. By displaying multiple eraser mode affordances within the erase mode interface, the electronic device need not detect multiple inputs in order to display corresponding multiple eraser mode affordances. Accordingly, processor usage, battery usage, and wear-and-tear of the electronic device is reduced. For example, the content manipulation affordances include a pencil affordance, eraser affordance, lasso affordance, highlighter affordance, undo affordance, redo affordance, color pot (e.g., hue and shading), etc. As another example, the first input corresponds to a long press touch or a force touch. In some embodiments, the eraser mode interface is at least partially overlaid on the drawing palette. In some embodiments, the eraser mode interface includes circles of different sizes indicating corresponding thicknesses of an erase operation. In some embodiments, the drawing palette is detachable. In some embodiments, the drawing palette is fixed to a toolbar region. As one example, the electronic device 100 detects the input 1211 in FIG. 12F and accordingly opens the eraser mode interface 1212 in FIG. 12G, and subsequently detects an input 1213 directed to the pixel eraser affordance 1212a in FIG. 12H. In response to detecting the input 1213 in FIG. 12H, the electronic device 100 sets the eraser tool to the pixel erase mode of operation. The electronic device 100 detects the first pixel erase input 1214 while the eraser tool is in the pixel erase mode of operation in FIG. 12K.

In some embodiments, while the eraser tool is in the pixel erase mode of operation: the electronic device detects (1320), via the input device, a third input directed to a second one of the plurality of eraser mode affordances; and in response to detecting the third input, the electronic device sets (1320) the eraser tool to an object erase mode of operation, wherein the object erase input is detected while the eraser tool is in the object erase mode of operation. For example, an eraser tool that is associated with a screenshot markup interface is in the object erase mode of operation. As another example, erasing the object in the object erase mode of operation corresponds to entirely removing (e.g., deleting or ceasing to display) the object. As yet another example, when a speed of the erase input satisfies a speed threshold, the electronic device erases the object. The pixel erase mode different from the object erase mode. As one example, the electronic device 100 detects an input 1215 in FIG. 12M and accordingly opens the eraser mode interface 1212 in FIG. 12N, and subsequently detects an input 1218 directed to the object eraser affordance 1212b in FIG. 12O. In response to detecting the input 1218 in FIG. 12O, the electronic device 100 sets the eraser tool to the object erase mode of operation. The electronic device 100 detects the first object erase input 1220 while the eraser tool is in the object erase mode of operation in FIG. 12K.

In some embodiments, while the eraser tool is in the object erase mode of operation, the eraser affordance has (1322) a first appearance, and while the eraser tool is in the pixel erase mode of operation, the eraser affordance has (1322) a second appearance that is different from the first appearance. By indicating the current erase mode of operation, the electronic device detects fewer erroneous erase inputs directed to within the drawing interface, reducing processor utilization and wear-and-tear of the electronic device. For example, the first appearance includes an "X" near the top of the eraser affordance, as illustrated in FIG. 12Q. As another example, the second appearance includes a shaded area near the top of the eraser affordance, as illustrated in FIG. 12J.

In some embodiments, the first portion of the respective object is (1324) within a first path defined by the pixel erase input. By ceasing to display the first portion based on the first path defined by the pixel erase input, the electronic device provides an accurate erasing mechanism. For example, the length of the first path relative to the size of the object determines whether or not to delete a portion of the object or delete a portion of the object and split the object. As another example, if the length of the first path extends through the object, the electronic device deletes a portion of the object that is within the first path and splits the remaining portion of the object into the second and third portions. As one example, in response to detecting the second pixel erase input 1234 in FIG. 12AH that defines a respective path that does not pass through the object 1208, the electronic device 100 erases a segment of the object without splitting the object 1208 into two separate portions in FIG. 12AI, leaving a fourth portion 1208c of the object 1208.

In some embodiments, the first path defined by the pixel erase input passes (1326) through the respective object, resulting in the second portion of the respective object that is not connected to the third portion of the respective object. For example, the second portion corresponds to a left side of a split square and the third portion corresponds to a right side of the split square. As one example, in response to detecting the first pixel erase input 1214 in FIG. 12K that defines a respective path that passes through the object 1208, the electronic device 100 splits (e.g., divides into two unconnected pieces) the object 1208 into the second portion 1208a and the third portion 1208b in FIG. 12L.

With reference to FIG. 13C, in some embodiments, in response to detecting the object erase input: in accordance with a determination that the object erase input is directed to the second portion of the respective object and that the second portion of the respective object is connected to the third portion of the respective object, the electronic device ceases (1328) to display the second portion of the respective object and ceases (1328) to display the third portion of the respective object. By ceasing to display both the second and third portions of the respective object in response to a single object erase input, the electronic device need not detect multiple erase inputs in order to erase both portions, reducing processor usage, battery usage, and wear-and-tear of the electronic device. For example, the removal of the first portion of the respective object in response to a preceding pixel erase input divided the respective object into the second and third portions. As one example, in response to determining, in FIG. 12AO, that the third object erase input 1240 is directed to the fourth portion 1208c and that the fourth portion 1208c corresponds to one connected drawing mark, the electronic device 100 removes the entirety of the object 1208 in FIG. 12AP.

In some embodiments, in response to detecting the object erase input: in accordance with a determination that the object erase input is directed to the third portion of the respective object and that the third portion of the respective object is connected to the second portion of the respective object, the electronic device ceases (1330) to display the third portion of the respective object and ceases (1330) to display the second portion of the respective object. By ceasing to display both the second and third portions of the respective object in response to a single object erase input, the electronic device need not detect multiple erase inputs in order to erase both portions, reducing processor usage, battery usage, and wear-and-tear of the electronic device. For example, the removal of the first portion of the respective object in response to a preceding pixel erase input divided the respective object into the second and third portions. As one example, in response to determining, in FIG. 12AO, that the third object erase input 1240 is directed to the fourth portion 1208c and that the fourth portion 1208c corresponds to one connected drawing mark, the electronic device 100 removes the entirety of the object 1208 in FIG. 12AP.

In some embodiments, in accordance with a determination that the object erase input defines a third path intersecting the second portion of the respective object and intersecting the third portion of the respective object, the electronic device ceases (1332) to display the second portion of the respective object and ceases (1332) to display the third portion of the respective object. By ceasing to display both the second and third portions of the respective object in response to a single object erase input, the electronic device need not detect multiple erase inputs in order to erase both portions, reducing processor usage, battery usage, and wear-and-tear of the electronic device.

In some embodiments, in response to detecting the object erase input: in accordance with a determination that the object erase input is directed to the second portion of the respective object and that the second portion of the respective object is connected to the third portion of the respective object, the electronic device ceases (1334) to display the second portion of the respective object and ceases (1334) to display the third portion of the respective object; and in accordance with a determination that the object erase input is directed to the third portion of the respective object and that the second portion of the respective object is connected to the third portion of the respective object, the electronic device ceases (1334) to display the second portion of the respective object and ceases (1334) to display the third portion of the respective object. By ceasing to display both the second and third portions of the respective object in response to a single object erase input, the electronic device need not detect multiple erase inputs in order to erase both portions, reducing processor usage, battery usage, and wear-and-tear of the electronic device. As one example, in response to determining, in FIG. 12AO, that the third object erase input 1240 is directed to the fourth portion 1208c and that the fourth portion 1208c corresponds to one connected drawing mark, the electronic device 100 removes the entirety of the object 1208 in FIG. 12AP.

With reference to FIG. 13D, in some embodiments, in accordance with a determination that the object erase input defines a first path intersecting the second portion of the respective object and not intersecting the third portion of the respective object, the electronic device ceases (1336) to display the second portion of the respective object without ceasing to display the third portion of the respective object. By ceasing to display a particular disconnected portion and maintaining the other remaining portions in response to an object erase input, the electronic device provides greater functionality and control with respect to erasing operations. Moreover, the electronic device need not receive a drag erase input that is spatially coextensive with a disconnected portion of an object in order to erase the disconnected portion. By utilizing the object erase input instead of the drag erase input in order to erase the disconnected portion, the electronic device reduces processing and battery utilization and experiences less wear-and-tear. As one example, in response to detecting the first object erase input 1220 in FIG. 12R, the electronic device 100 ceases to display the third portion 1208b of the object 1208 without ceasing to display the second portion 1208a of the object 1208 in FIG. 12S.

In some embodiments, in accordance with a determination that the object erase input defines a second path intersecting the third portion of the respective object and not intersecting the second portion of the respective object, the electronic device ceases (1338) to display the third portion of the respective object without ceasing to display the second portion of the respective object. By ceasing to display a particular disconnected portion and maintaining the other remaining portions in response to an object erase input, the electronic device provides greater functionality and control with respect to erasing operations. Moreover, the electronic device need not receive a drag erase input that is spatially coextensive with a disconnected portion of an object in order to erase the disconnected portion. By utilizing the object erase input instead of the drag erase input in order to erase the disconnected portion, the electronic device reduces processing and battery utilization and experiences less wear-and-tear. As one example, in response to detecting the second object erase input 1224 in FIG. 12V, the electronic device 100 ceases to display the second portion 1208a of the object 1208 without ceasing to display the third portion 1208b of the object 1208 in FIG. 12W.

In some embodiments, while displaying, within the drawing user interface, a drawing palette including a plurality of content manipulation affordances, the electronic device detects (1340), via the input device, a first input directed to a drawing affordance of the plurality of content manipulation affordances; in response to detecting the first input, the electronic device changes (1340) a currently selected tool from an eraser tool to a drawing tool that is associated with the drawing affordance; the electronic device detects (1340), via the input device, a drawing input directed to a canvas of the drawing user interface; and in response to detecting the drawing input, the electronic device performs (1340) a drawing operation on the canvas. By displaying multiple content manipulation affordances, the electronic device need not detect multiple inputs in order to display the multiple content manipulation affordances. Accordingly, battery usage, processor usage, and wear-and-tear of the electronic device is reduced. For example, the plurality of content manipulation affordances includes two or more of a pencil affordance, pen affordance, text insertion affordance, highlighter affordance, etc. As another example, the electronic device also changes an appearance of the drawing affordance in order to distinguish its appearance from the respective appearances of the remainder of the plurality of content manipulation affordances.

In some embodiments, after changing the currently selected tool from the eraser tool to the drawing tool, the electronic device detects (1342), via the input device, a second input directed to an eraser affordance of the plurality of content manipulation affordances, wherein the eraser affordance is associated with the eraser tool; and in response to detecting the second input, the electronic device changes (1342) the currently selected tool from the drawing tool to the eraser tool. As one example, in response to detecting the input 1210 in FIG. 12D, the electronic device 100 changes the currently selected tool from the pencil tool to the eraser tool, as indicated by the eraser affordance 1204g being selected in FIG. 12E.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device with one or more processors, a non-transitory memory, an input device, and a display device:
displaying, via the display device, a drawing user interface;
while displaying the drawing user interface, detecting an object insertion input that corresponds to a request to insert an object in the drawing user interface;
in response to detecting the object insertion input, inserting a respective object in the drawing user interface;
while displaying the respective object in the drawing user interface, detecting a pixel erase input;
in response to detecting the pixel erase input, ceasing to display a first portion of the respective object without ceasing to display a second portion of the respective object and without ceasing to display a third portion of the respective object;
detecting an object erase input defining a path intersecting a portion of the respective object; and
in response to detecting the object erase input:
in accordance with a determination that the object erase input defines a first path intersecting the second portion of the respective object and not intersecting the third portion of the respective object and that the second portion of the respective object is not connected to the third portion of the respective object, ceasing to display the second portion of the respective object without ceasing to display the third portion of the respective object; and
in accordance with a determination that the object erase input defines a second path intersecting the third portion of the respective object and not intersecting the second portion of the respective object and that the third portion of the respective object is not connected to the second portion of the respective object, ceasing to display the third portion of the respective object without ceasing to display the second portion of the respective object.

2. The method of claim 1, further comprising:
in response to detecting the object erase input:
in accordance with a determination that the object erase input defines the first path intersecting the second portion of the respective object and not intersecting the third portion of the respective object and that the second portion of the respective object is connected to the third portion of the respective object, ceasing to display the second portion of the respective object and ceasing to display the third portion of the respective object.

3. The method of claim 1, further comprising:
in response to detecting the object erase input:
in accordance with a determination that the object erase input defines the second path intersecting the third portion of the respective object and not intersecting the second portion of the respective object and that the third portion of the respective object is connected to the second portion of the respective object, ceasing to display the third portion of the respective object and ceasing to display the second portion of the respective object.

4. The method of claim 1, further comprising:
while displaying the respective object in the drawing user interface and before detecting the pixel erase input:
displaying, within the drawing user interface, a drawing palette including a plurality of content manipulation affordances;
detecting, via the input device, a first input directed to an eraser affordance of the plurality of content manipulation affordances, wherein the eraser affordance is associated with an eraser tool;
in response to detecting the first input, displaying an eraser mode interface including a plurality of eraser mode affordances;
detecting, via the input device, a second input directed to a first one of the plurality of eraser mode affordances; and
in response to detecting the second input, setting the eraser tool to a pixel erase mode of operation, wherein the pixel erase input is detected while the eraser tool is in the pixel erase mode of operation.

5. The method of claim 4, further comprising:
while the eraser tool is in the pixel erase mode of operation:
detecting, via the input device, a third input directed to a second one of the plurality of eraser mode affordances; and
in response to detecting the third input, setting the eraser tool to an object erase mode of operation, wherein the object erase input is detected while the eraser tool is in the object erase mode of operation.

6. The method of claim 5, wherein, while the eraser tool is in the object erase mode of operation, the eraser affordance has a first appearance, and wherein, while the eraser tool is in the pixel erase mode of operation, the eraser affordance has a second appearance that is different from the first appearance.

7. The method of claim 1, further comprising:
while displaying, within the drawing user interface, a drawing palette including a plurality of content manipulation affordances, detecting, via the input device, a first input directed to a drawing affordance of the plurality of content manipulation affordances;
in response to detecting the first input, changing a currently selected tool from an eraser tool to a drawing tool that is associated with the drawing affordance;

detecting, via the input device, a drawing input directed to a canvas of the drawing user interface; and in response to detecting the drawing input, performing a drawing operation on the canvas.

8. The method of claim 7, further comprising:

after changing the currently selected tool from the eraser tool to the drawing tool, detecting, via the input device, a second input directed to an eraser affordance of the plurality of content manipulation affordances, wherein the eraser affordance is associated with the eraser tool; and in response to detecting the second input, changing the currently selected tool from the drawing tool to the eraser tool.

9. The method of claim 1, wherein the first portion of the respective object is within a third path defined by the pixel erase input.

10. The method of claim 9, wherein the third path defined by the pixel erase input passes through the respective object, resulting in the second portion of the respective object that is not connected to the third portion of the respective object.

11. The method of claim 1, wherein:

in accordance with a determination that the first path passes through the second portion of the respective object and does not pass through the third portion of the respective object, ceasing to display the second portion of the respective object without ceasing to display the third portion of the respective object; and in accordance with a determination that the second path passes through the third portion of the respective object and does not pass through the second portion of the respective object, ceasing to display the third portion of the respective object without ceasing to display the second portion of the respective object.

12. The method of claim 1, further comprising, in accordance with a determination that the object erase input defines a third path intersecting the second portion of the respective object and intersecting the third portion of the respective object, ceasing to display the second portion of the respective object and ceasing to display the third portion of the respective object.

13. The method of claim 12, further comprising:

in response to detecting the object erase input:

in accordance with a determination that the third path passes through the second portion of the respective object and passes through the third portion of the respective object, ceasing to display the second portion of the respective object and ceasing to display the third portion of the respective object.

14. An electronic device comprising:

one or more processors;

a non-transitory memory;

an input device;

a display device; and one or more programs, wherein the one or more programs are stored in the non-transitory memory and configured to be executed by the one or more processors, the one or more programs including instructions for:

displaying, via the display device, a drawing user interface;

while displaying the drawing user interface, detecting an object insertion input that corresponds to a request to insert an object in the drawing user interface;

in response to detecting the object insertion input, inserting a respective object in the drawing user interface;

while displaying the respective object in the drawing user interface, detecting a pixel erase input;

in response to detecting the pixel erase input, ceasing to display a first portion of the respective object without ceasing to display a second portion of the respective object and without ceasing to display a third portion of the respective object;

detecting an object erase input defining a path intersecting a portion of the respective object; and in response to detecting the object erase input:

in accordance with a determination that the first path intersecting the second portion of the respective object and not intersecting the third portion of the respective object and that the second portion of the respective object is not connected to the third portion of the respective object, ceasing to display the second portion of the respective object without ceasing to display the third portion of the respective object; and in accordance with a determination that the second path intersecting the third portion of the respective object and not intersecting the second portion of the respective object and that the third portion of the respective object is not connected to the second portion of the respective object, ceasing to display the third portion of the respective object without ceasing to display the second portion of the respective object.

15. The electronic device of claim 14, the one or more programs including instructions for:

in response to detecting the object erase input:

in accordance with a determination that the object erase input defines the first path intersecting the second portion of the respective object and not intersecting the third portion of the respective object and that the second portion of the respective object is connected to the third portion of the respective object, ceasing to display the second portion of the respective object and ceasing to display the third portion of the respective object.

16. The electronic device of claim 14, the one or more programs including instructions for:

in response to detecting the object erase input:

in accordance with a determination that the object erase input defines the second path intersecting the third portion of the respective object and not intersecting the second portion of the respective object and that the third portion of the respective object is connected to the second portion of the respective object, ceasing to display the third portion of the respective object and ceasing to display the second portion of the respective object.

17. The electronic device of claim 14, the one or more programs including instructions for:

in accordance with a determination that the first path passes through the second portion of the respective object and does not pass through the third portion of the respective object, ceasing to display the second portion of the respective object without ceasing to display the third portion of the respective object; and in accordance with a determination that the second path passes through the third portion of the respective object and does not pass through the second portion of the respective object, ceasing to display the third portion of the respective object without ceasing to display the second portion of the respective object.

18. The electronic device of claim 14, the one or more programs including instructions for: in accordance with a determination that the object erase input defines a third path intersecting the second portion of the respective object and intersecting the third portion of the respective object, ceasing to display the second portion of the respective object and ceasing to display the third portion of the respective object.

19. The electronic device of claim 18, the one or more programs including instructions for:
   in response to detecting the object erase input:
      in accordance with a determination that the third path passes through the second portion of the respective object and passes through the third portion of the respective object, ceasing to display the second portion of the respective object and ceasing to display the third portion of the respective object.

20. A non-transitory computer readable storage medium storing one or more programs, the one or more programs comprising instructions, which, when executed by an electronic device with one or more processors, an input device, and a display device, cause the electronic device to:
   display, via the display device, a drawing user interface;
   while displaying the drawing user interface, detect an object insertion input that corresponds to a request to insert an object in the drawing user interface;
   in response to detecting the object insertion input, insert a respective object in the drawing user interface;
   while displaying the respective object in the drawing user interface, detect a pixel erase input;
   in response to detecting the pixel erase input, cease to display a first portion of the respective object without ceasing to display a second portion of the respective object and without ceasing to display a third portion of the respective object;
   detect an object erase input defining a path intersecting a portion of the respective object; and
   in response to detecting the object erase input:
      in accordance with a determination that the first path intersecting the second portion of the respective object and not intersecting the third portion of the respective object and that the second portion of the respective object is not connected to the third portion of the respective object, cease to display the second portion of the respective object without ceasing to display the third portion of the respective object; and
      in accordance with a determination that the second path intersecting the third portion of the respective object and not intersecting the second portion of the respective object and that the third portion of the respective object is not connected to the second portion of the respective object, cease to display the third portion of the respective object without ceasing to display the second portion of the respective object.

21. The non-transitory memory of claim 20, the one or more programs including instructions for:
   in response to detecting the object erase input:
      in accordance with a determination that the object erase input defines the first path intersecting the second portion of the respective object and not intersecting the third portion of the respective object and that the second portion of the respective object is connected to the third portion of the respective object, ceasing to display the second portion of the respective object and ceasing to display the third portion of the respective object.

22. The non-transitory memory of claim 20, the one or more programs including instructions for:
   in response to detecting the object erase input:
      in accordance with a determination that the object erase input defines the second path intersecting the third portion of the respective object and not intersecting the second portion of the respective object and that the third portion of the respective object is connected to the second portion of the respective object, ceasing to display the third portion of the respective object and ceasing to display the second portion of the respective object.

23. The non-transitory memory of claim 20, the one or more programs including instructions for:
   in accordance with a determination that the first path passes through the second portion of the respective object and does not pass through the third portion of the respective object, ceasing to display the second portion of the respective object without ceasing to display the third portion of the respective object; and
   in accordance with a determination that the second path passes through the third portion of the respective object and does not pass through the second portion of the respective object, ceasing to display the third portion of the respective object without ceasing to display the second portion of the respective object.

24. The non-transitory memory of claim 20, the one or more programs including instructions for: in accordance with a determination that the object erase input defines a third path intersecting the second portion of the respective object and intersecting the third portion of the respective object, ceasing to display the second portion of the respective object and ceasing to display the third portion of the respective object.

25. The non-transitory memory of claim 24, the one or more programs including instructions for:
   in response to detecting the object erase input:
      in accordance with a determination that the third path passes through the second portion of the respective object and passes through the third portion of the respective object, ceasing to display the second portion of the respective object and ceasing to display the third portion of the respective object.

* * * * *